(12) United States Patent
Stephens

(10) Patent No.: US 11,600,045 B2
(45) Date of Patent: Mar. 7, 2023

(54) COLLABORATIVE LIGHT SHOW AUTHORING FOR TESSELLATED GEOMETRIES

(71) Applicant: Contraventum, LLC, Georgetown, TX (US)

(72) Inventor: Arthur Stephens, Georgetown, TX (US)

(73) Assignee: CONTRAVENTUM, LLC, Georgetown, TX (US)

( * ) Notice: Subject to any disclaimer, the term of this patent is extended or adjusted under 35 U.S.C. 154(b) by 0 days.

(21) Appl. No.: 17/650,150

(22) Filed: Feb. 7, 2022

(65) Prior Publication Data

US 2022/0366648 A1    Nov. 17, 2022

Related U.S. Application Data

(63) Continuation of application No. 17/301,233, filed on Mar. 30, 2021, now Pat. No. 11,282,276.

(51) Int. Cl.
| | |
|---|---|
| *G06T 17/20* | (2006.01) |
| *F21V 23/00* | (2015.01) |
| *F21S 4/10* | (2016.01) |
| *H05B 47/105* | (2020.01) |
| *G06T 13/00* | (2011.01) |
| *F21V 23/04* | (2006.01) |
| *A47G 33/08* | (2006.01) |

(52) U.S. Cl.
CPC ............ *G06T 17/20* (2013.01); *F21S 4/10* (2016.01); *F21V 23/003* (2013.01); *F21V 23/045* (2013.01); *G06T 13/00* (2013.01); *H05B 47/105* (2020.01); *A47G 33/0836* (2013.01)

(58) Field of Classification Search
None
See application file for complete search history.

(56) References Cited

U.S. PATENT DOCUMENTS

2018/0153019 A1* 5/2018 Forbis ................... F21V 3/00

* cited by examiner

*Primary Examiner* — Elmito Breval
(74) *Attorney, Agent, or Firm* — Craige Thompson; Thompson Patent Law; Timothy D. Snowden

(57) ABSTRACT

Apparatus and associated methods relate to providing an optical display apparatus that can be used to make a light source display variable apparent sizes in response to light intensities emitted by the light source. In an illustrative example, the optical display apparatus may have a first baffle arranged on the top of a light source. The optical display apparatus may also include a second baffle, the first baffle may be nested in the second baffle such that a first intensity of a first beam of light guided within the first baffle is stronger than a second intensity of the second beam of light guided between the first baffle and the second baffle. By adjusting the light intensities, different display regions of a translucent diffuser may be lit, which may provide controllable apparent sizes of a light structure.

20 Claims, 132 Drawing Sheets

Figure 10
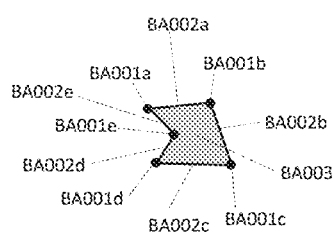
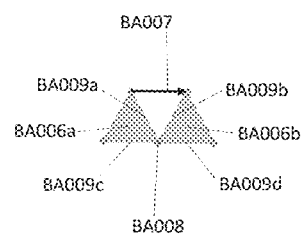
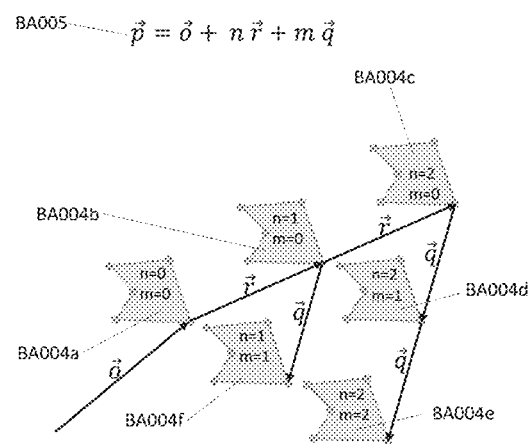

Figure 22
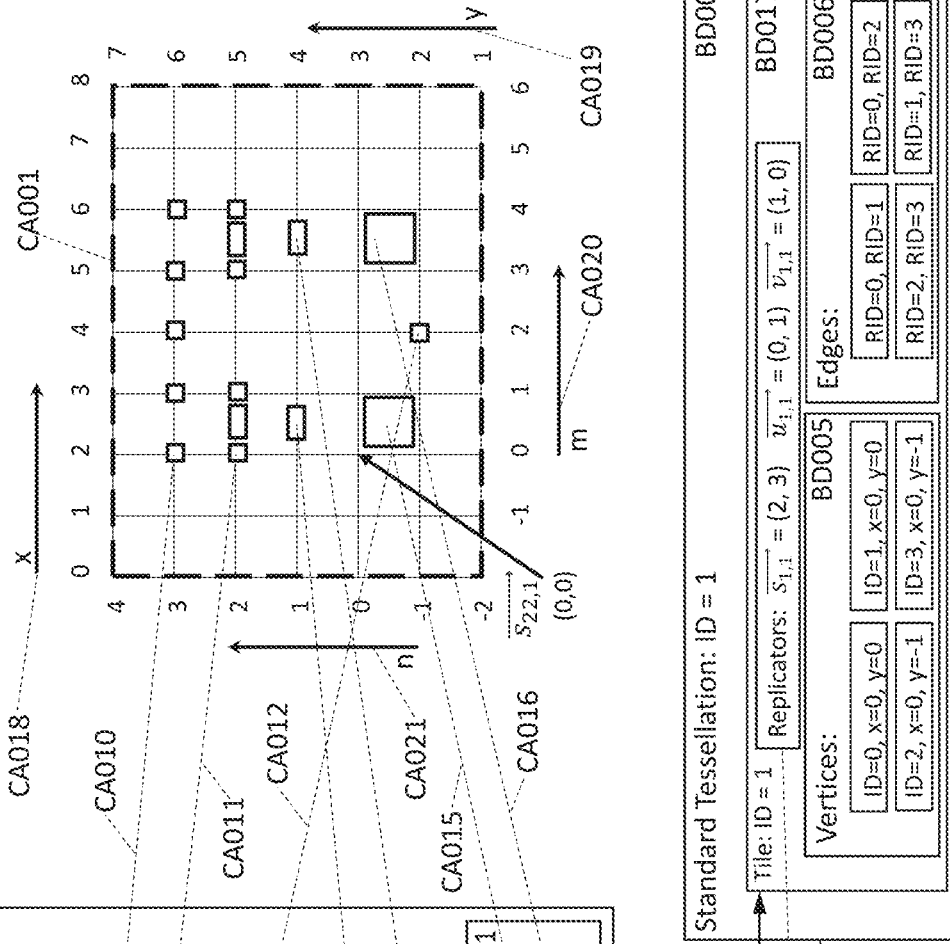
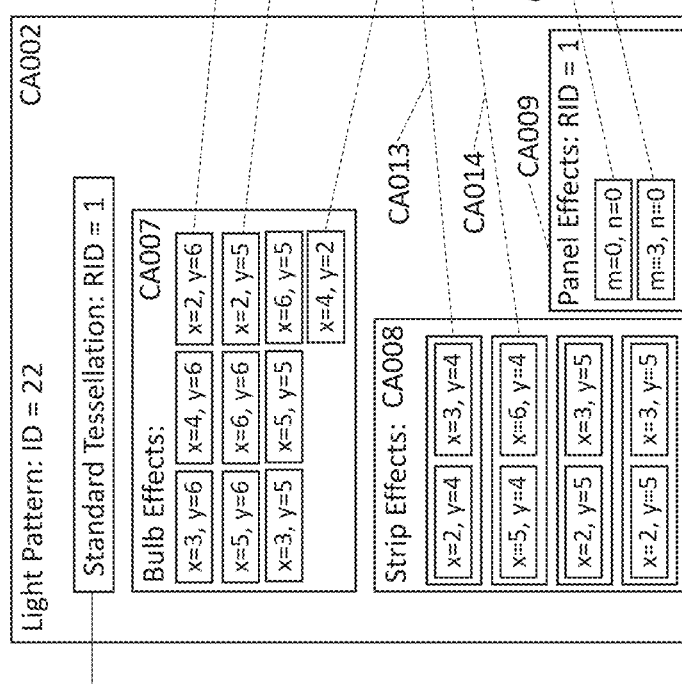

Figure 98

$$\text{Thresh\_func}(\text{Ambient\_est}_j + \text{Back\_func}(\text{Threshold}_j \times \sum_{i=0}^{N} \text{Unit\_brightness}_{j,i})) = \text{Threshold}_j \quad \text{JK001}$$

$$\text{Thresh\_grad} \times (\text{Ambient\_est}_j + \text{Back\_grad\_est}_j \times \text{Threshold}_j \times \sum_{i=0}^{N} \text{Unit\_brightness}_{j,i}) + \text{Thresh\_icpt} = \text{Threshold}_j \quad \text{JK002}$$

$$\text{Threshold}_j = \frac{\text{Thresh\_grad} \times \text{Ambient\_est}_j + \text{Thresh\_icpt}}{1 - \text{Thresh\_grad} \times \text{Back\_grad\_est}_j \times \sum_{i=0}^{N} \text{Unit\_brightness}_{j,i}} \quad \text{JK003}$$

$$\text{Total\_brightness}_j = \text{Threshold}_j \times \sum_{i=0}^{N} \text{Unit\_brightness}_{j,i} \quad \text{JK004}$$

$$\text{Back\_grad\_sample}_j = \frac{\text{Back\_sample}_j - \text{Back\_sample}_k}{\text{Total\_brightness}_j - \text{Total\_brightness}_k} \quad \text{JK005}$$

$$\text{Back\_contrib}_j = \text{Back\_grad\_est}_j \times \text{Total\_brightness}_j \quad \text{JK006}$$

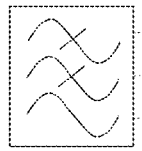 JK007

$$\text{Filtered}_j = (1 - \text{Decay}^{m+1}) \times \text{Sample}_j + \text{Decay}^{m+1} \times \text{Filtered}_{j-1} \quad \text{JK008}$$

$$\text{Filtered}_j = (1 - \text{Decay}) \times \text{Sample}_j + \text{Decay} \times \text{Filtered}_{j-1} \quad \text{JK009}$$

Figure 109

```
MH003c ---- function propagateToStartAt(fromSeg, fromPath, visitedPaths) {
              let toSeg = fromPath.getMySceneSyncSegEnd(fromSeg.getOtherEndId());
              let toPath = toSeg.getMovePath();
              if (visitedPaths.has(toPath)) {
                  throw new Error("encountered a sync loop");
              };
              visitedPaths.add(toPath);
MH002a ----  let fromInterval = fromPath.largestIntervalTo(fromSeg);
MH002b ----  let fromStartAt = fromPath.latestStartAtTime();
              for (let toGenKey of toPath.usedByIter()) {
                  let genElems = toPath.getDirectGen(toGenKey).genElems;
                  let toInterval = toPath.sumIntervalTo(toGenKey, toSeg);
                  genElems.genStartAt = fromStartAt + (fromInterval - toInterval);
              };
MH004c ----  propagateFromStartAt(toPath, visitedPaths);
           };                                                                          } MH001c
MH003b ---- function propagateFromStartAt(symPath, visitedPaths) {
              symPath.forEachSegment(function(segObj) {
                  if ((segObj.getSegType() === "syncEnd") && (!segObj.isToSyncEnd())) {
MH004b ----       propagateToStartAt(segObj, symPath, visitedPaths);
                  };
                  return false;
              }, symPath);
           };                                                                          } MH001b
MH003a ---- function propagateStartAt(rootPath) {
              let visitedPaths = new Set([rootPath]);
MH004a ----  propagateFromStartAt(rootPath, visitedPaths);
           };                                                                          } MH001a
```

COLLABORATIVE LIGHT SHOW AUTHORING FOR TESSELLATED GEOMETRIES

CROSS-REFERENCE TO RELATED APPLICATIONS

This application is a continuation of and claims the benefit of U.S. application Ser. No. 17/301,233 titled "COLLABORATIVE LIGHT SHOW AUTHORING FOR TESSELLATED GEOMETRIES," filed by Arthur Stephens, on Mar. 30, 2021, which application is a continuation-in-part of and claims the benefit of PCT Application Serial No. PCT/US19/61402 titled "COLLABORATIVE LIGHT SHOW AUTHORING FOR TESSELLATED GEOMETRIES," filed by Arthur Stephens, on Nov. 14, 2019, which application claims: the benefit of U.S. Provisional Application Ser. No. 62/768,460 titled "Collaborative Light Show Authoring For Tessellated Geometries," filed by Arthur Stephens, on Nov. 16, 2018, the benefit of U.S. Provisional Application Ser. No. 62/769,103, titled "Collaborative Light Show Authoring For Tessellated Geometries," filed by Arthur Stephens, on Nov. 19, 2019, and the benefit of U.S. Provisional Application Ser. No. 62/875,805, titled "Collaborative Light Show Authoring For Tessellated Geometries," filed by Arthur Stephens, on Jul. 18, 2019. U.S. application Ser. No. 17/301,233 also claims: the benefit of U.S. Provisional Application Ser. No. 63/004,330 titled "LIGHT STRUCTURES WITH VARIABLE APPARENT SIZE," filed by Arthur Stephens on Apr. 2, 2020, and the benefit of U.S. Provisional Application Ser. No. 63/040,574 titled "Collaborative Light Show Creation and Display," filed by Arthur Stephens on Jun. 18, 2020.

This application incorporates the entire contents of the foregoing applications herein by reference.

TECHNICAL FIELD

Various embodiments relate generally to creation and display of light shows.

BACKGROUND

Using light emitting diodes (LEDs) for lighting displays, such as holiday lighting, decorative displays, signage, or architectural accents, has become common. By combining primary colored LED lights of red, green and blue, most any common color is easily generated by these lights. Decorative lights are used on buildings for many reasons, the most common of which is probably to celebrate the Christmas season. The decorative lights are typically fixed in color and celebratory purpose. For example, some light strings may include a number of lights that all have the same color (e.g., all white, all red, etc.). Some light Strings may include a number of lights that are multicolored (e.g., red, green, blue, yellow, white). Further, some of these light strings may be designed to all be lit at the same time, while others may be designed to turn on and off intermittently (e.g., flashing or blinking). Many of these lights are suitably colored for a particular holiday, e.g., Christmas, where the lights may be solid red and green.

Lighting controllers are designed to control white light (or monochromatic light) in a theatrical or high-end business setting. A light producing monochromatic light, such as white, blue, or red, can be changed primarily along a single dimension brightness—from off to a maximum brightness. Different controllers permit a user to specify a brightness for each light over time.

SUMMARY

Apparatus and associated methods relate to having a number of separate discretional graphics and a number of discretional motions and merging or combining the discretional graphics with discretional motions to create a light animation for a light show. In an illustrative example, one or more authors may be contributed to the design of the number of separate discretional graphics, one or more authors may be contributed to the design of the number of discretional motions. In one or more embodiments, the creation of Light Show content is simplified so significantly (e.g., collaborative authoring of Light Show content) that new forms of light show become practical.

Apparatus and associated methods relate to providing an optical display apparatus can be used to make a light source display variable apparent sizes in response to light intensities emitted by the light source. In an illustrative example, the optical display apparatus may have a first baffle arranged to guide a first beam of light being distributed over a first angle with respect to an optical axis that originates at a light source, and a second baffle arranged to guide a second beam of light being distributed over a second angle with respect to a surface defined by the first angle that originates at the light source, the first baffle may be nested in the second baffle such that a first intensity of the first beam of light is stronger than a second intensity of the second beam of light. By adjusting the light intensities, different display regions of a translucent diffuser may be lit to a level which is visible for the background light level and this may provide controllable apparent sizes of a light structure.

Apparatus and associated methods relate to providing a subsystem to adjust light brightness in response to ambient light changes to get a uniform illusion. In an illustrative example, the sub system may include one or more of light sensors configured to monitor the ambient light level. Light sensors may be positioned near a physical light set. The light sensor may include one or more photodetectors that measure sufficient light frequencies to adequately capture the light level that may be observed by the human eye. The position and orientation of one or more Light Sensors allows them to capture good information on the background light level, which is the ambient light level plus the background light level change due to the light from the physical light set. By implementing the subsystem, the brightness of this light may be adjusted when the ambient light level changes.

Apparatus and associated methods relate to providing a graphical user interface (GUI) that is able to capture graphical moves. In an illustrative example, the GUI may include a first window configured to enter and edit model paths for one or more light models and a second window configured to enter and edit one or more timelines that may determine the timing of multi-pattern animations included in one or more Light Models. In some embodiments, the GUI may define the speed of movement and time spent stationary. The GUI may enable the creation of light animations with many model paths, and each of the model paths may have traversals with independent start times.

Apparatus and associated methods relate to providing a graphical user interface (GUI) that is able to allow user generate data entry for end points of a straight-line segment that may be included in a model movement. In an illustrative example, the mouse button may be clicked during the display of an option line then the option line may be selected for the straight-line segment. The GUI may display the option line with an end point that is closest to the mouse pointer. Other movements of the mouse pointer may be used to create any straight line segments that is possible within the limited area of standard tessellation that is displayed. By providing the GUI, designers may select from available displayed steps, which may advantageously reduce the design time of an animation.

Various embodiments may achieve one or more advantages. For example, some embodiments may provide an efficient way to generate an animation. Different authors may design artwork, for example, a snowman, and some authors may design motions. Those pictures and motions may be stored, for example, in cloud for future use. In addition, the design process may be happened in parallel, which may also advantageously reduce the design time of an animation. Some embodiments provide optical processing structures that may be used to adjust light apparent sizes. By adjusting light apparent sizes, more animations may be presented in a light show. Some embodiments provide methods and systems to adjust light brightness level in response to ambient environments. Thus, a light show may be presented with a better visual effect. In addition, reducing the light brightness may be good for power saving, which may reduce the light show expense. Some embodiments may enable designers to select from available displayed steps, which may advantageously reduce the design time of an animation.

BRIEF DESCRIPTION OF THE DRAWINGS

FIG. 10 illustrates a method for generating 2D tessellated geometries.

FIG. 22 illustrates a Light Pattern that complies with a tessellated geometry.

FIG. 98 includes equations that may be used to adjust light brightness in response to ambient light changes.

FIG. 109 includes a depiction of JavaScript Software which may be used to propagate Start At times over Model Paths that are connected using Sync Links.

Figure 120:
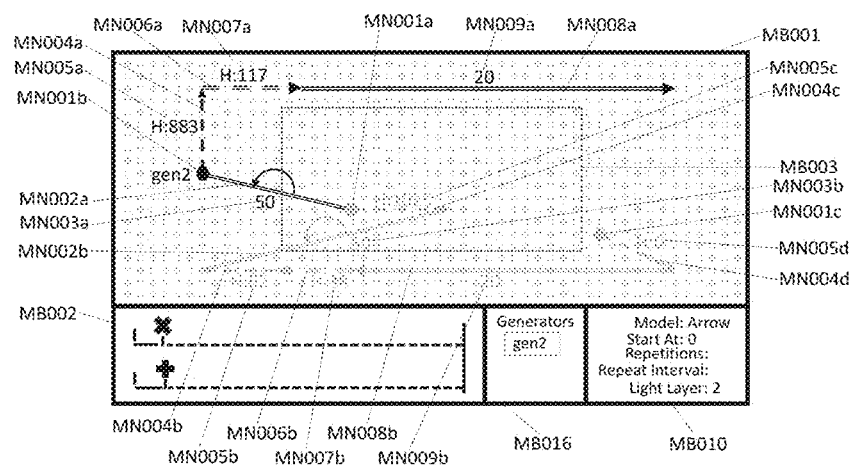

FIG. 120 includes a depiction of windows from a human computer interface which is capturing Model Paths that have Harmonized Timing.

Figure 121:
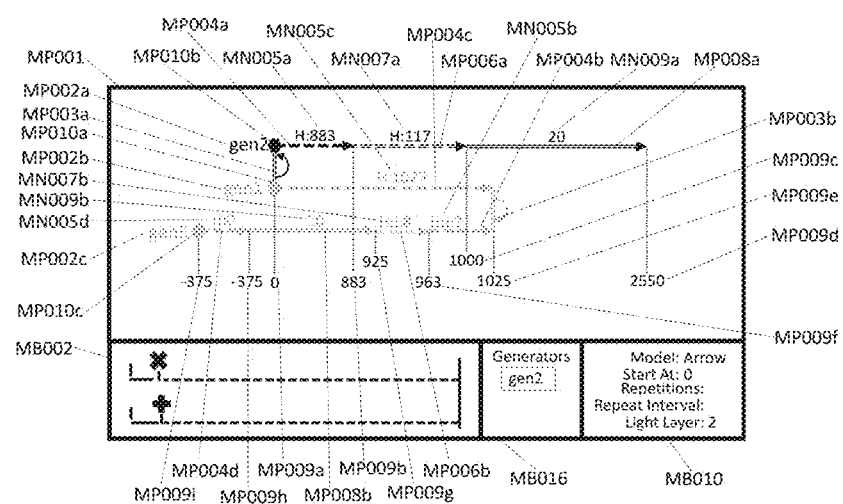

FIG. 121 includes a depiction of windows from a human computer interface which is displaying a Timeline representation of several Model Paths.

Figure 122:
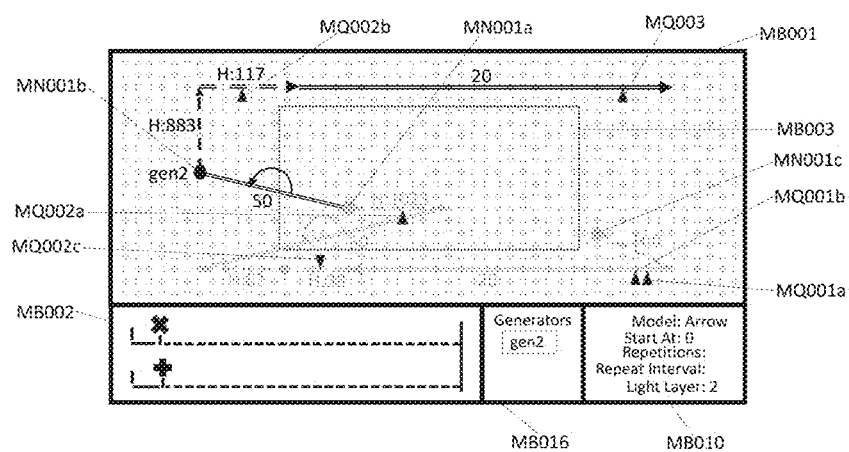

FIG. 122 includes a depiction of windows from a human computer interface which is displaying an animation of Light Model movement.

Figure 123:
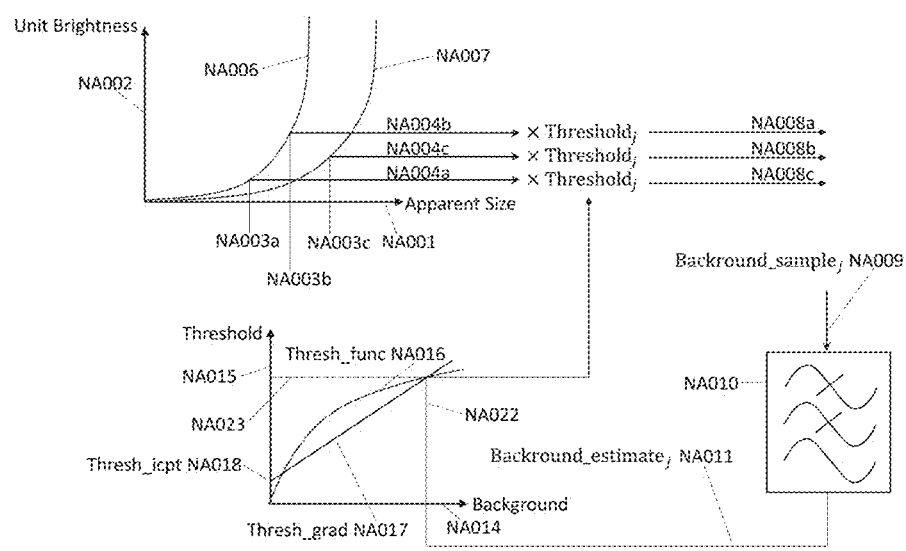

FIG. 123 includes a depiction of a method for adjusting light brightness in response to ambient light changes.

Figure 124:
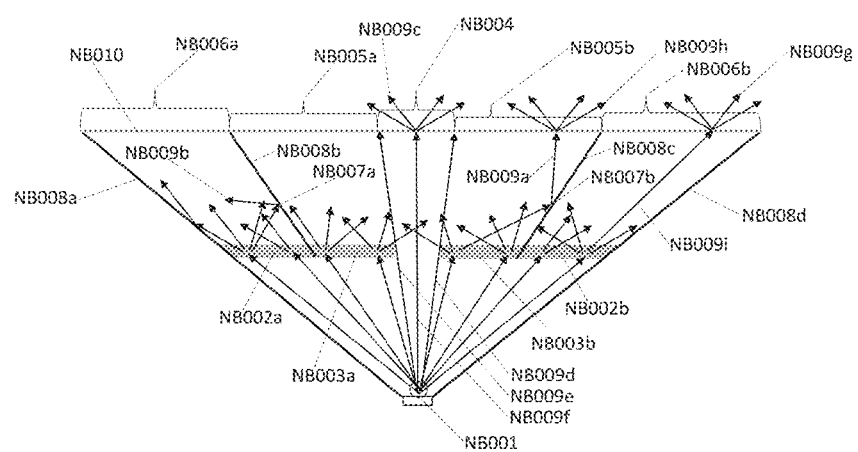

FIG. 124 includes a depiction of a method that may be used to enlarge the apparent size change of a light when its brightness varies.

Figure 125:
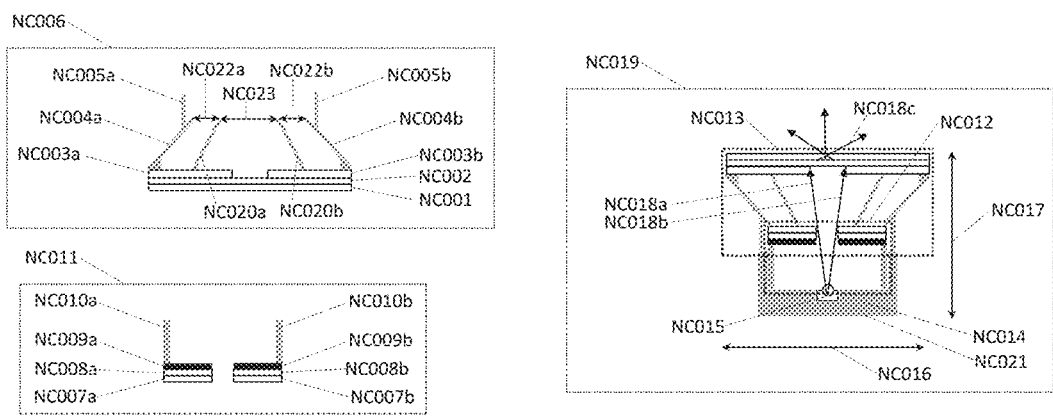

FIG. 125 includes a depiction of a light with enlarged apparent size change that may be constructed with a 3D Printer.

Figure 126:
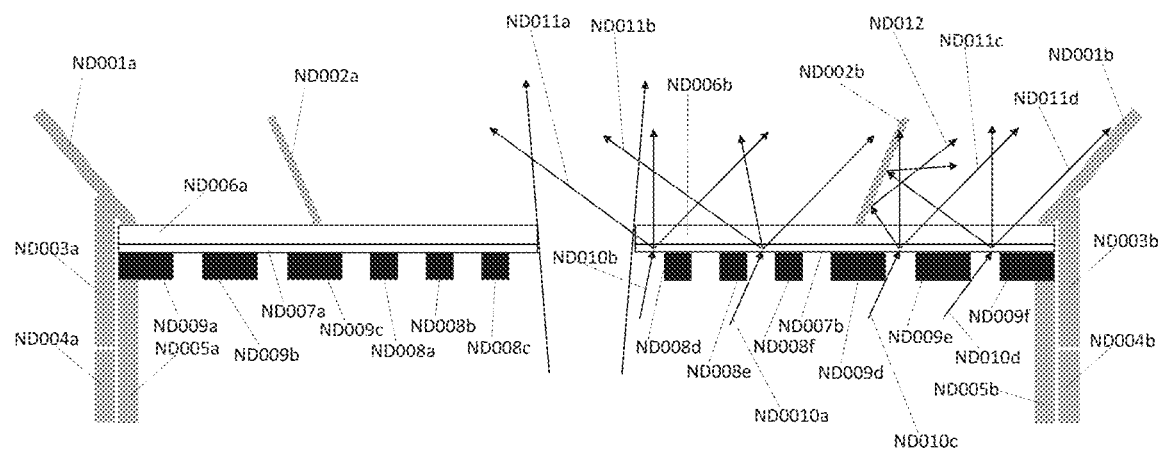

FIG. 126 includes a depiction of part of a light with enlarged apparent size change that may be constructed with a 3D Printer.

Figure 127:
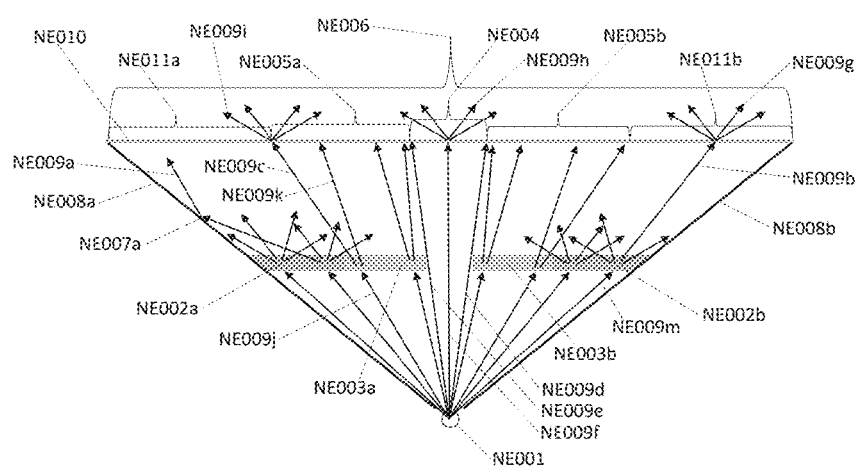

FIG. 127 includes a depiction of a method that may be used to enlarge the apparent size change of a light when its brightness varies.

Figure 128:
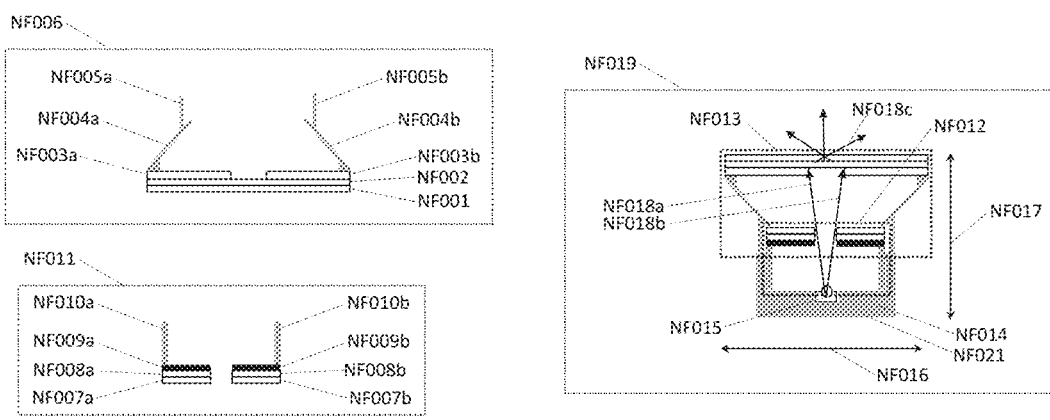

FIG. 128 includes a depiction of a light with enlarged apparent size change that may be constructed with a 3D Printer.

Figure 129:
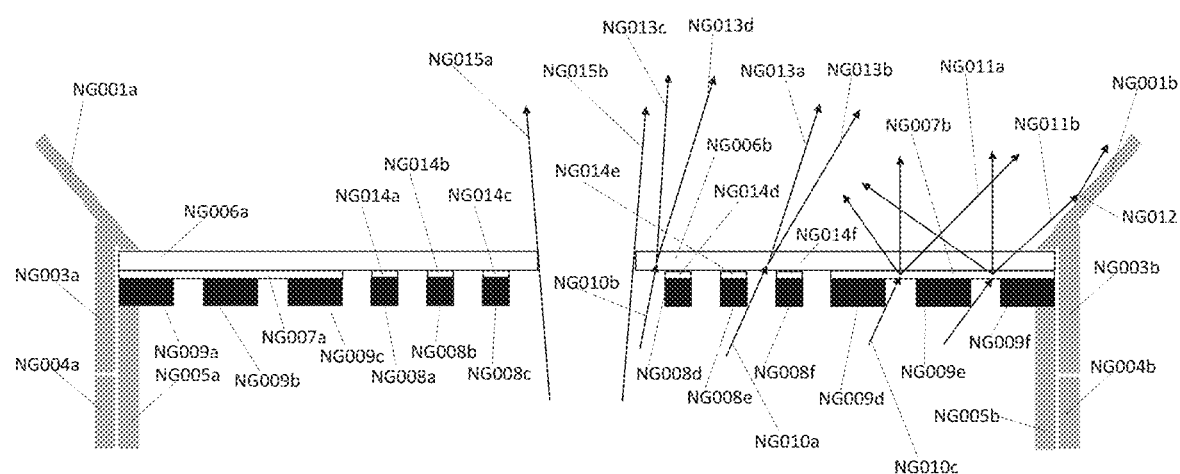

FIG. 129 includes a depiction of part of a light with enlarged apparent size change that may be constructed with a 3D Printer.

Figure 130:
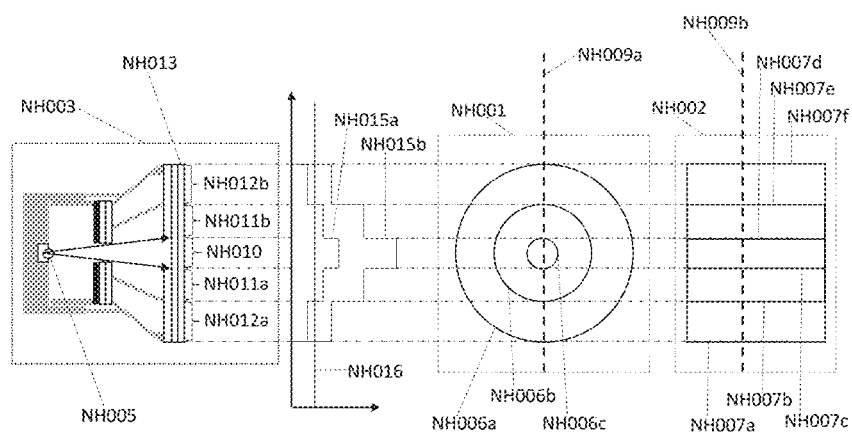

FIG. 130 includes a depiction of several lights with enlarged apparent size change that may be constructed with a 3D Printer.

Figure 1:
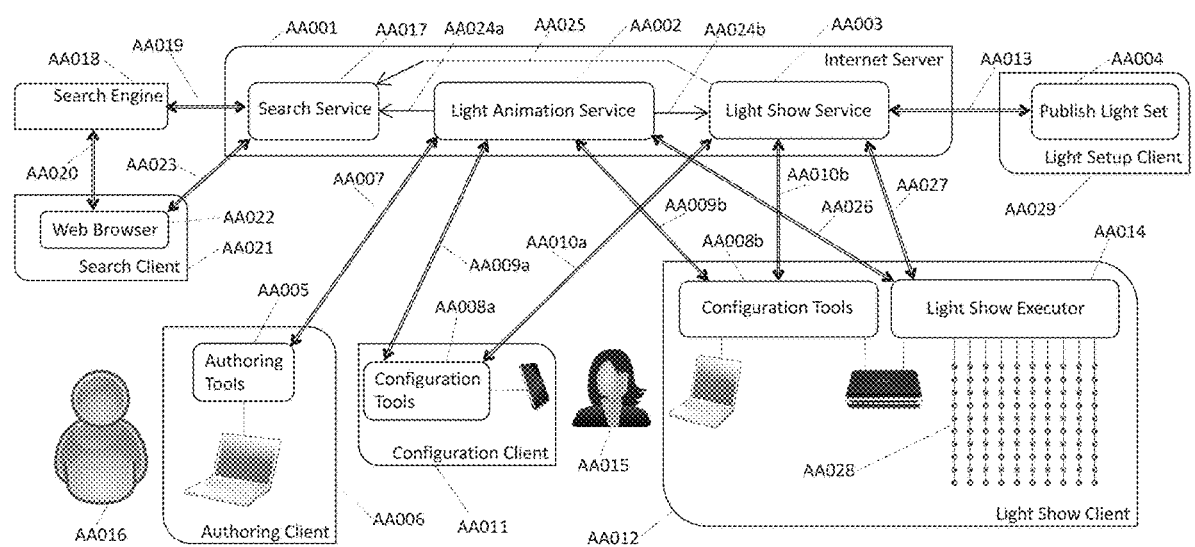
FIG. 1 shows an exemplary architecture for a Collaborative Light Show Authoring System.
Figure 131:
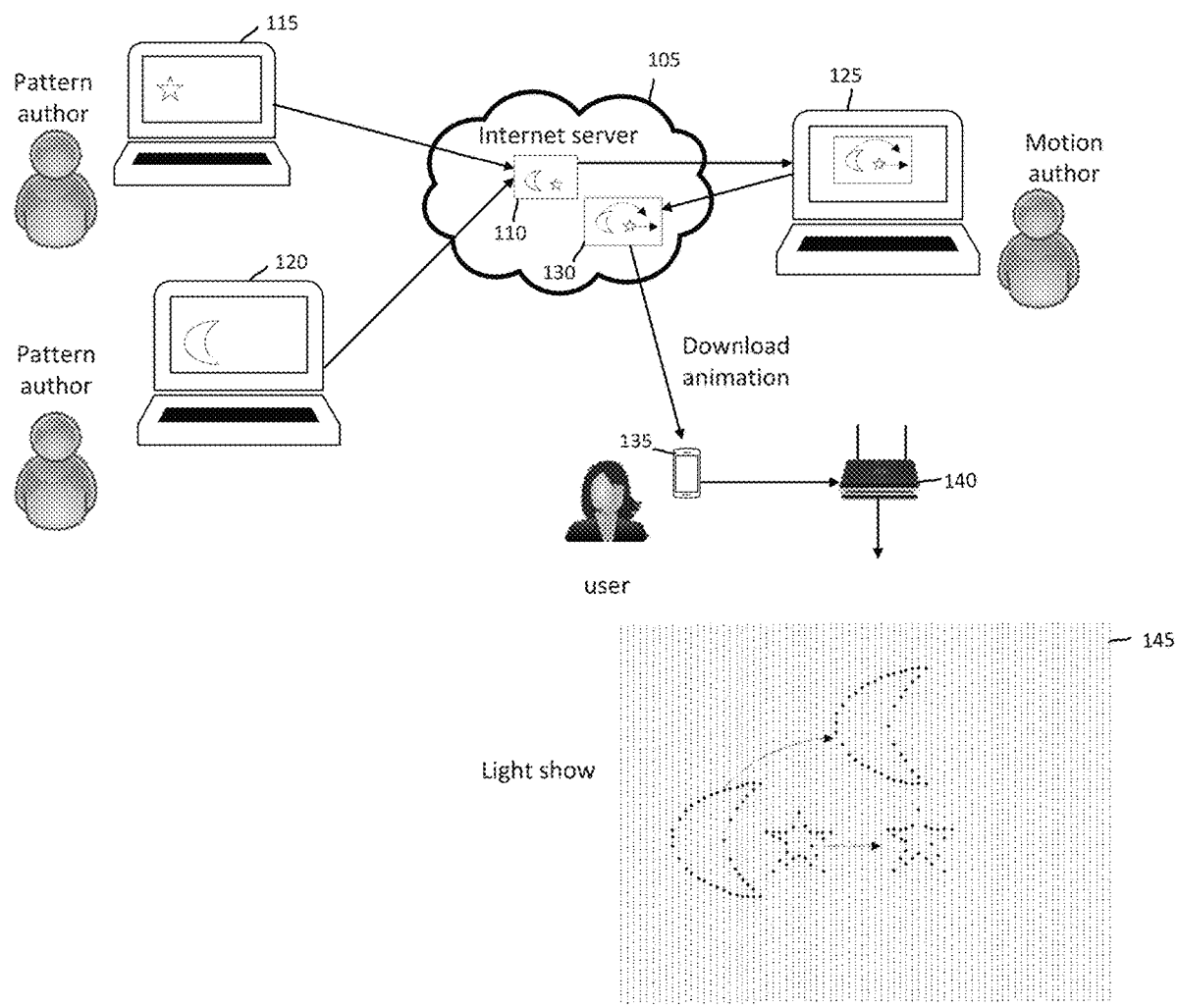

FIG. 131 depicts the exemplary generation and display of an animation by a system that has the exemplary architecture of FIG. 1.

Figure 132:
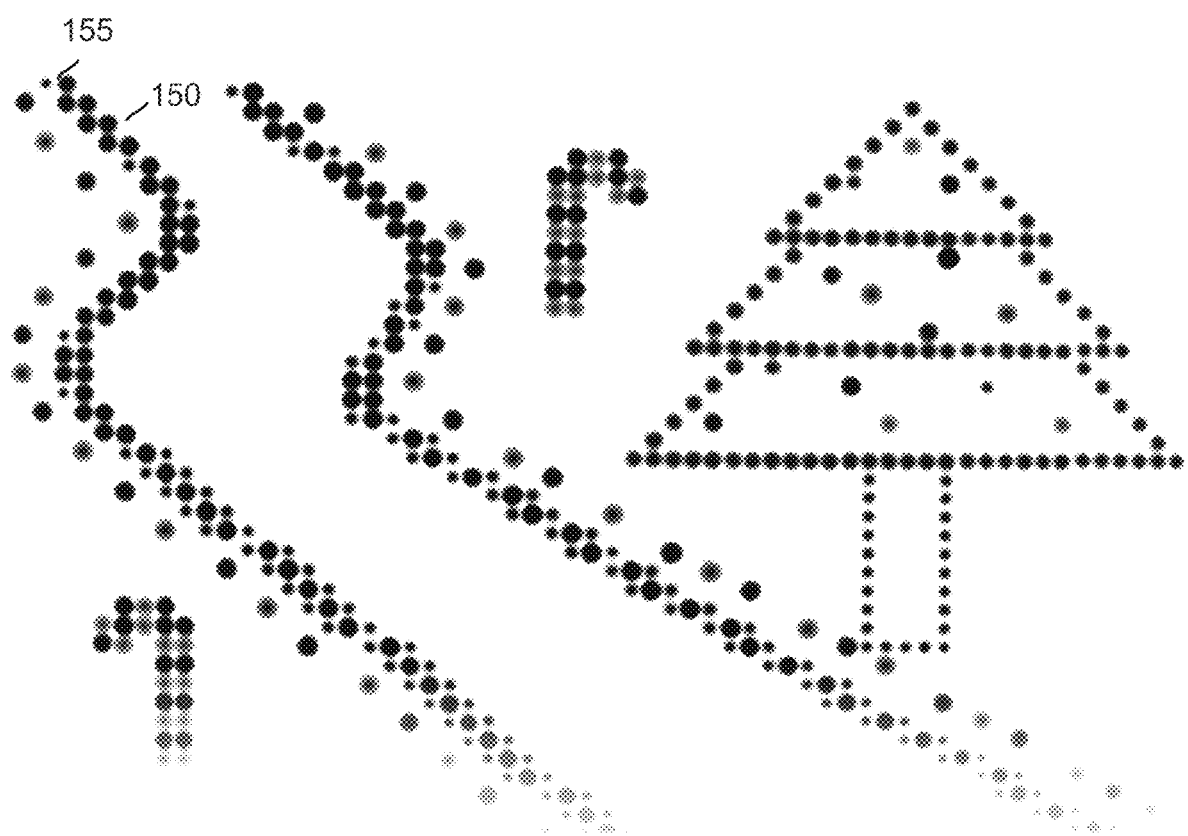

FIG. 132 depicts an exemplary light show implemented with lights having variable apparent sizes.

DETAILED DESCRIPTION OF ILLUSTRATIVE EMBODIMENTS

Many terms are used in this description, for example "Full Light Set" or "Show Content", the same name in different parts of the document, with or without Figure reference numbers, normally refers to the same functional element, message or data structure. Some terms, such as "Full Light Set" may be applied to both a physical object and the data structure used to represent it.

FIG. 1 is a top level functional diagram of an exemplar Collaborative Light Show Authoring system that may be used to author Light Shows for display on one or more Physical Light Sets that include one or more subsets of lights with Perspective Projections that present Tessellated Light Geometries. Internet Server AA001, which is typically a large computer system, provides a plurality of communication services that include Light Animation Service AA002, Light Show Service AA003 and Search Service AA017. Authoring Client AA06, Configuration Client AA011 and Search Client A021 are Electronic Devices, for example a Cell Phone or a Laptop, and may be general purpose. Light Show Client AA012 may also be a general purpose Electronic Device with an interface that can control Physical Light Set AA028, but it will typically be an Electronic Device that has been designed to control Physical Light Set AA028 for minimal cost. Light Animation Service AA002 and Authoring Tools AA005 communicate via messages over Communication Channel AA007, a plurality of Communication Channels AA007 connecting Internet Server AA001 to a plurality of Authoring Clients AA006. Light Animation Service AA002 and Configuration Tools AA008 communicate via messages over Communication Channel AA009, for example AA009a and AA009b, a plurality of Communication Channels AA009 connecting Internet Server AA001 to a plurality of Electronic Devices which may be either a Configuration Client AA011 or a Light Show Client AA012. Light Show Service AA003 and Configuration Tools AA008 communicate via messages over Communication Channel AA010, for example AA010a and AA010b, a plurality of Communication Channels AA010 connecting Internet Server AA001 to a plurality of Electronic Devices that may be either a Configuration Client AA011 or a Light Show Client AA012. Search Service AA017 and Search Engine AA018 communicate via messages over Communication Channel AA019, one or more Communication Channels AA019 connecting one or more Search Engines AA018 to Internet Server AA001. Search Service AA017 and Web Browser AA022 communicate via messages over Communication Channel AA023, a plurality of Communication Channels AA023 connecting Internet Server AA001 to a plurality of Search Clients AA021. Search Engine AA018 and Web Browser AA022 communicate via messages over Communication Channel AA020, a plurality of Communication Channels AA020 connecting a Search Engine AA018 to a plurality of Search Clients AA021. One or more First Users AA016 may use Authoring Tools AA005 to create one or more Light Animations and these may be used to produce one or more Light Shows by one or more Second Users AA015. Both First Users AA016 and Second Users AA015 may find Published Content to use via Web Browser AA022 on Search Client AA021. Publish Light Set AA004, on Light Setup Client AA029, may be used to add Full Light Set data structures to Light Show Service AA003 using Communication Channel AA013. Entities that want to add Full Light Set data structures will typically create one or more Physical Light Sets that they apply to, for example a manufacturer that mass produces Light Show Clients AA012.

The exemplar Collaborative Light Show Authoring system shown in FIG. 1 allows for the functionality of Configuration Tools AA008 to be provided on either a Configuration Client AA011 or a Light Show Client AA012. The general purpose Electronic Devices typically used for Authoring Client AA06, Configuration Client AA011 and Search Client A021 may have an interface for a human user. The purpose specific Electronic Device typically used for Light Show Client AA012 may often not have a user interface, when it doesn't Configuration Tools AA08b may support a Web Server interface, or other network based interface, which may allow Second Users AA015 access to its functionality via a Web Browser, or other application.

In one or more embodiments Communication Channels AA007, AA013, AA009, AA010, AA020, AA019, AA023, AA026, AA027 and all other Communication Channels in this document may be, packet based, IP datagrams or TCP/IP connections. These multi-hop connections may be run over a wide variety of underlying physical links, for example Wi-Fi or Ethernet for LAN links and Optical Fiber or Cellular RF for WAN links. The messages described in this document may be sent over TCP/IP connections and, as a consequence, may each be a segment of a formatted data stream that is transferred using one or more IP datagrams.

Figure 2:
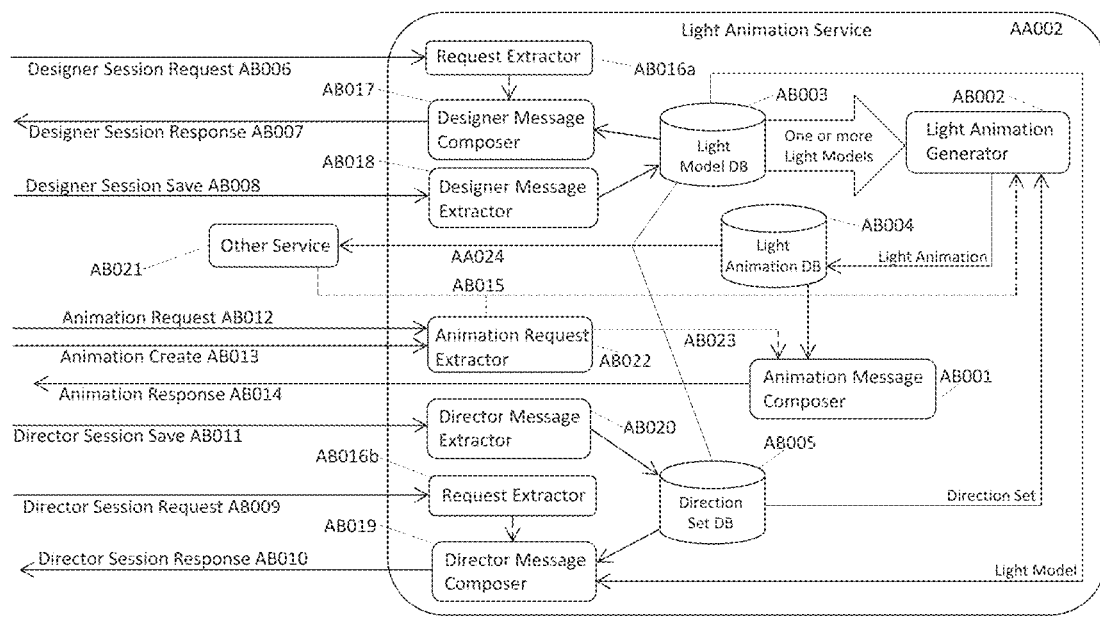
FIG. 2 shows a functional diagram for the Light Animation Service of the exemplar architecture.

FIG. 2 shows some functional details of Light Animation Service AA002. The Communication Messages that may be sent over a Communication Channel AA007 may include one or more of AB006-14. The Communication Messages that may be sent over a Communication Channel AA009 may include one or more of AB009, AB010, AB012 or AB014. The Communication Messages that may be sent over a Communication Channel AA026 may include one or more of AB012 or AB014. A Request Extractor AB016, for example AB016a-b, can interpret any Communication Message sent on Communication Channels AA007, AA009 or AA026. When Request Extractor AB016a sees a Designer Session Request AB007, on Communication Channel AA007, it causes Design Message Composer AB017 to get, from Light Model DB AB003, one or more of a Light Model, Standard Tessellation or list of Model Names and include them in a Designer Session Response AB006 that is sent back to the source of the Designer Session Request AB006. When Designer Message Extractor AB018, which may include a Request Extractor AB016, sees a Designer Session Save AB008, on Communication Channel AA007, it saves the Light Model included in the Designer Session Save AB008 to Light Model DB AB003. When Request Extractor AB016b sees a Director Session Request AB009, on Communication Channels AA007 or AA009, it causes Director Message Composer AB019 to get, from Direction Set DB AB005 or Light Model DB AB003, one or more of a Direction Set, Light Model or list of Direction Names and include them, with any associated data, in a Director Session Response AB010 that is sent back to the source of the Director Session Request AB009. When Director Message Extractor AB020, which may include a Request Extractor AB016, sees a Director Session Save AB011, on Communication Channel AA007, it saves the Direction Set included in the Director Session Save AB011 to Direction Set DB AB005. When Animation Request Extractor AB022, which may include a Request Extractor AB016, sees an Animation Request AB012, on Communication Channels AA007, AA009 or AA026, it sends a Signal AB015 to Light Animation Generator AB002 and waits for a response. On receiving the response, Animation Request Extractor AB022 sends Signal AB023 to Animation Message Composer AB001 causing it to include the requested Light Animation, from Light Animation DB AB004, in an Animation Response AB014 that is sent to the source of the Animation Request AB012. When Animation Request Extractor AB022 sees an Animation Create AB013, on Communication Channel AA007, it sends a Signal AB015 to Light Animation Generator AB002. On receiving a Signal AB015 Light Animation Generator AB002 tests the creation date of the requested Light Animation against the last update dates and times of the Direction Set and Light Models used to create it. If the Light Animation is older than either the Direction Set or any Light Model used in its creation then Animation Generator AB002 creates a new Light Animation from its sources before responding to Signal AB015. Other Service AB021 can be either Search Service AA017 or Light Show Service AA003, these services may request any Light Model, Direction Set or Light Animation they want over Service Connection AA024, using Signal AB015 to update a Light Animation before requesting it.

Figure 3:
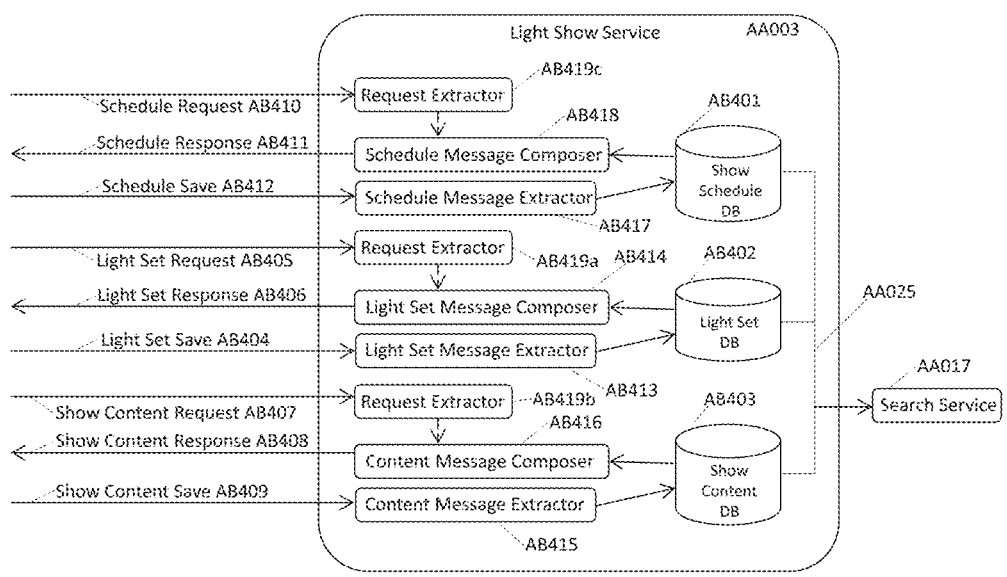
FIG. 3 shows a functional diagram for the Light Show Service of the exemplar architecture.

FIG. 3 shows some functional details of Light Show Service AA003. The Communication Messages that may be sent over a Communication Channel AA010 may include one or more of AB405-12. The Communication Messages that may be sent over a Communication Channel AA013 may include one or more of AB404-6. The Communication Messages that may be sent over a Communication Channel AA027 may include one or more of AB405-8 or AB410-11. A Request Extractor AB419, for example AB419a-c, can interpret any Communication Message sent on Communication Channels AA010, AA013 or AA027. When Request Extractor AB419a sees a Light Set Request AB405, on Communication Channel AA010, AA013 or AA027, it causes Light Set Message Composer AB414 to get, from Light Set DB AB402, a Full Light Set data structure, with its associated Tessellated Light Sets and Standard Tessellations, and include it in a Light Set Response AB406 that is sent back to the source of the Light Set Request AB405. When Light Set Message Extractor AB413, which may include a Request Extractor AB419, sees a Light Set Save AB404, on Communication Channel AA013, it saves the Full Light Set and Tessellated Light Set data structures, included in the Light Set Save AB404, to Light Set DB AB402. When Request Extractor AB419b sees a Show Content Request AB407, on Communication Channel AA010 or AA027, it causes Content Message Composer AB416 to get, from Show Content DB AB403, either a Show Content data structure or one or more Content Names and include it or them in a Show Content Response AB408 that is sent back to the source of the Show Content Request AB407. When Content Message Extractor AB415, which may include a Request Extractor AB419, sees a Show Content Save AB409, on Communication Channel AA010, it saves the Show Content, included in the Show Content Save AB409, to Show Content DB AB403. When Request Extractor AB419c sees a Schedule Request AB410, on Communication Channel AA010 or AA027, it causes Schedule Message Composer AB418 to get, from Show Schedule DB AB401, Animated Show and Daily Schedule data structures and include them in a Schedule Response AB411 that is sent back to the source of the Schedule Request AB410. When Schedule Message Extractor AB417, which may include a Request Extractor AB419, sees a Schedule Save AB412, on Communication Channel AA010, it saves the Animated Show and Daily Schedule data structures, included in the Schedule Save AB412, to Show Schedule DB AB401. Search Service AA017 can get any Show Content, Full Light Set, Tessellated Light Set, Standard Tessellation, Animated Show or Daily Schedule data structures it wants over Service Connection AA025.

Figure 4:
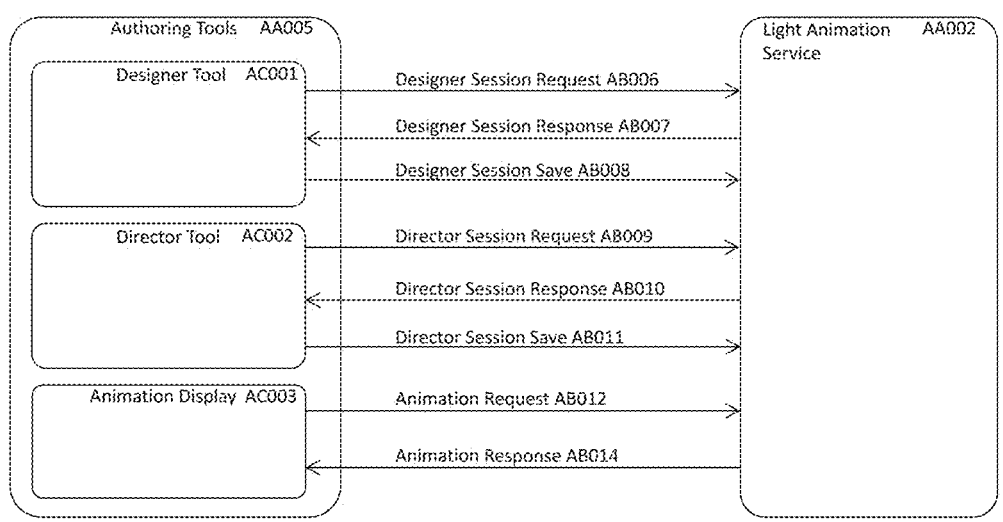
FIG. 4 shows a functional diagram for the Authoring Tools of the exemplary architecture.

FIG. 4 shows some functional details of Authoring Tools AA005. Designer Tool AC001 may provide, via a human computer interface, for the editing of one or more Light Models, which include the multiple Light Patterns that may be used to create a traditional multi-pattern animated effect. At any point in time, Director Tool AC002 may provide for the editing of a Direction Set via a human computer interface, this editing may include the ability to modify a description of the motion and pattern changes for multiple Light Models. Animation Display AC003, may provide a graphical simulation, on a human computer interface, of the Light Animation that was last downloaded for the Direction Set that was last saved by Director Tool AC002.

Designer Tool AC001 in FIG. 4 may make several different uses of Light Animation Service AA002. Many of these different uses include one or more Design Transactions, each of which includes a Designer Session Request AB006/Designer Session Response. Initially, Designer Tool AC001 may use a Design Transaction to recover, and subsequently display, all of the Model Names of Light Models held, in Light Model DB AB003, for First User AA016. If First User AA016 subsequently selects one of the Model Names, via the human computer interface of Authoring Client AA006, then a second Design Transaction may be used to recover the Light Model, for the selected Model Name, with its associated Standard Tessellation. Recovery of the Light Model may lead to its display on the human computer interface and maybe to edits by First User AA016. Any modifications made may be saved, to Light Model DB AB003, by sending a Designer Session Save AB008 message to Light Animation Service AA002. If First User AA016 enters a Tessellation Name, into the human computer interface, then Designer Tool AC001 may use a Design Transaction to recover the Standard Tessellation, with the name, from Light Model DB AB003. The human computer interface may subsequently configure itself for the Standard Tessellation downloaded, allowing the entry of a new Light Model that uses it. This new Light Model may be saved to Light Model DB AB003 using a Designer Session Save AB008 message. During an edit session, for a single Light Model, Designer Tool AC001 may perform one or more subsequent Design Transactions, which may send Designer Session Save AB008 messages and/or load Light Models and Model Names in any order. Any Tessellation Name entered may be used to access an existing Standard Tessellation. In one or more embodiments, the currently configured set of Standard Tessellation Names may be found via Search Service AA017. Light Models may be accessed, in Light Model DB AB003, using a key that includes a Model Name and a User Name, consequently Model Names may be reused by different First Users AA016. Standard Tessellations may be accessed, in Light Model DB AB003, using a key that includes the Tessellation Name, consequently in one or more embodiments they may be unique across all Users. In one or more embodiments, a default Standard Tessellation for Light Models may be configured into Designer Tool AC001 and used to provide a default configuration of its human computer interface.

Director Tool AC002 shown in FIG. 4 may make several different uses of Light Animation Service AA002. Many of these different uses include one or more Director Transactions, each of which includes a Director Session Request AB009/Director Session Response AB010. Initially, Director Tool AC002 may use a Director Transaction to recover, and subsequently display, all of the Direction Names of Direction Sets held, in Direction Set DB AB005, for a First User AA016. If First User AA016 subsequently selects one of the Direction Names, via the human computer interface of Authoring Client AA006 for Authoring Tools AA005, then a second Director Transaction may be used to recover the Direction Set for the selected Direction Name. Recovery of the Direction Set may lead to its display, on the human computer interface of Authoring Client AA006, and maybe to edits by First User AA016. Any modifications made may be saved, to Direction Set DB AB005, by sending a Director Session Save AB011 message to Light Animation Service AA002. If no Direction Name is selected then when First User AA016 specifies a Light Model, to include in the new Direction Set, a Director Transaction may be used to recover the Light Model and its associated Standard Tessellation. The Light Model recovered may be used for visualization within the Director Tool. Any Standard Tessellation downloaded may be used by a new Direction Set and to configure the human computer interface part of Director Tool AC002. Subsequent to recovery of a Direction Set or first Light Model by Director Tool AC002, from Light Animation Service AA002, First User AA016 may cause Director Tool AC002 to recover more Light Models using Director Transactions. All Light Models included in a Direction Set should share a Standard Tessellation. The new Direction Set, and any modifications made to it, may be saved, to Direction Set DB AB005, by sending a Director Session Save AB011 message to Light Animation Service AA002. During an edit session, for a single Direction Set, Director Tool AC002 may perform one or more subsequent Director Transactions, which may send Director Session Save AB011 messages and/or load Direction Sets, Light Models or Direction Names in any order. Direction Sets are accessed, in Direction Set DB AB005, using a key that includes a Direction Name and a User Name, consequently Direction Names may be reused by different First Users AA016. In one or more embodiments, a default Standard Tessellation, for Direction Sets, may be configured into Director Tool AC002 and used to provide a default configuration of its human computer interface. In one or more embodiments, a Direction Set that uses the default Standard Tessellation and includes no Light Models may be saved to Light Animation Service AA002 by Director Tool AC002. Please note that any Model Names entered into Director Tool AC002 may be obtained from Designer Tool AC001, and that, in one or more embodiments, Director Tool AC002 may provide direct access to Model Names available to Designer Tool AC001.

Animation Display AC003 shown in FIG. 4, may send one or more Animation Requests AB012 during a single session. Each Animation Request AB012 may be for the Direction Name of the Direction Set currently loaded into Director Tool AC002 and may cause Light Animation Service AA002 to first ensure Light Animation DB AB004 has an up to date Light Animation and then return the up to date Light Animation in an Animation Response AB014. Animation Display AC003 may use the Light Animation returned to provide an up to date graphical simulation, on the human computer interface of Authoring Client AA006 for Animation Display AC003, of the Light Animation defined by the Direction Set that was last saved by Director Tool AC002. An Animation Request AB012/Animation Response AB014 may also be referred to as an Animation Transaction. The human computer interface, of Animation Display AC003, may include an explicit mechanism for initiation of an Animation Transaction, for example a button. In one or more embodiments other user activity may initiate an Animation Transaction, for example a save message, either Designer Session Save AB008 or Director Session Save AB011, from either Designer Tool AC001 or Director Tool AC002 or a save message followed by moving the mouse focus to a window of the human computer interface of Animation Display AC003.

In one or more embodiments, Authoring Tools AA005 may have a human computer interface that can provide simultaneous display from Designer Tool AC001, Director Tool AC002 and Animation Display AC003. This simultaneous display allows a First User AA016 to quickly visualize the consequences of any change made, for example changes to the Light Animation displayed that are a consequence of a change to a Light Model may be immediately seen. In one or more embodiments, Authoring Tools AA005 may have multiple human computer interfaces, displaying each of Designer Tool AC001, Director Tool AC002 and Animation Display AC003 on one or more of them. In one or more embodiments, selection of a Light Model in Director Tool AC002 may cause Designer Tool AC001 to switch to the Light Model selected, this switching feature may be dependent on the current edit state of the Light Model, in Designer Tool AC001, in order to avoid the loss of any changes that have not been saved. In one or more embodiments Designer Session Save AB008 or Director Session Save AB011 may cause an amendment of their DB record, by Light Animation Service AA002, that has no associated version history. In one or more embodiments Designer Session Save AB008 or Director Session Save AB011 may cause an update of their DB record, by Light Animation Service AA002, that preserves a version history, additionally this record may allow previous versions to be seen from other references by the same or other Users. In one or more embodiments Light Animation Service AA002 has a Web Server interface for Communication Channel AA007 and Authoring Tools AA005 is one or more Web Pages, with associated scripts, presented via a Web Browser. In one or more embodiments, Authoring Tools AA005 may be an Application on a Cell Phone, Notepad or other Electronic Device.

Figure 5:
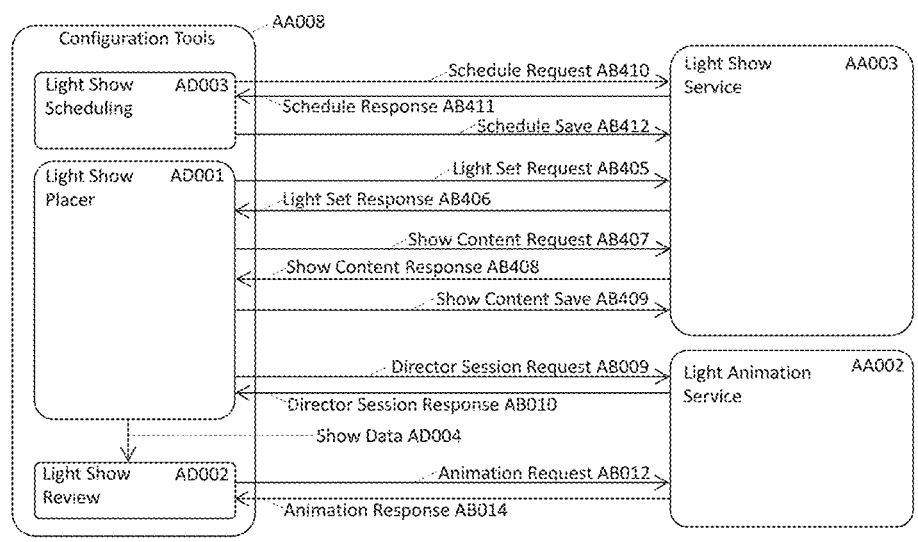
FIG. 5 shows a functional diagram for the Configuration Tools of the exemplary architecture.

FIG. 5 shows some functional details of Configuration Tools AA008. Light Show Placer AD001 enables, via a human computer interface, Second User AA015 to place one or more Light Animations on the one or more Tessellated Light Sets that can be provided by the lights of a Light Show Client AA012. The Physical Light Sets in a Light Show Client AA012 may include one or more Full Light Set light arrangements, each of which may include one or more Tessellated Light Sets.

A Light Set Request AB405/Light Set Response AB406 message exchange may be used, by Light Show Placer AD001, to obtain one Full Light Set with its associated Tessellated Light Sets and Standard Tessellations. A Show Content Request AB407/Show Content Response AB408 message exchange may be used, by Light Show Placer AD001, to obtain one Show Content or the one or more Show Content names that are available, from Light Show Service AA003, to Second User AA015. Show Content Save AB409 may be used, by Light Show Placer AD001, to send a Show Content to Light Show Service AA003. This message may be used to either create a new Show Content or modify an existing one, on Light Show Service AA003. A Director Session Request AB009/Director Session Response AB010 message exchange may be used, by Light Show Placer AD001, to obtain the names of the Light Animations that are available, from Light Show Service AA003, to Second User AA015. Second User AA015 may use the human computer interface, for Light Show Placer AD001, to: obtain a Full Light Set, with its associated Tessellated Light Sets and Standard Tessellations, and the Light Animation names, available to Second User AA015, by entering a Light Set Name; optionally request the names of Show Contents available to her; use the human computer interface, of Light Show Placer AD001, to place Light Animations on a display, of the Tessellated Light Sets, and give them Start Times relative to the start of the Show Content. Light Show Review AD002 enables, via a human computer interface, the Second User AA015 to see a representation of the Light Show that the Show Content may produce on the Full Light Set. An Animation Request AB012/Animation Response AB014 may be used by Light Show Review AD002 to obtain a Light Animation. Light Show Review AD002 may need to obtain one or more Light Animations in order for Second User AA015 to see the Light Show that the Show Content should produce. Show Data AD004 depicts Light Show Review AD002 obtaining the Full Light Set that it may need for its Light Show display from Light Show Placer AD001, along with any associated Tessellated Light Sets, Standard Tessellations, and Show Content.

A Schedule Request AB410/Schedule Response AB411 message exchange may be used, by Light Show Scheduling AD003, to obtain, from Light Show Service AA003, one Daily Schedule EB007 or the one or more Schedule Names EB009 that are available to Second User AA015. Schedule Save AB412 may be used, by Light Show Scheduling AD003, to either create a new Daily Schedule EB007 or modify an existing one, on Light Show Service AA003. Light Show Scheduling AD003 enables, via a human computer interface, Second User AA015 to create a Daily Schedule EB007 that enables a Light Show Client AA012 to display one or more Light Shows, that each include one or more Animated Shows, on one or more Full Light Sets, at one or more times in the future.

In one or more embodiments, the Light Set Name, entered into Light Show Placer AD001 by Second User AA015, may be selected, on a human computer interface by Second User AA015, from a display of Light Set Name List AE003, that is available on Light Show Client AA012, and in one or more embodiments this list may be made available on another Electronic Device. In one or more embodiments, Light Show Service AA003 may have a Web Server interface for Communication Channel AA010, Light Animation Service AA002 may have a Web Server interface for Communication Channel AA009 and Configuration Tools AA008 may be one or more Web Pages, with associated scripts, presented via a Web Browser. In one or more embodiments, Configuration Tools AA008 may be an Application on a Cell Phone, Notepad or other Electronic Device. In one or more embodiments, Light Show Review AD002 may visualize the Light Show that has been defined using 3D computer graphics generated by the client. In one or more embodiments, Light Show Review AD002 may visualize the Light Show that has been defined using 3D computer graphics streamed by a Server. In one or more embodiments, Light Show Review AD002 may visualize the Light Show that has been defined using a video of a Light Show Client displaying the Light Show.

Figure 6:
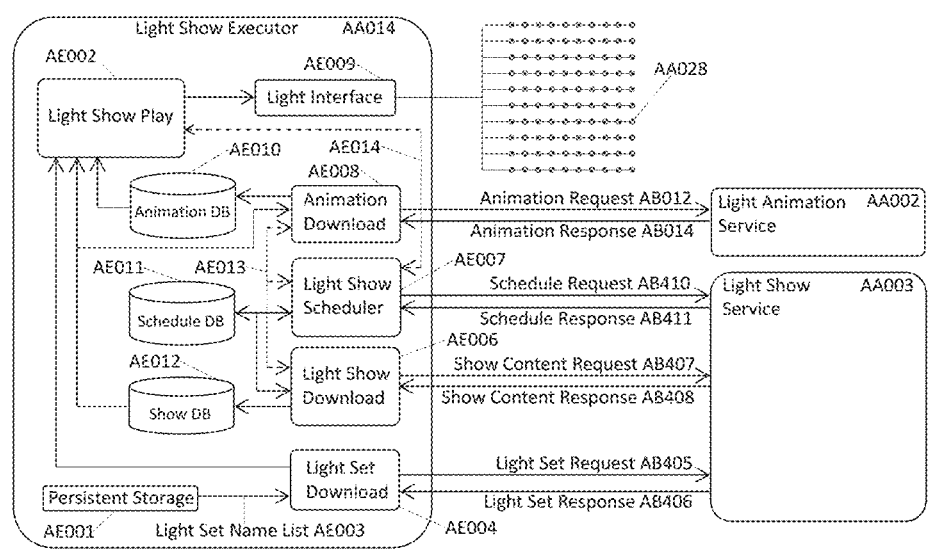
FIG. 6 shows a functional diagram for the Light Show Executor of the exemplary architecture.

FIG. 6 shows some functional details of Light Set Executor AA014. On startup, Light Set Name List AE003 is read from Persistent Storage AE001 by Light Set Download AE004. Immediately after Communication Channel AA027 is active, Light Set Download AE004 may obtain the one or more Full Light Sets, and their associated Tessellated Light Sets, named in Light Set Name List AE003, using one or more Light Set Request AB405/Light Set Response AB406 message exchanges. Whilst Communication Channel AA027 is active, Light Show Scheduler AE007 may poll the active Daily Schedule, using one or more Schedule Request AB410/Schedule Response AB411 message exchanges, held by Light Show Service AA003, keeping a copy of it in Schedule DB AE011. After a modified active Daily Schedule is saved to Schedule DB AE011, a First Signal AE013 may be sent to Light Show Download AE006, by Light Show Scheduler AE007, causing it to download the one or more Show Contents, using Show Content Request AB407/Show Content Response AB408 message exchanges, that have references in the Daily Schedule. After the one or more Show Contents referenced by the Daily Schedule are saved to Show DB AE012, a Second Signal AE013 may be sent to Animation Download AE008, by Light Show Download AE006, causing it to download one or more Light Animations, using Animation Request AB012/Animation Response AB014 message exchanges, from Light Animation Service AA002. After the one or more Light Animations, referenced by the Show Contents, are saved to Animation DB AE010, a Third Signal AE013 may be sent to Light Show Scheduler AE007, by Animation Download AE008, causing it to execute the Daily Schedule. During Daily Schedule execution, Light Show Scheduler AE007 sends a First Signal AE014, to Light Show Play AE002, when an Animated Show should be played and receives a Second Signal AE014, from Light Show Play AE002, when an Animated Show has finished. First Signal AE014 includes a Reference ID for the Animated Show, from the Daily Schedule, to be displayed. Light Show Play AE002 responds to First Signal AE014 by: loading the one or more Show Contents, referred to in the Animated Show, from Show DB AE012; loading the one or more Light Animations, referred to in the Show Contents, from Animation DB AE010; generating a Light Control signal to Light Interface AE009 in order to display the Light Show; sending a Second Signal AE014 to Light Show Scheduler AE007 when the Animated Show has finished playing. In some embodiments, a way for a Second User AA015 to configure the active Daily Schedule may be needed, this can be done by selecting which Daily Schedule should be active on one or more days, for example on each day of the week, using the human computer interface of Light Show Scheduling AD003.

In one or more embodiments, Light Set Download AE004 may remember the one or more Full Light Sets it holds, for Light Set Name List AE003, over one or more restarts or power cycles of Light Show Client AA012. In one or more embodiments, Light Animation Service AA002 may have a Web Server interface for Communication Channel AA026, Light Show Service AA002 may have a Web Server interface for Communication Channel AA027 and Light Show Executor AA014 may use the https, or http, protocols to communicate with them. In some embodiments, long polling, or an equivalent mechanism, may allow Animation Service AA002 or Light Show Service AA003 to send the first message in an exchange.

In one or more embodiments, Internet Server AA001 may stream one or more Light Animations CT011 or Light Controls CW207 to Light Show Client AA012. Streaming is: the incremental delivery of large data sets, for example audio or video, in order to avoid the wait time of a data download before playback commences; normally, the lack of an ability to save the data received on the receiving client. A Light Show may be streamed by sending the data structure components of a Light Animation CT011 or Light Control CW207, for example an Animation Event CT201, a Light Pattern or a Control Event CW208, as one or more separate communication messages over a Communication Channel. In various embodiments, these communication messages may be sent in the order they are used for reproduction of the Light Show. The receiving client may then build a partial version of a Light Animation CT011 or Light Control CW207 and use it to start displaying the Light Show before the client has received all of it. In one or more embodiments: the client may delete the Light Animation CT011 or Light Control CW207 when the Light Show is finished; the client may keep the Light Animation CT011 or Light Control CW207 when the Light Show is finished and use it for subsequent Light Shows. The streaming process may be adapted, for example, to provide a high probability that the client receives every data structure before it is needed for the Light Show. In order to do this the data throughput of the Communication Channel is assessed and a Jitter Buffer used to accommodate both the variable rate at which component data structures will be completely received and the variable rate at which they are needed for display of the Light Show. The data structure components received by the client may either be saved or discarded when they are no longer needed for the Light Show. Streaming may be supported in the exemplar system architecture by: including streaming support in Animation Message Composer AB001; including streaming support in Light Show Download AE006 and or Light Show Play AE002; amending Light Show Scheduler AE007 such that it instructs the streaming of Light Animations CT011, from Internet Server AA001, when they are needed for display of a Light Show.

Figure 7:
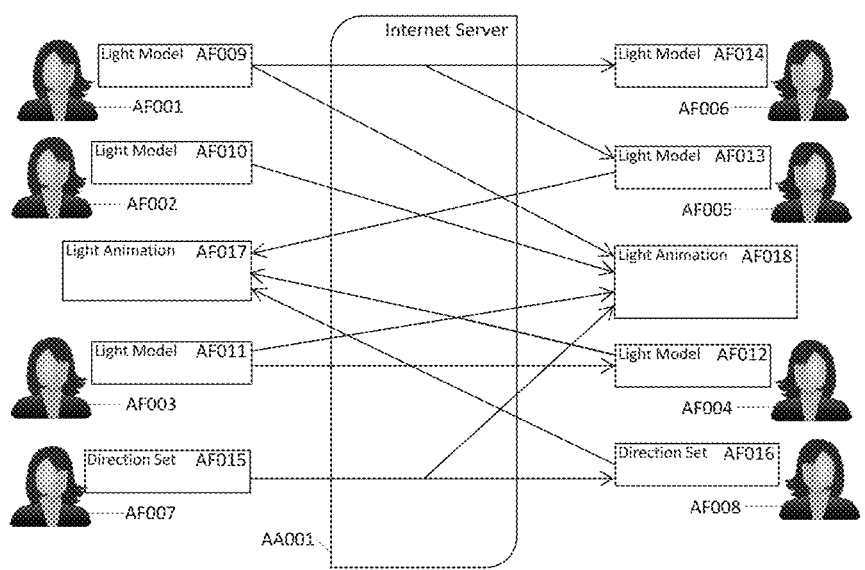
FIG. 7 illustrates the utility of collaborative Light Show creation.

FIG. 7 illustrates the utility of the exemplar Collaborative Light Show Authoring system. Light Models AF009-14 are the content for multi-pattern animations, for example a Snowman that appears to wave its hand due to regular changes to the lights that are displaying Light Effects. User AF001 creates Light Model AF009, User AF002 creates Light Model AF010 and User AF003 creates Light Model AF011; they all save the Light Model they created to Internet Server AA001. After User AF001 saves Light Model AF009, User AF006 downloads it, from Internet Server AA001, and changes it to Light Model AF014. After User AF003 saves Light Model AF011, User AF004 downloads it, from Internet Server AA001, changes it to Light Model AF012 and then saves it, to Internet Server AA001. After User AF001 saves Light Model AF009, User AF005 downloads it, from Internet Server AA001, changes it to Light Model AF013 and then saves it, to Internet Server AA001. Direction Sets AF015-16 are descriptions of when and how one or more Light Models should be used to change light illumination, these changes may be either a movement illusion, for a whole Light Model, or an animation illusion, from changing the patterns, from within a Light Model, that are displayed. Internet Server AA001 creates Light Animations AF017-18 by applying one or more of the movements and pattern changes, defined in Direction Sets AF015-16, to one or Light Models. User AF007 creates Direction Set AF015, and saves it to Internet Server AA001. After User AF007 saves Direction Set AF015, User AF008 downloads it, from Internet Server AA001, changes it to Direction Set AF016 and then saves it, to Internet Server AA001. Direction Set AF015 specifies movements and pattern changes for Light Models AF009-11. Light Animation AF018 includes information necessary to display the animation defined by Direction Set AF015, and Light Models AF009-11, it may be created, by Internet Server AA001, any time after Direction Set AF015 and Light Models AF009-11 are saved. Similarly, Light Animation AF017 includes information necessary to display the animation defined by Direction Set AF016 and Light Models AF012-13, it may be created, by Internet Server AA001, any time after Direction Set AF016 and Light Models AF012-13 are saved.

The repeated creation, copy and modification of Light Models and Direction Sets, illustrated in FIG. 7, enables a large group of Users to create a large set of Light Animations using Internet Server AA001. After an Internet Server AA001 is created and seeded with an initial set of Light Models and Direction Sets then, provided a large number of Light Show Clients are available for display of Light Shows that include the Light Animations, it would be reasonable to expect the creation of a growing set of content from a growing set of Users. One would expect more Users to create more Light Models and Direction Sets and this to attract more Users, creating a growing set of Light Animations. The creation of even a small subset of this content may be prohibitively expensive with current Light Show systems as they do not provide methods equivalent to, for example, the: easy creation of Light Models or Direction Sets; easy combination of previously created Light Models with Direction Sets; easy modification of Light Models or Direction Sets; easy collaboration between different Users; a search for Light Models or Direction Sets of interest to Users, for use or edit. There is no existing body of Light Show content similar to that which the exemplar Collaborative Light Show Authoring system could enable and there should be if its creation was economically feasible with current systems.

Figure 8:
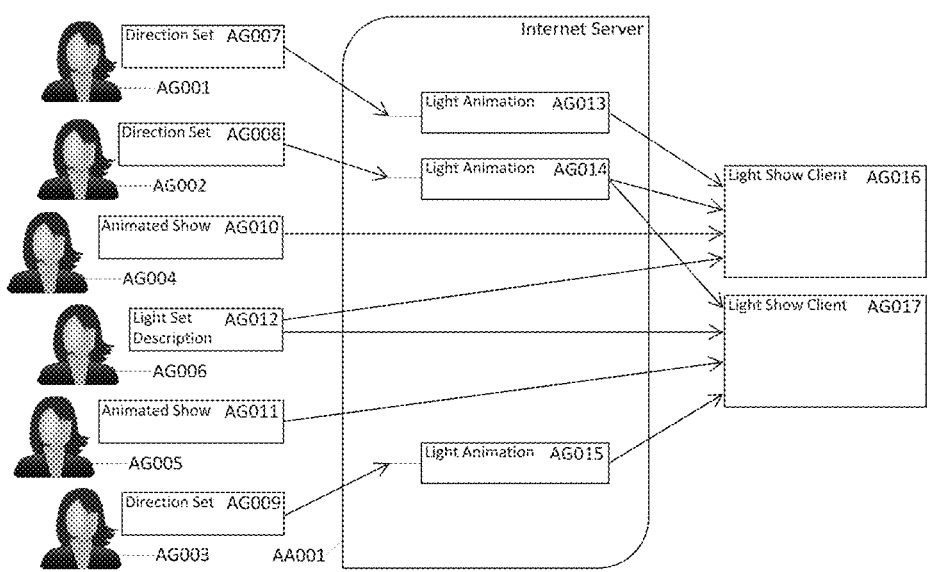
FIG. 8 illustrates the utility of Light Shows that can be displayed on multiple Light Show Client types.

FIG. 8 illustrates part of the utility of the exemplar Collaborative Light Show Authoring system. Light Set Description AG012 includes a description of some of the lights in, the Physical Light Set of, Light Show Clients AG016-17, for example one or more Full Light Sets or Tessellated Light Sets. This description is sufficient for any of Light Animations AG013-15 to be displayed by Light Show Clients AG016-17. Animated Show AG010 includes a description of how to display Light Animations AG013-14 on Light Show Client AG016. Animated Show AG011 includes a description of how to display Light Animations AG014-15 on Light Show Client AG017. User AG006 creates Light Set Description AG012 and saves it to Internet Server AA001. As a Light Set Description AG012 may include information specific to the hardware of a Light Show Client, User AG006 should be someone qualified to enter it, for example an employee of the organization that manufactured Light Show Clients AG016-17. Users AG001-3 create Direction Sets AG007-9 and save them to Internet Server AA001, these Direction Sets may make use of one or more Light Models. User AG004 saves Animated Show AG010 to Internet Server AA001. Light Show Client AG016 downloads Light Set Description AG012, Animated Show AG010 and Light Animations AG013-14 from Internet Server AA001. Light Animations AG013-14 are created from Direction Sets AG007-08, with their associated Light Models, sometime between their saving and the Light Animation download. Light Show Client AG017 downloads Light Set Description AG012, Animated Show AG011 and Light Animations AG014-15 from Internet Server AA001. Light Animations AG014-15 are created from Direction Sets AG008-09, with their associated Light Models, sometime between their saving and the Light Animation download. The exemplar system supports one or more Light Set Descriptions AG012 and each one may be used with one or more Animated Shows, provided it presents one or more perspective projections that share one or more standardized geometries, or Standard Tessellations, with the Animated Shows. A Light Set Description AG012 may be applied to a large number of Light Show Clients. A Light Animation may be used by one or more Light Shows. Animated Shows, Light Set Descriptions and Direction Sets may be created, copied and modified. Consequently, the exemplar system supports a flexible use of Light Animations on Light Show Clients, one or more Animated Shows being used to display one or more Light Animations in ways that are appropriate for one or more Light Show Client types.

The method for displaying one or more Light Animations, on one or more Light Show Clients, illustrated in FIG. 8 provides a way for Light Animations to be applied to a large number of different Light Show Client types. The ability to support different Light Show Client types allows Light Animation data to be used in different markets, for example holiday specific Light Shows for small businesses or family homes, this in turn encourages the manufacture of Light Show Clients for the different markets. Also supported is the application of the same Light Animation content to Light Show Clients produced by a plurality of manufacturers competing in the same market and the plurality of products each manufacturer may produce over time. Consequently, the flexible use of Light Animations, by Light Show Clients, expands the set of Light Show Clients a Light Animation may be used with at any moment in, and over, time. This wider use of Light Animations encourages the creation of a large number of Light Show Clients. Hence the large number of Light Show Clients condition, mentioned in the text for FIG. 7, can be met. In addition, it can be seen that the exemplar system provides for the collaborative authoring of Light Shows for multiple Light Show Clients with easy to use design and animation tools that support separate input of artwork and motion.

Figure 9:
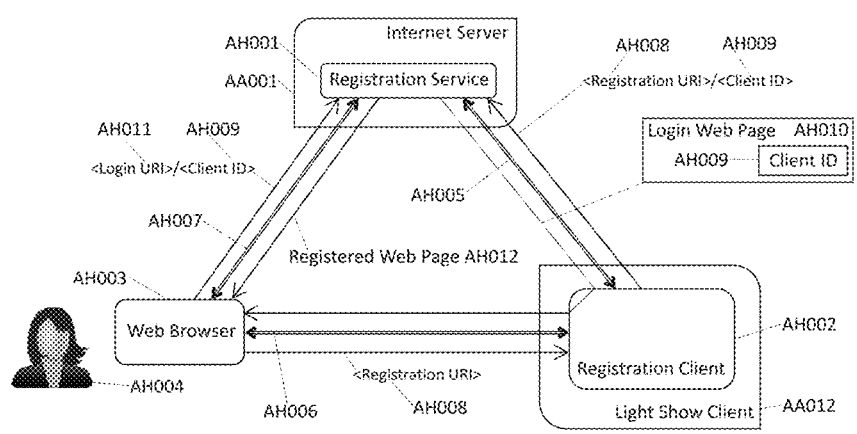
FIG. 9 illustrates a method of associating a Light Show Client with a User.

FIG. 9 illustrates a method for associating a User AH004 with a Light Show Client AA012 that may be used in one or more embodiments. A Registration Service AH001 is added to Internet Server AA001 and a Registration Client AH002 is added to Light Show Client AA012. User AH004 uses Web Browser AH003, which may run on a general purpose Electronic Device, to send Registration URI AH008 to Registration Client AH002 over Communication Channel AH006. Registration Client AH003 appends Client ID AH009 and sends "Registration URI AH008/Client ID AH009" to Registration Service AH001 over Communication Channel AH005. Registration Service AH001 responds with Login Web Page AH010 that includes Client ID AH009, which is sent back over Communication Channels AH005 and AH006 to Web Browser AH003. Web Browser AH003 displays Login Web Page AH010, which includes a username text box, password text box and login button, to User AH004. User AH004 enters their username and password and presses the login button, causing "Login URI AH011/Client ID AH009" to be sent as the URI of an https exchange with Registration Service AH001, over Communication Channel AH007. Registration Service AH001 confirms the users credentials, that the password is correct for the username, and that either: they are the current supervisor of the Light Show Client AA012 with Client ID AH009; no User is the current supervisor of the Light Show Client AA012 with Client ID AH009. On passing the tests then, if necessary, User AH004 is assigned as the supervisor of Light Show Client AA012 and a Registered Web Page AH012 is sent back to Web Browser AH003 and displayed for User AH004. If either test fails then an error web page may be sent to Web Browser AH003 and displayed for User AH004, this case is not shown on FIG. 9.

High levels of security should not be required for the method of AH0 due to: the rejection, by Internet Server AA001, of an attempt to claim a Light Show Client AA012 currently supervised by another User; the ability to easily establish that User AH004 has become the supervisor of a Light Show Client AA012 by asking it to display one of many available Light Shows or a unique test pattern. Communication Channels AH007 and AH005 should be secured, for example https. In one or more embodiments, Communication Channel AH006 may not be secure, for example http.

FIG. 10 illustrates a mathematical method for the generation of a two-dimensional tessellated geometry. Tile BA003 includes the 5 vertices BA001a-e and the 5 edges BA002a-e. Replication equation BA005 specifies the positions of an unlimited number of copies of tile BA003 using the unbound integer variables m and n. The tile copies BA004a-f of FIG. 10 have their associated m and n values printed on them, it can be seen that: each different value of n produces a different movement in the direction of vector $\vec{r}$; each different value of m produces a different movement in the direction of vector $\vec{q}$. The position of each tile being calculated by adding these different movements to the position $\vec{o}$ of tile BA004a, which has m=0 and n=0. The replication equation BA005 may specify many different position offsets between copies. However, for many simple tessellated geometries the values of vectors $\vec{r}$ and $\vec{q}$ will be such that one or more of the vertices and edges of adjacent copies will be aligned. This alignment is illustrated by triangular tiles BA006a and BA006b, for the change in position of vector BA007 these tiles have an aligned position for vertex BA008. For such aligned vertices, or edges, from different tiles the tessellated geometry may only have a single vertex, or edge, this leads to a single vertex at BA008 that is an end of the four edges BA009a-d. It should be noted that most calculations of position are done with limited numerical precision and that consequently any estimate of alignment may be done to a precision that tolerates the numerical inaccuracy of the calculations done.

Figure 11:
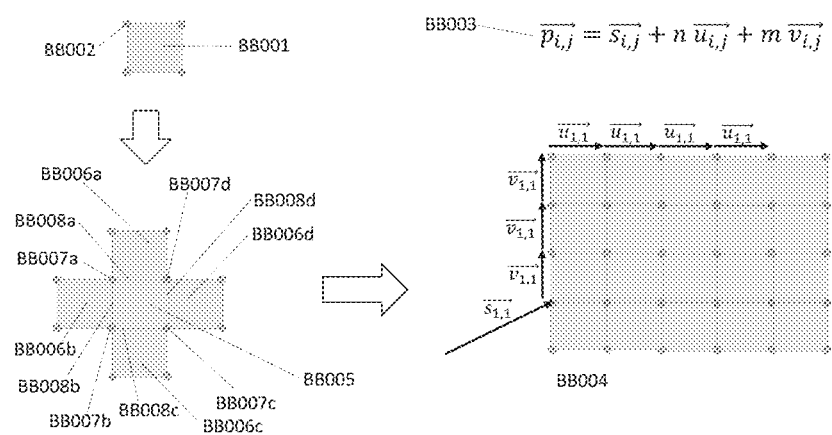
FIG. 11 illustrates the generation of a square tessellated geometry.

FIG. 11 illustrates the generation of a square tessellated geometry. A square BB001, with origin at vertex BB002, is replicated using an equation BB003 with a unit vector $\vec{u}_{i,j}$ that moves along a horizontal square edge and a unit vector unit vector $\vec{v}_{i,j}$ that moves along a vertical square edge. The tile BB005 has horizontally adjacent tiles BB006b and BB006d. The tile BB006b shares edge BB008b and corners BB007a and BB007b with tile BB05, leading to single vertices at BB007a and BB007b and a single edge at BB008b. Similarly, BB006d and BB005 share vertices BB007c and BB007d. The tile BB005 has vertically adjacent tiles BB006a and BB006c. The tile BB006a shares edge BB008a and corners BB007a and BB007d with tile BB05, leading to single vertices at BB007a and BB007d and a single edge at BB008a. Similarly, BB006c and BB005 share vertices BB007b and BB007c and edge BB008c. These replications create the unlimited square tile pattern of BB004, the multiple alignment of edges and vertices leading to a square lattice that merges 4 tile vertices per lattice vertex and 2 tile edges per lattice edge. The equation BB003 is associated with a Standard Tessellation, subscript i being set to the Standard Tessellation's ID and subscript j being set to a Tile ID within Standard Tessellation i, it can be seen that BB004 was constructed by the Tile with ID 1, BB001, from the Standard Tessellation with ID 1.

Figure 12:
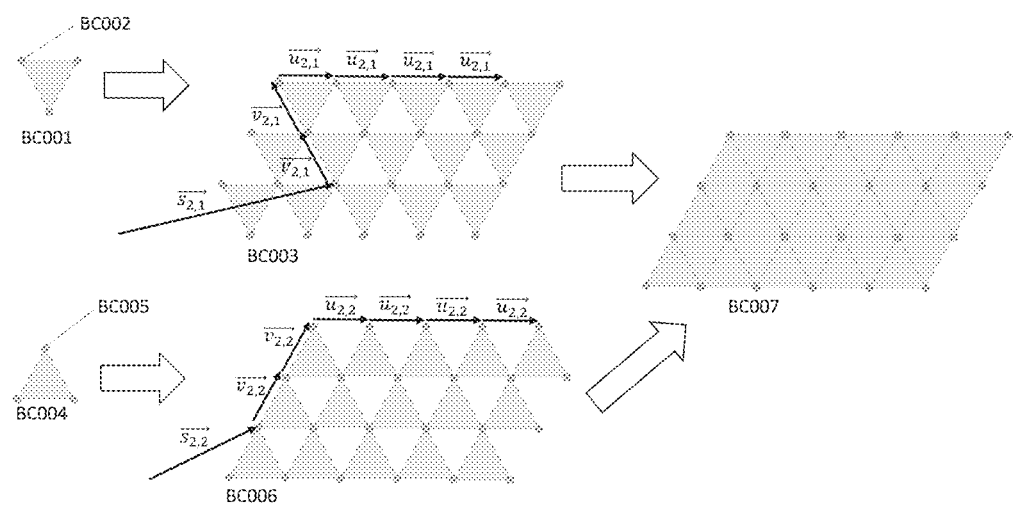
FIG. 12 illustrates the generation of a triangular tessellated geometry.

FIG. 12 illustrates the generation of a triangular tessellated geometry from two triangular tiles of different shape, tile BC001, with origin at vertex BC002, and tile BC004, with origin at vertex BC005. Tile BC001 is replicated to produce the pattern of BC003, using Replication Equation BB003 and the Tile with ID 1, BC001, of the Standard Tessellation with ID 2. Tile BC004 is replicated to produce the pattern of BC006, using Replication Equation BB003 and the Tile with ID 2, BC004, of the Standard Tessellation with ID 2. The patterns of BC003 and BC006 are overlaid to produce pattern BC007, the complete unlimited extent pattern for the Standard Tessellation with ID 2. When Replication Equation BB003 is used to generate the patterns of BC003 and BC006 there will be multiple mergers of the aligned vertices from adjacent tiles. When the patterns of BC003 and BC006 are overlaid to produce BC007 there will be multiple mergers of both aligned vertices and aligned edges from adjacent tiles.

Figure 13:
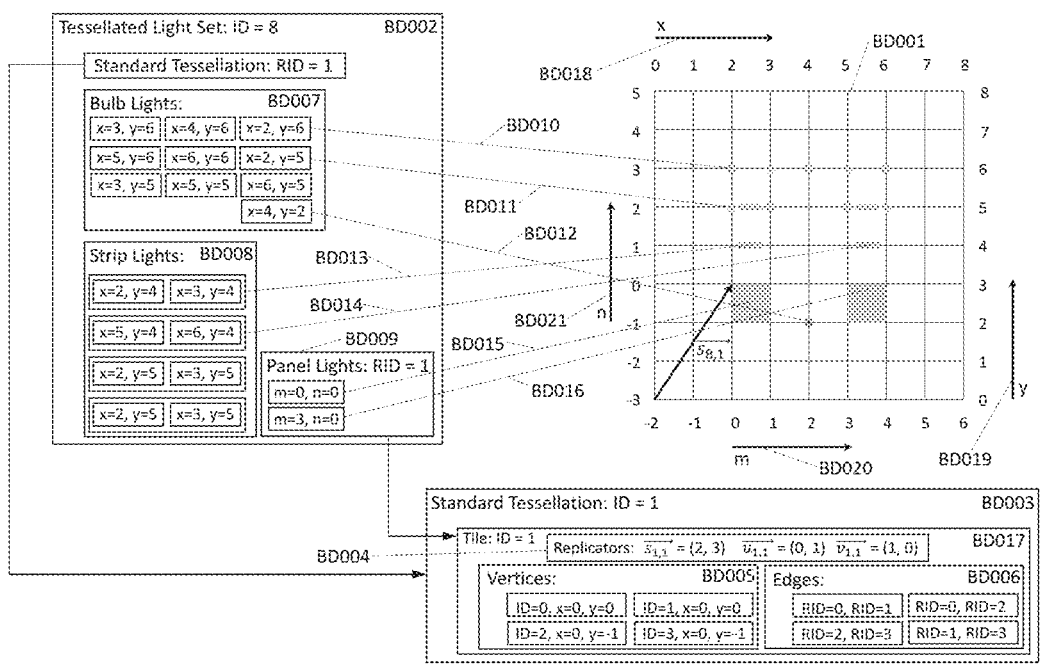
FIG. 13 illustrates the creation of a Tessellated Light Set from a tessellated geometry.

FIGS. 10, 11 and 12 illustrate an exemplar method for generating a wide variety of tiled geometric tessellations of unlimited extent. This method may be applied to the generation of Standard Tessellations that can be used to design Light Shows which include Full Light Sets that have perspective projections which approximately align with the geometry of a Standard Tessellation. FIG. 13 illustrates an exemplar data structure that specifies the lights in a Tessellated Light Set that has light positions aligned with a Standard Tessellation. Illustration BD003 is a depiction of an exemplar data structure for the Standard Tessellation introduced in FIG. 11. The replicated square Tile BB001 and its replication data are described in the Tile Data Structure BD017, which stores: the parameters of Replication Equation BB003, or Replicators, in BD004; the vertices of the Tile to be replicated in BD005, along with an ID for each vertex; the edges of the tile to be replicated in BD006, specifying each edge using the IDs of the vertices at its ends. Illustration BD002 is a depiction of a Tessellated Light Set, with unique ID 8, that is aligned with the Tessellated Geometry described in BD003, storing: the (x, y) position of the Standard Tessellation vertex that locates each Bulb Light in BD007; the (x, y) positions of the Standard Tessellation vertices that locate the ends of each Strip Light in BD008; the m and n values, that are parameters of Replication Equation BB003, for the Tile of each Panel Light in BD009. The Standard Tessellation of FIG. 11 is depicted in illustration BD001 as a grid of lines with axes BD018 and BD019 for the (x, y) positions of the Standard Tessellation and axes BD020 and BD021 for the m and n parameter values used, with Replication Equation BB003, to place Tile copies. The lights of Tessellated Light Set BD002 are drawn over this grid and in some instances the mapping of light data to drawing is illustrated: BD010, BD011 and BD012 map the data of three Bulb Lights onto illustration BD001; BD013 and BD014 map the data of two Strip Lights onto illustration BD001; BD015 and BD016 map the data of two Panel Lights onto illustration BD001.

Figure 14:
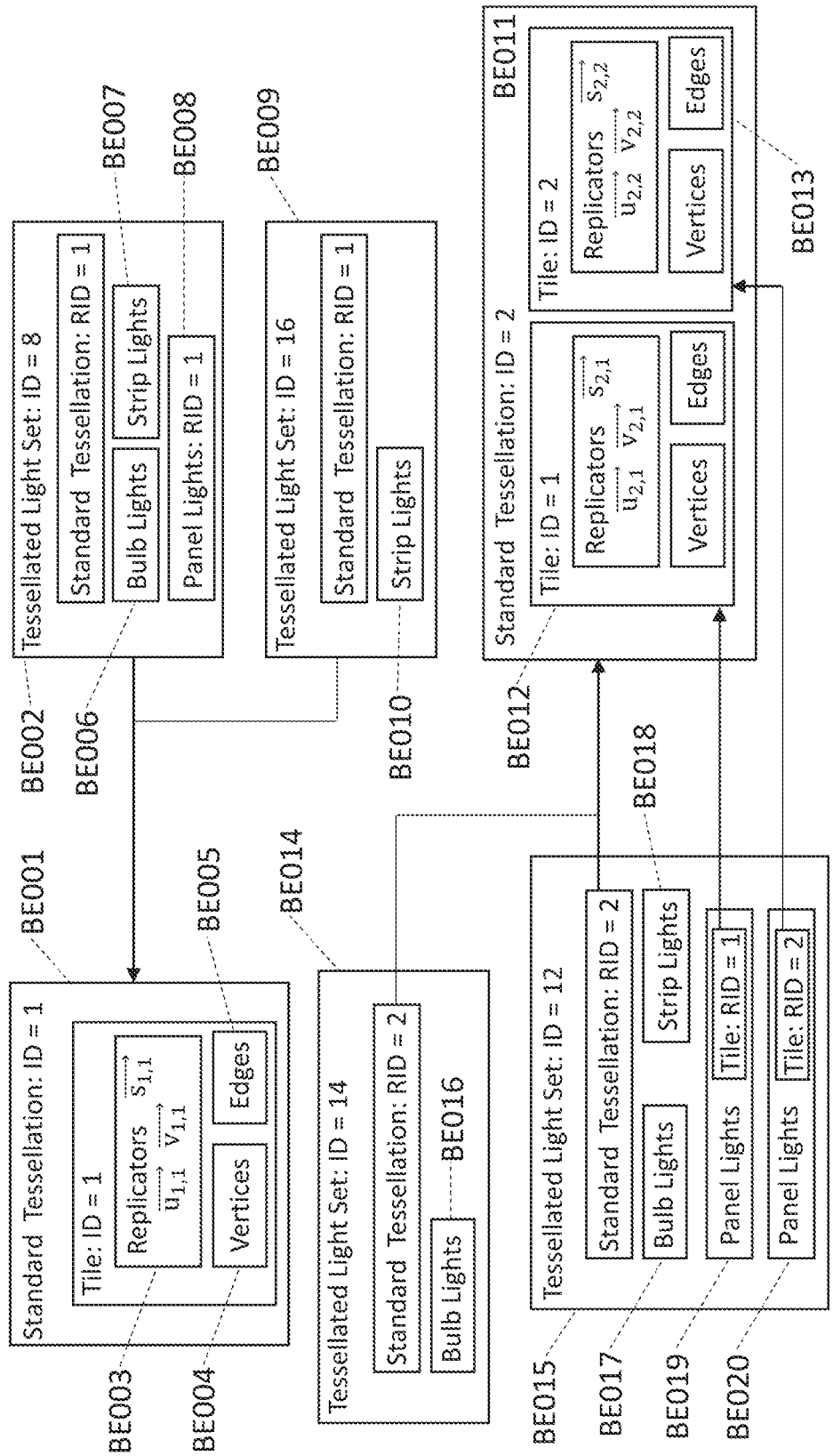
FIG. 14 illustrates exemplar data structures for representing Tessellated Light Sets and Standard Tessellations.

FIG. 14 expands on the exemplar data structure for Tessellated Light Sets illustrated in FIG. 13. Illustration BE001 is a reduced detail depiction of the Standard Tessellation introduced in FIG. 11 and previously depicted in illustration BD003, the representation of Replicators by BE003, Vertices by BE004 and Edges by BE005 omitting the data values present in their depiction by Replicators BD004, Vertices BD005 and Edges BD006. FIG. 14 shows two Tessellated Light Sets that use the tessellated geometry of BE001, Tessellated Light Sets BE002 and BE009. Tessellated Light Set BE002 is a reduced detail depiction of the Standard Tessellation previously depicted in illustration BD002, the representation of Bulb Lights by BE006, Strip Lights by BE007 and Panel Lights BE008 omitting the data values present in their depiction by Bulb Lights BD007, Strip Lights BD008 and Panel Lights BD009. Tessellated Light Set BE009 is a reduced detail depiction of the Tessellated Light Set with ID 16, it includes the Strip Lights depicted by BE010 but does not include any Bulb or Panel Lights. FIG. 14 also includes reduced detail depiction BE011 of the triangular Standard Tessellation introduced in FIG. 12, the triangle BC001 being illustrated by Tile depiction BE012 and the triangle BC004 being illustrated by Tile depiction BE013. FIG. 14 depicts two Tessellated Light Sets that use the tessellated geometry of BE011, BE014 and BE015. Tessellated Light Set BE014 includes Bulb Lights BE016, but does not include any Strip or Panel Lights. Tessellated Light Set BE015 includes Bulb Lights BE017, Strip Lights BE018, Panel Lights BE019 that use Tiles with the geometry of triangle BC001 and Panel Lights BE020 that use Tiles with the geometry of triangle BC004. Consequently, it can be seen, from FIG. 14, that each Standard Tessellation may be used by one or more Tessellated Light Sets and that each of these may include any combination of Bulb, Strip or Panel Lights at any position that is aligned with the Standard Tessellation.

Figure 15:
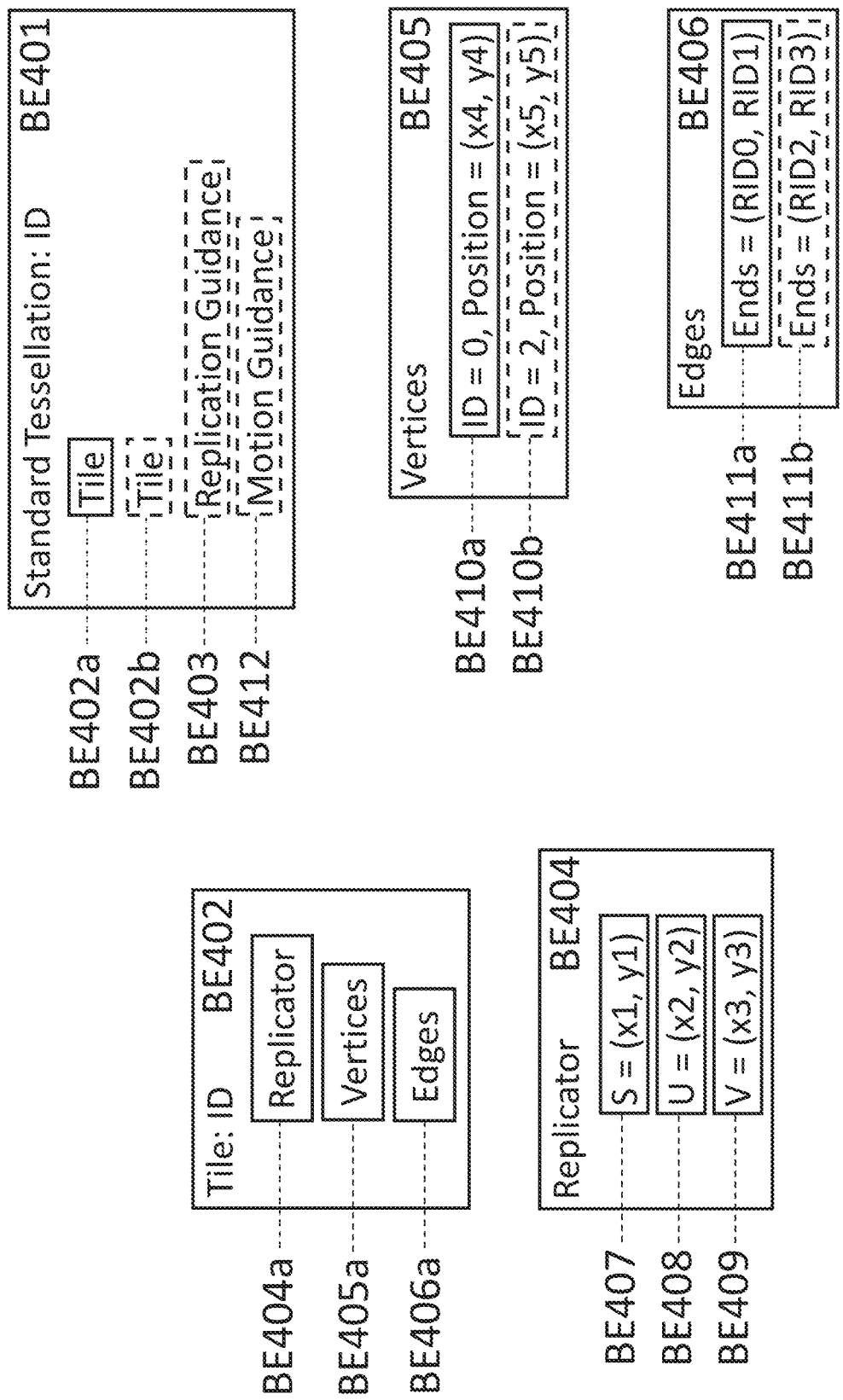
FIG. 15 includes a depiction of the Standard Tessellation, Tile, Replicator, Vertices and Edges data structures of the exemplar architecture.

FIG. 15 depicts a more general form of the Standard Tessellation data structure illustrated in FIGS. 13 and 14. Standard Tessellation BE401 includes an ID, one or more Tiles BE402, for example BE402a and BE402b, optional Replication Guidance BE403 and optional Motion Guidance BE412. Tile BE402 includes an ID, a Replicator BE404a, a Vertices BE405a and an Edges BE406a. Replicator BE404 includes the parameters S Vector BE407, U Vector BE408 and V Vector BE409 for Replication Equation BB003. Vertices BE405 includes one or more Position Vectors BE410, for example BE410a and BE410b. Edges BE406 includes one or more Ends BE411 that refer to the IDs of Vertices at the ends of the Edges, for example BE411a and BE411b. Optional Replication Guidance BE403 may include additional information that helps one or more parts of one or more embodiments of the exemplar system to limit integer variables m and n when creating a complete sets of Vertices, Edges and Tiles for an area being covered by a Standard Tessellation. For more complicated Standard Tessellations the contents of Replication Guidance BE403 may need to be synchronized with the functionality of the embodiment. Consequently, Standard Tessellations may be configured into the exemplar system in embodiment specific ways. In one or more embodiments simple Standard Tessellations, for example the one illustrated in FIG. 11, do not need optional Replication Guidance BE403. Optional Motion Guidance BE412 is described in more detail by FIG. 25.

Figure 16:
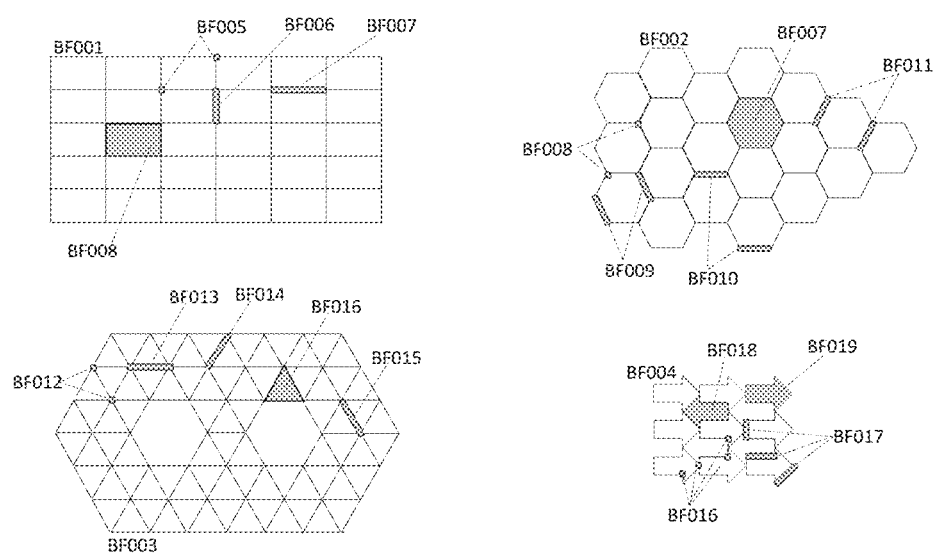
FIG. 16 illustrates a variety of Tessellated Light Sets with bulb, strip and panel lights.

FIG. 16 depicts planar Tessellated Light Sets BF001-4 that may be used in one or more embodiments, showing a vertex, edge graph from their respective Standard Tessellations. Every Tessellated Light Set BF001-4 has either a Bulb Light, Strip Light or Planar Light associated with every vertex or edge from the slice of its Standard Tessellation shown, however only a few of these lights are shown on the illustration, for example: depiction BF001, of a rectangular Tessellated Light Set, includes Bulb Lights BF005, vertical Strip Light BF006, horizontal Strip Light BF007 and Panel Light BF008; depiction BF002, of a hexagonal Tessellated Light Set, includes Bulb Lights BF008, Planar Light BF007 and Strip Lights BF009-11 which have various orientations; depiction BF003, of a triangular Tessellated Light Set, includes Bulb Lights BF012, Panel Light BF016 and Strip Lights BF013-15 which have various orientations; depiction BF004, of a Tessellated Light Set that includes arrows facing in two directions, includes Bulb Lights BF016, Strip Lights with various orientations BF017 and Panel Lights BF018 and BF019, which are arrows facing in different directions. Consequently, it can be seen, from FIG. 16, that Tessellated Light Sets come in a wide variety of forms and also that these forms may be used for Light Show designs based on their Standard Tessellation, provided they include a sufficiently large region that includes the type of lights, either Bulb Lights, Strip Lights or Panel Lights, used by the design.

Figure 17:
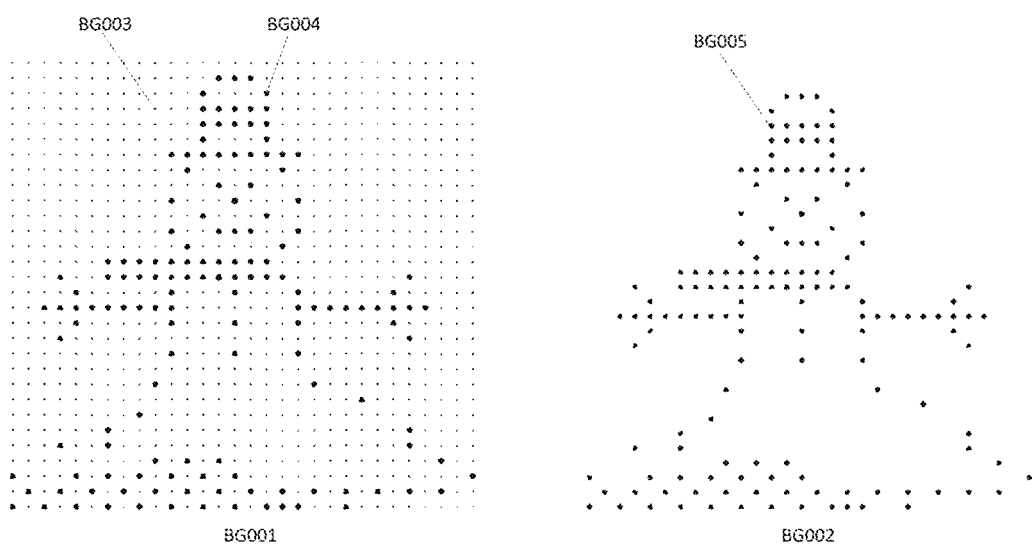
FIG. 17 illustrates a complex Light Pattern.

FIG. 17 has two different depictions of a Tessellated Light Set, which includes a 30 by 30 grid of Bulb Lights placed at the vertices of a Square Standard Tessellation. Illustration BG001 depicts both Active Bulb Lights showing Bulb Effects, for example BG004, and Inactive Bulb Lights, for example BG003. Illustration BG002 depicts the same activity on the same Tessellated Light Set, but it only shows the Active Bulb Lights, for example BG005. FIG. 17 demonstrates that: the approach discussed within this document can produce interesting visual effects; a small grid of widely spaced Bulb Lights can produce interesting Light Patterns, for example a snow man; a relatively easy to use design tool that supports the association of Light Positions, on a Standard Tessellation, with Light Effects may be used to produce visually interesting Light Patterns.

Figure 18:
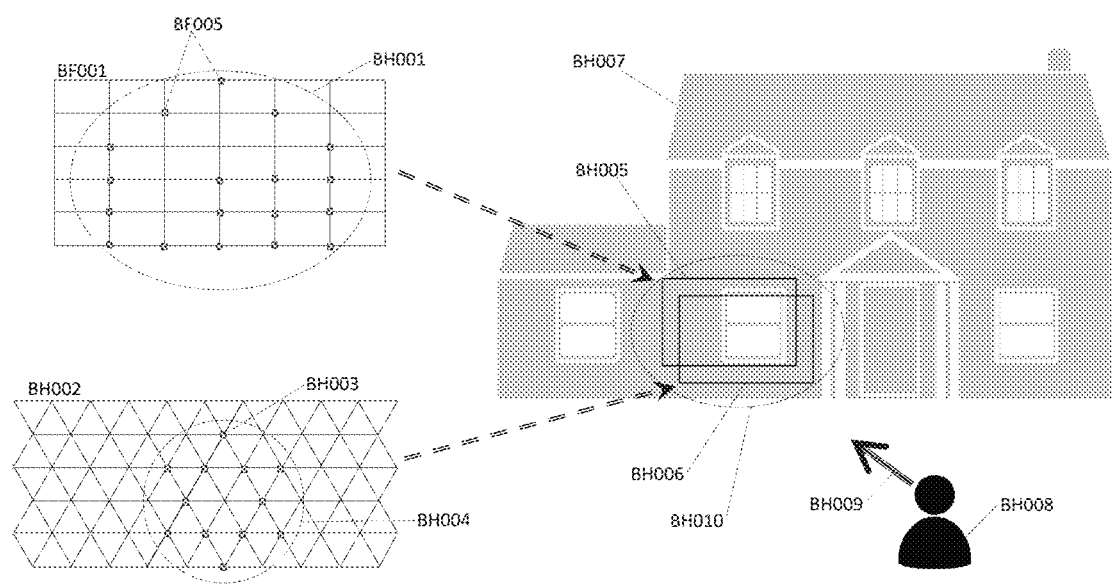
FIG. 18 illustrates an enhanced Light Show that uses a multi-layer Physical Light Set that presents multiple Tessellated Light Sets.

FIG. 18 illustrates a Light Show that uses multiple Tessellated Light Sets and that may be part of the exemplar system in one or more embodiments. Rectangular Tessellated Light Set BF001, from FIG. 16, is combined with Triangular Tessellated Light Set BH002. Tessellated Light Set BF001 fully populates the vertices of the Standard Tessellation slice shown with Bulb Lights, a subset of these Bulb Lights, for example BF005, show Light Effects BH001 that have the shape of a house. Tessellated Light Set BH002 fully populates the vertices of the Standard Tessellation slice shown with Bulb Lights, a subset of these Bulb Lights, for example BH003, show Light Effects BH004 that have the shape of a star. Tessellated Light Sets BF001 and BH002 are combined to form Layered Light Set BH010, Tessellated Light Set BF001 being placed at position BH005 which is behind the position of Tessellated Light Set BH002 at BH006. As Tessellated Light Set BH002 only includes Bulb Lights then, via an appropriate physical design, it is possible to make Tessellated Light Set BF001 visible through Tessellated Light Set BH002. Consequently, Layered Light Set BH010 can be placed on House BH007 such that a passing Observer BH008 may have a Perspective BH009 that presents a pleasing 3D Light Show with overlaid Light Patterns, for example a star shape in front of a house shape.

Figure 19:
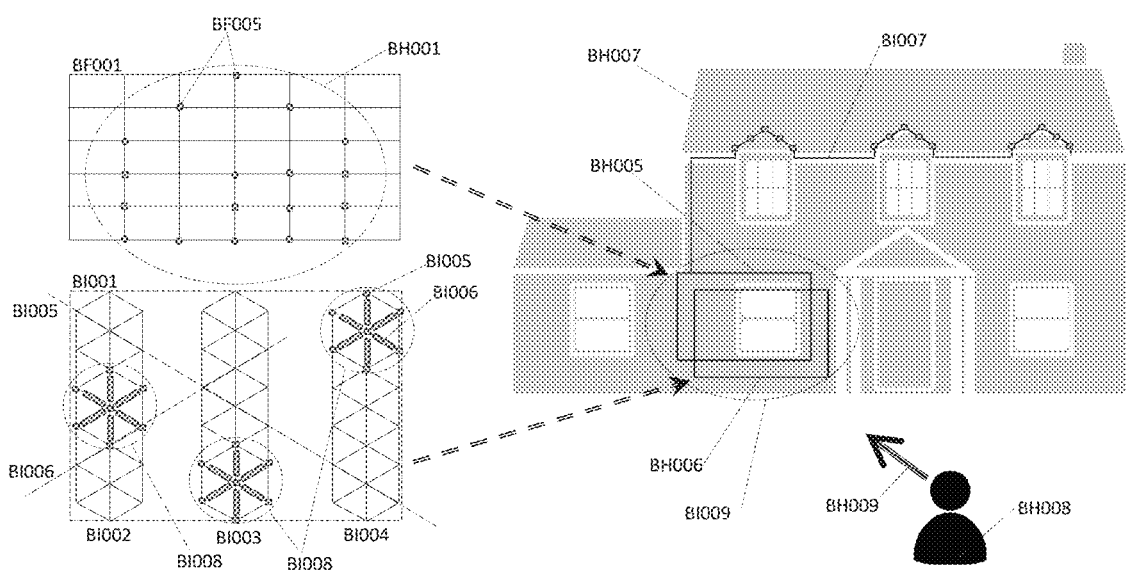
FIG. 19 illustrates an enhanced Light Show that uses a multi-layer Physical Light Set that presents multiple Tessellated Light Sets.

FIG. 19 illustrates a Light Show with multiple Tessellated Light Sets, and additional lights, which may be part of the exemplar system in one or more embodiments. Rectangular Tessellated Light Set BF001, from FIG. 16, is combined with Triangular Tessellated Light Set BI001. Triangular Tessellated Light Set BI001 fully populates the vertices and edges of the three columns BI002-4 of its Standard Tessellation slice shown with Bulb Lights and Strip Lights. In between columns BI002-4 no Bulb Lights or Strip Lights are present. However, the columns BI002-4 are positioned such that they share the same Standard Tessellation, as illustrated by lines BI005-6. Columns BI002-4 may be used to display a wide variety of Light Patterns, but are particularly useful for displaying snowflake shapes similar to snowflake shape BI008. Tessellated Light Sets BF001 and BI001 are combined to form Layered Light Set BI009, Tessellated Light Set BF001 being placed at position BH005 which is behind the position of Tessellated Light Set BI001 at BH006. As Tessellated Light Set BI001 only includes Bulb and Strip Lights then, via an appropriate physical design, it is possible to make Tessellated Light Set BF001 visible through Tessellated Light Set BI001. Consequently, Layered Light Set BI009 can be placed on House BH007 such that a passing Observer BH008 may have a Perspective BH009 that presents a pleasing 3D Light Show with overlaid Light Patterns, for example snowflake shapes falling in front of a house shape. The Light Show also includes the Light String BI007 that is used to decorate the roof of House BI007. The Layered Light Sets BH010 and BI009 are examples of Full Light Sets, each of which has two planar Tessellated Light Sets. A Physical Light Set AA028 may include one or more Full Light Sets and additional lights, for example, Light String BI007.

Figure 20:
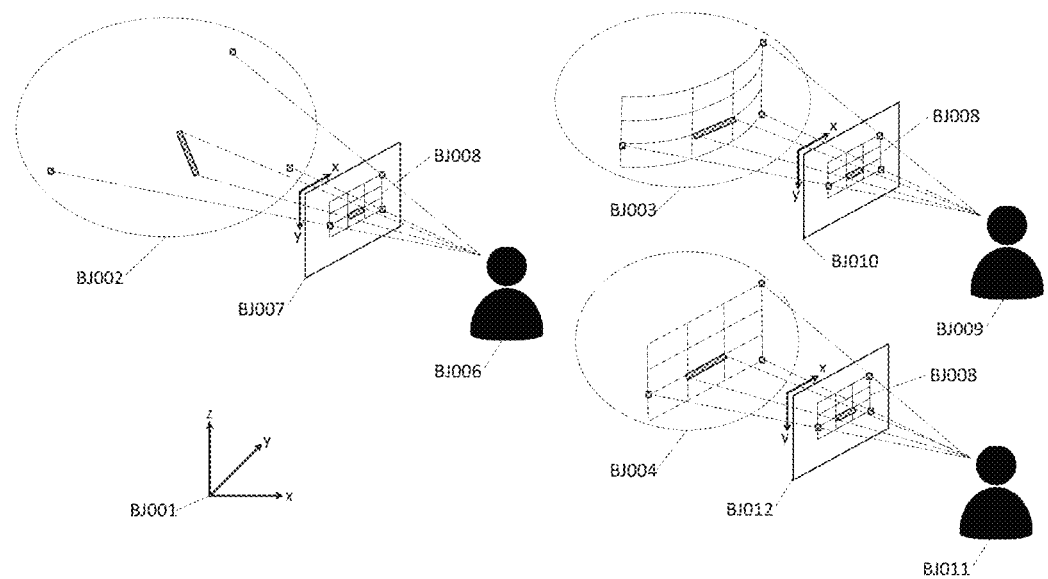
FIG. 20 illustrates different 3D Physical Light Set configurations that present perspective projections onto the same rectangular Tessellated Light Set.

FIG. 20 illustrates different Full Light Sets that may be used in one or more embodiments and have a perspective projection with the same Tessellated Light Set. Full Light Sets BJ002-4 include three Bulb Lights, a Strip Light and use the same three dimensional axes BJ001. Full Light Set BJ002 includes lights at varying positions and orientations that happened to be positioned such that Observer BJ006 sees Tessellated Light Set BJ008 on Image Plane BJ007. Full Light Set BJ003 includes lights that are arranged on a curved surface and positioned such that Observer BJ009 sees Tessellated Light Set BJ008 on Image Plane BJ010. Full Light Set BJ004 includes lights that are arranged on a plane and positioned such that Observer BJ011 sees Tessellated Light Set BJ008 on Image Plane BJ012. The position of Observer BJ006 is the only position that will provide a perspective projection of Full Light Set BJ002 that produces Tessellated Light Set BJ008. The geometry of planar projections allows Observer BJ011 to observe a perspective projection of Full Light Set BJ004 that is Tessellated Light Set BJ008 from a large number of different positions. The example Full Light Sets BJ002-4 are three examples from a large plurality of Full Light Sets that may have one or more perspective projections that produce Tessellated Light Set BJ008, for example the curved surface of Full Light Set BJ003 may also be curved in a second dimension and lights placed on it such that it produces a perspective projection with Tessellated Light Set BJ008. Please note, FIG. 20 uses a pinhole camera model, with a planar image plane, for perspective projection, this is a huge simplification of real world optical systems, such as the human eye, but is sufficient for this exemplar system description. Please note, Full Light Sets BJ002 and BJ003 may produce interesting Light Shows from Observer Positions other than those of Observers BJ006 and BJ009, for example the curved surface of Full Light Set BJ003 may be part of a Light Show that includes a geometrically distorted animation on its lights that is combined with other lights.

Figure 21:
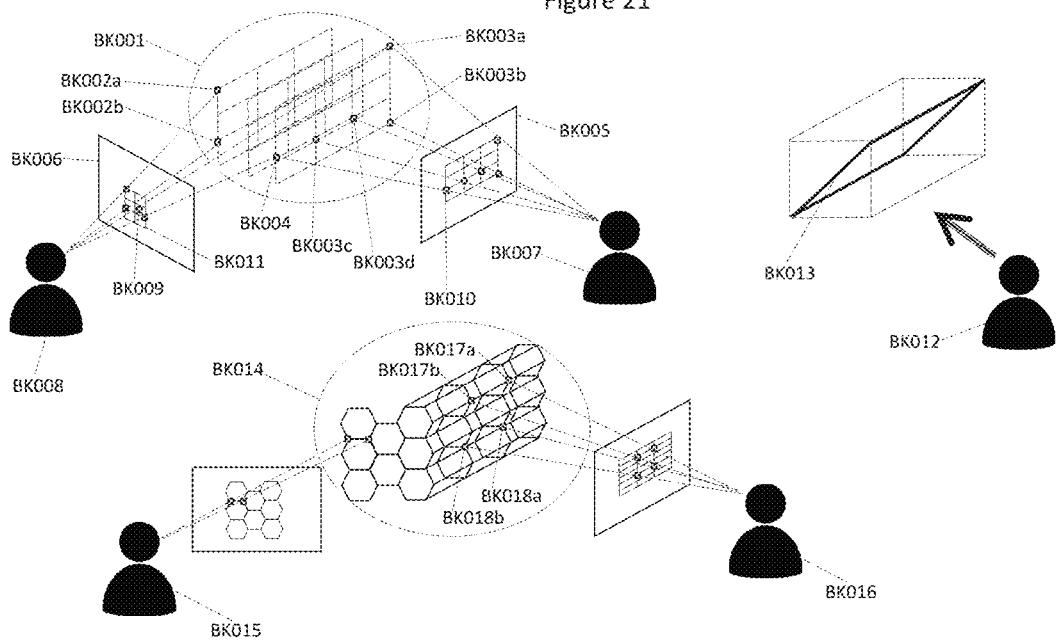
FIG. 21 illustrates Tessellated Light Sets from different perspective projections of a single 3D Physical Light Set.

FIG. 21 depicts two Full Light Sets with Topologies that produce different Tessellated Light Set projections from different perspectives and may be used in one or more embodiments. Full Light Set BK001 has a cuboid Topology of lights that presents three, four by four, rectangular Tessellated Light Sets towards First Observer BK007 and four, three by four, rectangular Tessellated Light Sets towards Second Observer BK008. Full Light Set BK001 includes 48 lights in total, but the depiction of Full Light Set BK001 only shows some lights: projections of example Lights BK002a, BK002b and BK004 are shown in example Tessellated Light Set BK009, for Second Observer BK008, on Second Image Plane BK006; projections of example Lights BK003a-d and BK004 are shown in example Tessellated Light Set BK010, for First Observer BK007, on First Image Plane BK005. However, if the physical structure of BK001 permits, all 48 lights in Full Light Set BK001 may be seen by both First Observer BK007 and Second Observer BK008, this is illustrated by the projection of light Bk003a at position BK009 on Second Image Plane BK006. Consequently, it can be seen that Full Light Set BK001, which has good visibility of all its lights from many different viewpoints, may be used to present a Light Show that includes many consecutive layered Light Effects in different directions at different times. Full Set BK001 presents more Tessellated Light Sets than those seen clearly by Observers BK007 and BK008, for example one or more inter-light distances may have planes of lights, for example BK013, that present a Third Observer BK012 with one or more Tessellated Light Sets. Full Light Set BK014 has a Topology with multiple planes of hexagonal lights. This can present multiple hexagonal Tessellated Light Sets to First Observer BK015 and multiple approximately rectangular Tessellated Light Sets to Second Observer BK016. The Tessellated Light Sets seen by Second Observer BK016 are approximately rectangular because of perspective effects due to lights that are nearly planar, for example Lights BK017a and BK017b are in a slightly different plane than Lights BK018a and BK018b.

The lights used in a Full Light Set should provide precision control of when they are on and off. In one or more embodiments, LEDs are used to provide lights with precision on/off timing, intensity and or color control. In one or more embodiments, the lights used may be monochrome with fixed or variable intensity. In one or more embodiments, full color lights with fixed or variable intensity may be used. In one or more embodiments, full color lights may be created using multiple LEDs with different colors, for example a red LED, green LED and blue LED. In one or more embodiments, lights may be created from something other than LEDs, for example filament bulbs.

The lights and support structures used, for Physical Light Sets AA028, may have varying physical properties. In one or more embodiments, lights towards the back of a Full Light Set may have lenses designed such that their light can pass around lights with smaller lenses towards the front. This may be done for front Strip Lights or Bulb Lights, for example. In one or more embodiments, light from LEDs towards the back of a Full Light Set may pass through light guides that are used, to emit light, for LEDs towards the front of the Full Light Set, this may be done for front lights that are Panel Lights, Strip Lights or Bulb Lights. In one or more embodiments, the support structures used for lights in a Full Light Set may be very thin wires, which minimally block light, stretched on a frame. In one or more embodiments, the support structures used for lights in a Full Light Set may be transparent. In one or more embodiments, a thin wire light support structure may be embedded in an inflatable lawn ornament such that it has the correct 3D shape when the ornament is inflated, with one or more transparent exterior panels used to see the Light Show. In one or more embodiments, the lights may be part of a net that may be hung from the front of a house, for example hung from the gutter and held in shape using ground pegs and strings.

FIG. 22 shows Graphical Representation CA001 of a number of Light Effects, stored within a Light Pattern data structure CA002, which specify the positions of Light Effects on Standard Tessellation BD003. Graphical Representation CA001 has both x/y position axes CA018-19 and m/n parameter axes CA020-21 shown for Standard Tessellation BD003. Lights Effects may either be: Bulb Effects CA007 that are applied to Bulb Lights, for example CA010-12; Strip Effects CA008 that are applied to Strip Lights, for example CA013-14 or Panel Effects CA009 that are applied to Panel Lights, for example CA015-16. Bulb Effects, Strip Effects and Panel Effects may take different forms, for example: an on/off for a simple light with fixed intensity; a color and intensity for a light with variable luminosity Red, Green and Blue LEDs; a, possibly repeating, pattern of different colors and intensities for a light with variable luminosity Red, Green and Blue LEDs, for example a flashing or fading effect. The mapping of these effects onto the repeating pattern of Standard Tessellation Vertex and Edge and Tile positions is done by a method similar to the one depicted for Tessellated Light Set BD002 in FIG. 13: an (x, y) position that aligns with a vertex of the tessellated geometry is used for Bulb Lights, for example CA010-12; a pair of (x, y) positions that align to the ends of a tessellated geometry edge are used for Strip Effects, for example CA013-14; the m and n parameter values to be used with Replicators BD004 when creating a Standard Tessellation Tile is provided for Panel Effects, for example CA015-16.

Figure 23:
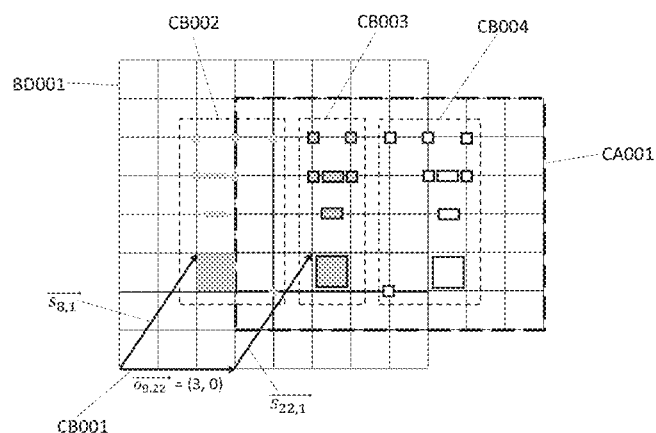
FIG. 23 illustrates a method for activating lights in a Tessellated Light Set using a Light Pattern.

FIG. 23 depicts the application of the Light Effects depicted in FIG. 22 to the Tessellated Light Set depicted in FIG. 13. The graphical representation CA001 of the Light Pattern of CA002 is reproduced along with the graphical representation BD001 of Tessellated Light Set BD002. Light Pattern CA002, with ID 22, is offset from Tessellated Light Set BD002, with ID 8, by vector $\vec{o}_{8,22}$ CB001. Offset CB001 is set such that there is some overlap between the lights of Tessellated Light Set BD002 and the effects of Light Pattern CA002: the lights in BD002 that are within area CB003 align with the Light Effects from CA001, causing the lights at these positions to become Active Lights that display the Bulb Effect, Strip Effect or Panel Effect that is aligned with them; the lights from in BD002 that are within area CB002 do not align with any Light Effects, causing them to be switched off; the Light Effects from CA001 that are within CB004 do not align with any lights and consequently no Light Effect can be produced. Consequently, it can be seen, from FIG. 23, that the Light Effects of a Light Pattern can be applied to multiple Tessellated Light Sets, provided they have the same Tessellated Geometry.

Figure 24:
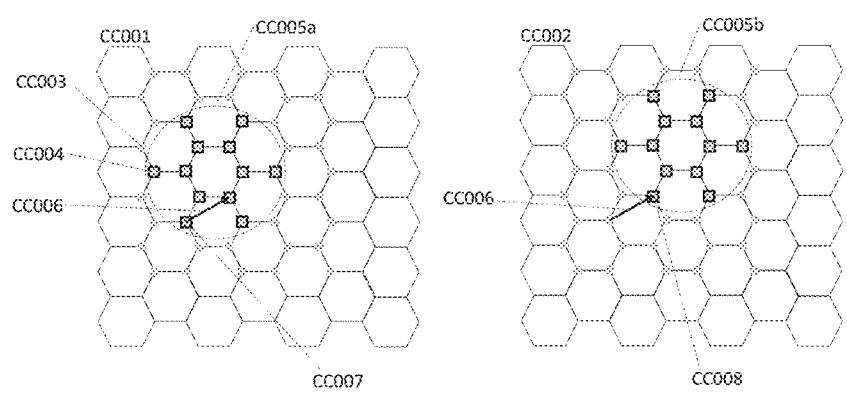
FIG. 24 illustrates a Movement Step on a hexagonal tessellated geometry.

FIG. 24 depicts a segment of a hexagonal Tessellated Geometry at two different times, the depiction in CC001 occurring shortly before the depiction in CC002. The Standard Tessellation of CC001 and CC002 is used by a 4×4 hexagon area Tessellated Light Set that has its vertices completely populated with Bulb Lights, for example Bulb Light CC003. A subset of the Bulb Lights within this area are displaying Bulb Effects from a Light Pattern with the star shape CC005a in CC001, for example Bulb Light CC004. The Bulb Lights displaying the Bulb Effects change between the times of CC001 and CC002, for example the Bulb Effect at Bulb Light CC007 in CC001 is at Bulb Light CC008 in CC002. This change in the Bulb Light for each Bulb Effect creates a Movement Illusion by Vector CC006 between CC001 and CC002, with the star shape appearing to be at CC005b in CC002.

Figure 25:
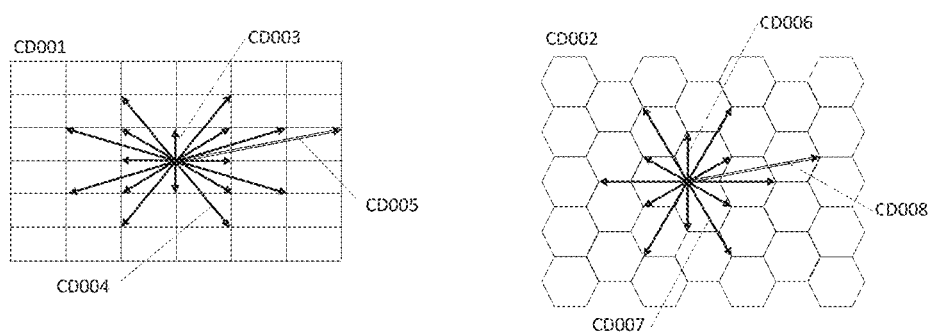
FIG. 25 illustrates individual Movement Steps that might be used as part of a Movement Illusion.

FIG. 25 depicts the set of short range Movement Illusions available on two different Tessellated Geometries. Movement Illusion CD003 is one of eight Movement Illusions available, on Rectangular Standard Tessellation CD001, that traverse a single Standard Tessellation Tile and move to a new location that is surrounded by the same relative positioning of Standard Tessellation Tiles, all of these Movement Illusions are shown. Movement Illusion CD004 is one of eight Movement Illusions available, on Rectangular Standard Tessellation CD001, that traverse two Standard Tessellation Tiles and move to a location surrounded by the same relative positioning of Standard Tessellation Tiles, all of these Movement Illusions are shown. Movement CD005 is a Movement Illusion, on Rectangular Standard Tessellation CD001, that traverses three Standard Tessellation Tiles and moves to a new location surrounded by the same relative positioning of Standard Tessellation Tiles. Movement Illusion CD006 is one of six Movement Illusions, available on Hexagonal Standard Tessellation CD002, that traverse a single Standard Tessellation Tile and move to a new location that is surrounded by the same relative positioning of Standard Tessellation Tiles, all of these Movement Illusions are shown. Movement Illusion CD007 is one of six Movement Illusions, available on Hexagonal Standard Tessellation CD002, that traverse two Standard Tessellation Tiles and move to a new location surrounded by the same relative positioning of Standard Tessellation Tiles, all of these Movement Illusions are shown. Movement Illusion CD008 is a Movement Illusion, on Hexagonal Standard Tessellation CD002, that traverses three Standard Tessellation Tiles and moves to a location surrounded by the same relative positioning of Standard Tessellation Tiles. The low resolution Tessellated Light Sets, with significant distance between lights, which may be used for a Light Show require a Light Pattern to be placed at the one or more locations that are surrounded by the relative positioning of Standard Tessellation Tiles used by the Light Pattern. Consequently, it can be seen that only a few short distance Movement Illusions are available for Light Patterns that use simple Standard Tessellations. In one or more embodiments, the optional Motion Guidance BE412 data structure provides, in a Standard Tessellation BE401, a set of vectors describing the short range Movement Illusions available for the Standard Tessellation BE401.

Figure 26:
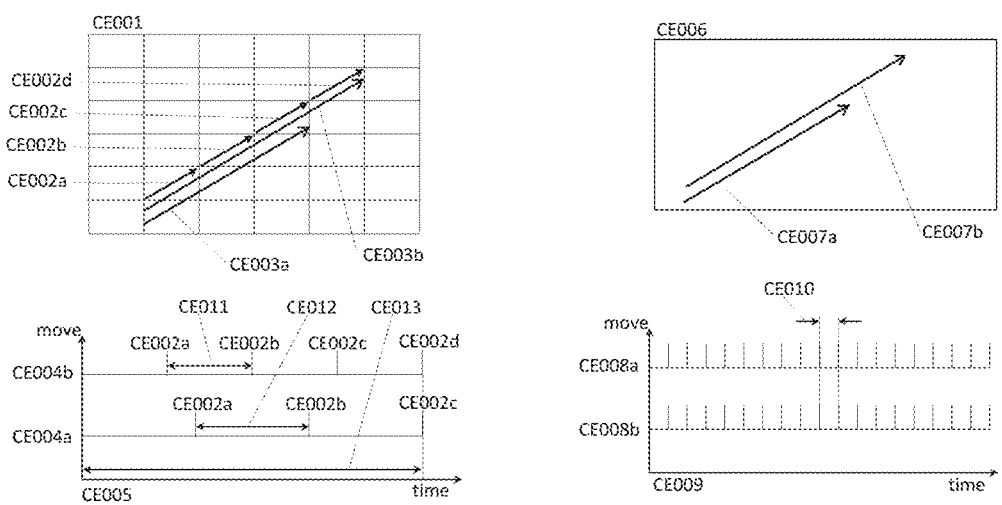
FIG. 26 illustrates two Movement Illusions with different speeds.

FIG. 26 illustrates how the exemplar system generates Movement Illusions with different speeds and compares this to the movement illusion used in films and video. Tessellated Light Set CE001 is used to provide a Movement Illusion for two different straight line motions with the same time duration and different distances, CE003a and CE003b. Movement Illusion CE003a uses the three Movement Steps, CE002a, CE002b and CE002c. Movement Illusion CE003b uses the four Movement Steps, CE002a, CE002b, CE002c and CE002d. Timeline graph CE005 depicts the execution of Movement Steps by Movement Illusions CE003a and CE003b. Timeline CE004a shows the execution of Movement Steps by Movement Illusion CE003a. Timeline CE004b shows the execution of Movement Steps by Movement Illusion CE003b. Movement Illusions CE003a and CE003b both execute their last Move Step at time CE013, for Movement Illusion CE003a this is Movement Step CE002c and for Movement Illusion CE003b this is Movement Step CE002d. Movement Illusions CE003a and CE003b have constant speed, consequently the time between each Movement Step is the same within each of them. Movement Illusion CE003a has a Movement Step time separation of Time CE012. Movement Illusion CE003b has a Movement Step time separation of Time CE011. The different durations of Time CE011 and Time CE012 create: the different motion speeds of Movement Illusions CE003a and CE003b; asynchronous execution of the Movement Steps of Movement Illusions CE003a and CE003b. Video Screen CE006 is used to provide a movement illusion for two different motions with the same time duration and different distances, CE007a and CE007b. The movement illusions for both CE007a and CE007b are shown on Timeline CE009, the position updates for CE007a are shown on CE008a and the position updates for CE007b are shown on CE008b. The position updates for both motions occur at the same synchronized Frame Rate, each Frame being separated by Time CE010. The different movement illusion speeds of CE007a and CE007b are created by moving a different number of picture elements per position update and may include fractional picture element distances created using different intensity levels at moving shape edges. Consequently, it can be seen that the Movement Illusions for Light Shows and the movement illusions for Video are created by different processes, this difference arises from: the large difference between the number of lights in a Light Show and the number of picture elements in a Video Display; the nearly contiguous nature of picture elements in a Video and the potentially large separations between Bulb Lights and Strip Lights that may be used in a Light Show; the simple array of picture elements in a Video Display and the more complex geometry of light positions that may be used in a Light Show; the synchronized sample nature of Video control signals and the per light asynchronous nature of typical Light Show control signals. A common practice for Light Shows has been the processing of Video Streams to convert them to a Light Show control signal, unless a very large number of lights is available for the Light Show current conversion technology does not produce a high-quality conversion of video that includes moving shapes.

Figure 27:
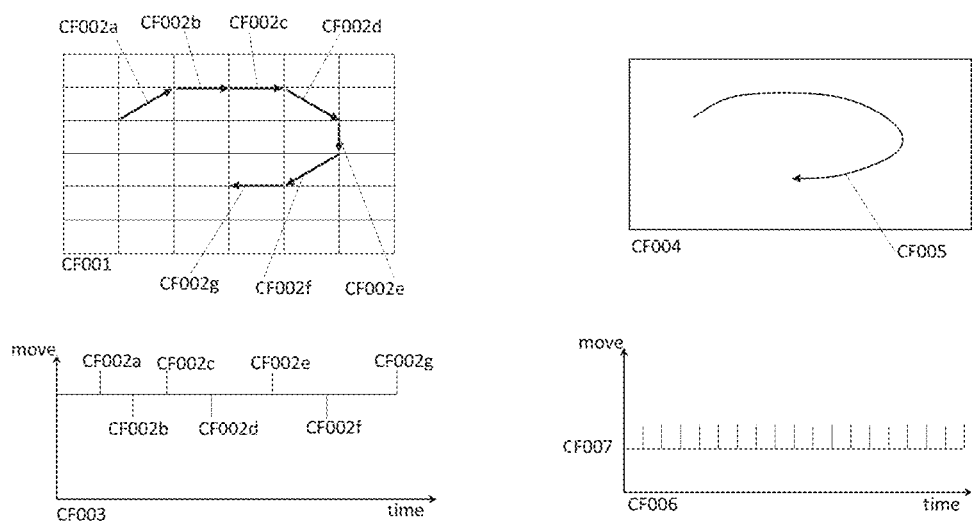
FIG. 27 illustrates the difference between a light effect Movement Illusion and a video movement illusion.

FIG. 27 illustrates a Movement Illusion for a curved motion on a Tessellated Light Set and a Video Screen. Illustration CF001 depicts a partial spiral motion generated using Movement Steps CF002a-g on a Tessellated Light Set, it can be seen that the coarse Movement Steps available on the Tessellated Light Set causes the motion to be a rough approximation to a spiral. The Movement Illusion created has an apparent speed that slows as the spiral progresses, consequently Timeline CF003 shows increasing time intervals between Movement Steps CF002a-g as the Movement Illusion progresses. Video Screen CF004 shows a similar movement illusion on a video screen. The much higher resolution of Video Screen CF004 can provide a movement illusion of a smooth curved movement of varying speed which is achieved by moving a different number of picture elements per position update, and may include fractional picture element distances created using different intensity levels at moving shape edges, at the fixed Frame Rate shown by the vertical lines on Timeline CF007 of Timeline Graph CF006.

Figure 28:
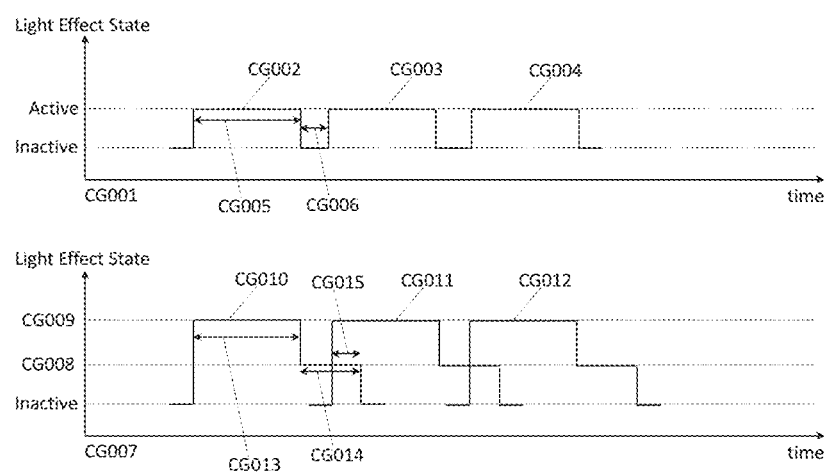
FIG. 28 illustrates light effect activations that may be used to enhance a Movement Illusion.

FIG. 28 illustrates enhancements to the Movement Illusion, introduced by FIGS. 24-27, which may be used in one or more embodiments. Timeline Graph CG001 depicts the application of the Light Effects, from a Light Pattern, to a Tessellated Light Set. At Effect Position CG003 the Light Effects are Active on a set of lights that is one Movement Step after the set of lights the Light Effects are active on at Effect Position CG002. Similarly, at Effect Position CG004 the Light Effects are Active on a set of lights that is one Movement Step after the set of lights the Light Effects are active on at Effect Position CG003. The Light Effect becomes Inactive on the lights of the previous Effect Position, either CG002 or CG003, before it becomes Active on the lights of the next Effect Position. This brief Inactivity may produce a, Movement Illusion speed dependent, smoothing effect for the Movement Illusion. The Movement Illusion is of uniform speed on a simple Tessellated Geometry, hence the Active Time CG005 and Inactive Time CG006 are the same for and between the Light Effect activities of Effect Positions CG002-4. Timeline Graph CG007 depicts the application of the Light Effects, from a Light Pattern, to a Tessellated Light Set. The Light Effects may be active at either Brightness CG008 or Brightness CG009. The Light Effects are active at three Effect Positions CG010-12. For all three of these Effect Positions the Light Effects are first active at Brightness CG009 for a Time CG013 and then at Brightness CG008 for a Time CG014. For all three of these Effect Positions the Light Effect activity of the previous Effect Position overlaps, with a different brightness level, the Light Effect activity at the next Effect Position by Overlap Time CG015. The Light Effect activity depicted in CG007 adds a trailing shadow to the Movement Illusion. The enhancements depicted in FIG. 28, and other Movement Illusions, may be further developed using a Timeline Graph CG007 with a different brightness Overlap Time or no brightness Overlap Time.

Figure 29:
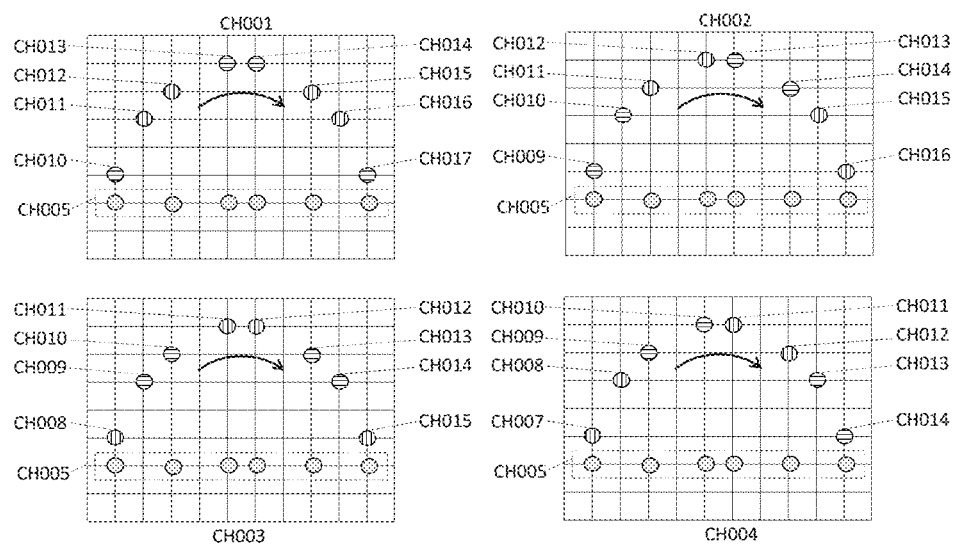
FIG. 29 illustrates an animation based on changing Light Patterns.

FIG. 29 illustrates an Animated Illusion for a set of lights that is created using a traditional multi-pattern animation. Four Depictions CH001-4 of a Tessellated Light Set, with a square Standard Tessellation, are shown. In all four Depictions CH001-4, the same Light Effects are shown on Lights CH005. The Light Effects CH007-17 are applied to the arc of lights above Lights CH005 such that if Depictions CH001-4 were displayed in order repeatedly a circular motion effect may be seen on the Tessellated Light Set.

Figure 30:
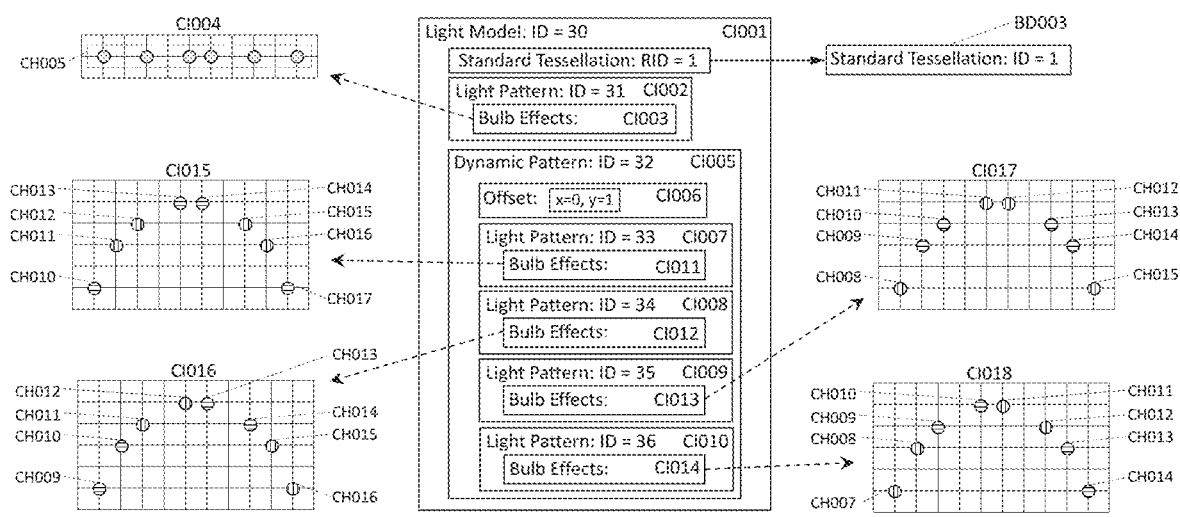
FIG. 30 illustrates a Light Model data structure that may be used to describe the Light Patterns of a multi-pattern animation.

FIG. 30 depicts the data structure Light Model CI001, this may include Light Effects that can produce the multi-pattern Animated Illusion illustrated in FIG. 29. Light Model CI001 defines a square Standard Tessellation for its Light Effect via Reference Identifier (or RID) 1 to the square Standard Tessellation BD003. Light Model CI001 splits the multi-pattern animation illustrated in CH0 into a static Light Pattern CI002 and a Dynamic Pattern CI005. Light Pattern CI002 includes the data structure Bulb Effects CI003, this stores the Light Effect CI004 that is shown on lights CH005. Dynamic Pattern CI005 includes the data structure Offset CI006, this stores the position of the Light Patterns CI007-10, components of Dynamic Pattern CI005, relative to Light Pattern CI002. The value held in Offset CI006 positions the Dynamic Pattern CI005 on the lights immediately above lights CH005, in order to create the multi-pattern animation of FIG. 29. Light Pattern CI007 includes the data structure Bulb Effects CI011, which itself includes the Light Effects CH010-17, shown in depiction CI015, which are the changing part of Depiction CH001. Light Pattern CI008 includes the data structure Bulb Effects CI012, which itself includes the Light Effects CH009-16, shown in depiction CI016, which are the changing part of Depiction CH002. Light Pattern CI009 includes the data structure Bulb Effects CI013, which itself includes the Light Effects CH008-15, shown in depiction CI017, which are the changing part of Depiction CH003. Light Pattern CI010 includes the data structure Bulb Effects CI014, which itself includes the Light Effects CH007-14, shown in depiction CI018, which are the changing part of Depiction CH004. Consequently, it can be seen that if Light Patterns CI007-10 are applied to a Tessellated Light Set at Offset CI006 from the application of Light Pattern CI002 then the multi-pattern Animated Illusion illustrated in FIG. 29 may be produced. Please note Light Model CI001 does not include the Bulb Effects detail, for Bulb Effects CI011-14, included in Light Pattern CA002 for Bulb Effects CA007 All Light Patterns within a Light Model may all reference the Standard Tessellation of the Light Model. Consequently, Light Patterns CI007-10 and CI002 include Reference Identifier (or RID) 1 to the square Standard Tessellation BD003.

Figure 31:
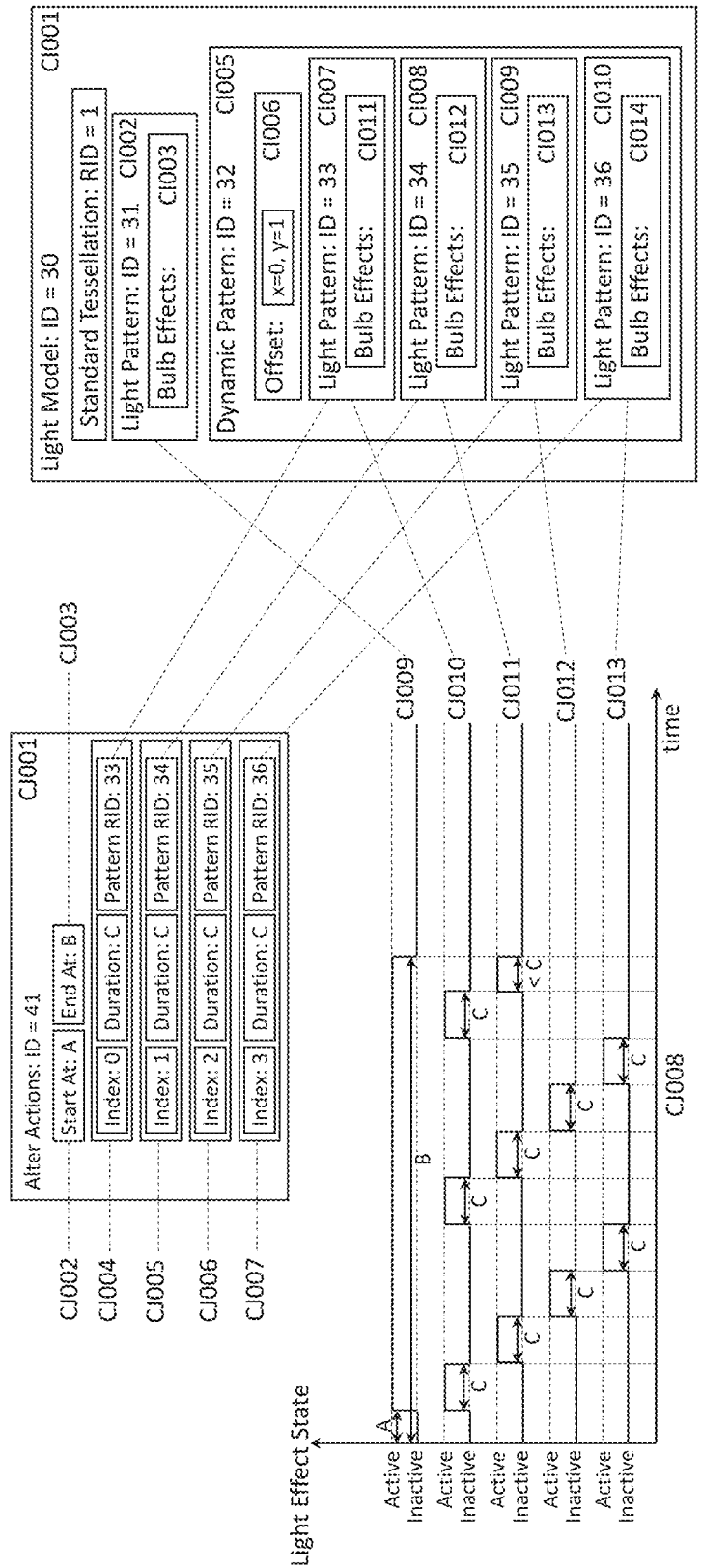
FIG. 31 illustrates an Alter Actions data structure that may be used to describe the changes of a multi-pattern animation.

FIG. 30 depicts Light Model CI001, which includes Light Effects that can be used to produce the multi-pattern Animated Illusion of FIG. 29. FIG. 31 depicts Alter Actions CJ001, which holds when the Light Effects in Light Model CI001 should be active in order to produce the multi-pattern Animated Illusion of FIG. 29. Alter Actions CJ001 includes Start At time CJ002 which includes time A and End At time CJ003 which includes time B. Timeline CJ009 shows how times A and B determine the start and end times for the activity of static Light Pattern CI002 when it is used with Alter Actions CJ001. Timelines CJ0010-13 show the activity time of the Light Patterns in Dynamic Pattern CI005. Pattern Activations CJ004-7 control when the Light Patterns in Dynamic Pattern CI005 are active between Start Time CJ002 and End Time CJ003. The Index field of each Pattern Activation CJ004-7 controls the activation sequence for Light Patterns CI007-10, referencing them via the Pattern RID field values 33-36. The Duration field controls the time duration which each Light Pattern CI007-10 is active for, the activation of the Light Pattern associated with the next Index field happening immediately after the inactivation of the last Light Pattern. For example: Light Pattern CI009 is referenced by Pattern Activation CJ006 which has Index value 2; Light Pattern CI008 is referenced by Pattern Activation CJ005 which has Index value 1; Timelines CJ011 and CJ012 show Light Pattern CI009 being activated immediately after Light Pattern CI008 becomes inactive and remaining active for duration C, the time of the Duration field of Pattern Activation CJ006. The active index rolls over immediately after the end of Pattern Activation CJ007, which has the highest Index value of 3, activating CJ004 with Index value 0. In addition to index based activation Pattern Activations CJ004-7 are also constrained by Start At time CJ002 and End At time CJ003, this is best illustrated by the last activation of Timeline CJ011 having its duration reduced to <C by end time B.

Figure 32:
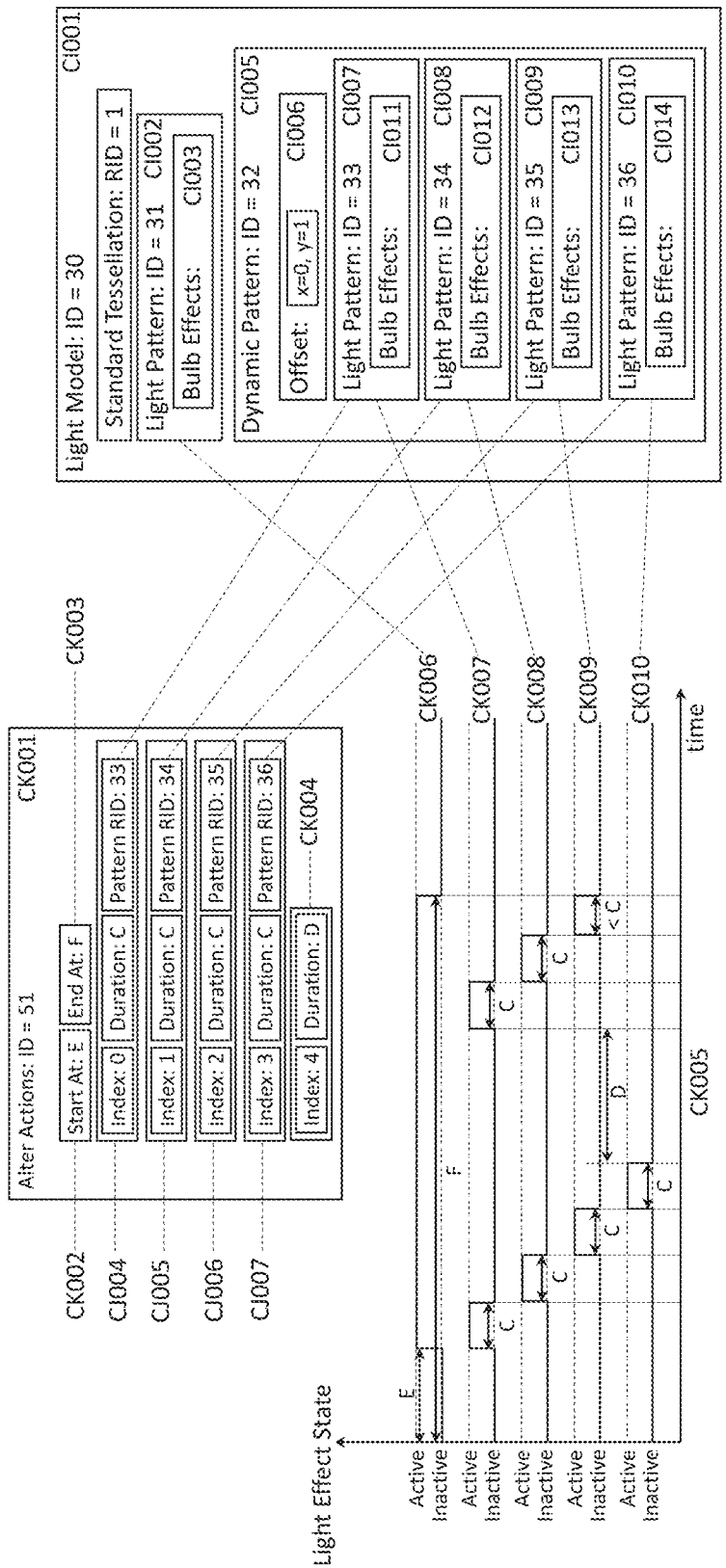
FIG. 32 illustrates an Alter Actions data structure that may be used to describe the changes of a multi-pattern animation.

FIG. 32 illustrates a multi-pattern Animated Illusion that displays only its static Light Pattern during part of its active period. Alter Actions CK001 includes Start At time CK002 with value E, End At time CJ003 with value F and Pattern Activations CJ004-7 from Alter Actions CJ001. In addition, Alter Actions CK001 also includes Pattern Activation CK004 that has Duration D and no reference to a Light Pattern. Timeline CK006 shows how times E and F determine the start and end times for the activity of static Light Pattern CI002 when it is used with Alter Actions CK001. Timelines CK007-10 depict the activation of Dynamic Pattern CI005 when it is used with Alter Actions CK001. Consequently, it can be seen, from FIG. 32, that Pattern Activation CK004 leads to a time, of duration D, when none of Light Patterns CI007-10 are active and that this Inactive Dynamic time period occurs at the time one would expect given its Index field value of 4. In one or more embodiments, Alter Actions with many Inactive Dynamic periods may be used to create flashing light effects. In one or more embodiments, a modified Alter Actions data structure may be used to transition between inactive and a plurality of different active brightness levels.

Figure 33:
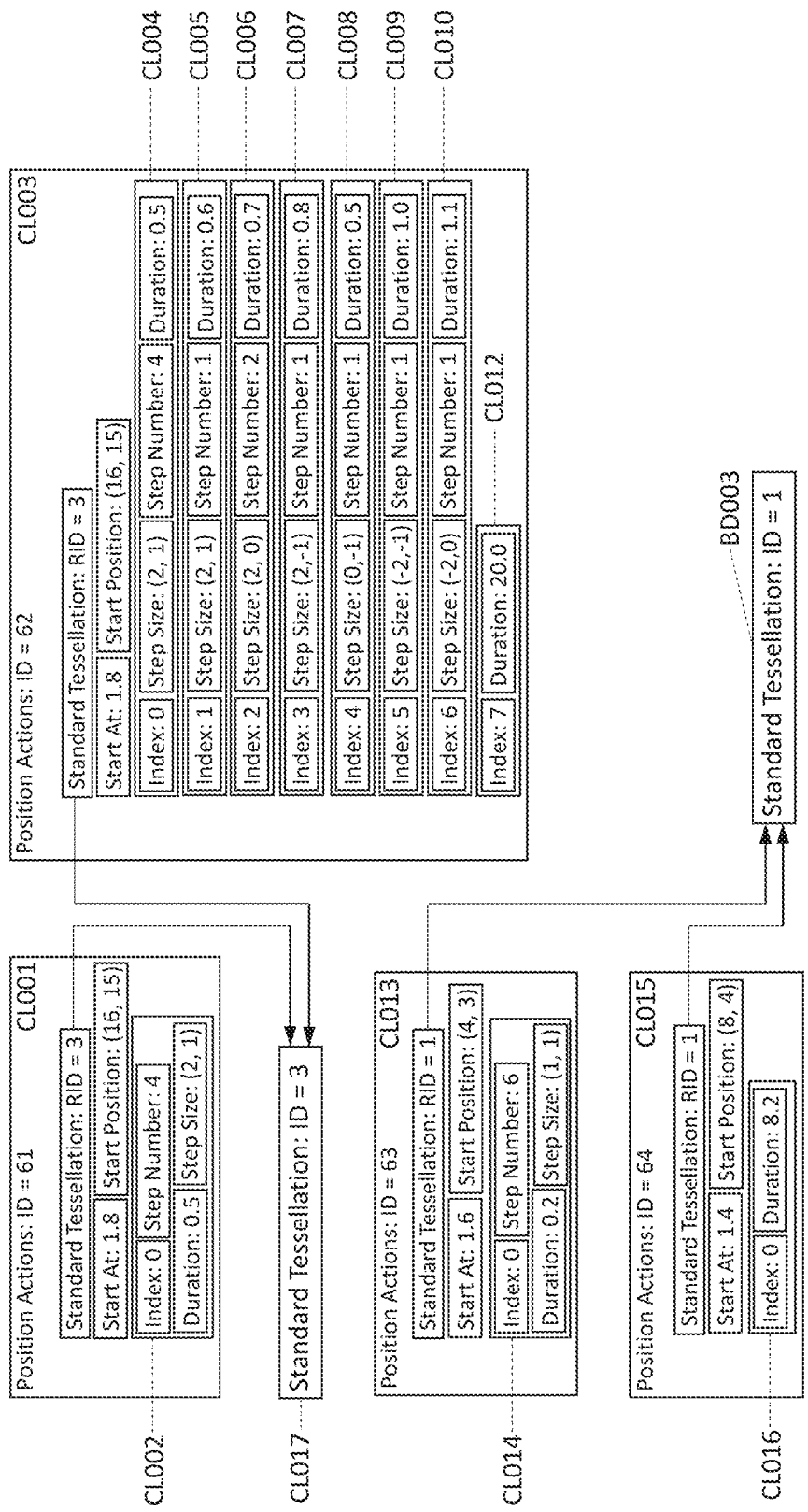
FIG. 33 illustrates several Position Actions data structures that can represent a Movement Illusion.

FIG. 33 illustrates the Position Actions data structure, this data structure creates a series of positions, at asynchronous times, for the origin of any Light Model on a Standard Tessellation. Position Actions CL001 and CL003 include a movement description across the rectangular Standard Tessellation CL017, the Standard Tessellation of CD001, CE001 and CF001, with each rectangle of the tessellation having a width of 2 and a height of 1. Position Actions CL001 includes: Reference ID 3 for Standard Tessellation CL017; a Start At time 1.8 seconds after the start of the Animation; Start Position of (16, 15), which is 8 horizontal squares and 15 vertical squares from the origin of Standard Tessellation CL017; data structure Origin Movement CL002 which may produce the Movement Illusion CE003$b$. Origin Movement CL002 includes: Step Number 4 which produces 4 moves, corresponding to the 4 Movement Steps CE002$a$-$d$; a value of 0.5 seconds for CE011 using Duration 0.5; Step Size (2, 1) which specifies that each of the Movement Steps CE002$a$-$d$ is from the bottom left to the top right of a rectangle in Standard Tessellation CL017. At 1.8 seconds after the start of the Animation the Light Model being positioned should be placed on Standard Tessellation CL017 such that its origin is at (16, 15). At 2.3 seconds, 1.8+0.5, after the start of the Animation, the Light Model should be moved by (2, 1), Movement Step CE002$a$, placing its origin at (18, 16). Similarly, Movement Steps CE002$b$-$d$ should move the Light Model origin to (20, 17), (22, 18) and (24, 19) at 2.8, 3.3 and 3.8 seconds after the start of the Animation. At 4.3 seconds after the start of the Animation the Light Model positioning for Position Actions CL001 should end. Position Actions CL001 may be used to produce a Movement Illusion, in a Light Show, for any Light Model and Tessellated Light Set that have the Standard Tessellation CL017.

Position Actions CL003, of FIG. 33, produces in order: Movement Illusion CE003$b$; the Movement Illusions CF002$a$-$g$; stationary Light Effects. Position Actions CL003 has the same Start Position and Start At time as Position Actions CL001. As Origin Movement CL004 holds the same values as Origin Movement CL002 then the same first Movement Illusion CE003$b$ may be produced. At the end of Origin Movement CL004, 4.3 seconds after the start of the Animation, Position Actions CL003 executes Origin Movement CL005, corresponding to Movement Illusion CF002$a$, and moves the origin of the Light Model to (26, 20). Origin Movement CL006 should then move the Light Model origin to (28, 20) and (30, 20) at 4.9 and 5.6 seconds after the start of the Animation, producing Movement Illusions CF002$b$ and CF002c. Similarly, Origin Movements CL007-10 should move the Light Model origin to (32, 19), (32, 18), (30, 17) and (28, 17) at 6.3, 7.1, 7.6 and 8.6 seconds after the start of the Animation, corresponding to Movement Illusions CF002d-g. The Light Model origin then stays at (28, 17) for a further 21.1 seconds before the Light Model positioning ends, the first 1.1 seconds of this time are due to Origin Movement CL010 and the last 20 seconds are due to Origin Movement CL012. The absence of Step Number and Step Size fields from Origin Movement CL012 implying a stationary Light Model origin for its Duration.

Position Actions CL013 and CL015, of FIG. 33, illustrate simple Origin Movements on square Standard Tessellation BD003. Position Actions CL013 has a single Origin Movement CL014 that produces a six step Movement Illusion that lasts 1.2 seconds. Position Actions CL015 has a single stationary Origin Movement CL016, this produces Light Effects that: locate a Light Model origin at fixed origin position (8, 4); start 1.4 seconds after the start of the Animation; last for 8.2 seconds.

Figure 34:
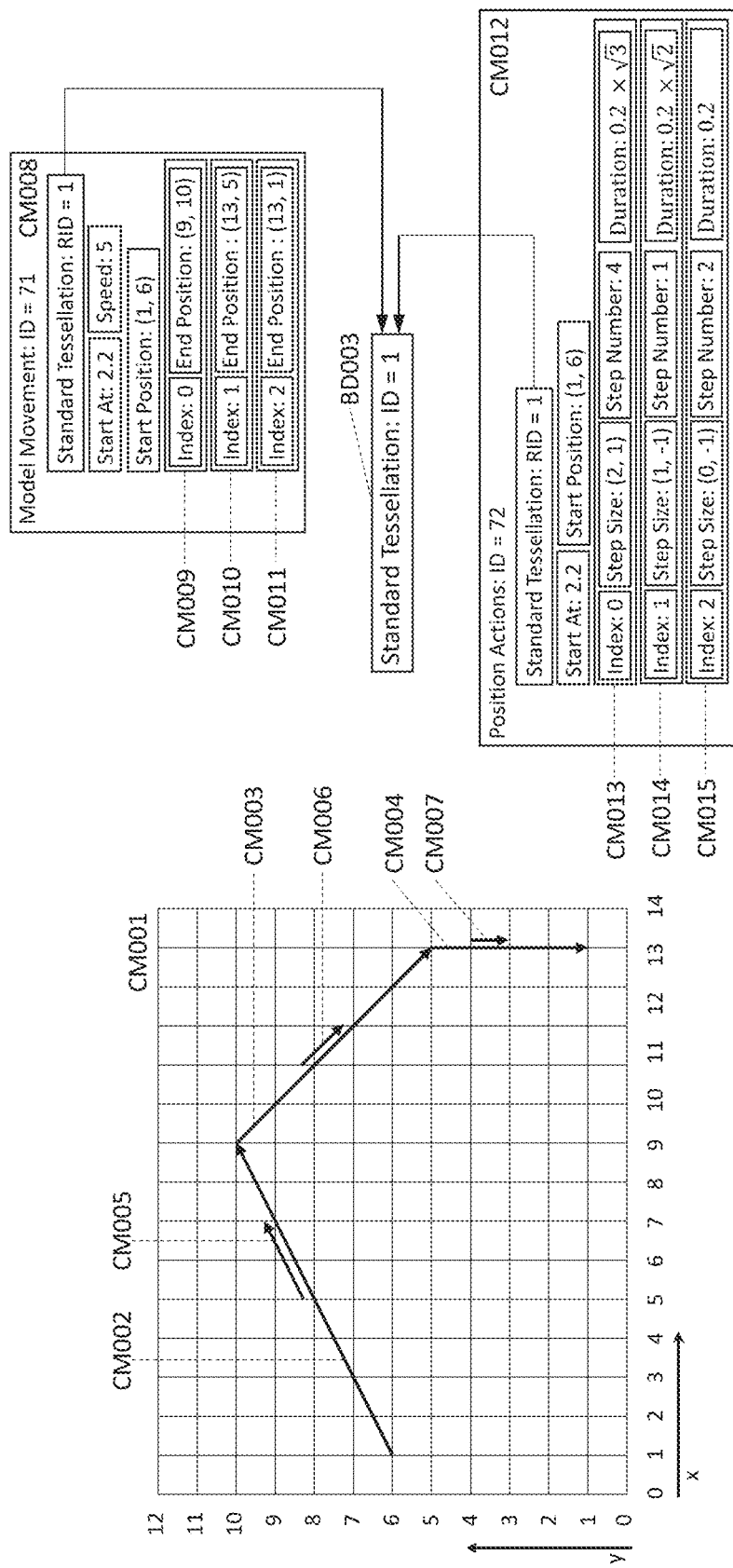
FIG. 34 illustrates a Model Movement data structure that can represent a movement illusion.

FIG. 34 illustrates the Model Movement data structure using a constant speed motion along the Straight-Line Segments CM002-4 drawn in depiction CM001. Model Movement CM008 includes: Reference ID 1 to the motion's square Standard Tessellation BD003; a Start At time 2.2 seconds after the start of the Animation; a motion Speed of 5 units per second; the Start Position (1, 6) of first Straight-Line Segment CM002; the End Positions CM009-11 of all three Straight-Line Segments CM002-4. As the start position of Straight-Line Segments CM003-4 is the end position of the previous Straight-Line Segments CM002-3, this is sufficient to describe the motion. The motion of Model Movement CM008 can be converted to Position Actions CM012 by: copying the Start At time and Start Position; calculating Step Sizes CM005-7 and their associated Step Numbers from the directions and length of Straight-Line Segments CM002-4; calculating the Duration of each Movement Illusion step along the Straight-Line Segments that should produce the 5 units per second constant Speed of CM005. The Model Movement data structure is a description of the motion that can easily be captured using a Human Computer Interface, or HCI, the Position Actions data structure is a motion description that can easily be used when generating a Light Animation. Conversion between these data structures may be done when the Light Animation is created.

Figure 35:
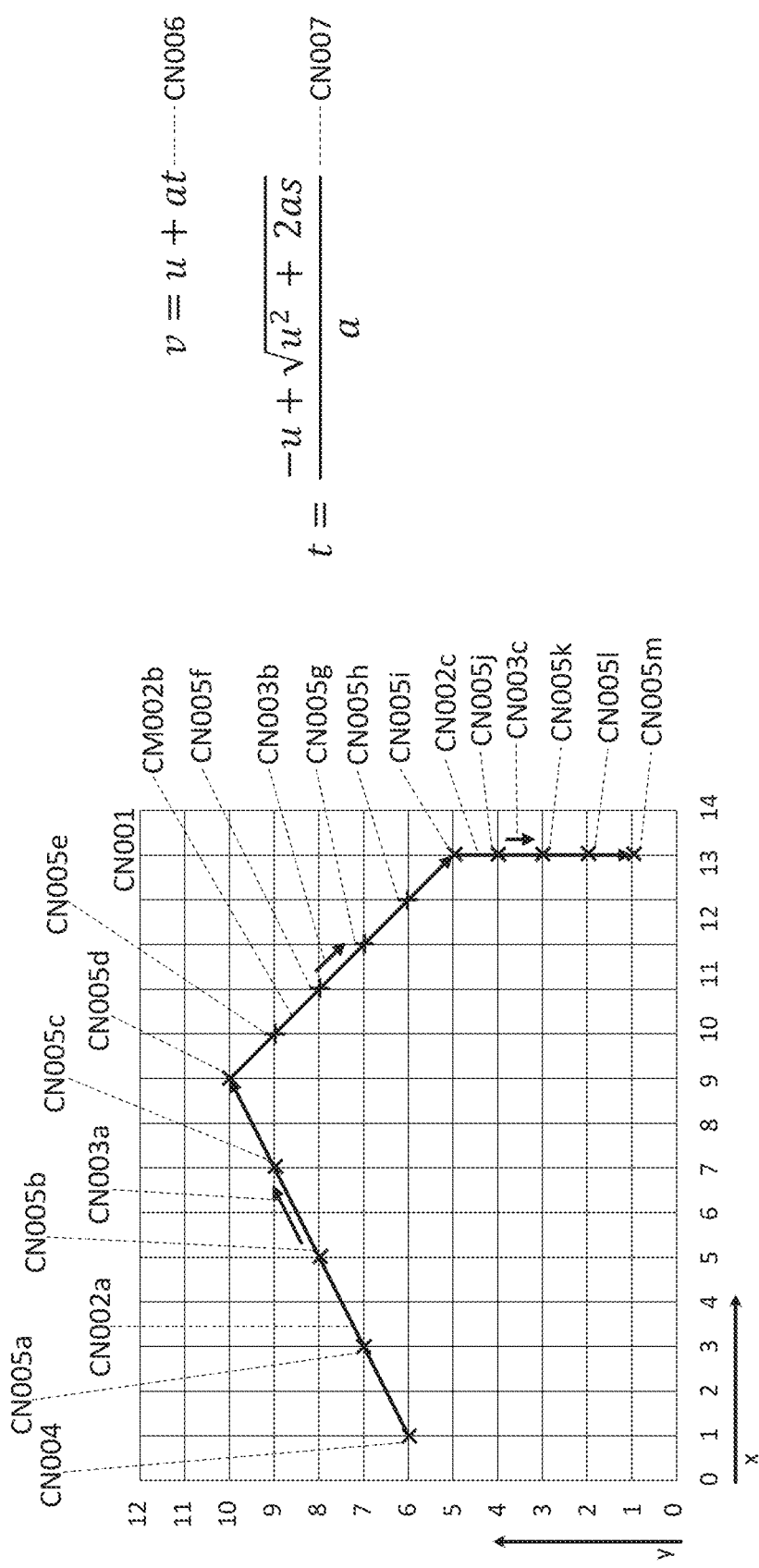
FIG. 35 illustrates Model Movement with an accelerating movement illusion.

FIG. 35 illustrates a movement illusion, for a Light Model, on square Standard Tessellation CN001 using a constant acceleration motion, illustrated by example Motion Vectors CN003a-c, along a path created from Straight-Line Segments CN002a-c. The negative acceleration of the example motion is illustrated by the decreasing lengths of example Motion Vectors CN003a-c. The motion illusion is created by applying the light effects, from a Light Model, to a Tessellated Light Set, for Light Model origin positions at Start Position CN004 and Moved Positions CN005a-m. The time of light effect display start for each Moved Position CN005a-m is offset by time difference "t", calculated using Equation CN007, from the time of light effect display start at Start Position CN004. The time of light effect display stop at each position may be the time of light effect display start for the next position or may be varied according to one or more of the methods illustrated in FIG. 28. Equation CN007 includes: variable 'u' which is the initial speed of the Light Model at Start Position CN004; variable 'a' which is the constant acceleration of the Light Model; variable 's' which is the distance, along the path created by Straight-Line Segments CN002a-c, from Start Position CN004 to the Moved Position CN005a-m for which time 't' is being calculated. Equation CN006 calculates the speed 'v', at any point along the path created by Straight-Line Segments CN002a-c, from the variables 'u', 'a' and T. FIG. 35 is an example motion on a square Standard Tessellation, it illustrates a more general method that may be applied, in one or more embodiments, to one or more types of motion, for example constant acceleration or linearly decreasing acceleration, on one or more Standard Tessellations, with possibly different geometries, for one or more motions and which is applicable to any motion that includes one or more Movement Steps. In one or more embodiments, the motion illustrated in FIGS. 34 and 35 may be enhanced by one or more, possibly different, rotations of the Light Model being displayed, for example when the Standard Tessellation has rotational symmetries the light effects of the Light Model may easily be displayed, with the correct geometry of the Light Model, at any of the rotational symmetries.

In one or more embodiments, extended Model Movement data structures may provide more complex variable speed motion, for example changing acceleration or constant acceleration followed by constant deceleration.

Figure 36:
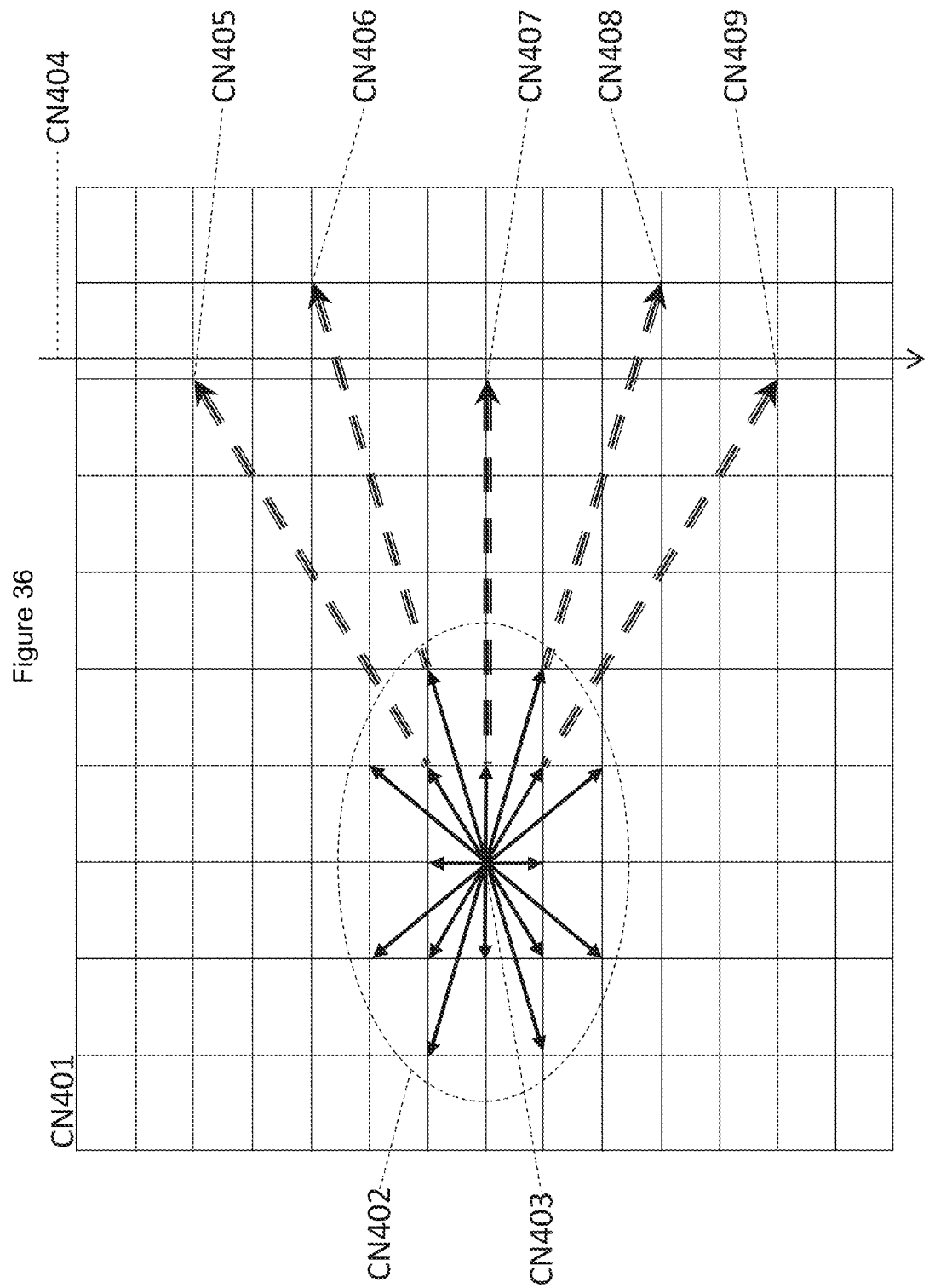
FIG. 36 illustrates a method for user entry of a Model Movement.

FIG. 36 illustrates a method of data entry, via a Human Computer Interface, for the end points of a Straight-Line Segment that may be included in a Model Movement. Standard Tessellation CN401 has an overlaid Depiction CN402 of the Movement Steps previously shown in Depiction CD001. The Center CN403 of Depiction CD402 is the start of the Straight-Line Segment that was already entered by selection of the closest light by a mouse click. Subsequently, the mouse is moved along line CN404, causing Option Lines CN405-09, for Straight-Line Segments, to be displayed. Each Option Line CN405-09 is displayed during the time the mouse pointer is closer to its end than the end of any other possible Option Line. As the mouse is moved down the screen, the order of Option Line display is CN405, CN406, CN407, CN408 and finally CN409. If the mouse button is clicked during the display of an Option Line then it may be selected for the Straight-Line Segment. The method displays the Option Line with an end point that is closest to the mouse pointer. Consequently, it can be seen that other movements of the mouse pointer may be used to create any Straight Line Segment that is possible within the limited area of Standard Tessellation CN401 that is displayed.

Figure 37:
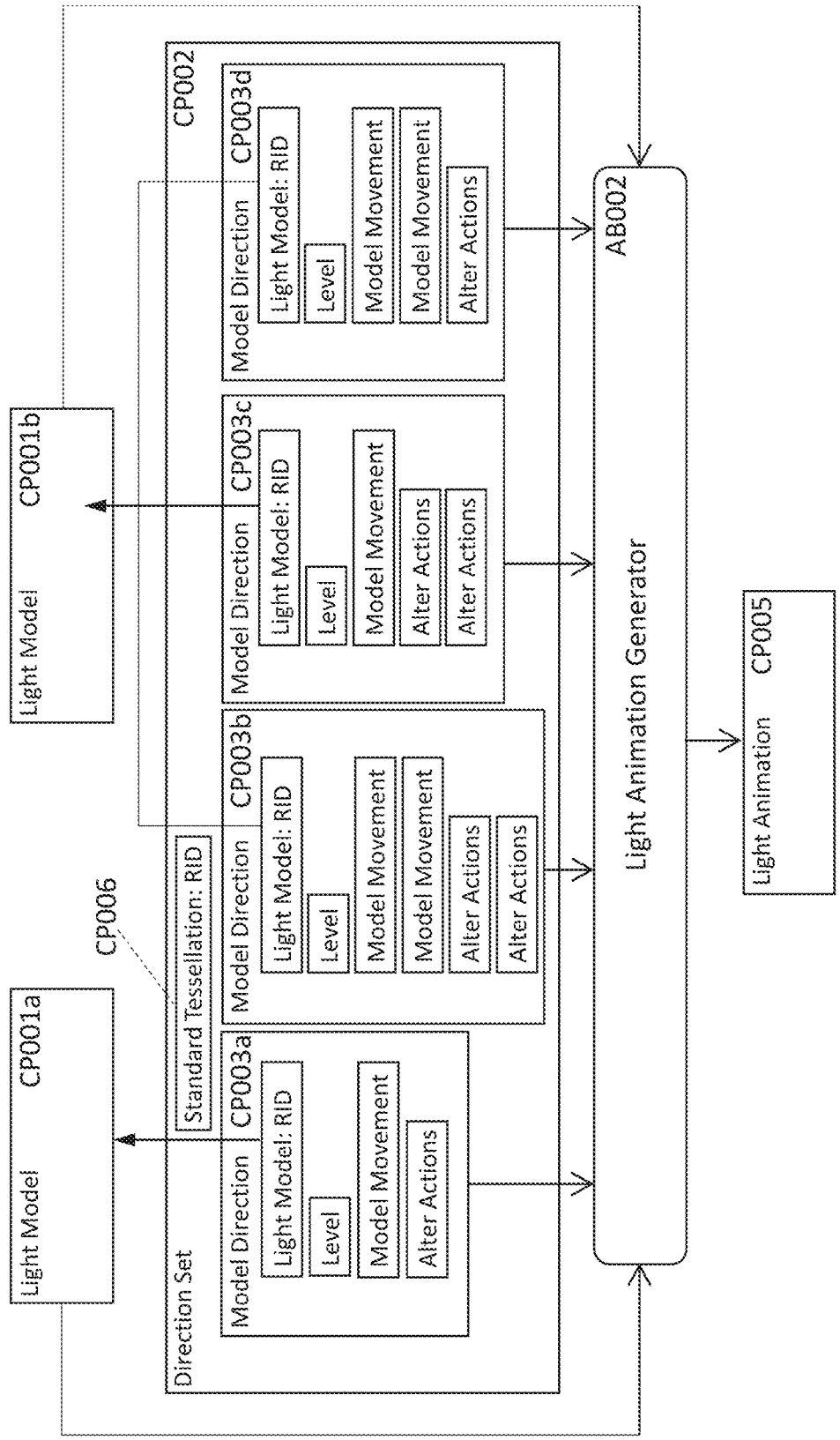
FIG. 37 shows, for the exemplar architecture, a functional diagram for the generation of a Light Animation data structure.

FIG. 37 illustrates the process by which a Light Animation CP005 is created. Light Models CP001a-b and the Direction Set CP002 are used by Light Animation Generator AB002 to create Light Animation CP005. Direction Set CP002 includes Standard Tessellation RID CP006 and Model Directions CP003a-d. Model Direction CP003a includes a reference to Light Model CP001a which is used by Light Animation Generator AB002 to look up the contents of Light Model CP001a. Every Model Direction CP003b-d includes a reference to Light Model CP001b, these are used by Light Animation Generator AB002 to look up the contents of Light Model CP001b. Consequently, the animated effects, included in Light Animation CP005, for Model Directions CP003b-d have the same Light Effects, but different motion and multi-pattern sequencing. In the general case, Light Animation Generator AB002, of the exemplar system, creates a Light Animation from a Direction Set and one or more Light Models. A Direction Set includes one or more Model Directions. Each Model Direction includes: a Light Model reference; a Level, which is the display priority for its Light Effects; one or more Model Directions; optionally, in one or more embodiments, one or more Alter Actions. Each Model Direction uses the Light Effects from the single Light Model that it references. The Direction Set, Model Movements within the Direction Set and Light Models used to create a Light Animation may share, via RIDs, the same Standard Tessellation.

Model Directions CP003a-d, of FIG. 37, illustrate that Model Directions referencing the same Light Model may include different numbers of Model Movements and Alter Actions. The interval of each Model Movement in a Model Direction, which is the period between its Start At time and the end time of its last Origin Movement, may not overlap the interval of any other Model Movement in the same Model Direction. The interval of each Alter Action in a Model Direction, which is the period between its Start At time and End At time, may not overlap the interval of any other Alter Action in the same Model Direction. Alter Actions only cause Light Effects for times within the interval of a Model Movement in the same Model Direction, at other times no Standard Tessellation position is available for the Light Effect.

Figure 38:
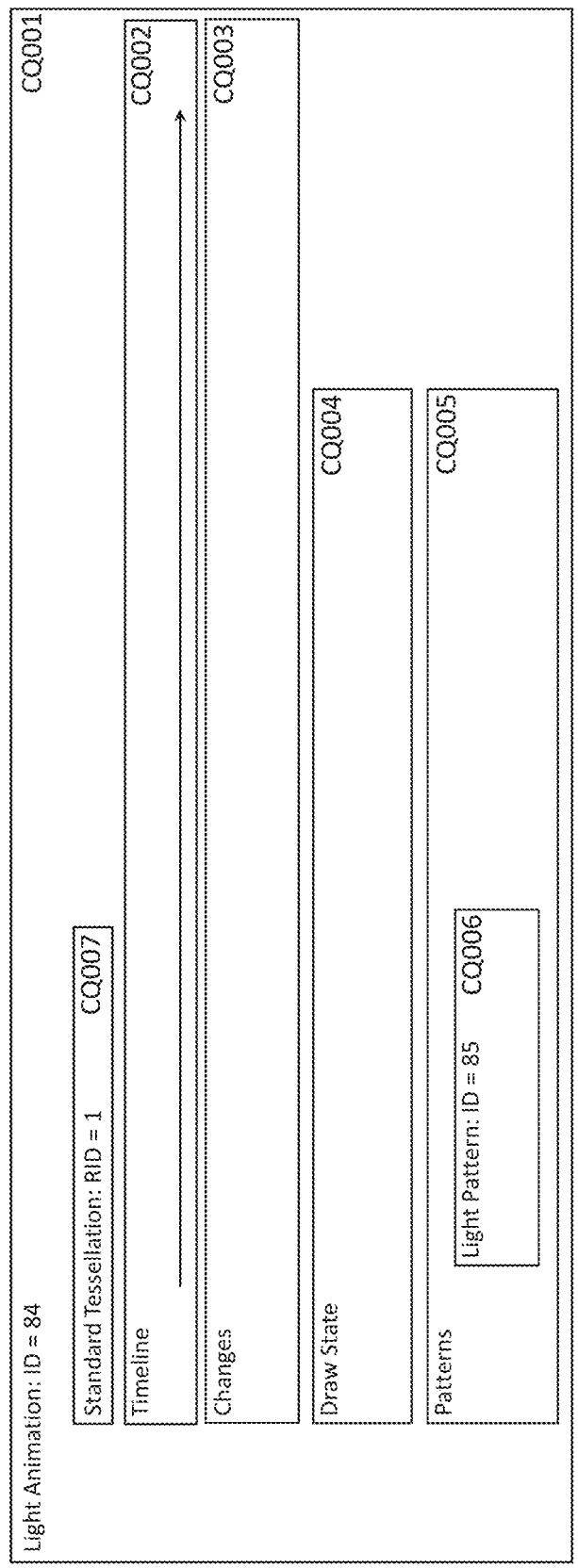
FIG. 38 shows an empty Light Animation data structure.

When creating a Light Animation from a Direction Set and one or more Light Models, Light Animation Generator AB002: creates an empty Light Animation with an ID and a reference to the Standard Tessellation shared by the Light Models and Model Movements that it may use; adds data structures to the Light Animation for each of the Model Directions in the Direction Set. FIG. 38 depicts the data structure for empty Light Animation CQ001 which includes: an ID (with value 84); Reference ID CQ007 (with value 1) for the Standard Tessellation BD003 of the Light Models and Model Movements which may be used; empty container Timeline CQ002 which may include a time ordered collection of Animation Events; empty container Changes CQ003 which may include the changes to make at the times of all Animation Events in container Timeline CQ002; empty container Draw State CQ004 which may include Draw Effects that describe how to apply the Light Effects in a Light Pattern to the shared Standard Tessellation; the container Patterns CQ005, this may include one empty Light Pattern CQ006 which has no Bulb Effects, Strip Effects or Panel Effects.

Figure 39:
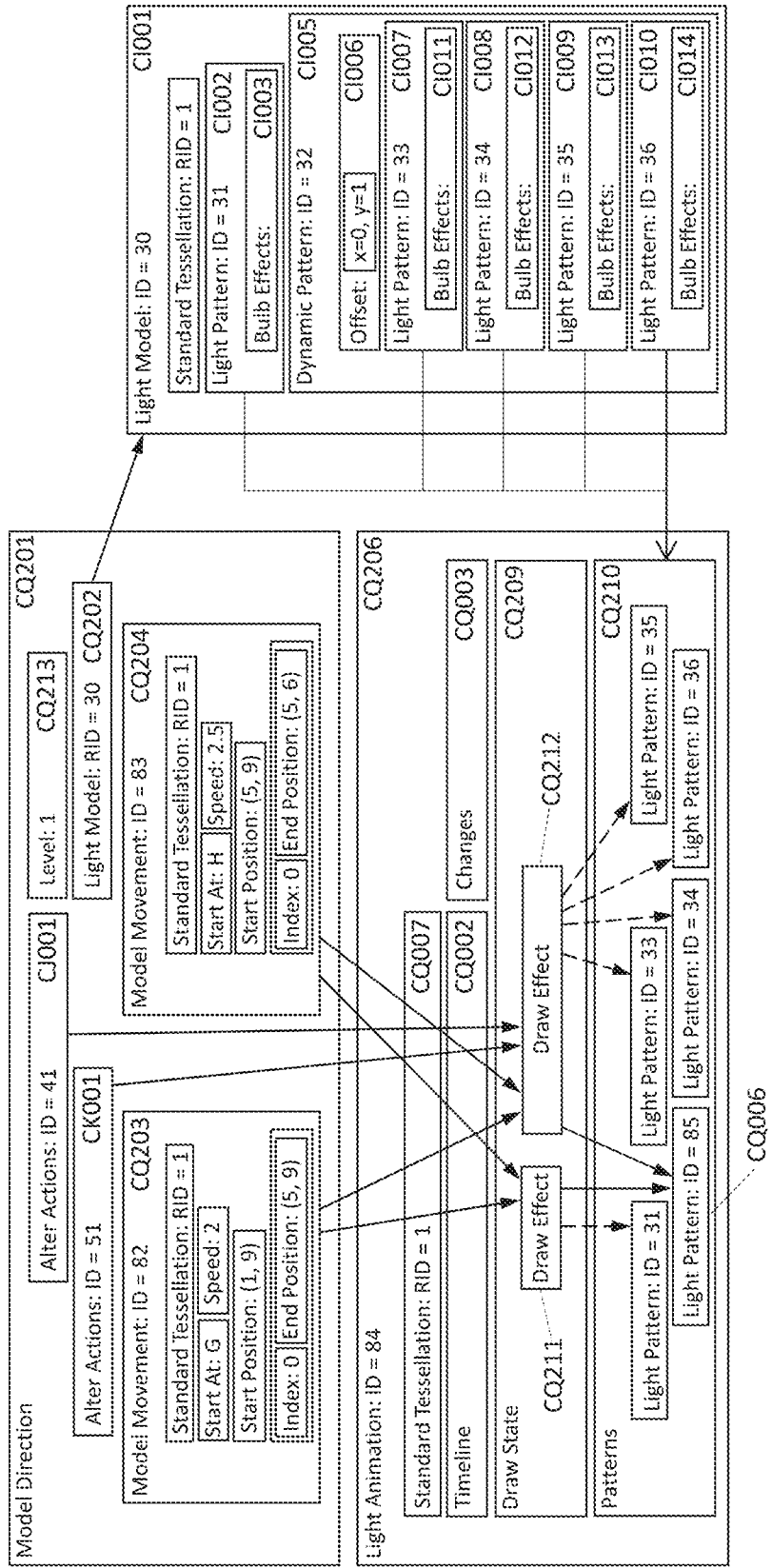
FIG. 39 illustrates the addition of Draw Effect and Light Pattern data structures to a Light Animation data structure.

There are three stages to the Effect Addition process, executed by Light Animation Generator AB002, which modifies a Light Animation such that it includes the Light Effects from a Model Direction and its associated Light Model. The first stage of this process is illustrated in FIG. 39, the second stage in FIG. 40 and the third stage in FIG. 41. FIG. 39 depicts the Light Animation CQ206 that is produced when Light Animation Generator AB002 executes the first stage of the Effect Addition process for Model Direction CQ201 with the empty Light Animation CQ001. The first stage makes the following changes to Light Animation CQ001: Light Patterns CI002 and CI007-10 are copied into container Patterns CQ005, creating container Patterns CQ210; Two Draw Effects CQ211-12, both with Standard Position (0, 0), Level CQ213, from Model Direction CQ201, and references to the empty Light Pattern CQ006 are added to Draw State CQ004, creating Draw State CQ209. Draw Effect CQ211 is used to project Light Pattern CI002, onto Standard Tessellation BD003, at an Offset of (0,0) from its Standard Position, referencing the empty Light Pattern (with ID value 85) when this effect is not active and the copy of Light Pattern CI002, in container Patterns CQ210, when the effect is active. Draw Effect CQ212 is used to project Dynamic Pattern CI005, onto Standard Tessellation CM012, at Offset CI006 from its Standard Position, referencing the empty Light Pattern (with ID value 85) when the effect is inactive, or active without an active multi-pattern, and the active Light Pattern, one of the copies of Light Patterns CI007-10 in container Patterns CQ210, when a multi-pattern effect is active. Initially Draw Effects CQ211-12 reference the empty Light Pattern CQ006, only referencing a different Light Pattern when an Animation Event on a modification of container Timeline CQ002 changes the Light Pattern they refer to.

The second stage of the Effect Addition process adds data structures due to the Alter Actions included within the Model Direction being processed. In stage 2 Animation Events are added to the Timeline container and Change Effect (or CH-E) data structures to the Changes container. Each Animation Event controls when, as part of applying a Light Animation to a Tessellated Light Set, the information in one or more CH-E data structures may be used to modify Draw Effects in the Draw State container. Model Directions CQ201, of FIG. 39, includes Alter Actions CJ001 and Alter Actions CK001, the combined Timeline CR001, of FIG. 40, for these Alter Actions shows that they have non-overlapping time intervals with Alter Actions CK001 starting after the end of Alter Actions CJ001. Animation Event data structures, for example Animation Event CR006, are added to container Timeline CQ002 for all active or inactive transitions in combined Timeline CR001, creating container Timeline CR003. One or more CH-E data structures, such as CH-E CR007, are added to container Changes CQ003 for every Animation Event added to container Timeline CQ002, creating container Changes CR004. Each Animation Event includes references to the one or more CH-E data structures associated with it and all the CH-E data structures include References CR005 to Draw Effect CQ212. In addition, a CH-E includes which Light Pattern, in container Patterns CQ210, should be referenced by Draw Effect CQ212 as a consequence of the Animation Event, this Draw Effect reference change may cause a multi-pattern animation Light Effect when the Light Animation is applied to a Tessellated Light Set.

Figure 41:
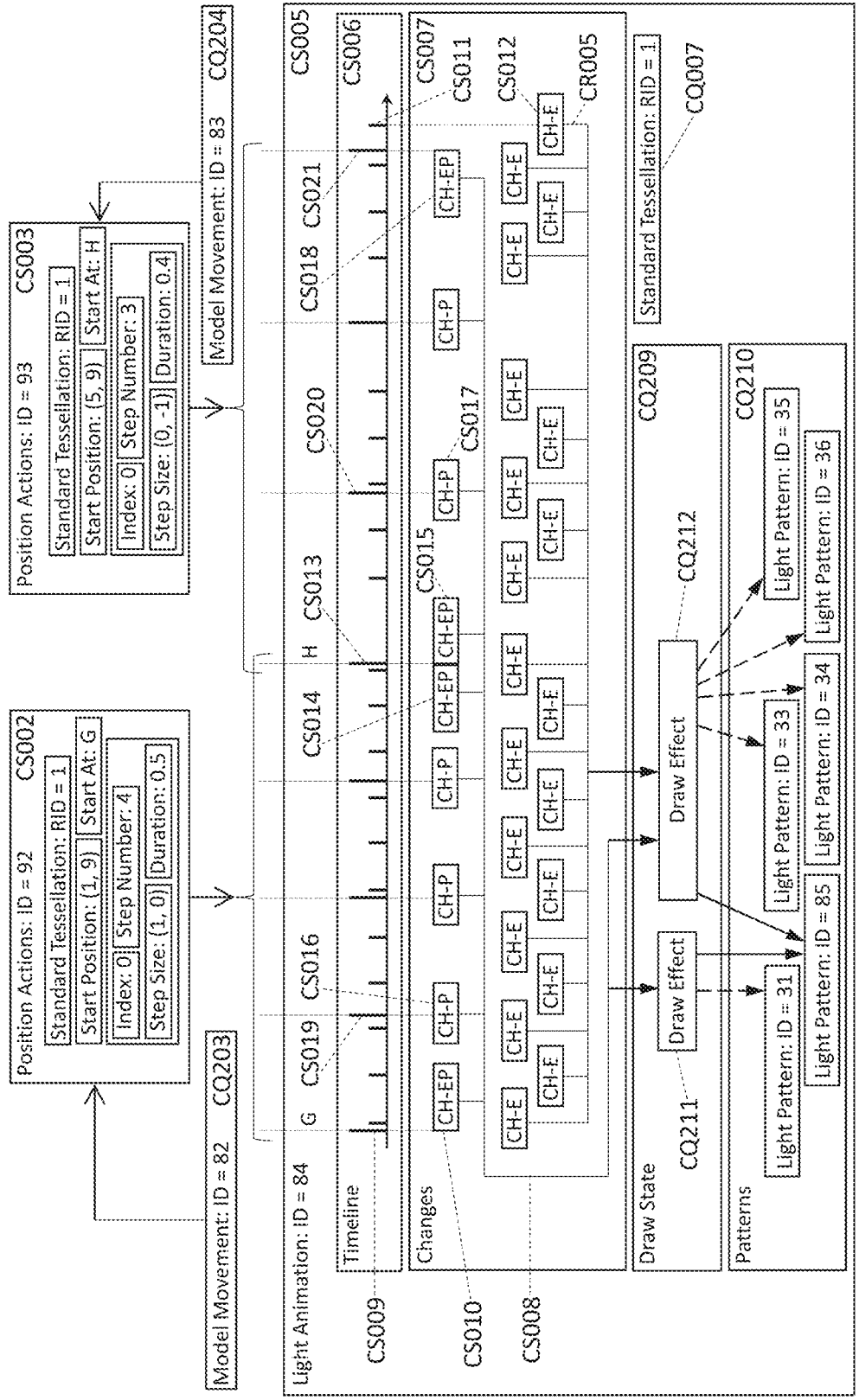
FIG. 41 illustrates the addition of movement illusion changes to a Light Animation.

The third stage of the Effect Addition process adds data structures due to the Model Movements included within the Model Direction being processed. In stage three: Animation Events are added to the Timeline container; Change Position (or CH-P) and Change Position Effect (C-PE) data structures are added to the Changes container. Each Animation Event controls when, as part of applying a Light Animation to a Tessellated Light Set, the information in one or more CH-P or CH-PE data structures should be used to modify Draw Effects in the Draw State container. FIG. 41 illustrates stage three, of the Effect Addition process, for Model Direction CQ201, this: converts Model Movements CQ203-4, of FIG. 39, to Position Actions CS002-3 using the conversion process illustrated in FIG. 34; adds the Animation Events implied by Position Actions C S002-3 to container Timeline CR003, for example Animation Event CS009, creating container Timeline CS006; adds one or more CH-EP, for example Change Position Effect CS010, or CH-P, for example Change Position CS016, data structures to container Changes CR004 for each Animation Event added to container Timeline CR003 as a consequence of Position Actions CS002-3, creating container Changes CS007. Animation Events are added to container Timeline CR003 for all Initial Placements, Origin Movements, and Positioning Ends implied by Position Actions CS002-3. For Position Actions CS002, Light Animation Generator AB002 creates: Animation Event C S009, at time G, and Change Effect-Position CS010 for its Initial Placement; several Animation Events and Change Positions, for example Animation Event CS019 and Change Position CS016, for its Origin Movements; Animation Event CS013 and Change Effect-Position CS014 for its Positioning End. For Position Actions CS003 Light Animation Generator AB002: reuses Animation Event CS013, which is at time H to within the numerical precision available, and creates Change Effect-Position CS015 for its Initial Placement; creates several Animation Events and Change Positions, for example Animation Event CS020 and Change Position CS017, for its Origin Movements; creates Animation Event CS021 and Change Effect-Position CS018 for its Positioning End. Both Draw Effects CQ211 and CQ212 are referenced by the CH-EP and CH-P data structures created in CS005 by stage three, as illustrated by Reference Arrow CS008, any CH-P positioning change may be applied to Draw Effects CQ211 and CQ212. The CH-EP data structures created in Light Animation CS005 by the Initial Placements of stage three, for example Change Effect-Positions CS010 and CS015, may change Draw Effect CQ211 to reference the copy of Light Pattern CI002, Draw Effect CQ212 to reference a Light Pattern copied Dynamic Pattern CI005 and the positions of Draw Effects CQ211 and CQ212. The CH-EP data structures created in Light Animation CS005 by stage three at the end of Position Actions, for example Change Effect-Positions CS014 and CS018, may change Draw Effects CQ211 and CQ212 so they reference the empty Light Pattern with ID 85 and have no Standard Position. Both Draw Effect CQ211 and Draw Effect CQ212 should be set to the same position by any positioning change, Draw Effect CQ212 applying its copy of Offset CI006 to the effects of the Light Pattern it references in order for them to have the correct position on Standard Tessellation BD003. Please note that Animation Event CS011 and its associated Change Effect CS012, which arise from an Alter Actions CK001, are not within the time interval of either Position Actions CS002 or Position Actions CS003. Consequently, as they have no position for the effect, they should not cause any Light Effects when Light Animation CS005 is applied to a Tessellated Light Set.

Figure 42:
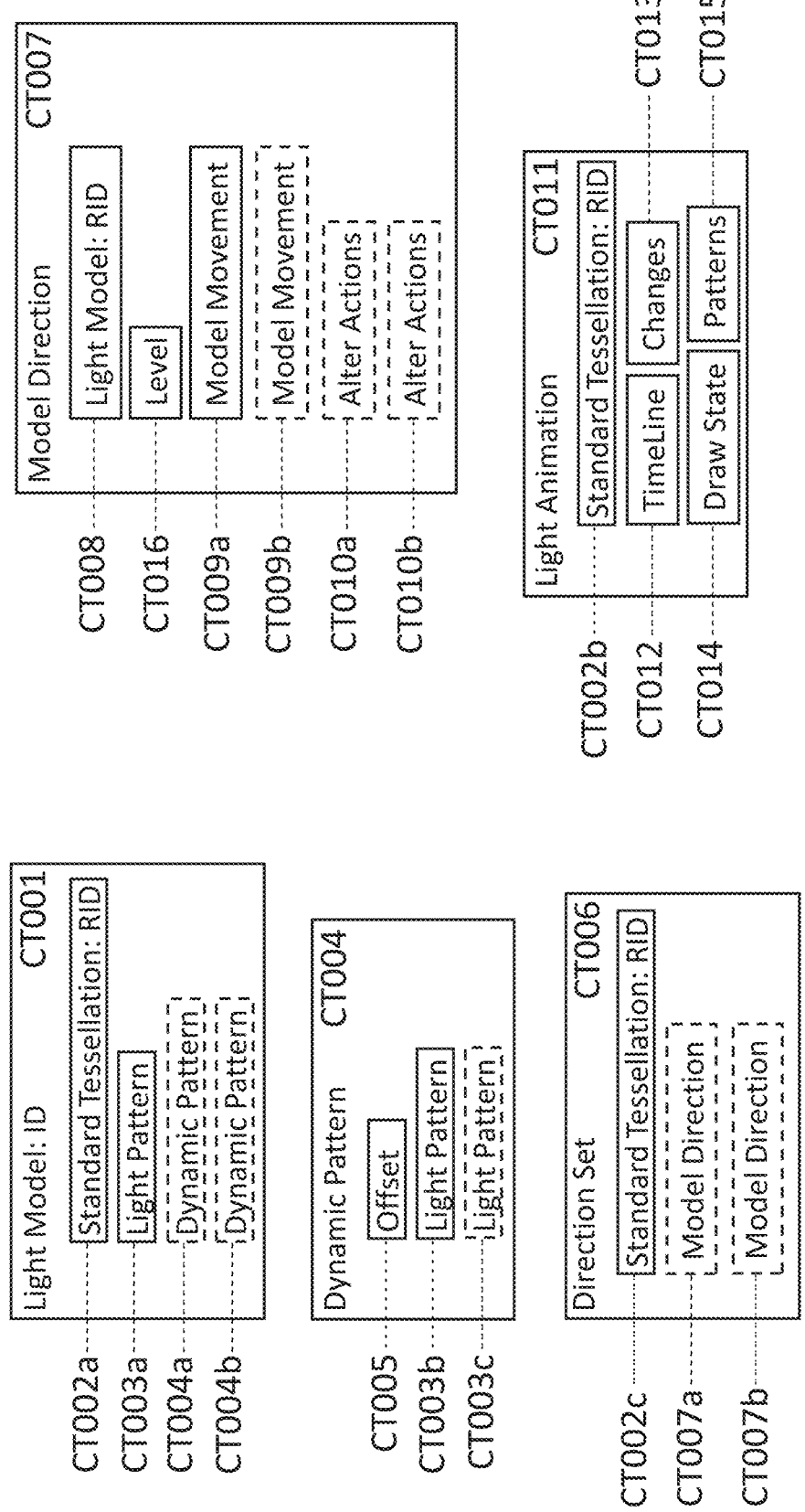
FIG. 42 includes depictions of the Light Model, Direction Set and Light Animation data structures of the exemplar architecture.

FIG. 42 depicts more general forms of the data structures illustrated in FIGS. 37-41. Light Model CT001 includes Standard Tessellation RID CT002a, static Light Pattern CT003a and optionally one or more Dynamic Patterns CT004, for example CT004a and CT004b. Dynamic Pattern CT004 includes Offset CT005 and one or more Light Patterns CT003, for example CT003b and CT003c. Direction Set CT006 includes Standard Tessellation RID CT002c and optionally one or more Model Directions CT007, for example CT007a and CT007b. Model Direction CT007 includes Light Model RID CT008, Level CT016, one or more Model Movements CT009, for example CT009a and CT009b, and optionally one or more Alter Actions CT010, for example CT010a and CT010b. Light Animation CT011 includes Standard Tessellation RID CT002b and the containers Timeline CT012, Changes CT013, Draw State CT014 and Patterns CT015.

Figure 43:
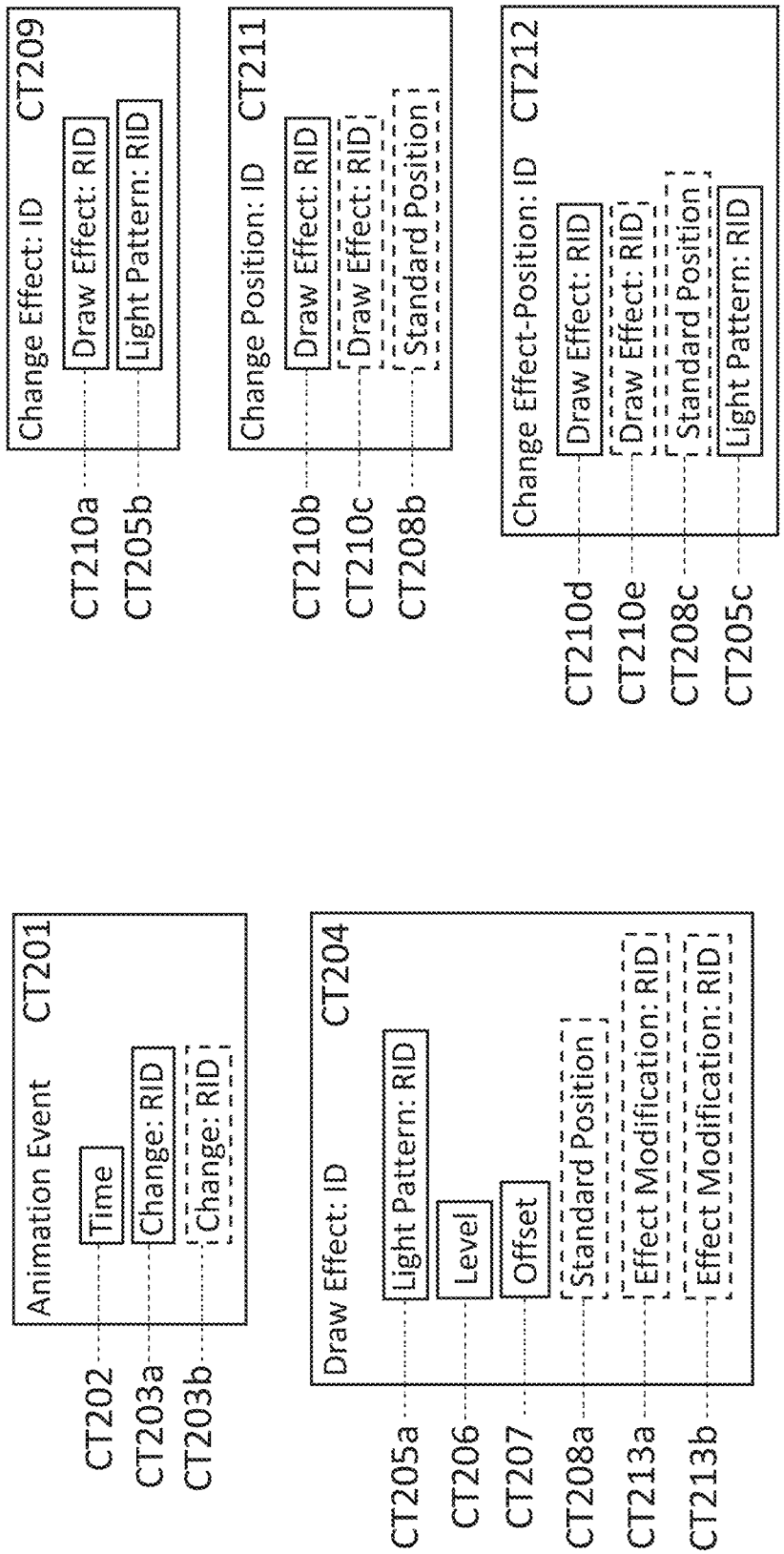
FIG. 43 includes depictions of the Animation Event, Draw Effect, Change Effect, Change Position and Change Effect-Position data structures of the exemplar architecture.

FIG. 43 depicts more general forms of the data structures used within Light Animation CT011. An Animation Event CT201 includes Time CT202 and one or more Change Reference IDs CT203, for example CT203a and CT203b, these may include the ID of a Change Effect CT209, Change Position CT211 or Change Effect-Position CT212 that is held within the same Light Animation CT011. A Change Effect CT209 includes a Draw Effect Reference ID CT210a and a Light Pattern Reference ID CT205b, Change Effect CT209 may be used to change the Draw Effect CT204 pointed to by Draw Effect RID CT210a such that it references the Light Pattern with the ID in Light Pattern RID CT205b. A Change Position CT211 includes one or more Draw Effects CT210, for example CT210b and CT210c, and an optional Standard Position CT208b, which is a position on the Standard Tessellation referenced by the Light Animation CT011 that may be used to set the position of the one or more Draw Effects referenced. A Change Effect-Position CT212 includes: one or more Draw Effects CT210, for example Draw Effects CT210d and CT210e; Light Pattern RID CT205c; optional Standard Position CT208c. A Change Effect-Position may be used to change both the Standard Position CT208a and Light Pattern RID CT205a of the Draw Effects it references. A Draw Effect CT204 includes: Light Pattern RID CT205a which may reference any Light Pattern in the same Light Animation CT011; Level CT206 that may be used to set the display priority for Light Effects in the Light Pattern referenced by CT205a when creating part of a Light Show; Offset CT207 that is used to offset the position of Light Effects in the Light Pattern referenced by CT205a from Standard Position CT208a when creating a Light Show; an optional Standard Position CT208a, at Light Show times when this is not available the Light Effects of the Light Pattern referenced by CT205a cannot be used in a Light Show; a, possibly empty, list of Effect Modification RIDs, for example CT213a and CT213b, these are used to remove the Effects associated with Light Pattern CT205a when generating a Light Show. A Standard Position CT208 may include either an (x, y) position in the two-dimensional space of the Standard Tessellation or (m, n) parameters for the Standard Tessellation space. When either Standard Position CT208b or CT208c are not present the Change referenced should cause removal of Standard Position CT208a from the Draw Effect.

Figure 44:
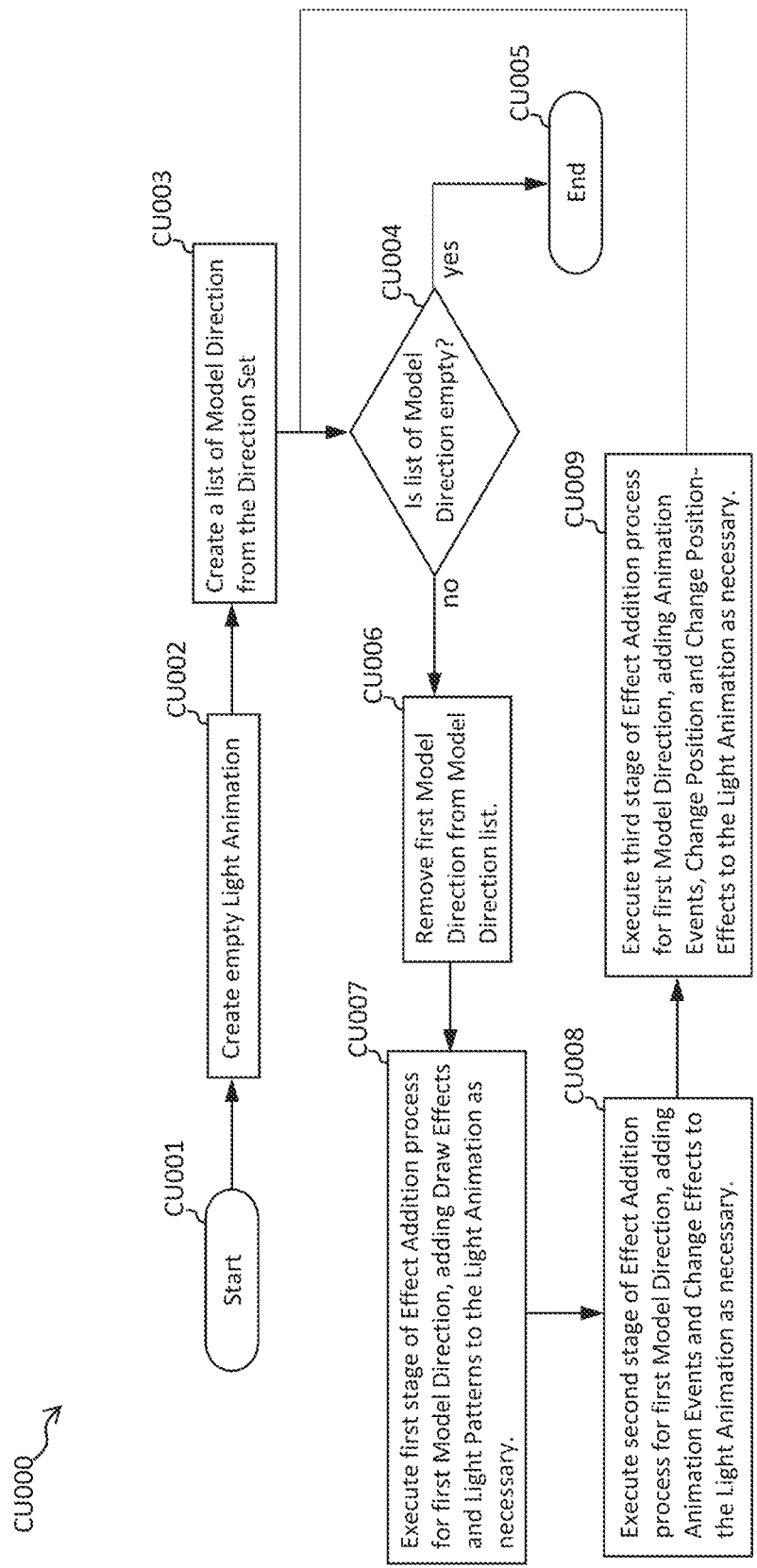
FIG. 44 is a flow chart of a method of Light Animation generation.

FIG. 44 is a flow diagram illustrating a method CU000 that may be used by Internet Server AA001 to create a Light Animation CT011 from a Direction Set CT006 and one or more Light Models CT001. The method CU000 may be performed by Light Animation Generator AB002.

Figure 40:
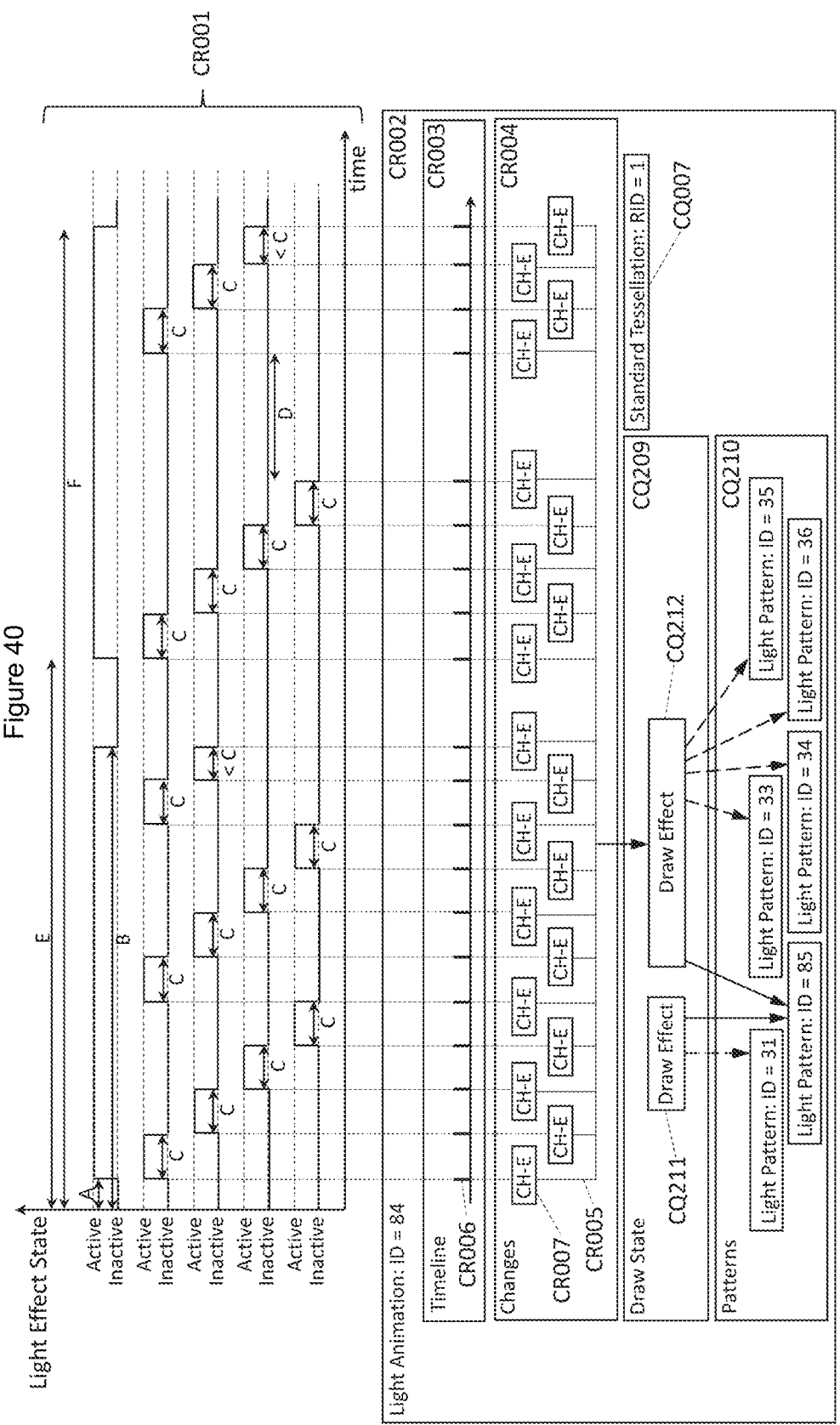
FIG. 40 illustrates the addition of multi-pattern animation changes to a Light Animation.

In operation CU002 an empty Light Animation CT011, as illustrated in FIG. 38, is created. In operation CU003 a list of Model Directions CT007 is created from the Model Directions CT007 in Direction Set CT006. In operation CU004 the contents of the current list of Model Directions CT007 is tested: if no Model Directions are held then the Light Animation CT011 is complete and the method CU000 depicted in flow diagram ends; if Model Directions CT007 are held then the flow diagram proceeds with operation CU006. In operation CU006 the first Model Direction in the current Direction List is removed. In operation CU007 the first stage of the Effect Addition process, as illustrated in FIG. 39, for the first Model Direction, removed from the current Direction List in operation CU006, adds one or more Draw Effects to container Draw State CT014 and one or more Light Patterns CT003 to container Patterns CT015. In operation CU008 the second stage of the Effect Addition process, as illustrated in FIG. 40, for the first Model Direction, removed from the current Direction List in operation CU006, adds one or more Animation Events to container Timeline CT012 if necessary and one or more Change Effects to container Changes CT013 if necessary. In operation CU009 the third stage of the Effect Addition process, as illustrated in FIG. 41, for the first Model Direction, removed from the current Direction List in operation CU006, adds one or more Change Positions, Change Position-Effects or Change Effects to container Changes CT013 if necessary and one or more Animation Events to container Timeline CT012 if necessary.

Figure 45:
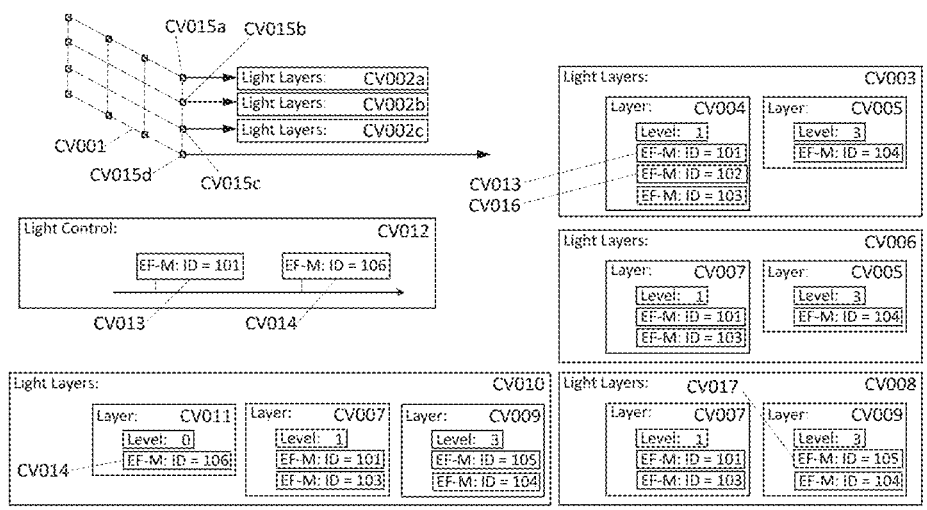
FIG. 45 illustrates a method for deciding which Light Effect to apply to a light when more than one is available.

When Light Animation Generator AB002 is used with a Direction Set CT006 that includes a plurality of Model Directions CT007 then more than one Light Effects may be available for a light during a time period. However, only one Light Effect can be active on a light during any time period. Consequently, one Light Effect may be selected as the active one, this is done by: assigning a display priority, or Level, to every Model Direction CT007 in the Direction Set CT006; using the last activated Light Effect of a given Level. FIG. 45 describes a method that is used by the exemplar system to select an active Light Effect from the one or more Light Effects that may be available for a light. The Tessellated Light Set that displays the Light Effects of FIG. 45 has lights around the perimeter of a three by two area of rectangular Standard Tessellation. Set Layers CV001 includes a reference to a Light Layer data structure for every light in this Tessellated Light Set, for example Light Layers CV002a-c. The Light Layers referenced are used to control which Light Effects become active. For example, References CV015a-c point at Light Layers CV002a-c for the duration of FIG. 45. There are no active Light Effects for the lights associated with Light Layers CV002a-c during the time interval illustrated in FIG. 45 and consequently Light Layers CV002a-c are empty. The Light Effects for the light associated with Reference CV015d change, during the time interval of FIG. 45, causing the Light Layers data structure referenced to change its contents from Light Layers CV003 to Light Layers CV006, Light Layers CV008 and Light Layers CV010. The initial data structure Light Layers CV003 includes: Layer CV004 which has Level 1, and Effect Modifications (EF-M) with IDs 101, 102 and 103; Layer CV005 which has Level 3 and the Effect Modification with ID 104. The active Light Effect is the last one added to the Layer with the lowest Level. As the Effect Modifications in a Layer are held in the order added, with the first one held last, then Effect Modification CV013 will be active in Light Layers CV003. Light Layers CV003 is converted to Light Layers CV006 by the removal of Effect Modification CV016 from Layer CV004. Effect Modification CV013 was added after Effect Modification CV016, consequently this removal leaves Effect Modification CV013 active. Light Layers CV006 is converted to Light Layers CV008 by the addition of Effect Modification CV017, with ID 105, to Layer CV005. This does not change Layer CV007, with the lowest Level, and consequently leaves Effect Modification CV013 active. Light Layers CV008 is converted to Light Layers CV010 by the addition of Effect Modification CV014, with ID 106. As Effect Modification CV014 has Level 0 then a new Layer CV011, with Level 0, is created. As Layer CV011 has the lowest Level in Light Layers CV010 then the active Effect Modification changes from CV013 to CV014. Consequently, of the three Effect Modifications depicted in FIG. 45, only Effect Modification CV014 is placed in Light Control CV012, during the interval of FIG. 45, and seen in the Light Show generated. Please note that Draw Effect CT204 may need to hold Effect Modification RIDs CT213 in order to remove the Effect Modifications CW206 that it inserted from their Light Layers. In one or more embodiments, the method illustrated in FIG. 45 may be used to ensure the Light Effects of Brightness CG009 are preferentially activated over those of Brightness CG008 when producing the trailing shadow Movement Illusion illustrated in FIG. 28. In one or more embodiments, a Light Effect may switch a light off, if it has a lower Level than all of the one or more Light Effects that may switch the light on then the light may be off whilst it is active. Light Effects that switch lights off may be used to embellish an existing Light Show, for example a blank space may be created within an existing Light Show and a new Light Animation displayed in it.

Figure 46:
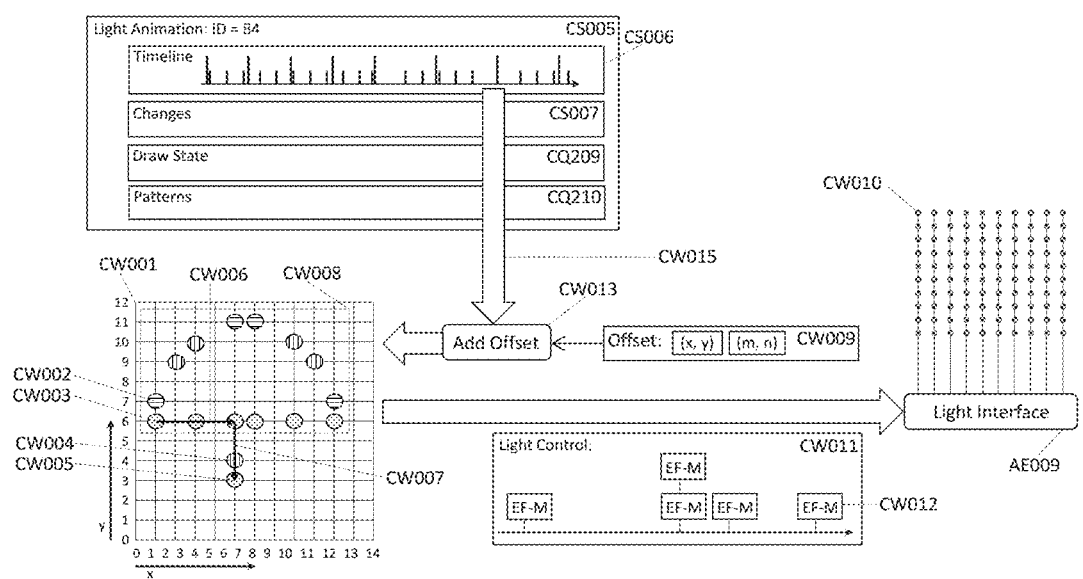
FIG. 46 illustrates the generation of a Light Control data structure, from a Light Animation, and its use as a control signal for a Tessellated Light Set.

FIG. 46 illustrates the conversion of Light Animation CS005 to Light Control CW011. Light Control CW011 is a data structure that may easily be used, by Light Interface AE009, to apply light effects to Tessellated Light Set CW010. Add Offset CW013 may position Light Animation CS005 on Tessellated Light Set CW010, using Offset CW009 to convert positions in the reference frame of the Tessellated Geometry, used by Light Animation CS005, into positions in the reference frame of Tessellated Light Set CW010. The conversion process may use Set Layers CW001 to decide which light effect to apply to a light, in Tessellated Light Set CW010, when more than one is available. The conversion process may generate activation and removal of the light effects described by Light Animation CS005 in time order, adding Effect Modifications for them to Light Control CW011 if they are visible on Tessellated Light Set CW010. Nothing may be added to Light Control CW011 for light effects that cannot be seen, for example a light effect hidden beneath another light effect or a light effect which does not have a corresponding light in Tessellated Light Set CW010 that it can be applied to. In one or more embodiments, Light Control CW011 may be generated in advance of its display on Tessellated Light Set CW010. In one or more embodiments, Light Control CW011 may be generated incrementally, with the Effect Modifications, for light effects, being added as they are needed for display on Tessellated Light Set CW010.

FIG. 46 uses Light Animation CS005 and the method illustrated in FIG. 45 to illustrate a method that may be used by the exemplar system, and which may be performed by a Light Show Play AE002, to create a Light Control data structure. The Physical Light Set, of a Light Show Client AA012, controlled by Light Interface AE009 includes Tessellated Light Set CW010. Set Layers CW001 is created for Tessellated Light Set CW010. The Animation Events, held in container Timeline CS006, are walked in time order and for each Animation Event the Changes referenced, held in container Changes CS007, are used to modify the associated Draw Effects, held in Draw State CQ209, and Set Layers CW001. The Draw Effects referenced may have both their position and Light Pattern modified and are also used to apply Light Effects to Set Layers CW001. For example, Animation Event CS009 is used to apply Change Effect-Position CS010 to Draw Effects CQ211 and CQ212, this: provides a position to CQ211 and CQ212; changes the reference of CQ211 from empty Light Pattern with ID 85 to the Light Pattern with ID 31 that is copy of Light Pattern CI002; changes the reference of Draw Effect CQ212 from the empty Light Pattern 85 to Light Pattern with ID 33 that is a copy of Light Pattern CI007; creates Effect Modification entries in the Light Layer data structures of Set Layers CW001 for the Light Effects that came from Light Patterns CI002 and CI007; causes the method illustrated in FIG. 45 to add Effect Modifications, for the Light Effects, to Light Control CW011. Please note that the Light Animation is adapted to Tessellated Light Set CW010 by moving the position of Effect Modifications, in Set Layers CW001 and Tessellated Light Set CW010, by Offset CW009. Similarly, Animation Event CS019 causes Change Position CS016 to move Draw Effects CQ211 and CQ212, and their associated Effect Modifications in Set Layers CW001, to new positions. Animation Event CS013: first causes Change Effect-Position CS014 to remove the positions of Draw Effects CQ211 and CQ212 and changes their references to the empty Light Pattern with ID 85, removing Effect Modifications from Set Layers CW001; then causes Change Effect-Position CS015 to set Draw Effects CQ211 and CQ212 to new positions and changes them back to non-empty Light Patterns, adding Effect Modifications to Set Layers CW001 at new positions. As before these changes lead to changes in Light Control CW011 via the method illustrated in FIG. 45. Animation Event CS021 causes Change Effect-Position CS018 to remove the positions of Draw Effects CQ211 and CQ212 and changes their references to the empty Light Pattern with ID 85, removing Effect Modifications from Set Layers CW00. When Animation Event CS011 attempts Change Effect CS012 both Draw Effects CQ211 and CQ212 have no position, consequently no action is taken. A position is available for all other Change Effects in C S007, consequently they may modify Draw Effect CQ212 and Set Layers CW001 during creation of Light Control CW011. The illustration of Light Control CW011, provided in FIG. 46, only includes a few exemplary Effect Modifications, it does not include all the Effect Modifications that CS005 may generate because there would be far too many of them to draw in a Figure. Please note that: Light Control CW011 does show one or more Effect Modifications at the same time in a Light Control, typically there will be many due to the multiple Light Effect changes associated with a Light Pattern change; Offset CW009 includes both (x, y) and (m, n) so that it can easily be applied to Bulb, Strip and Panel Effects.

In one or more embodiments, the method illustrated in FIG. 46 is implemented on Light Show Client AA012. In one or more embodiments, the method illustrated in FIG. 46 creates data structure Light Control CW011 before the Light Show and stores it on Light Show Client AA012 or in some other place. In one or more embodiments, the method illustrated in FIG. 46 creates the data structure Light Control CW011 during the Light Show, creating Effect Modifications shortly before they are needed. In one or more embodiments, the method illustrated in FIG. 46 is implemented somewhere other than Light Show Client AA012 and Light Control CW012 is copied or streamed to Light Show Client AA012, please note this design makes less efficient use of data Communication Channels because a Light Animation CT011 will typically be much smaller than its equivalent Light Control CW011.

Figure 47:
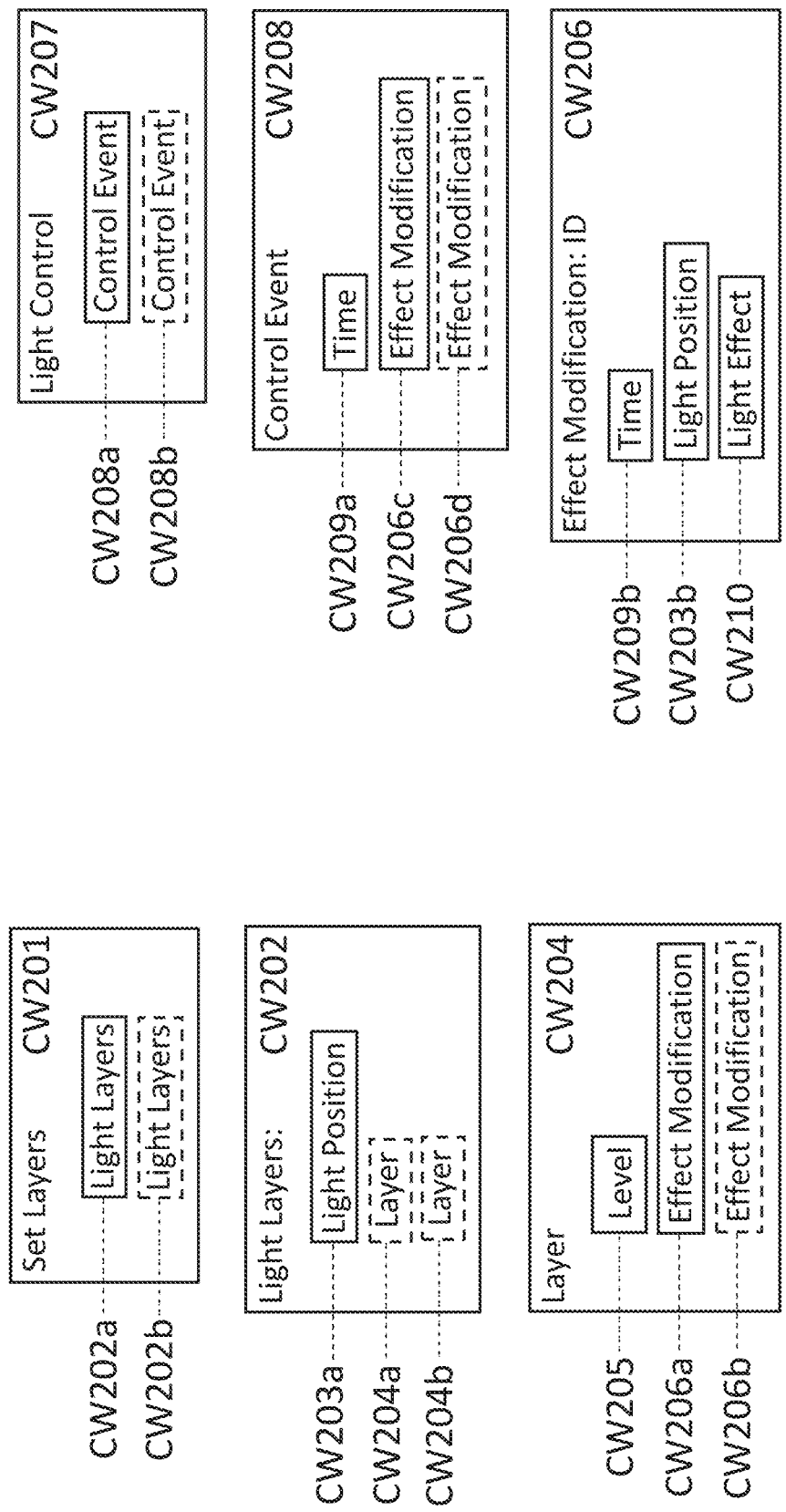
FIG. 47 includes depictions of the Set Layers, Light Layers, Layer, Light Control, Control Event and Effect Modification data structures of the exemplar architecture.

FIG. 47 depicts more general forms of the data structures illustrated in FIGS. 45-46. An Effect Modification CW206 includes: Time CW209b at which the modification should be made; Light Position CW203b which identifies the light to which the Effect should be applied; the Light Effect CW210 that may be applied to the light, this Light Effect may be an off command. A Control Event CW208 includes Time CW209a and one or more Effect Modifications CW206, for example CW206c and CW206d, each of which has a Time CW209b which is the same as CW209a. A Light Control CW207 includes one or more Control Events CW208, for example CW208a and CW208b. The Control Events CW208 in a Light Control CW207 can be accessed in time order with the earliest Control Event accessed first. A Layer CW204 includes: Level CW205 that has the same value as Level CT206 of the Draw Effect CT204 used in its creation; one or more Effect Modifications CW206, for example CW206a and CW206b. The Effect Modifications CW206 in a Layer CW204 can be accessed in the order they were added and removed using their ID. A Light Layers CW202 includes: optionally one or more Layers CW204, for example CW204a and CW204b; Light Position CW203a which has the same value as any Light Position CW203b in an Effect Modification CW206 held within one of the Layers CW204 that the Light Layers CW202 includes. The Layers CW204 in a Light Layers CW202 can be accessed either via their Level value or in Level order, with the lowest Level first. When the last Effect Modification CW206 is removed from a Layer CW204, the Layer CW204 is removed from the Light Layer CW202 that includes it. A Set Layers CW201 includes one or more Light Layers CW202, for example CW202a and CW202b. Each Light Layers CW202 is associated with a light, in the Tessellated Light Set it was created from, and can be accessed using the position of this light which is held in Light Position CW203a. A Light Layers CW202 in a Set Layers CW201 can also be accessed using the ID of any Effect Modification CW206 held in one of its Layers CW204. Please note Light Position CW203b may take various forms depending on the type of light, for example an (x, y) position for a Bulb Light or (m, n) parameters for a Panel Light.

Figure 48:
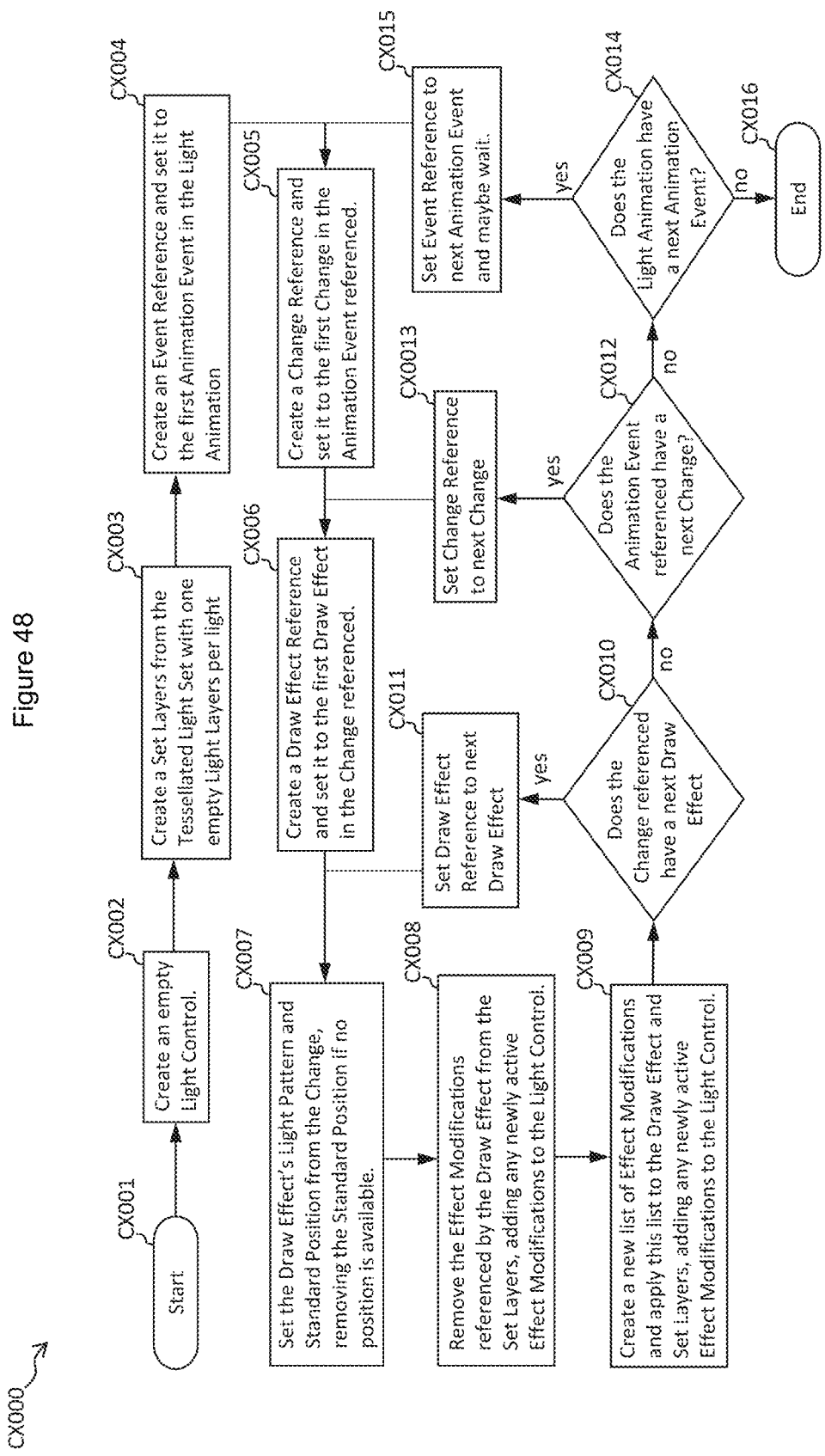
FIG. 48 is a flow chart of a method of Light Control generation.

FIG. 48 is a flow diagram illustrating a method CX000 that may be used by Light Show Client AA012 to create a Light Control CW207 from a Light Animation CT011. The method CX000 may be performed by Light Show Play AE002.

In operation CX002 an empty Light Control CW207, one that includes no Control Events CW208, is created. In operation CX003 a Set Layers CW201 is created and initialized with one or more empty Light Layers CW202, ones that include no Layers CW204, per light in the Tessellated Light Set to be controlled by the Light Control CW207 being created. Each Light Layers CW202 will be accessible in the Set Layers CW201 using its Light Position CW203a, the position of its light, on the two-dimensional plane of its Standard Tessellation, in the Tessellated Light Set. In operation CX004 an Event Reference is created and set such that it accesses the first, earliest, Animation Event CT201 in the container Timeline CT012, which includes one or more Animation Events CT201, of Light Animation CT011. The Event Reference is sufficient to both access an Animation Event CT201 and move to the next Animation Event CT201 in, increasing time ordered, container Timeline CT012. In operation CX005 a Change Reference is created and set such that it accesses the Change referred to by the first Change Reference ID CT203 in the Animation Event CT201 which is referenced by the Event Reference created in operation CX004. The Change referenced may be held in the container Changes CT013, of the Light Animation CT011, and may be one of Change Effect CT209, Change Position CT211 or Change Effect-Position CT212. In operation CX006 a Draw Effect Reference is created and set such that accesses the Draw Effect CT204 referred to by the first Draw Effect Reference ID CT210 in the Change which is referenced by the Change Reference created in operation CX005. The Draw Effect referenced may be held in the Draw State CT014 of Light Animation CT011. In operation CX007 the current Draw Effect referenced has its Light Pattern Reference ID CT205a and Standard Position CT208a set from any Light Pattern Reference ID 205 and Standard Position CT208 in the current Change referenced. If the current Change referenced has no Light Pattern Reference ID CT205 then Light Pattern CT205a, of the current Draw Effect referenced, is not modified. If the current Change referenced is a Change Effect CT209 then Standard Position CT208a, of the current Draw Effect referenced, should not be modified. If the current Change referenced is a Change Position CT211 or Change Effect-Position CT212 then Standard Position CT208a may either be copied from the current Change referenced or removed if the current Change referenced does not have a Standard Position CT208. In operation CX008 the list of Effect Modifications CT213 in the current Draw Effect referenced is used to update the Set Layers CW201 and Light Control CW207 created in operations CX002 and CX003. Operation CX008 removes Light Effects, causing lights to either change to other Light Effects or switch off and removes the Effect Modifications held by the current Draw Effect referenced, it is described in more detail in FIG. 49. In operation CX009 a new list of Effect Modifications is created, this is used to create Effect Modifications RIDs CT213 in the current Draw Effect and used to update the Set Layers CW201 and Light Control CW207 created in operations CX002 and CX003. Operation CX009 adds the Light Effects that arise from the new Light Pattern CT205, at the new Standard Position CT208, of the current Draw Effect referenced, it is described in more detail in FIG. 50. In operation CX010 the ability to advance the current Draw Effect reference, within the current Change referenced, is tested. In operation CX011 the current Draw Effect reference is advanced. In operation CX012 the ability to advance the current Change reference, within the current Animation Event referenced, is tested. In operation CX013 the current Change reference is advanced. In operation CX014 the ability to advance the current Animation Event reference, within the container Timeline CT012 of Light Animation CT011, is tested. In operation CX015 the current Animation Event reference is advanced and, in one or more embodiments, if Effect Modifications CW206 are being created as needed then the method may wait for Time CT202, of the Animation Event CT201 referenced, to become relevant.

Figure 49:
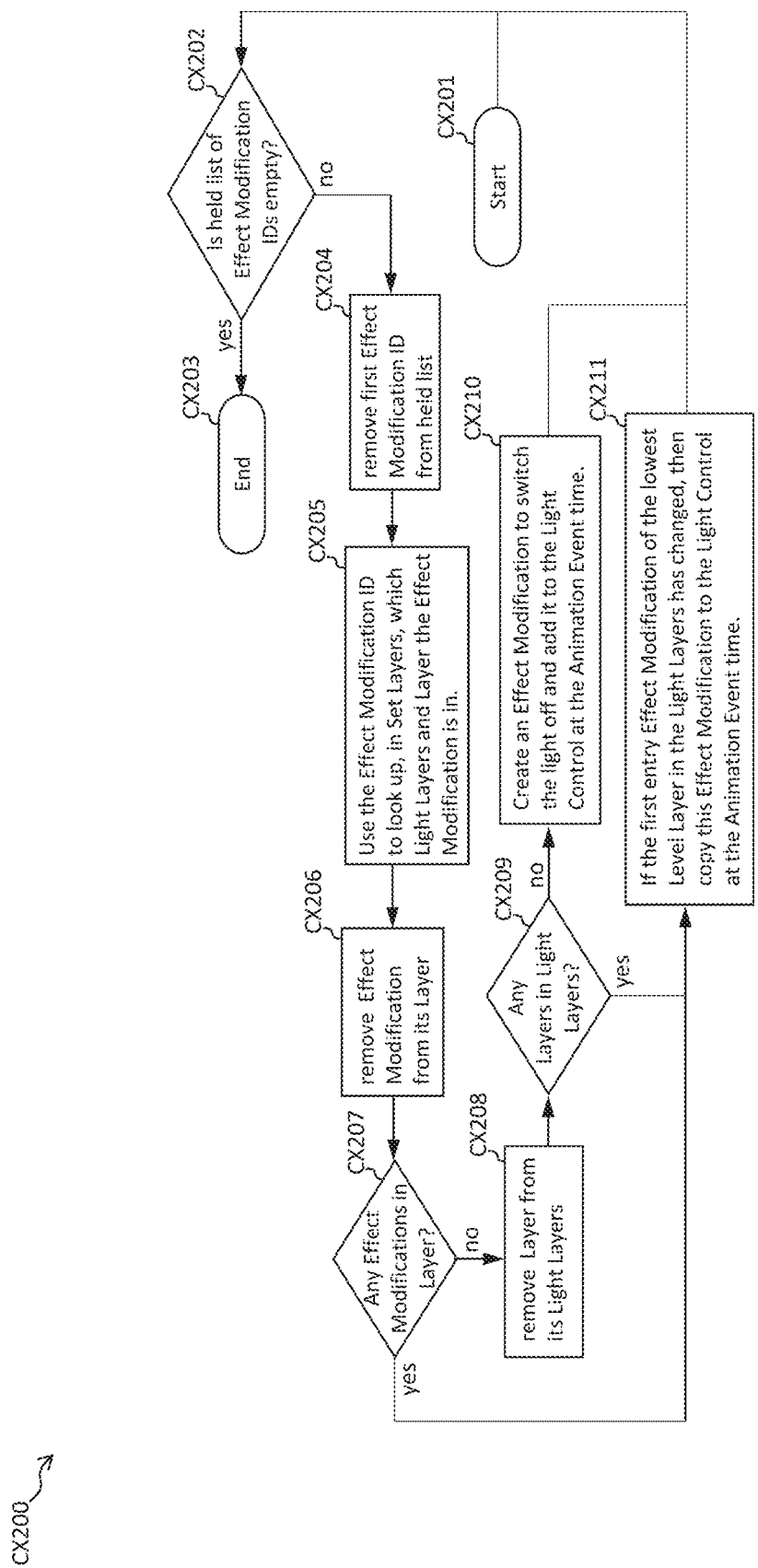
FIG. 49 is a flow chart of a method of Light Control generation.

FIG. 49 is a flow diagram illustrating a method CX200 that may be used by Light Show Client AA012 when creating a Light Control CW207 from a Light Animation CT011. The method CX200 may be used, by Light Show Play AE002, to perform operation CX008 of method CX000.

In operation CX202 the ability to remove an Effect Modification Reference ID CT213, from the Draw Effect CT204 currently referenced, is tested. In operation CX204 the first Effect Modification Reference ID CT213 is removed from the Draw Effect CT204 that is currently referenced. In operation CX205 the first Effect Modification Reference ID CT213, removed in operation CX204, is used to look up, in Set Layers CW201, the Light Layers CW202 and Layer CW204 that include an Effect Modification CW206 with the Reference ID CT213. In operation CX206 the first Effect Modification CW206, with first Effect Modification Reference ID CT213, is removed from its Layer CW204. In operation CX207 the number of Effect Modifications CW206 left in Layer CW204, from which first Effect Modification CW206 was removed, is counted and tested against 0. In operation CX208 the empty Layer CW204, which includes no Effect Modifications CW206, from which first Effect Modification CW206 was removed is itself removed. In operation CX209 the number of Layers CW204 left in Light Layers CW202, from which empty Layer CW204 was removed, is counted and tested against 0. In operation CX210 an Effect Modification CW206, which switches off the light, is created for the Light Position CW203a of the empty Light Layers CW202 from which empty Layer CW204 was removed. This Effect Modification CW206 should have its Time CW209b set to the time of the currently referenced Animation Event. In operation CX211 the first Effect Modification CW206 of the Layer CW204 with the lowest Level CW205, in Light Layers CW202 from which empty Layer CW204 was removed, is tested. If this Effect Modification CW206 is not the first Effect Modification CW206 in the lowest Level CW205, in the Light Layers CW202 at the time of operation CX205, then the current first Effect Modification CW206 is added to Light Control CW207.

Figure 50:
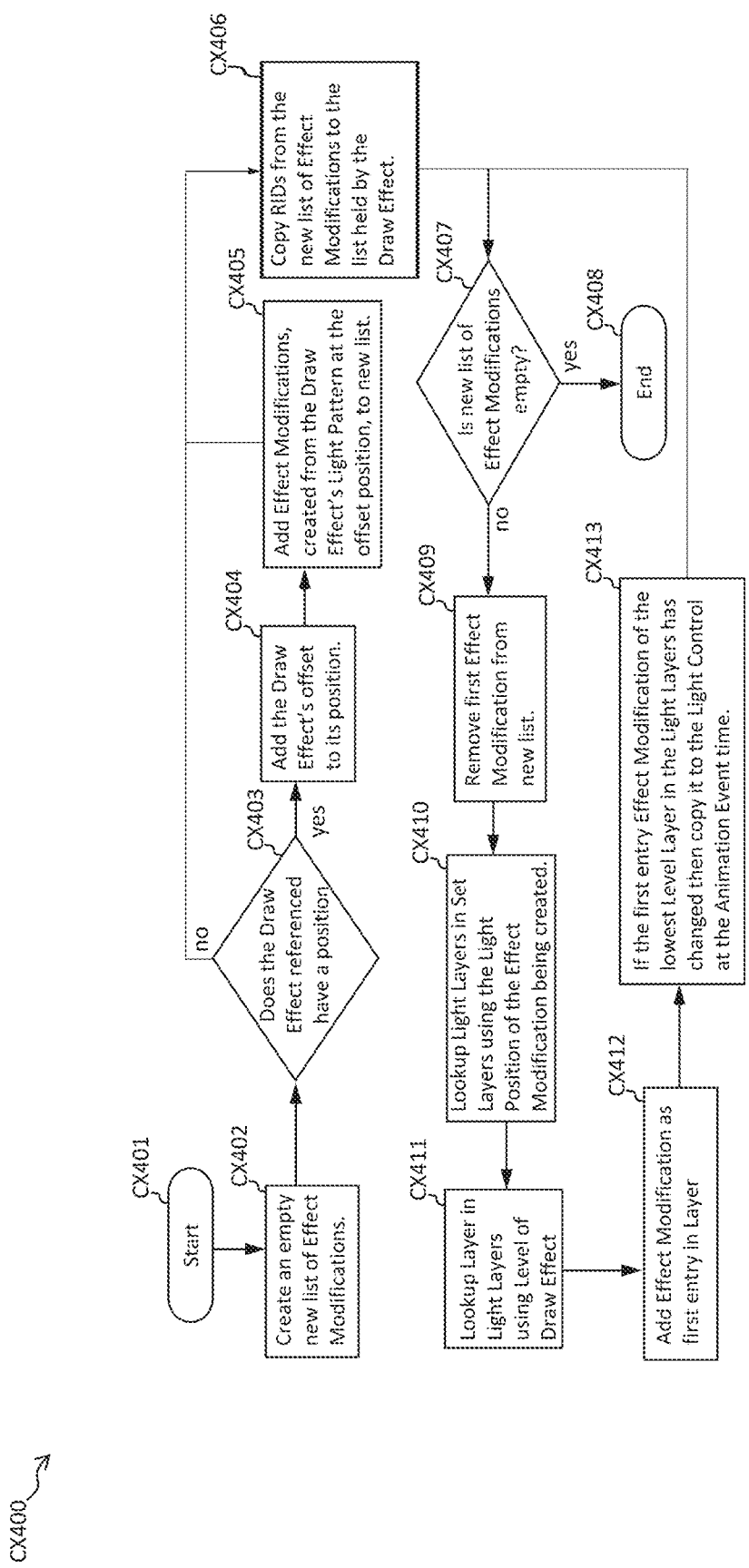
FIG. 50 is a flow chart of a method of Light Control generation.

FIG. 50 is a flow diagram illustrating a method CX400 that may be used by Light Show Client AA012 when creating a Light Control CW207 from a Light Animation CT011. The method CX400 may be used, by Light Show Executor AA014, to perform operation CX009 of method CX000.

In operation CX402 an empty new list of Effect Modifications CW206 is created. In operation CX403 the Draw Effect CT204 currently referenced is tested for the presence of Standard Position CT208a. In operation CX404, an Offset Position is created by adding the current Draw Effect's Standard Position CT208a to its Offset CT207. In operation CX405: Light Effects with Standard Tessellation positions are created from Offset Position and Light Pattern CT205a of the current Draw Effect; Effect Modifications CW206, for these Light Effects and their positions, are added to the new list of Effect Modifications with Time CW209b, taken from the Animation Event CT201 currently referenced. In operation CX406, IDs from the new list of Effect Modifications CW206 are added to the Effect Modification RIDs CT213 of the Draw Effect CT204 currently referenced. In operation CX407 the ability to remove an Effect Modification CW206, from the new list of Effect Modifications CW206, is tested. In operation CX409 the first Effect Modification CW206 is removed from the new list of Effect Modifications CW206. In operation CX410 the Light Position CW203b of first Effect Modification CW206, which uses the Standard Position axes set, is converted to the Set Layers CW201 axes set using Offset CW009 and then used to look up a Light Layers CW202. In operation CX411 a Layer CW204 for the new Effect Modification is obtained using the Light Layers CW202, from operation CX410, and a Level CT206 from the Draw Effect CT204 currently referenced. In operation CX412: a new light Effect Modification CW206 is created using the Time CW209b, and Light Effect CW210, of first Effect Modification CW206 and the Set Layers CW201 axes position, calculated in operation CX410, for the Light Position CW203b; the new light Effect Modification CW206 is added to the Layer CW204 data structure obtained in operation CX411. In operation CX413 the first entry Effect Modification CW206 of the Layer CW204 with the lowest Level CW205, in the Light Layers CW202 obtained in operation CX410, is tested. If this Effect Modification CW206 is not the first Effect Modification CW206 in the lowest Level CW205, in the Light Layers CW202 at the time of operation CX410, then the current first Effect Modification CW206 is added to Light Control CW207.

Figure 51:
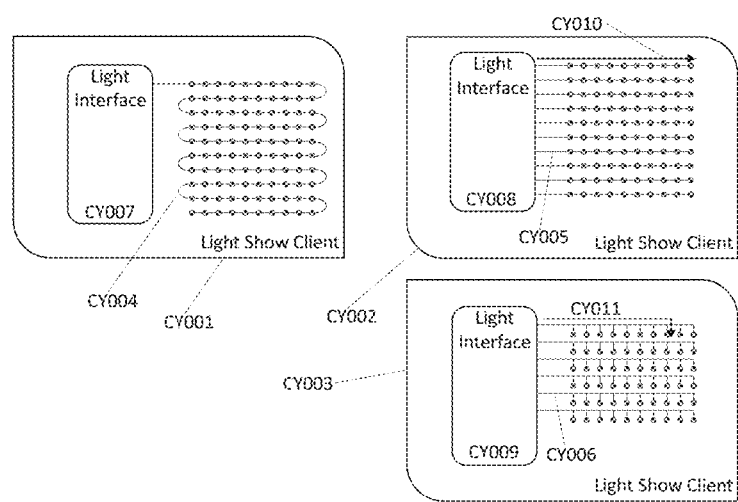
FIG. 51 illustrates several different ways of controlling a plurality of lights.

FIG. 51 illustrates three example light communication configurations that may be used in one or more embodiments of the exemplar system. Three different Physical Light Set communication architectures are depicted in Light Show Clients CY001-3, all of which show logical connections to a square Tessellated Light Set that is part of a, possibly larger, Physical Light Set. In one or more embodiments, the light communication architecture of Light Show Client CY001 may be used to connect Light Interface CY007 to the square Tessellated Light Set via a single serial digital Communication Channel CY004. In one or more embodiments, the light communication architecture of Light Show Client CY002 may be used to connect Light Interface CY008 to the square Tessellated Light Set via many serial digital Communication Channels, for example CY005, each link controlling one row of lights; for example, Signal CY010 may set every light in the top row. In one or more embodiments, the light communication architecture of Light Show Client CY003 may be used to connect Light Interface CY009 to the square Tessellated Light Set via many digital Communication Channels, for example CY006, where each link supports individually addressing each light, for example Signal CY011 may set the eighth light on the top row. The three different architectures have different update properties, for example to update a single light: the architecture of Light Show Client CY001 may need to update every single light in the Tessellated set; the architecture of Light Show Client CY002 may need to update a row of lights in the Tessellated Light Set; the architecture of Light Show Client CY003 may be able to selectively update only the target light. All of these different light communication architectures can be supported by the exemplar system, the Light Effect changes associated with a Control Event CW208, all of which happen at the same Time CW209a, being converted to an update of one or more lights that only changes the Light Effects of the lights with Effect Modifications CW206 in Control Event CW208. Consequently, it can be seen that the asynchronous design of the exemplar system may be implemented using many different physical light communication architectures.

Human persistence of vision allows a system to use a rapidly flashing light in place of a light that is constantly on. In one or more embodiments, one or more lights in a Physical Light Set are connected in such a way that they can be continuously showing a Light Effect or off. In one or more embodiments, one or more lights in a Physical Light Set are connected in such a way that they can be switched on and off rapidly enough that, when they are active, they appear to be continuously showing a Light Effect.

Figure 52:
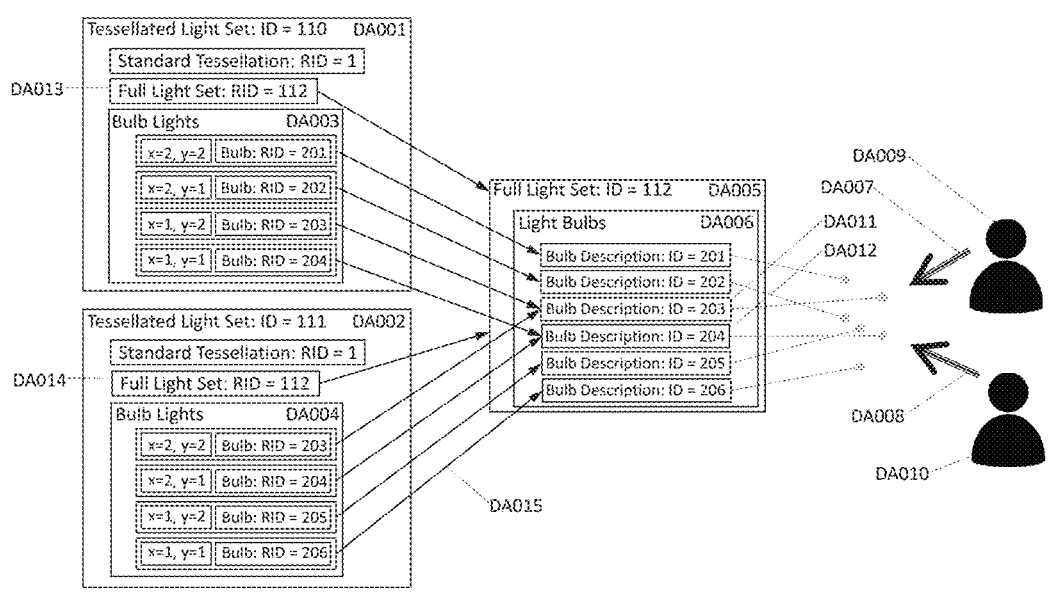
FIG. 52 illustrates a Full Light Set data structure that may be used, by the exemplar architecture, to describe one or more lights.

FIG. 52 depicts a Full Light Set DA005 that is referenced by planar Tessellated Light Sets DA001 and DA002, both of which reference the square Standard Tessellation BE401 with ID 1. Tessellated Light Set DA001 includes four Bulb Lights DA003 and is seen by Observer DA009 along Viewing Direction DA007. Tessellated Light Set DA002 includes four Bulb Lights DA004 and is seen by Observer DA010 along Viewing Direction DA008. The four lights in each of Bulb Lights DA003-4, in Tessellated Light Sets DA001-2, are mapped onto the six Light Bulbs DA006 of Full Light Set DA005 using: the Full Light Set RIDs DA0013-14, of Tessellated Light Sets DA001-2, that reference Full Light Set DA005; Full Light Set DA005 specific Bulb RIDs from each light in Bulb Lights DA003-4 to the Bulb Descriptions of Light Bulbs DA006, for example Reference DA015. Consequently, it can be seen, from FIG. 52, that the 8 Bulb Lights in DA003-4 are mapped onto the six Bulb Descriptions in Light Bulbs DA006 by the sharing of Bulb Descriptions DA011 and DA012. The Bulb Descriptions may include, possibly light set specific, information on how to set and access the bulb lights of one or more Light Show Clients AA012 that have Physical Light Sets with the geometry depicted.

Figure 53:
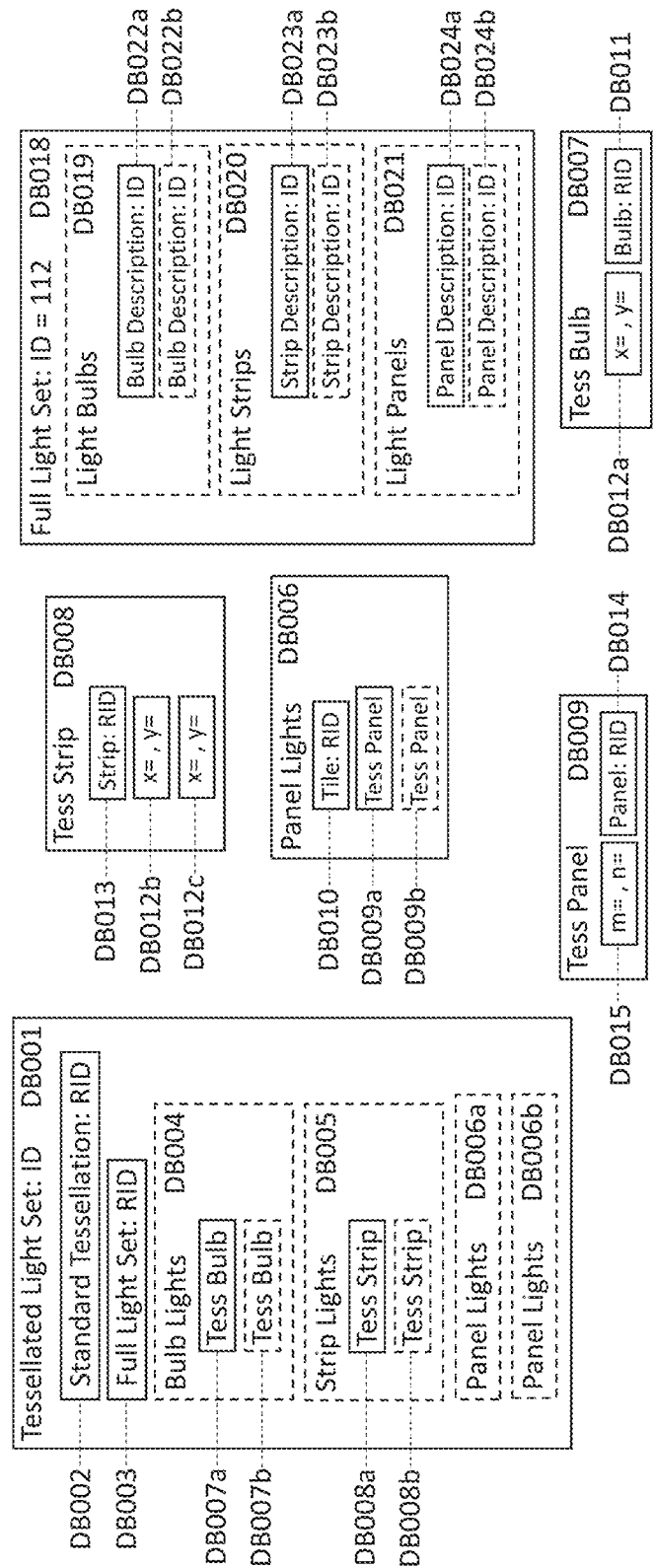
FIG. 53 includes depictions of the Full Light Set, Tessellated Light Set, Tess Bulb, Tess Strip, Panel Lights and Tess Panel data structures of the exemplar architecture.

FIG. 53 depicts more general data structures for the representation of Tessellated Light Sets DB001 and Full Light Sets DB018 that may be used in one or more embodiments. A Tessellated Light Set DB001 includes: Standard Tessellation RID DB002 which references the Standard Tessellation BE401 that defines the perspective projection light geometry of Tessellated Light Set DB001; Full Light Set RID DB003 which references the Full Light Set DB018 that has a perspective projection light geometry which can be described by Tessellated Light Set DB001; an optional Bulb Lights DB004 that includes one or more Tess Bulbs DB007, for example DB007a and DB007b; an optional Strip Lights DB005 that includes one or more Tess Strips DB008, for example DB008a and DB008b; an optional one or more Panel Lights DB006, for example DB006a and DB006b. Panel Light DB006 includes: Tile RID DB010 that references the Tile, in the Standard Tessellation BE401 referenced by Standard Tessellation RID DB002, used for its panel lights; one or more Tess Panels DB009, for example DB009a and DB009b, each including data for one panel light. Tess Bulb DB007 includes: the X/Y Position DB012a of a bulb light in the perspective projection of Tessellated Light Set DB001; a Bulb RID DB011 for the Bulb Description DB022 of the bulb light in the Full Light Set DB018. Tess Strip DB008 includes: the X/Y Positions DB012b-c for the ends of a strip light in the perspective projection of Tessellated Light Set DB001; a Strip RID DB013 for the Strip Description DB023 of the strip light in the Full Light Set DB018. Tess Panel DB009 includes: the M/N Position Parameters DB015, which locate the tile of the panel light in the perspective projection of Tessellated Light Set DB001; a Panel RID DB014 for the Panel Description DB024 of the panel light in the Full Light Set DB018. Full Light Set DB018 includes: an optional Light Bulbs DB019, which itself includes one or more Bulb Descriptions DB022, for example DB022a and DB022b, each of which may include, possibly light specific, information on how to set and access a bulb light in the Physical Light Set of one or more Light Show Clients AA012; an optional Light Strips DB020, which itself includes one or more Strip Descriptions DB023, for example DB023a and DB023b, each of which may include, possibly light specific, information on how to set and access a strip light in the Physical Light Set of one or more Light Show Clients AA012; an optional Light Panels DB021, which itself includes one or more Panel Descriptions DB024, for example DB024a and DB024b, each of which may include, possibly light specific, information on how to set and access a panel light in the Physical Light Set of one or more Light Show Clients AA012.

Figure 54:
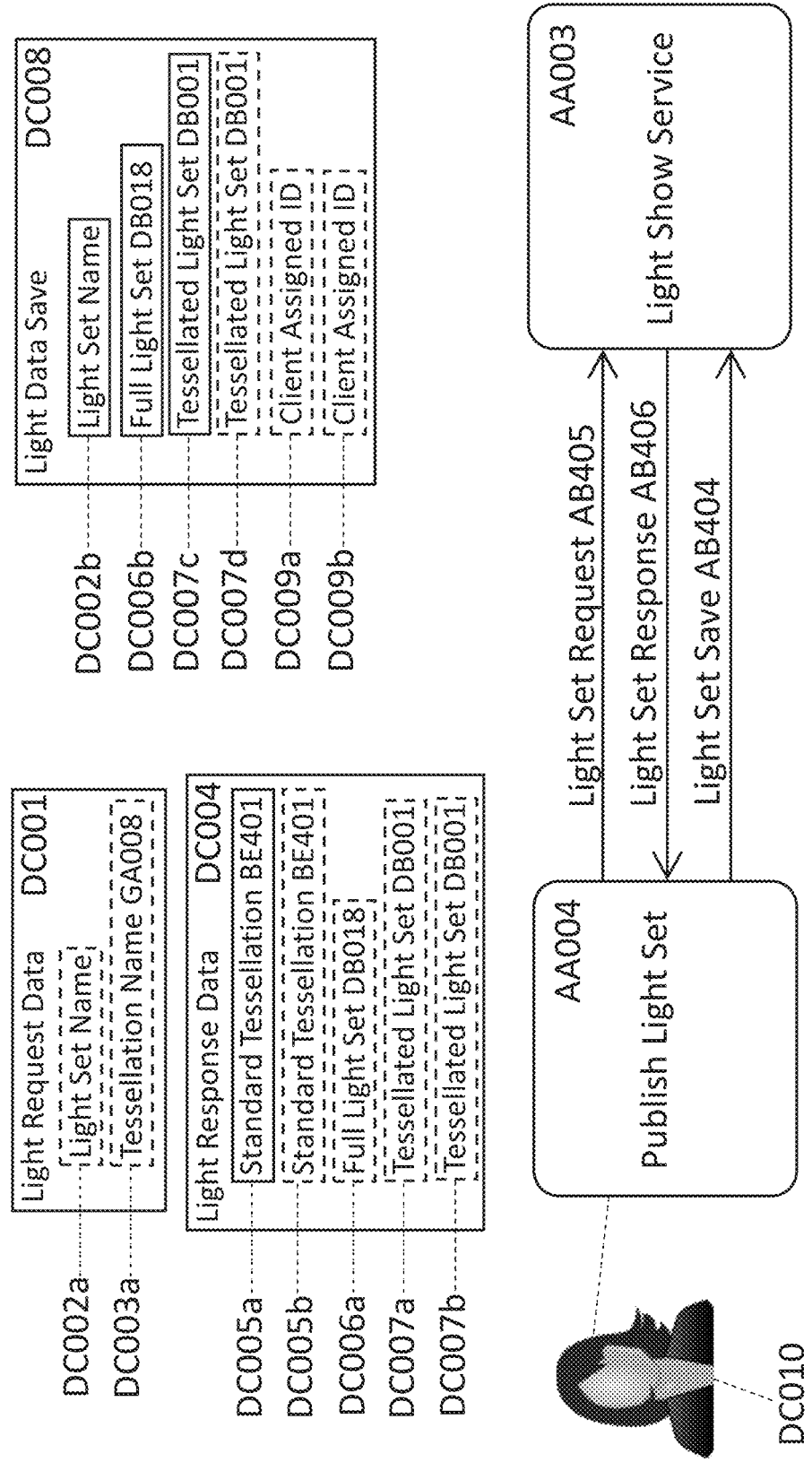
FIG. 54 includes a functional diagram for the Publish Light Set component of the exemplar architecture and depictions of the Light Request Data, Light Response Data and Light Data Save exemplar data structures.

FIG. 54 includes depictions of a messages exchange that may be used between Publish Light Set AA004 and Light Show Service AA003, and data structures that may be included in the messages. Publish Light Set AA004 provides, to User DC010 via a human computer interface, for the creation and editing of one or more Full Light Sets DB018 and the one or more Tessellated Light Sets DB001 that reference each of them. Each of the Tessellated Light Sets DB001 may reference a Standard Tessellation BE401 that defines their geometry. Consequently, in order to build a Full Light Set DB018 the messages between Light Show Service AA003 and Publish Light Set AA004 may support: Publish Light Set AA004 receiving Full Light Sets DB018, Tessellated Light Sets DB001 and Standard Tessellations BE401 from Light Show Service AA003; Light Show Service AA003 receiving Full Light Sets DB018 and Tessellated Light Sets DB001 from Publish Light Set AA004.

FIG. 54 includes depictions of data structures Light Request Data DC001, Light Response Data DC004 and Light Data Save DC008. Light Request Data DC001 includes either one of optional Light Set Name DC002a or optional Tessellation Name DC003a. If Light Set Name DC002a is present then a Full Light Set DB018, and its associated Tessellated Light Sets DB001, may be recovered from Light Set DB AB402, using a key that includes Light Set Name DC002a, and returned to the Light Request Data DC001 message source in a Light Response Data DC004. If Tessellation Name DC003a is present then a Standard Tessellation may be recovered from Light Set DB AB402, using a key that includes Tessellation Name DC003a, and returned to the Light Request Data DC001 message source in a Light Response Data DC004. These messages may be used to: save Full Light Sets DB018, and associated data, to Light Show Service AA003 and; recover Standard Tessellations and Full Light Sets DB018, with associated data, from Light Show Service AA003. Publish Light Set AA004 may be used by the representative of an entity that creates one or more Light Show Clients AA012 to describe the one or more Full Light Sets DB018 their Light Show Clients AA012 include.

Light Response Data DC004, of FIG. 54, includes one or more Standard Tessellations DC005, for example DC005a and DC005b, and an optional Full Light Set DC006a with its associated one or more Tessellated Light Sets DC007, for example DC007a and DC007b. When Light Set Request AB405 includes, in its Light Request Data DC001, a Tessellation Name DC003a then: a key that includes the Tessellation Name DC003a may be used to look up a Standard Tessellation BE401 in Light Set DB AB402; the Standard Tessellation BE401 should be included, as DC005a, in a Light Response Data DC004 and sent back to the message source in a Light Set Response AB406. When Light Set Request AB405 includes, in its Light Request Data DC001, a Light Set Name DC002a then: a key that includes the Light Set Name DC002a may be used to look up a Full Light Set DB018 in Light Set DB AB402; a full description of Full Light Set DB018 should be included, as DC006a, in a Light Response Data DC004 and sent back to the message source in a Light Set Response AB406. This full description should include: a Full Light Set DC006a recovered from Light Set DB AB402; one or more Tessellated Light Sets DC007, for example DC007a and DC007b, that reference the Full Light Set DC006a; one or more Standard Tessellations DC005, for example DC005a and DC005b, that are referenced by the Tessellated Light Sets DC007.

Light Data Save DC008, of FIG. 54, includes Light Set Name DC002b, Full Light Set DC006b, one or more Tessellated Light Sets DC007, for example DC007c and DC007d, and one or more Client Assigned IDs DC009, for example DC009a and DC009b. Light Set Name DC002b may be included in a key that is used to save Full Light Set DC006b to Light Set DB AB402. The Tessellated Light Sets DC007 may be saved to Light Set DB AB402 with keys that include their IDs. The Client Assigned IDs DC009 may be used to manage the IDs used for the Full Light Set DC006b and Tessellated Light Sets DC007. Any Client Assigned IDs DC009 identify IDs, in Full Light Set DC006b or Tessellated Light Sets DC007, that were not assigned by Light Show Service AA003. These IDs may be reassigned to new values that are unique within Internet Server AA001. The client may ensure its locally generated IDs, for a Light Data Save DC008 message, are not the same as IDs or RIDs assigned by Light Show Service AA003 to the same message.

In one or more embodiments, Publish Light Set AA004 and Light Show Service AA003 support the creation of Full Light Sets DB018 that share Tessellated Light Sets DB001. The sharing of Tessellated Light Sets DB001 by Full Light Sets DB018 enables a Show Content DD006 to be applied to multiple Full Light Sets DB018. In one or more embodiments, Light Show Service AA003 has a Web Server interface for Communication Channel AA013 and Publish Light Set AA004 is one or more Web Pages, with associated scripts, presented via a Web Browser.

Figure 55:
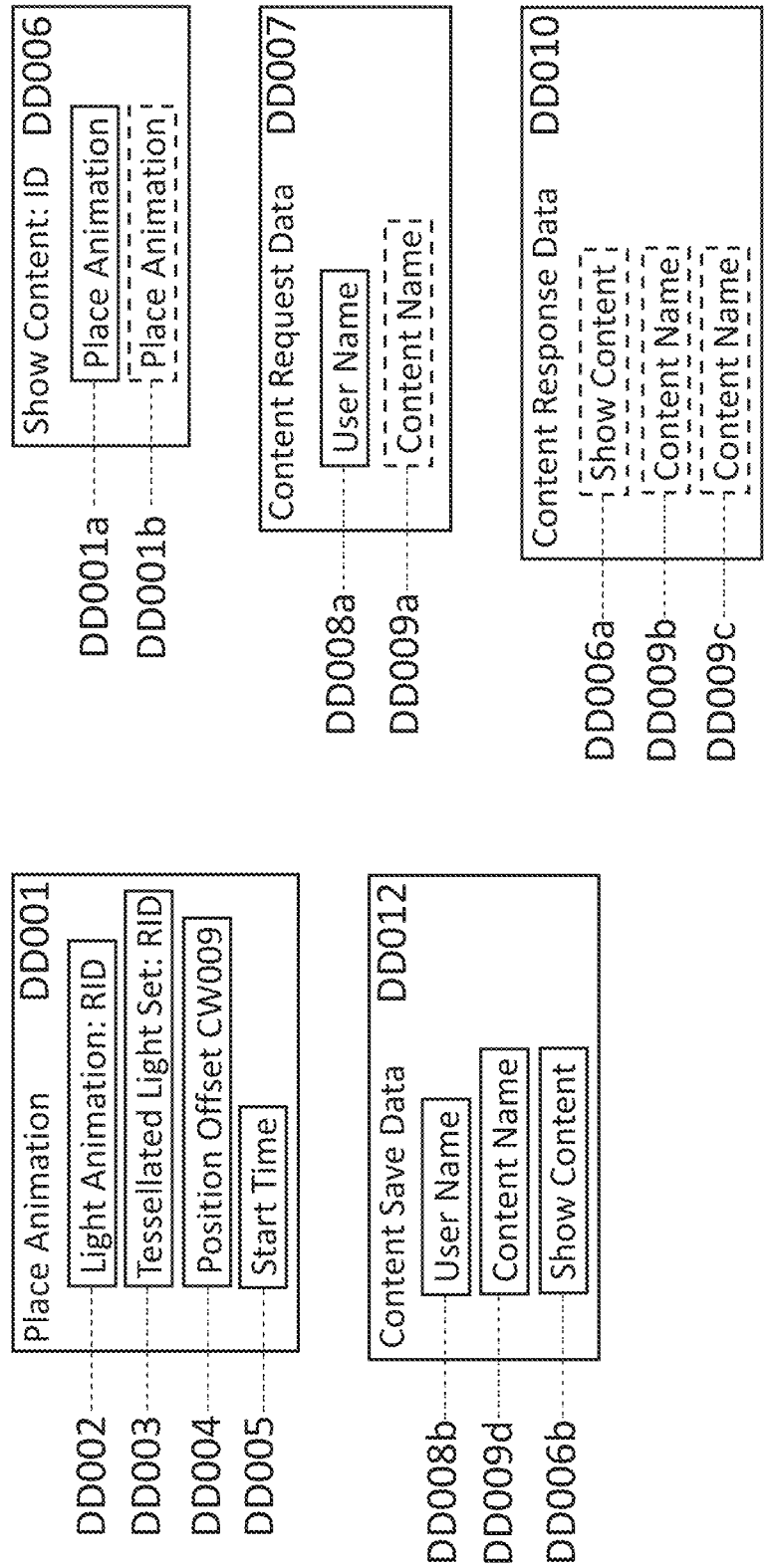
FIG. 55 includes depictions of the exemplar architecture data structures Place Animation, Show Content, Content Request Data, Content Response Data and Content Save Data.

FIG. 55 depicts more general forms of the data structures that may be used to define and communicate the part of a Light Show that is displayed on one Full Light Set DB018. Place Animation DD001 includes data that describes a way that a Light Animation CT011 may be displayed on a Full Light Set DB018. Show Content DD006 includes one or more Place Animations DD001, for example DD01a and DD01b, it may be used to describe a Light Show that can be displayed on a Full Light Set DB018. Content Request Data DD007 may be included, as application data, in a Show Content Request AB407 message. Content Response Data DD010 may be included, as application data, in a Show Content Response AB408. Content Save Data DD012 may be included, as application data, in a Show Content Save AB409. Content Request Data DD007 includes User Name DD008a and optionally includes Content Name DD009a. Content Response Data DD010 includes either Show Content DD006a or one or more Content Names DD009, for example DD009b and DD009c.

In order to provide the functionality shown in FIG. 5 using the data structures depicted in FIG. 55, Light Show Service AA003: includes a Show Content DD006a in the Content Response Data DD010 for any Content Request Data DD007 that includes a Content Name DD009a; includes one or more Content Names DD009, for example DD009b and DD009c, in the Content Response Data DD010 for any Content Request Data DD007 that does not include a Content Name DD009a; obtains any Show Content DD006a, which may be included in a Content Response DD010, from Show Content DB AB403 using a key that includes User Name DD008a and Content Name DD009a, from Content Request Data DD007; sets any Content Names DD009 to be included in a Content Response Data DD010 to the names, included in database keys, of all Show Content DD006 records, stored in Show Content DB AB403, for Second User AA015; saves the Show Content DD006b, included in a Content Save Data DD012, to Show Content DB AB403 using a key that includes User Name DD008b and Content Name DD009d. Place Animation DD001 includes Light Animation RID DD002, Tessellated Light Set RID DD003, Position Offset DD004 and Start Time DD005. Position Offset DD004 converts from the co-ordinates of a Standard Tessellation BE401 to those of a Tessellated Light Set DB001. Start Time DD005 defines the time difference between the start of the display of a Show Content DD006 and the start of the display of the Light Animation with Light Animation RID DD002. The Start Times DD005 in the Place Animations DD001 of a Show Content DD006 are relative to the start of the Show Content and, in one or more embodiments, after its start, they may cause multiple Light Animations CT011 to be displayed at the same time. A Show Content DD006 ends when all the Light Animations CT011 referenced by the Light Animation RIDs DD002, in its Place Animations DD001, have finished displaying.

Figure 56:
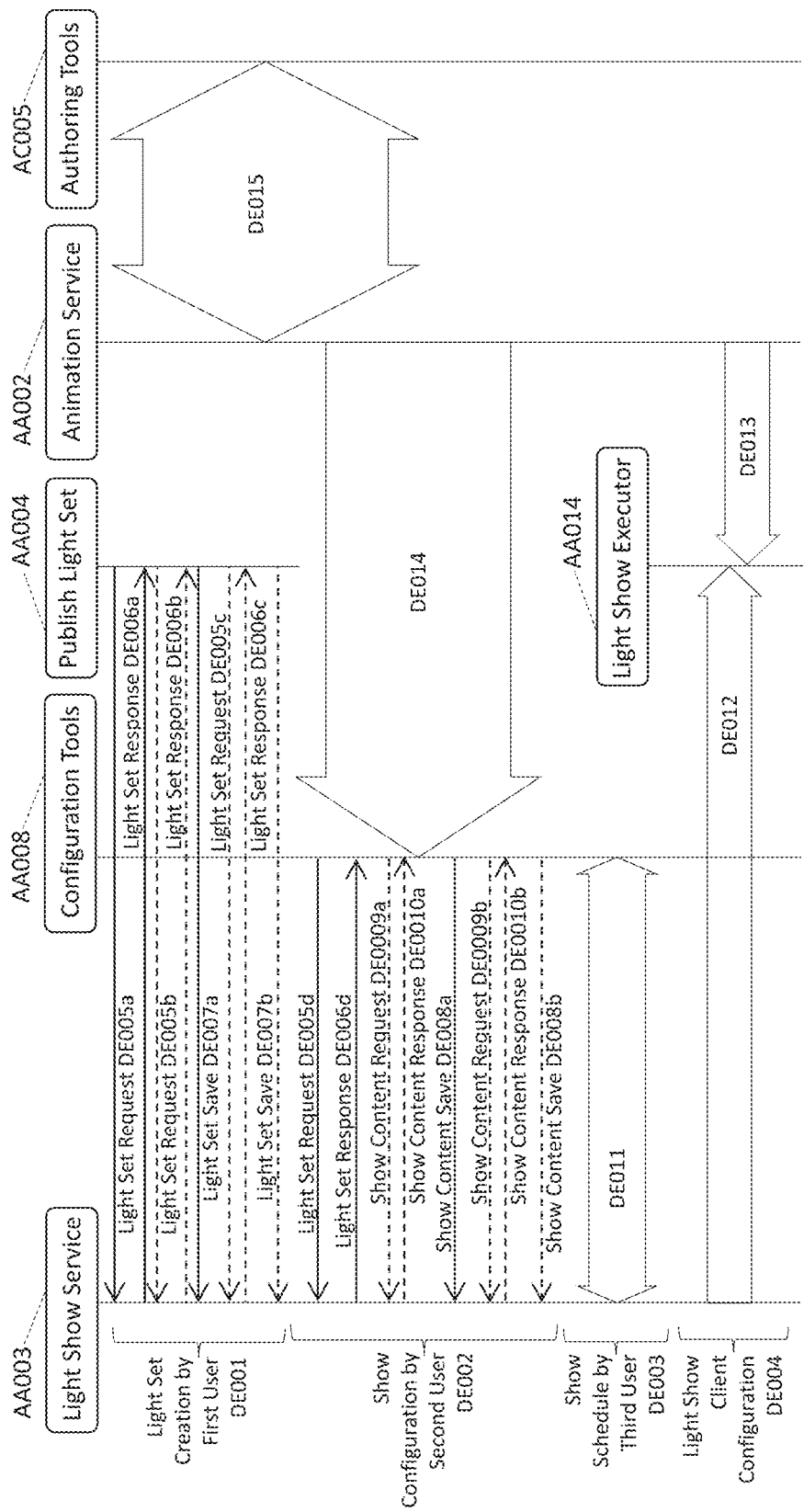
FIG. 56 shows a message flow diagram for the creation of an example Full Light Set and Show Content.

FIG. 56 is a message flow diagram illustrating the creation, and use by Light Show Client AA012, of an example Full Light Set DB018 and an example Show Content DD006 that uses it. The exemplar architecture supports: the creation of one or more Full Light Sets DB018; the creation of one or more Tessellated Light Sets DB001 for each Full Light Set DB018; the creation of one or more Show Contents DD006, each of which may use one or more Tessellated Light Sets DB001; multiple different versions of each Full Light Set DB018 over time, Tessellated Light Set DB001 and Show Content DD006. In FIG. 56, Light Set Creation by First User DE001 is shown before Show Configuration by Second User DE002, this order is necessary, in one or more embodiments, in order for Tessellated Light Set RID DD003 to be assigned the ID of a Tessellated Light Set DB001. In one or more embodiments an extended Place Animation DD001 allows the use of a Light Set Name DC002, of a Tessellated Light Set DB001, in place of Tessellated Light Set RID DD003, removing this creation order restriction. Please note that FIG. 56 is only a partial message exchange for the exemplar system that summarizes much of the communication used for the creation and display of Light Shows in summary Message Exchanges, for example the download of Full Light Sets DB018 by Light Show Client AA012 is summarized in Message Exchange DE012.

Light Set Creation by First User DE001, of FIG. 56, includes: one or more Light Set Request DE005/Light Set Response DE006 message exchanges, for example DE005$a$/DE006$a$ and DE005$b$/DE006$b$, which may be used by Publish Light Set AA005 to recover one or more Standard Tessellations BE401 from Light Show Service AA003; Light Set Save DE007$a$, which may save a first version of a Full Light Set DB018, with one or more Tessellated Light Sets DB001 that reference the one or more Standard Tessellations BE401 previously recovered; one or more optional Light Set Request DE005/Light Set Response DE006 message exchanges, for example DE005$c$/DE006$c$, which may be used to download either Standard Tessellations BE401 or Full Light Sets DB018 with Tessellated Light Sets DB001; one or more optional Light Set Saves DE007, for example DE007$b$, which may be used to save updates of the Full Light Set DB018. A human computer interface for Publish Light Set AA004 is used by First User DE001, activities done with it include: providing one or more Tessellation Names GA008 and downloading Standard Tessellations for the names; creation and editing of the Full Light Set DB018 with its associated name and one or more Tessellated Light Sets DB001; saving and recovering Full Light Set DB018 and its associated one or more Tessellated Light Sets DB001. Please note that the Message Exchange DE015, that may be used to create one or more Light Animations CT001, is a potentially parallel activity that is not dependent on Light Set Creation by First User DE001.

Show Configuration by Second User DE002, of FIG. 56, includes: Light Set Request DE005$d$/Light Set Response DE006$d$, which may be used, by Configuration Tools AA008, to obtain a Full Light Set DB018 and its Tessellated Light Set DB001/Standard Tessellation BE401 data; Message Exchange DE014, which may be used, by Configuration Tools AA008, to obtain one or more Light Animations CT011; optional Show Content Request DE009$a$/Show Content Response DE010$a$, which may be used to obtain one or more Content Names DD009; creation of a Show Content DD006 by Second User DE002 using Configuration Tools AA008; Show Content Save DE008$a$, which may be used to save an initial version of a Show Content DD006; optionally one or more Show Content Saves DE008$b$, which may be used to send different versions of the Show Content DD006 to Light Show Service AA003; optionally one or more Show Content Requests DE009/Show Content Responses DE010, for example DE009$b$/DE010$b$, which may be used to update the version of Show Content DD006 held by Configuration Tools AA008. Please note that Message Exchange DE015 may have been used to create one or more of the Light Animations CT011 downloaded by Message Exchange DE014 and that Message Exchanges DE015 and DE014 may overlap, provided the correct version of Light Animation CT011 is available to Animation Service AA002 before its download as part of Message Exchange DE014. More detailed descriptions of summary Message Exchanges DE014 and DE015 may be found in FIG. 66.

Show Schedule by Third User DE003, of FIG. 56, includes summary Message Exchange DE011. A more detailed illustration of a Message Exchange DE011 is provided in FIG. 60, see Show Schedule by Third User EC003. Light Show Client Configuration DE004 includes summary Message Exchanges DE012 and DE013. A more detailed illustration of a Message Exchange DE012 is provided in FIG. 60, see Light Show Client Configuration EC004. A more detailed illustration of Message Exchange DE013 is provided in FIG. 66, see Light Show Client Configuration GD006.

Figure 57:
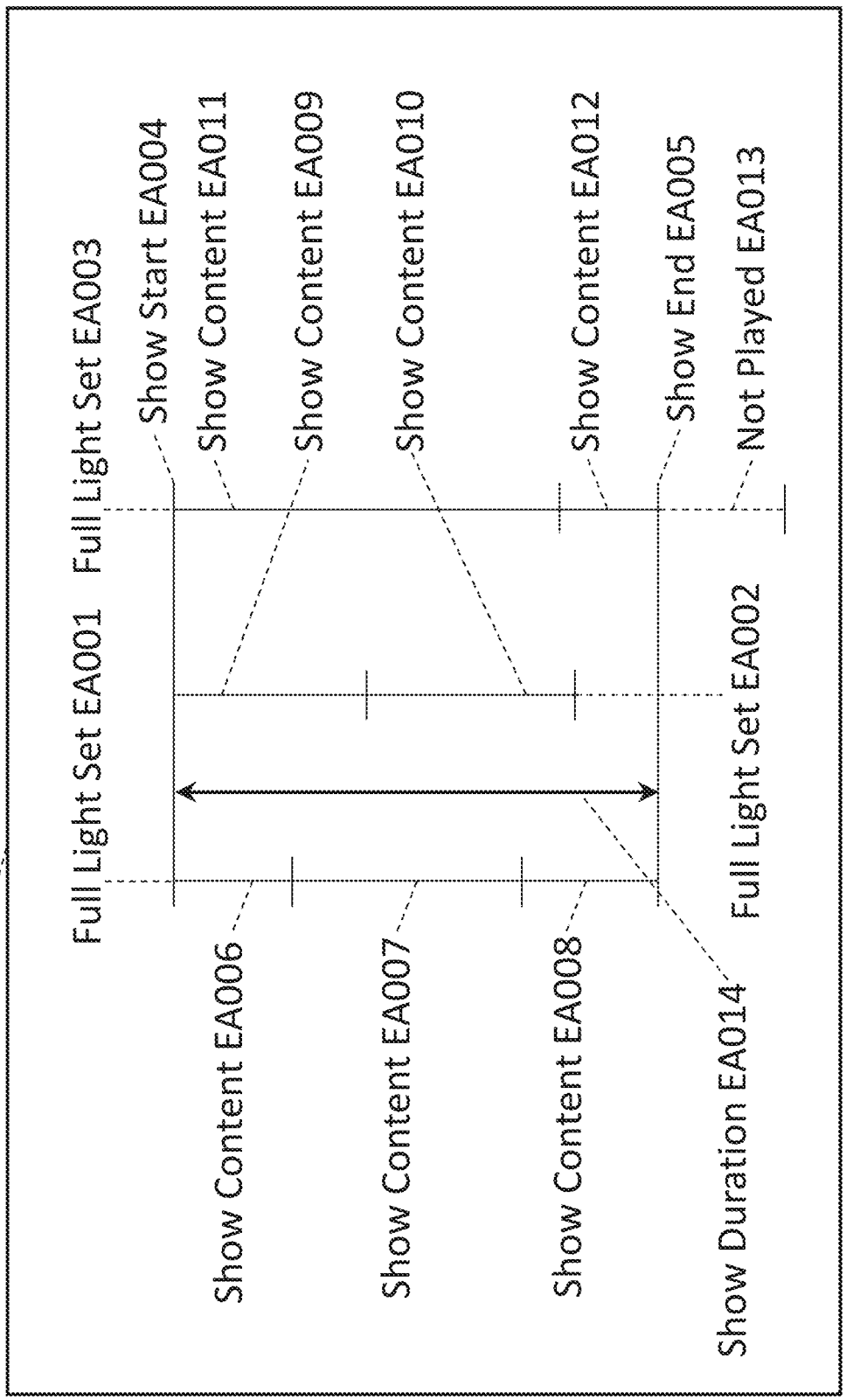
FIG. 57 illustrates Scheduling of the Show Content within a Light Show.

FIG. 57 illustrates the scheduling of one or more Show Contents DD006 on one or more Full Light Sets DB018 that may be used to create an Animated Show EB003. Animated Show EA015 depicts the scheduling of a single Animated Show EB003 which starts at Show Start EA004, ends at Show End EA005 and has Show Duration EA014. Animated Show EA015 is displayed on the three Full Light Sets EA001-3 with: Show Contents EA006-8 displayed in order on Full Light Set EA001, with the sum of the duration of the three shows being the same as Show Duration EA014; Show Contents EA009-10 displayed in order on Full Light Set EA002, with the sum of the duration of the two shows being shorter than Show Duration EA014 and Full Light Set EA002 unlit after Show Contents EA009-10 are finished; Show Contents EA011-12 displayed in order on Full Light Set EA003, with the sum of the duration of the two shows being longer than Show Duration EA014 and show segment Not Played EA013 omitted from Animated Show EA015. Consequently, it can be seen, from FIG. 57, that the Light Show scheduling behavior depicted for the three Full Light Sets DB018 and seven Show Contents DD006 of Animated Show EA015 may easily be applied to the scheduling of Animated Shows EB003 with different numbers of Show Contents DD006 and Full Light Sets DB018. In one or more embodiments, more general scheduling behaviors may be provided, for example inactive intervals between the Show Contents DD006 displayed on a Full Light Set DB018. In one or more embodiments, Animated Show EA015 may be included in a larger Light Show that has lights, in its Physical Light Set, that are not included in Full Light Sets EA001-3.

Figure 58:
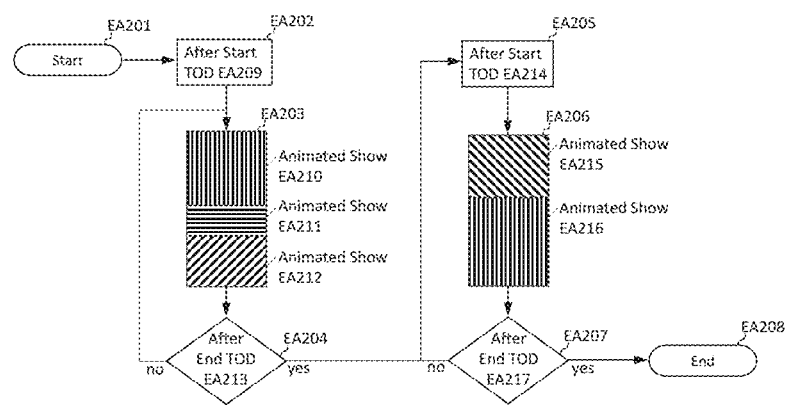
FIG. 58 illustrates time of day based scheduling of Light Shows by a Light Show Client.

FIG. 58 uses an informal data flow diagram to illustrate the operation of a Light Show scheduler which may be used by Light Show Scheduler AE013. In operation EA202 the scheduler will wait for the current Time Of Day, or TOD, to be after Start TOD EA209. In operation EA203 the Animated Shows EA210-12 are displayed in the order drawn on the diagram and immediately after one another. In operation EA204 the current TOD is checked to see if it is after End TOD EA213. In operation EA205 the scheduler will wait for the current TOD to be after Start TOD EA214. In operation EA206 the Animated Shows EA215-16 are displayed in the order drawn on the diagram and immediately after one another. In operation EA207 the current TOD is checked to see if it is after End TOD EA217. This scheduler may provide: a loop display of Animated Shows EA210-212 starting immediately after Start TOD EA209 and ending at the end of the first iteration that ends after End TOD EA213; a possible wait, if the TOD after the EA203 loop is before Start TOD EA214, until immediately after Start TOD EA214 followed by a loop display of Animated Shows EA215-16 that stops at the end of the first iteration that ends after End TOD EA217. Consequently, it can be seen that the scheduling behavior depicted in FIG. 58: may easily be applied to different numbers of Animated Shows for one or more loop displays; supports starting and stopping Light Show display at different TODs; supports different Light Show displays at different TODs. In one or more embodiments, different Daily Schedules may be run on different days or dates, for example a different Daily Schedule may be run each day of the week or in the days leading up to Christmas day or any other holiday.

Figure 59:
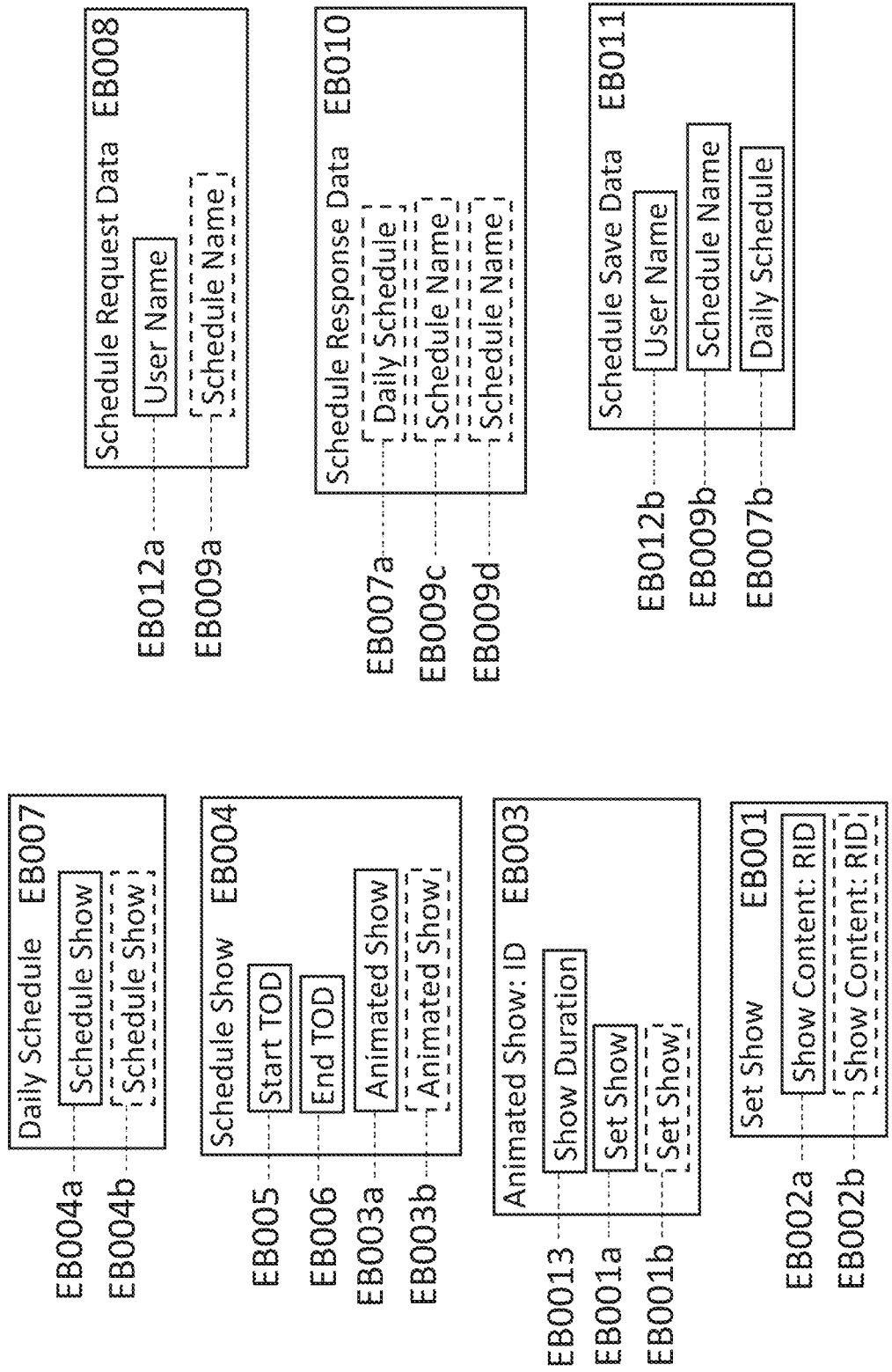
FIG. 59 includes depictions of the exemplar architecture data structures Daily Schedule, Set Show, Animated Show, Schedule Show, Schedule Request Data, Schedule Response Data and Schedule Save Data.

FIG. 59 depicts more general forms of data structures that may be used to define and communicate a Daily Schedule EB007. Set Show EB001 includes one or more Show Content RIDs EB002, for example EB002a and EB002b, for Show Contents DD006 that may all be displayed on the same Full Light Set DB018. Animated Show EB003 includes Show Duration EB013 and one or more Set Shows EB001, for example EB001a and EB001b, for the one or more Full Light Sets DB018 it may be displayed on. Schedule Show EB004 includes Start TOD EB005, End TOD EB006 and one or more Animated Shows EB003, for example EB003a and EB003b. Daily Schedule EB007 includes one or more Schedule Shows EB004, for example EB004a and EB004b. Schedule Request Data EB008 may be included, as application data, in a Schedule Request AB410 message. Schedule Response Data EB010 may be included, as application data, in a Schedule Response AB411. Schedule Save Data EB011 may be included, as application data, in a Schedule Save AB412. Schedule Request Data EB008 includes User Name EB012a and optionally includes Schedule Name EB009a. Schedule Response Data EB010 includes either Daily Schedule EB007a or one or more Schedule Names EB009, for example EB009c and EB009d. Schedule Save Data EB011 includes User Name EB012b, Schedule Name EB009b and Daily Schedule EB007b. Please note, the ID of Animated Show EB003 may be used by Signal AE014 to tell Light Show Play AE002 which Animated Show EB003 in the active Daily Schedule EB007 to display.

In order to provide the functionality shown in FIG. 5 using the data structures depicted in FIG. 59, Light Show Service AA003: includes a Daily Schedule EB007a in the Schedule Response AB411 for any Schedule Request AB410 that includes a Schedule Name EB009a; includes one or more Schedule Names EB009, for example EB009c and EB009d, in the Schedule Response AB411 for any Schedule Request AB410 that does not include a Schedule Name EB009a; obtains any Daily Schedule EB007a, for inclusion in a Schedule Response AB411, from Show Schedule DB AB401 using a key that includes User Name EB012a and Schedule Name EB009a, from Schedule Request AB410; sets any Schedule Names EB009 to be included in a Schedule Response AB411 to the names, included in database keys, of all Daily Schedule EB007 records, stored in Show Schedule DB AB401, for User AA015; saves the Daily Schedule EB007b, included in a Schedule Save AB412, to Show Schedule DB AB401 using a key that includes User Name EB012b and Schedule Name EB009b.

Figure 60:
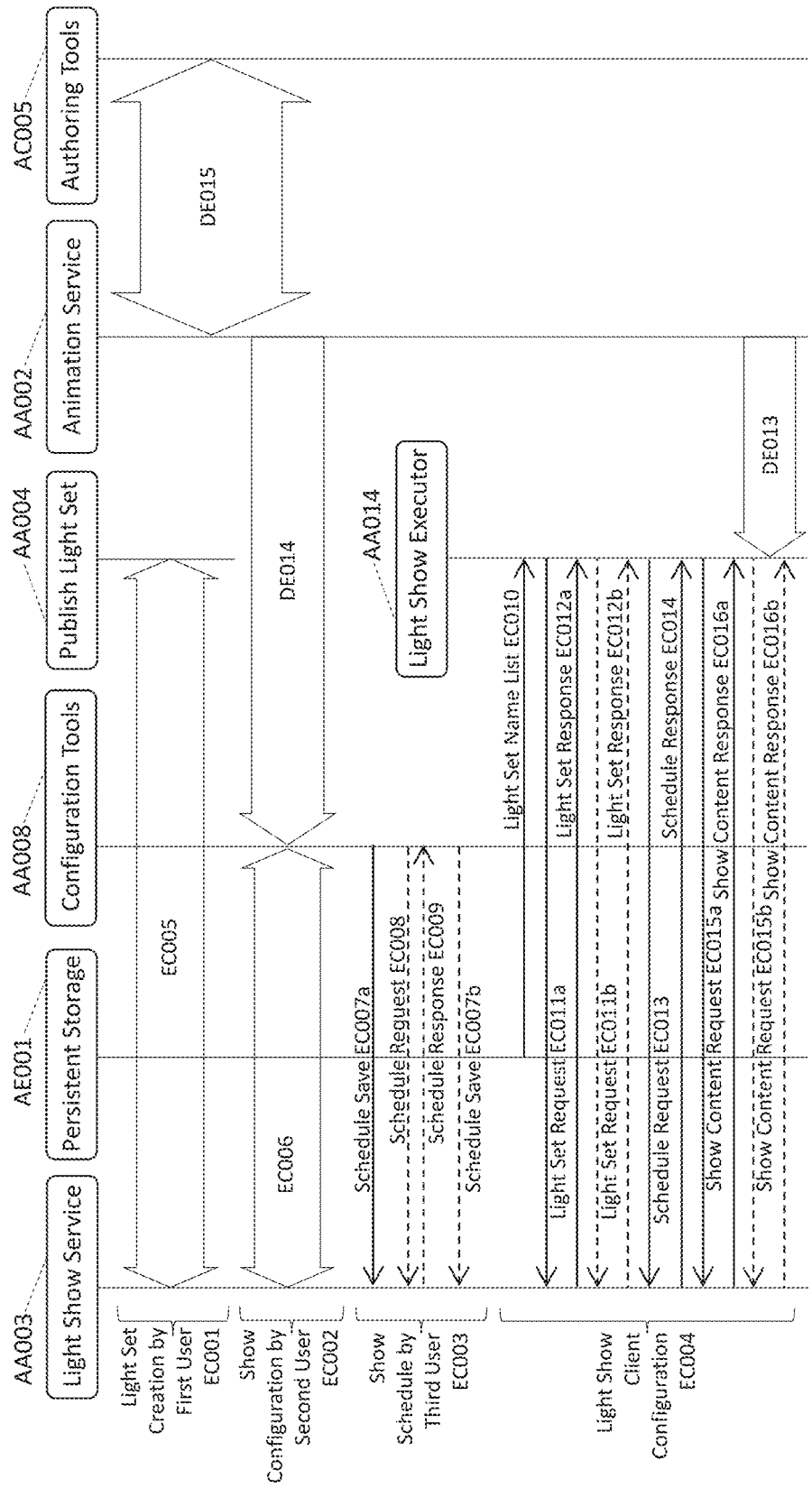
FIG. 60 shows a message flow diagram for the creation and use of an example Daily Schedule which includes one or more Animated Shows.

FIG. 60 is a message flow diagram illustrating the creation of an example Daily Schedule EB007 and its use, along with other data structures that may be needed, for the display of one or more Animated Shows EB003, by Light Show Client AA012. The exemplar architecture supports: the creation of one or more Daily Schedules EB007 by one or more Users AA015; the use of one or more Light Show Clients AA012 by one or more Users AA015; multiple different versions of each Daily Schedule EB007 over time; the activation of a Daily Schedule EB007 for a Light Show Client AA012. Please note that FIG. 60 is only a partial message exchange for the system that summarizes much of the communication used for the creation and display of Light Shows in Message Exchanges, for example Message Exchange EC005.

Light Set Creation by First User EC001, of FIG. 60, includes Messages Exchange EC005, a more detailed illustration of this of this can be found in FIG. 56, see Light Set Creation by First User DE001. Show Configuration by Second User EC002 includes Message Exchanges EC006 and DE014. A more detailed illustration of Message Exchange EC006 can be found in FIG. 56, see Show Configuration by Second User DE002. A more detailed illustration of Message Exchange DE014 can be found in FIG. 66, see Show Configuration by Fourth User GD004. Message Exchange DE015 also occurs before the Show Schedule by Third User EC003, a more detailed description of it can be found in FIG. 66, see Designer/Director Tool Updates by Users GD001-3.

Show Schedule by Third User EC003, of FIG. 60, includes: use of Light Show Scheduling AD003, by Third User EC003, to create one or more versions of a Daily Schedule EB007 over time; saving of Daily Schedule EB007 versions in one or more Schedule Save EC007 messages, for example EC007a and EC007b, to Light Show Service AA003 by Light Show Scheduling AD003; downloading of one or more Daily Schedule EB007 versions from Light Show Service AA003, with one or more Schedule Request EC008/Schedule Response EC009 exchanges, as necessary, for example after Light Show Scheduling AD003 is restarted. After the initial Schedule Save EC007a message, subsequent optional Schedule Save EC007b messages and optional Schedule Request EC008/Schedule Response EC009 exchanges may occur in any number and order.

Light Show Client Configuration EC004, of FIG. 60, illustrates an example message flow used to activate a Daily Schedule EB007 on a Light Show Client AA012. In Light Show Client Configuration EC004: Light Set Name List EC010 is sent to Light Show Executor AA014; immediately after a Communication Channel AA027, to Light Show Service AA003, exists, Light Show Executor AA014 uses one or more Light Set Request EC011/Light Set Response EC012 message exchanges, for example EC011a/EC012a and EC011b/EC012b, to obtain a Full Light Set DB018, with associated Tessellated Light Sets DB001 and Standard Tessellations, per Light Set Name DC002 in Light Set Name List EC010; Light Show Executor AA014 uses Schedule Request EC013/Schedule Response EC014 to obtain the active Daily Schedule EB007; Light Show Executor AA014 uses one or more Show Content Request EC015/Show Content Response EC016 exchanges, for example EC015a/ EC016a and EC015b/EC016b, to obtain the one or more Show Contents DD006 referenced by the one or more Show Contents RIDs EB002 in Daily Schedule EB007; Message Exchange DE013 obtains the Light Animations CT011 referenced by Show Contents DD006; Light Show Executor AA014 uses the Daily Schedule EB007 and Show Contents DD006 to control when the Light Animations CT011 are displayed on the Full Light Sets DB018 in Physical Light Set AA028. Message Exchange DE013 is illustrated in more detail in FIG. 66, see Light Show Client Configuration GD006. In one or more embodiments, a Light Show Executor AA014 may regularly poll Light Show Service AA003, for the latest active Daily Schedule EB007, using Schedule Request AB410/Schedule Response AB411 exchanges. In one or more embodiments, Light Show Executor AA014 may use http long polling, or a similar method, to reduce the delay from polling before an active Daily Schedule EB007 change on Light Show Service AA003 becomes available on one or more Light Show Clients AA012.

Figure 61:
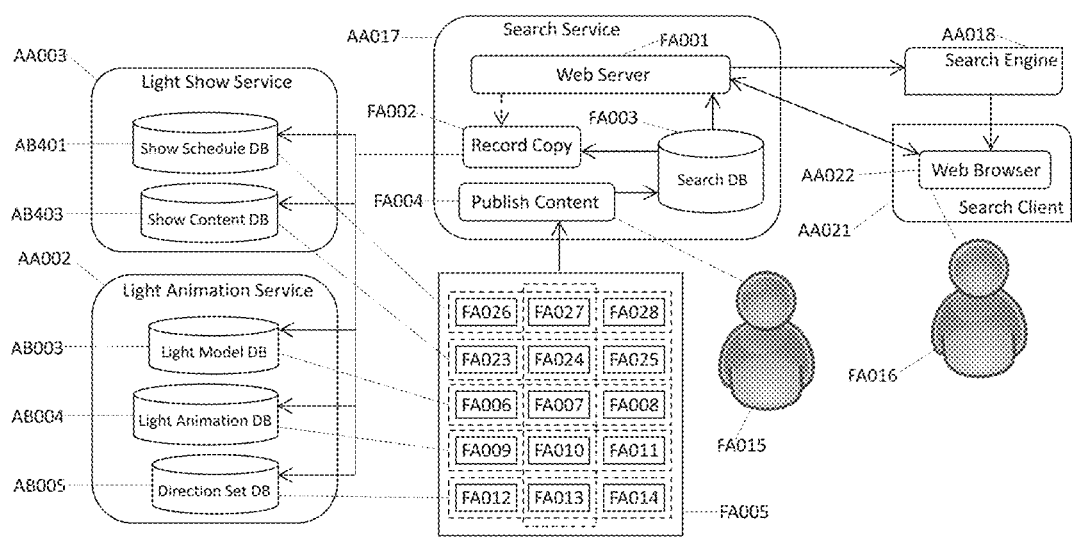
FIG. 61 illustrates a method that may be used, by the exemplar architecture, in order for users to find Light Show related content of interest.

FIG. 61 illustrates a method which may be used by a User FA016 to find Database Records and then include them in the set of Database Records which they may create scheduled Light Shows from, these records may include Light Models CT001, Direction Sets CT006, Light Animations CT011, Show Contents DD006, Animated Shows EB003 and Daily Schedules EB007. Table FA005 depicts: three Database Records FA006-8 that include Light Model CT001 data structures along with other, search relevant, information; three Database Records FA009-11 that include Light Animation CT011 data structures along with other, search relevant, information; three Database Records FA012-14 that include Direction Set CT006 data structures along with other, search relevant, information; three Database Records FA023-25 that include Show Content DD006 data structures along with other, search relevant, information; three Database Records FA026-28 that include Daily Schedule EB007, or Animated Show EB003, data structures along with other, search relevant, information.

User FA015 interacts with Publish Contents FA004 to publish Database Records FA007, FA010, FA013, FA024 and FA027, by copying them from their personal record sets to Search DB FA003. Web Server FA001, for example Apache or Node.js, provides access to all published Database Records by providing one or more web pages that describe each record, once Database Records FA007, FA010, FA013, FA024 and FA027 are published Web Server FA001 provides web pages for them. One or more Search Engines AA018, for example Google or Bing, walk all the web pages provided by Web Server FA001 subsequent to the publishing of Database Records FA007, FA010, FA013, FA024 and FA027, creating searchable entries for them. User FA016 uses Web Browser AA022, for example Safari or Chrome, to access a Search Engine AA018 and does a query that leads him to select a web page for Database Record FA010, which includes a Light Animation. User FA016 reads the web pages for Database Record FA010 and decides that he may want to use its Light Animation CT011 in a Light Show. In order to use the Light Animation CT011, of Database Record FA010, when creating a Light Show, User FA016 logs in, to Web Server FA001, via a link embedded in one or more of the web pages for Database Record FA010, which are provided by Web Server FA001 and displayed by Web Browser AA022, and presses a copy button embedded in the login web page. The pressing of this copy button causes Record Copy FA002 to copy at least some of Database Record FA010, including the Light Animation CT011, from the records created by User FA015, in Search DB FA003, to the personal set of records for User FA016 in Light Animation DB AB004. Please note the personal record sets for a User FA015-16 support a namespace defined by the User FA015-16, the database record keys being kept unique by inclusion of the User's username.

In one or more embodiments, a reference to the Database Record FA010, created by User FA015, may be used in place of the copy and provide access to the original published record for User FA016. In one or more embodiments, the web pages for a Database Record include: whether they include a Light Model CT001, Light Animation CT011, Direction Set CT006, Show Content DD006, Animated Show EB003 or Daily Schedule EB007; the maximum number of lights active at any time; the minimum (x, y) extent of any Tessellated Light Set DB001 that they may have been designed for display on; labels representing the shape of the Light Effects created, for example House, Snowman or Turkey; the % of lights of each color, for example 60% white, 24% blue and 16% red. This information may be used by a Search Engine AA018 to help a User FA016 find Light Models CT001, Direction sets CT006, Light Animations CT011, Show Contents DD006, Animated Shows EB003 and Daily Schedules EB007 of interest. In one or more embodiments, including the one of FIG. 1, Publish Content FA004 has a Web Server interface, which may be provided by Web Server FA001, which is used by User FA015, via a Web Browser, to publish database records.

Figure 62:
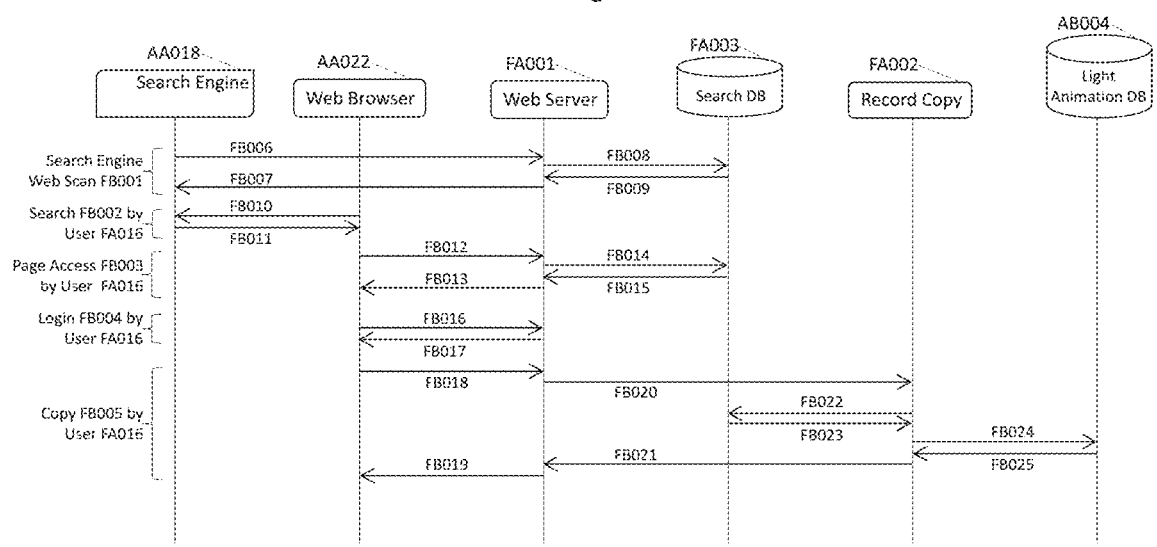
FIG. 62 shows a message flow diagram that illustrates users finding Light Show related content of interest.

FIG. 62 is a message flow diagram for a method, illustrated in FIG. 61, which may be used by a User FA016 to find the published Database Records of User FA015. FIG. 62 uses the same example as FIG. 61 to show how User FA016 may obtain a copy of Database Record FA010, which includes a Light Animation CT011. FIG. 62 does not include any information on the publish part of the method of FIG. 61.

In Search Engine Web Scan FB001, of FIG. 62: Search Engine AA018 sends Html request FB006 to Web Server FA001; Web Server FA001 converts the content of Html Request FB006 to DB Query FB008 and sends it to Search DB FA003; Search DB FA003 looks up Record FA010 and returns it in Query Response FB009; Web Server FA001 converts Query Response FB009 to a web page and returns it to Search Engine AA018 in HTML Response FB007. Please note HTML Request FB006 and HTML Response FB007 is only one HTML message exchange, and that Search Engine AA018 may use many such exchanges to extract one or more web pages per published Database Record from Search DB FA003.

In Search FB002 by User FA016, of FIG. 62: User FA016 uses Web Browser AA022 to send an HTML Request FB010, which includes a search string, to Search Engine AA018; Search Engine AA018 uses the search string, of HTML Request FB010, to generate an HMTL Response FB011 that includes a number of search matches; Web Browser AA022 shows the web page returned in HTML Response FB011. Please note that the message exchange used to obtain the web page into which the search string of HTML Request FB010 is entered, by User FA016, is not shown.

In Page Access FB003 by User FA016, of FIG. 62: User FA016 selects the search match for Database Record FA010, from HTML Response FB011, using Web Browser AA022; Web Browser AA022 sends Html Request FB012, which includes the URI of the search match selected, to Web Server FA001; Web Server FA001 converts the content of Html Request FB012 to DB Query FB014 and sends it to Search DB FA003; Search DB FA003 looks up Database Record FA010 and returns it in Query Response FB015; Web Server FA001 converts Query Response FB015 to a web page and returns it to Web Browser AA022 in HTML Response FB013; Web Browser AA022 shows the web page returned in HTML Response FB013.

In Login FB004 by User FA016, of FIG. 62: User FA016 enters login credentials, for example a username and password, into the web page returned in HTML Response FB013; Web Browser AA022 sends Html Request FB016, which includes the username and contents calculated from the password, to Web Server FA001; Web Server FA001 authenticates User FA016 and associates them with the session of Web Browser AA022; Web Server FA001 returns HTML Response FB017; Web Browser AA022 displays the web page included in HTML Response FB017, this may include a way to enter a User FA016 specific name for a copy of Database Record FA010, or some of its contents, and a way to command Web Server FA001 to copy the data, for example a web page button.

In Copy FB005 by User FA016, of FIG. 62: User FA016 may enter their user specific name for data from Database Record FA010 into Web Browser AA022 and commands the data copy be made; Web Browser AA022 sends HTML Request FB018, which includes the user specific name for Database Record FA010, to Web Server FA001; Web Server FA001 converts the contents of Html Request FB018 to Copy Message FB020 and sends it to Record Copy FA002, this message includes both the user specific name entered and identifying information for Database Record FA010, which may be extracted from the URI of Html Request FB018; Record Copy FA00 converts the content of Copy Message FB020 to DB Query FB022 and sends it to Search DB FA003; Search DB FA003 looks up Database Record FA010 and returns its contents in Query Response FB023; Record Copy FA002 creates message DB Add FB024, which includes both the user specific name and the contents of Database Record FA010 being copied; Light Animation DB AB004 creates a new record that includes information from Database Record FA010, including the Light Animation CT011, and makes it accessible via the username, and user specific database record name, of User FA016; Add Success FB025 confirms success of the add operation to Record Copy FA002 which, in turn, sends Add Success FB021 to Web Server FA001; Web Server FA001 sends HTML Response FB019 to Web Browser AA022 which displays the copy success web page included in the response. Please note the message flow given creates a new record in Light Animation DB AB004 and is applicable when a Light Animation CT011 is being copied, copies of other data structure types may have similar message flows that lead to the creation of records in other databases, for example Light Model DB AB003, Direction Set DB AB005, Show Schedule DB AB401 or Show Content DB AB403.

Figure 63:
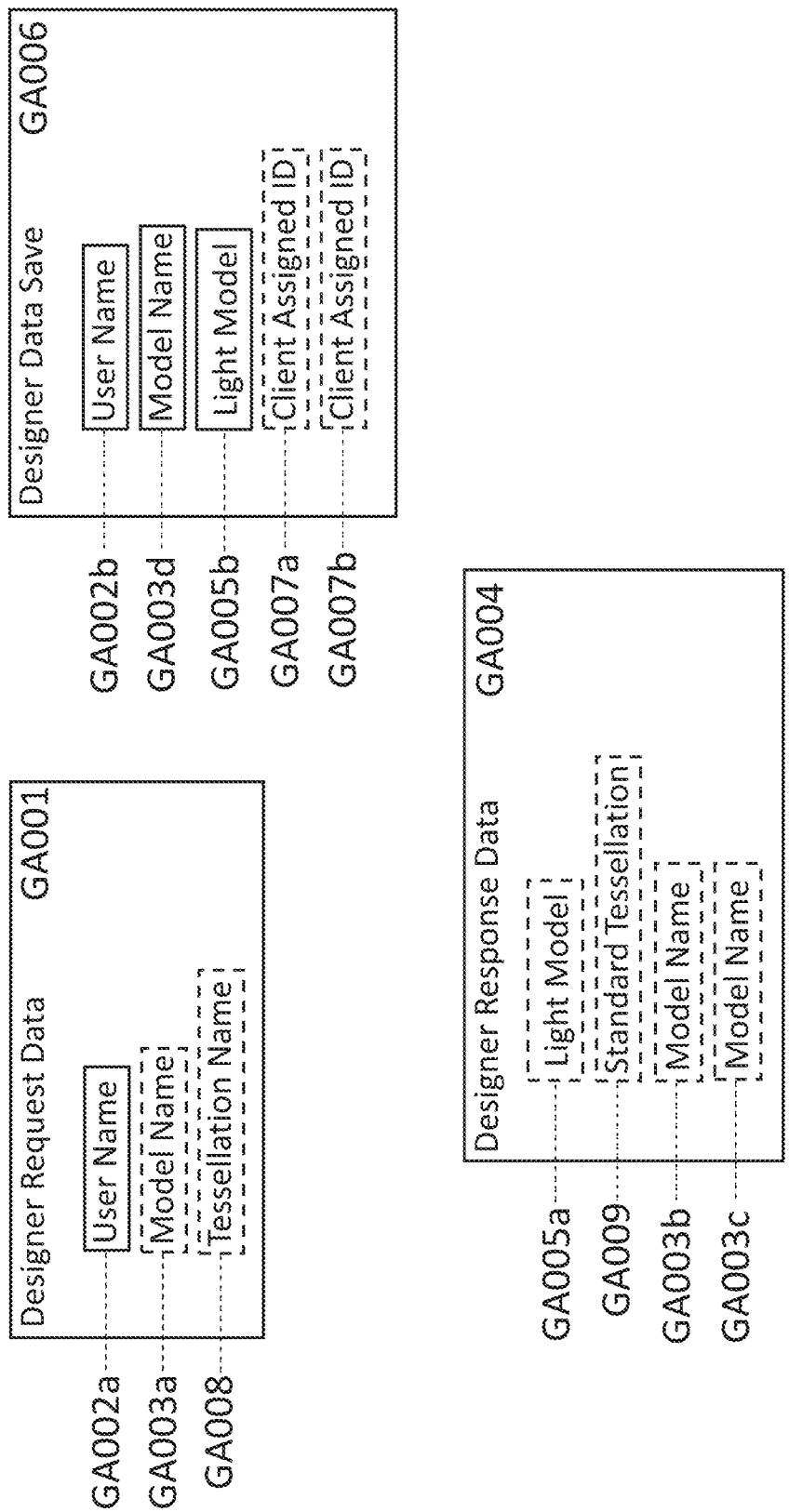
FIG. 63 includes depictions of the exemplar architecture data structures Designer Request Data, Designer Response Data and Designer Data Save.

FIG. 63 depicts: data structure Designer Request Data GA001 which may be included, as application data, in a Designer Session Request AB006 message; data structure Designer Response Data GA004 which may be included, as application data, in a Designer Session Response AB007 message; Designer Data Save GA006 which may be included, as application data, in a Designer Session Save AB008 message. Designer Request Data GA001: includes User Name GA002a of First User AA016; includes at most one of optional Model Name GA003a or optional Tessellation Name GA008. Designer Response Data GA004: optionally includes a Light Model GA005a; optionally includes a Standard Tessellation GA009; includes a Standard Tessellation GA009 when it includes a Light Model GA005a; optionally includes one or more Model Names GA003, for example GA003b and GA003c. Please note, User Name GA002a is not used when recovering the Standard Tessellation GA009 for a Tessellation Name GA008.

In order to provide the functionality shown in FIG. 4 using the messages depicted in FIG. 63, Light Animation Service AA002: includes a Light Model GA005a and Standard Tessellation GA009, which should be the Standard Tessellation BE401 referenced by the Light Model GA005a, in the Designer Response Data GA004 for any Designer Request Data GA001 that has a Model Name GA003a; includes a Standard Tessellation GA009 in the Designer Response Data GA004 for any Designer Request Data GA001 that has a Tessellation Name GA008; includes one or more Model Names GA003, for example GA003b and GA003c, in the Designer Response Data GA004 for any Designer Request Data GA001 that has neither a Model Name GA003a or a Tessellation Name GA008; optionally includes one or more Model Names GA003, for example GA003b and GA003c, in the Designer Response Data GA004 for any Designer Request Data GA001; sets any Model Names GA003 included Designer Response Data GA004 to the user specific names of all Light Models, held in Light Model DB AB003, for the First User AA016 with User Name GA002a. Model Names GA003, for a User Name GA002a, may be included when they have been changed, on Internet Server AA001, since they were last sent to the client. Designer Data Save GA006: includes User Name GA002b, of First User AA016, Model Name GA003d and Light Model GA005b; saves Light Model GA005b to Light Model DB AB003 using a key that includes User Name GA002b and Model Name GA003d; optionally includes one or more Client Assigned IDs GA007, for example GA007a and GA007b. Any Client Assigned IDs GA007 identify IDs in Light Model GA005b that were not assigned by Light Animation Service AA002. These IDs may be reassigned to new values that are unique within Internet Server AA001. The client may ensure its locally generated IDs, for a Designer Data Save GA006 message, are not the same as IDs or RIDs assigned by Light Animation Service AA002 to the same message.

Figure 64:
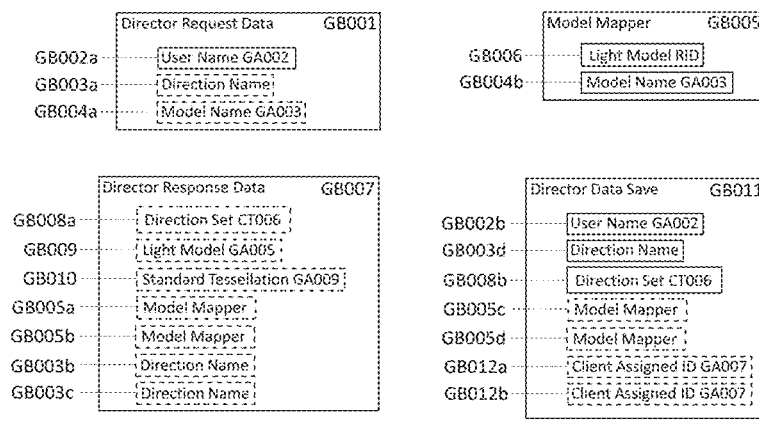
FIG. 64 includes depictions of the exemplar architecture data structures Model Mapper, Director Request Data, Director Response Data and Director Data Save.

FIG. 64 depicts: data structure Director Request Data GB001 which may be included, as application data, in a Director Session Request AB009 message; data structure Director Response Data GB007 which may be included, as application data, in a Director Session Response AB010 message; Director Data Save GB011 which may be included, as application data, in a Director Session Save AB011 message. Director Request Data GB001: includes User Name GB002a of First User AA016; includes at most one of optional Direction Name GB003a or optional Model Name GB004a. Director Response Data GB007: includes at most one of optional Direction Set GB008a or optional Light Model GB009; includes a Standard Tessellation GB010 when it includes a Direction Set GB008a or Light Model GB009; includes one or more Model Mappers GB005, for example GB005a and GB005b, when it includes a Direction Set GB008a; optionally includes one or more Direction Names GB003, for example GB003b and GB003c.

In order to provide the functionality described for FIG. 4 using the messages depicted in FIG. 64, Light Animation Service AA002: may include a Direction Set GB008a and Standard Tessellation GB010, which is the one referenced by the Direction Set GB008a, in the Director Response Data GB007 for any Director Request Data GB001 that has a Direction Name GB003a; may include a Light Model GB009 and Standard Tessellation GB010, which is the one referenced by the Light Model GB009, in the Director Response Data GB007 for any Director Request Data GB001 that has a Model Name GB004a; may include one or more Model Mappers GB005, for example GB005a and GB005b, in any Director Response Data GB007 that has a Direction Set GB008a; may include one or more Direction Names GB003, for example GB003b and GB003c, in the Director Response Data GB007 for any Director Request Data GB001 that has neither a Direction Name GB003a or a Model Name GB004a; optionally includes one or more Direction Names GB003, for example GB003b and GB003c, in the Director Response Data GB007 for any Director Request Data GB001; sets the Light Model RID GB006 and Model Name GB004 of any Model Mappers GB005 included in Director Response Data GB007 such that all the Light Model RIDs in Direction Set GB008a may be converted to Model Names GA003 for First User AA016 with User Name GB002a; sets any Direction Names GB003, for example GB003*b* and GB003*c*, included in Director Response Data GB007, to the Direction Names that may be included in keys in order to access all Direction Sets CT006, held in Direction Set DB AB005, for the First User AA016 with User Name GB002*a*. Director Data Save GB011 includes User Name GB002*b*, of First User AA016, Direction Name GB003*d* and Direction Set GB008*b*; optionally includes one or more Model Mappers GB005, for example GB005*c* and GB005*d*; optionally includes one or more Client Assigned IDs GB012, for example GB012*a* and GB012*b*. User Name GB002*b* and Direction Name GB003*d* may be included in a key that is used to save a Direction Set GB008*b*, to Direction Set DB AB005. Model Mappers GB005 should be included in Director Data Save GB011 for all Light Models referenced by Direction Set GB008*b*, each providing a Model Name GB004*b*, specific to First User AA016, for a Light Model RID GB006 that is also used by Direction Set GB008*b*. When Light Model RID GB006 is assigned by Director Tool AC002 there may be no Light Model, for User Name GB002*b* and Model Name GB004*b*, in Light Model DB AB003, in these circumstances Light Animation Service AA002 may create an empty Light Model record. Any Client Assigned IDs GB012, for example GB012*a* and GB012*b*, identify IDs in Direction Set GB008*b* that were not assigned by Light Animation Service AA002. These IDs may be reassigned to new values that are unique within Internet Server AA001. The client may ensure its locally generated IDs, for a Director Data Save GB011 message, are not the same as IDs or RIDs assigned by Light Animation Service AA002 to the same message.

Figure 65:
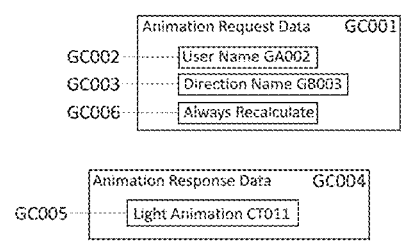
FIG. 65 includes depictions of the exemplar architecture data structures Animation Request Data and Animation Response Data.

FIG. 65 depicts: data structure Animation Request Data GC001 which may be included, as application data, in an Animation Request AB012 message; data structure Animation Response Data GC004 which may be included, as application data, in an Animation Response AB014 message. Animation Request Data GC001 includes User Name GC002, of First User AA016, Direction Name GC003 and Always Recalculate GC006. Animation Response Data GC004 includes Light Animation GC005. Light Animation Service AA002: receives an Animation Request AB012 which includes Animation Request Data GC001; uses User Name GC002 and user specific Direction Name GC003 to look up a Direction Set CT006 in Direction Set DB AB005; checks if there is an up to date Light Animation CT011 for the Direction Set CT006 and the Light Models CT001 it references, in Light Animation DB AB004; updates the Light Animation CT011 if necessary, always updating if Always Recalculate GC006 is set; returns an Animation Response AB014 to the source of Animation Request AB012 that includes an Animation Response Data GC004 with Light Animation GC005 set to the, possibly updated, Light Animation CT011.

The flexible communication message data structures included in FIGS. 63-65 and other figures may be readily implemented using modern message data formatting methods, for example JSON or XML.

Figure 66:
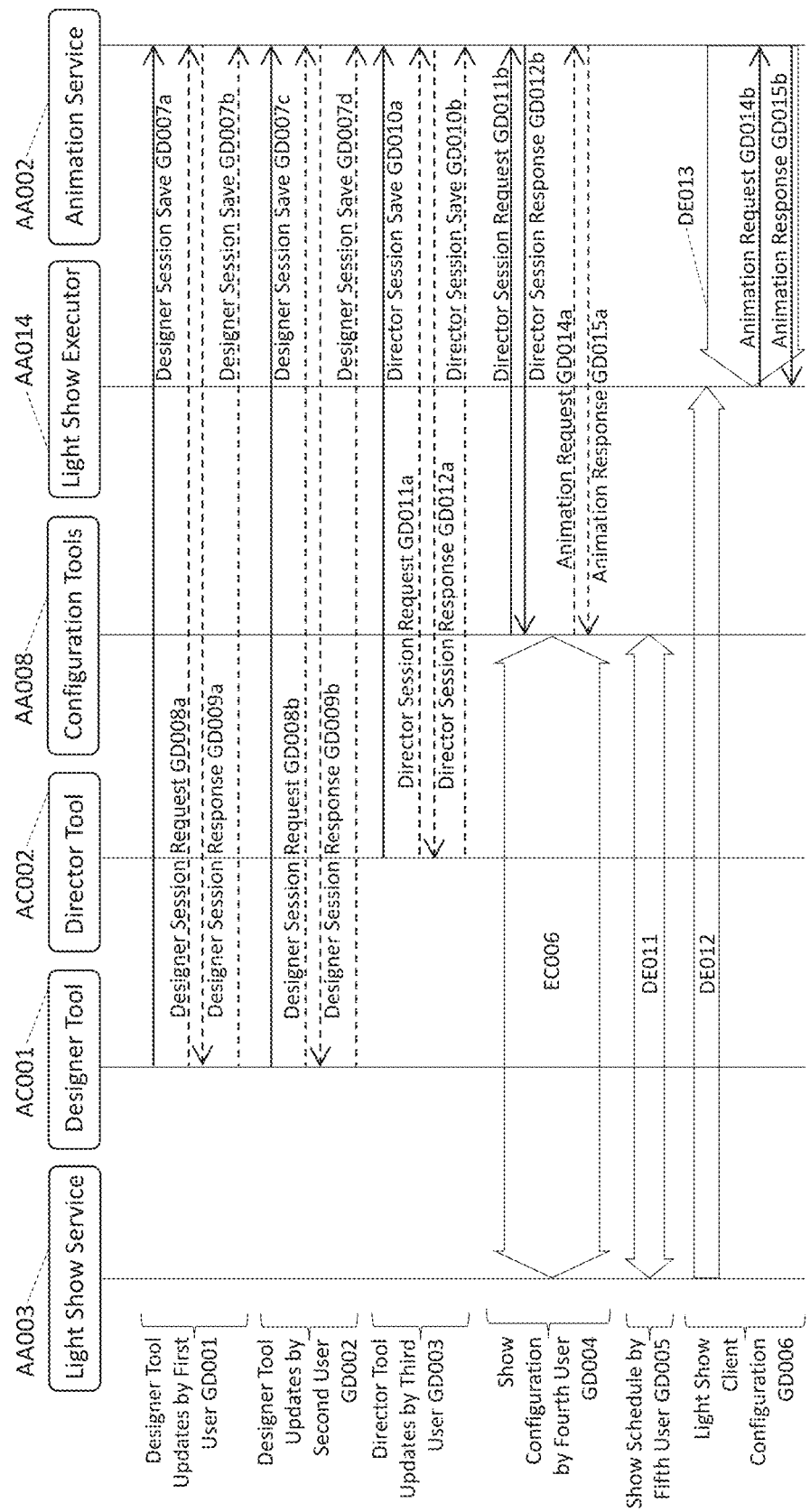
FIG. 66 shows a message flow diagram for the creation and use of an example Light Animation.

FIG. 66 is a message flow diagram illustrating an example creation, and use by a Light Show Client AA012, of a Light Animation CT011 that includes two Light Models CT001. The exemplar architecture: supports the creation of a Light Animation CT011, from a Direction Set CT006 and one or more Light Models CT001, for multiple different versions of the Direction Set CT006 and Light Models CT001; automatically creates new Light Animations CT011, for the various Direction Set CT006 and Light Models CT001, as required. FIG. 66 shows a sequential order for Designer/Director Tool Updates by Users GD001-3, the exemplar system supports a parallel, and interleaved, exchange of their messages. Please note that FIG. 66 is only a partial message exchange for the system that summarizes much of the communication used for the creation and display of scheduled Light Shows in Message Exchanges, for example the download of Full Light Sets DB018 by Light Show Client AA012 is included in Message Exchange DE012. FIG. 66 assumes First Designer Tool AC001, Second Designer Tool AC001 and Director Tool AC002 all have the same default Standard Tessellation BE401.

Designer Tool Updates by First User GD001, of FIG. 66, illustrates a first part of the message flow represented by Message Exchange DE015 in FIG. 56 and FIG. 60. In Designer Tool Updates by First User GD001: First User GD001 uses First Designer Tool AC001 to create one or more versions of a First Light Model CT001; First Designer Tool AC001 includes these First Light Model CT001 versions in one or more Designer Session Save GD007 messages, for example GD007*a* and GD007*b*, and sends them to Light Animation Service AA002; First Designer Tool AC001 uses Designer Session Request GD008/Designer Session Response GD009 exchanges, for example GD008*a*/GD009*a*, to download First Light Model CT001 versions from Light Animation Service AA002 as necessary, for example after First Designer Tool AC001 is restarted. After the initial Designer Session Save GD007*a* message, which creates the first version of First Light Model CT001 using the default Standard Tessellation BE401 of First Designer Tool AC001, one or more subsequent Designer Session Save GD007 messages or Designer Session Request GD008/Designer Session response GD009 exchanges may occur in any number and order.

Designer Tool Updates by Second User GD002, of FIG. 66, illustrates a second part of the message flow represented by Message Exchange DE015 in FIG. 56 and FIG. 60. In Designer Tool Updates by Second User GD002: Second User GD002 uses Second Designer Tool AC001 to create one or more versions of a Second Light Model CT001; Second Designer Tool AC001 includes these Second Light Model CT001 versions in one or more Designer Session Save GD007 messages, for example GD007*c* and GD007*d*, and sends them to Light Animation Service AA002; Second Designer Tool AC001 uses Designer Session Request GD008/Designer Session Response GD009 exchanges, for example GD008*b*/GD009*b*, to download Second Light Model CT001 versions from Light Animation Service AA002 as necessary, for example after Second Designer Tool AC001 is restarted. After the initial Designer Session Save GD007*c* message, which creates the first version of Second Light Model CT001 using the default Standard Tessellation BE401 of Second Designer Tool AC001, one or more subsequent Designer Session Save GD007 messages or Designer Session Request GD008/Designer Session response GD009 exchanges may occur in any number and order.

Director Tool Updates by Third User GD003, of FIG. 66, illustrates a third part of the message flow represented by Message Exchange DE015 in FIG. 56 and FIG. 60. In Director Tool Updates by Third User GD003: Third User GD003 uses Director Tool AC002 to create different versions of a Direction Set CT006 over time; Director Tool AC002 includes these Direction Set CT006 versions in one or more Director Session Save GD010 messages, for example GD010*a* and GD010*b*, and sends them to Light Animation Service AA002; Director Tool AC002 uses Director Session Request GD011/Director Session Response GD012 exchanges, for example GD011*b*/GD012*b*, to download one or more Light Models CT001 or Direction Set CT006 versions from Light Animation Service AA002 as necessary, for example after Director Tool AC002 is restarted. After the initial Director Session Save GD010*a* message, which creates the first version of the Direction Set CT006 using the default Standard Tessellation BE401 of Director Tool AC002, one or more subsequent Director Session Save GD010 messages or Director Session Request GD011/Director Session response GD012 exchanges may occur in any number and order.

Show Configuration by Fourth User GD004, of FIG. 66, illustrates the same exemplar system activities as the Show Configurations by Second Users DE002 and EC002 from the perspective of animation related messages. In Show Configuration by Fourth User GD004: Fourth User GD004 uses First Configuration Tools AA008 to create a Show Content DD006 for a Full Light Set DB018 controlled by Light Show Client AA012. Fourth User GD004 defines the Show Content DD006 by providing start times and Offsets CW009 for one or more Light Animations CT011 on the Tessellated Light Sets DB001 of the Full Light Set DB018. First Configuration Tools AA008 communicates with Internet Server AA001 when creating this Show Content DD006: Director Session Request GD011*b*/Director Session Response GD012*b* recovers the Direction Names GB003 for all Light Animations CT011, currently available to Fourth User GD004, from Light Animation Service AA002; Fourth User GD004 uses these Direction Names GB003 to select Light Animations CT011, which include the Light Animation CT011 defined by the Direction Set CT006 created in Director Tool Updates by Third User GD003, that may be used by the Show Content DD006; Message Exchange EC006, which may include many different messages, includes communication of the new Show Content DD006 to Light Show Service AA003, which saves it to Show Content DB AB403; Message Exchange EC006 also includes download of the Full Light Sets DB018 controlled by the Light Show Client AA012. Animation Request GD014*a*/Animation Response GD015*a* may be used to recover the Light Animation CT011, defined in Director Tool Updates by Third User GD003, as part of obtaining all the Light Animations CT011, being used by the Show Content DD006, from Animation Service AA002. These Light Animations CT011 allow Fourth User GD004 to view a graphical simulation of a display of the Show Content DD006 on the Full Light Set DB018. The download of all Light Animations CT011, except the Light Animation CT011 produced by Designer/Director Tool Updates GD001-3, is omitted from the depiction of Show Configuration by Fourth User GD004 in FIG. 66.

Show Schedule by Fifth User GD005, of FIG. 66, illustrates the same exemplar system activities as the Show Schedules by Third Users DE003 and EC003 from the perspective of animation related messages. In Show Schedule by Fifth User GD005: Fifth User GD005 creates one or more Animated Shows EB003, and their associated Daily Schedule EB007, by scheduling the display, using Second Configuration Tools AA008, of one or more Show Contents DD006, including the Show Content DD006 created in Show Configuration by Fourth User GD004, on the Full Light Sets DB018 controlled by Light Show Client AA012. Message Exchange DE011 is used by Second Configuration Tools AA008, in Show Schedule by Fifth User GD005, to create, recover and update Animated Show EB003 and Daily Schedule EB007 records held in Show Schedule BD AB001.

Light Show Client Configuration GD006, of FIG. 66, illustrates the same exemplar system activities as Light Show Client Configuration DE004 and EC004 from the perspective of animation related messages. In Light Show Client Configuration GD006, Light Show Executor AA014 downloads one or more Animated Shows EB003, and their associated information, and displays them one or more times. First Light Show Executor AA014 uses Message Exchange DE012 to download, from Light Show Service AA003, the active Daily Schedule EB007, defined in Show Schedule by Fifth User GD005 along with the Animated Shows EB003 it includes, and associated information, for example Show Content DD006 defined in Show Configuration by Fourth User GD004. Next Light Show Executor AA014 uses Message Exchange DE013 to download all the Light Animations CT011 which are used, by the active Daily Schedule EB007, from Animation Service AA002. This download includes Animation Request GD014*b*/Animation Response GD015*b* in order to obtain the Light Animation CT011 defined in Director Tool Updates by Third User GD003. Light Show Client AA012 may subsequently use Daily Schedule EB007 to provide each Animated Show EB003 at one or more times in the future.

Figure 67:
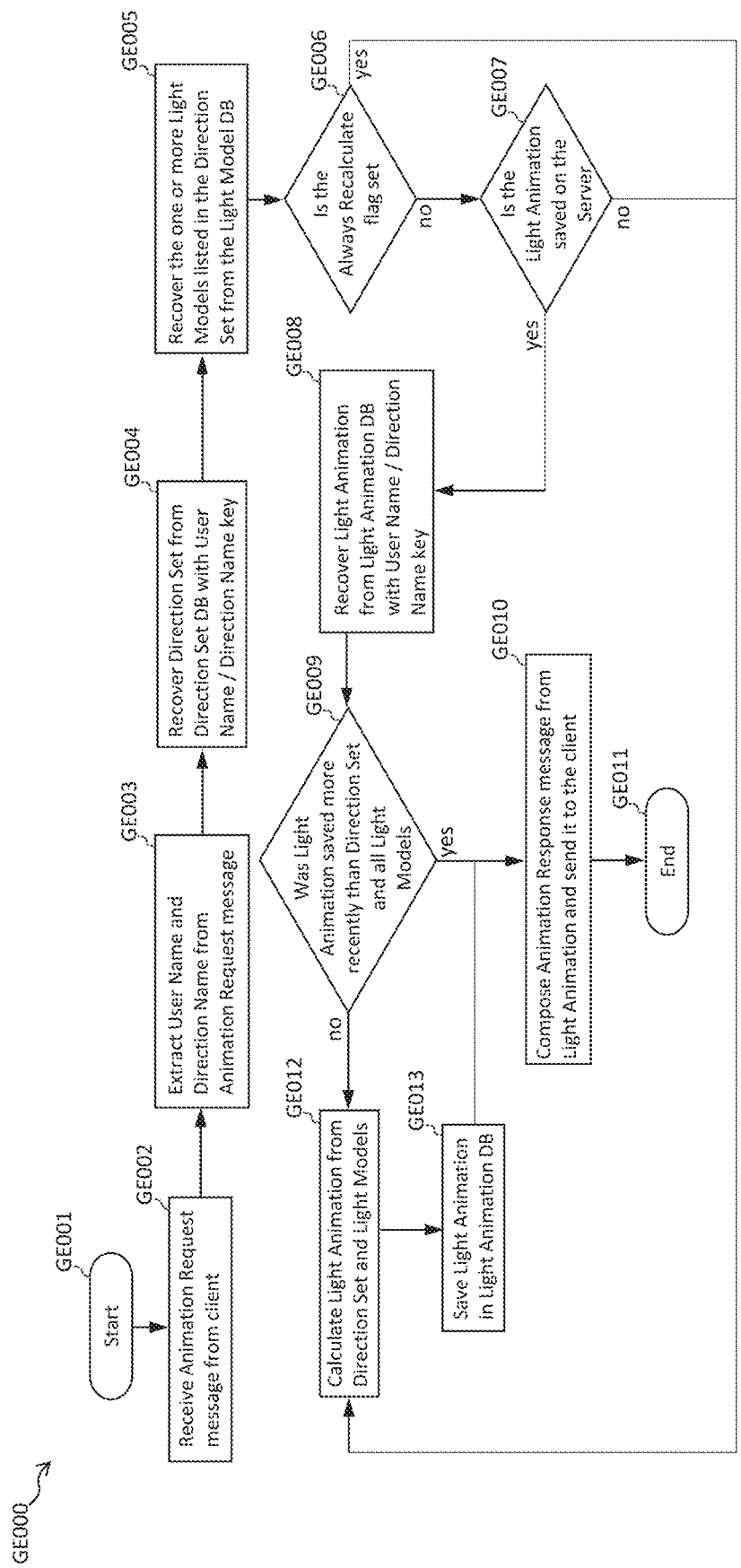
FIG. 67 is a flow chart of a method of Internet Server operation.

FIG. 67 is a flow diagram illustrating a method GE000 that may be used by Internet Server AA001 to provide a Light Animation CT011 to a client, for example Light Show Client AA012, Configuration Client AA011 or Authoring Client AA006. The method GE000 may be performed by Light Animation Service AA002.

In operation GE002 an Animation Request AB012 message is received from the client. In operation GE003 an Animation Request Data GC001 is extracted from the Animation Request AB012 in order to access the User Name GC002 and Direction Name GC003 in the message. In operation GE004 a Direction Set CT006 is recovered, from Direction Set DB AB005, using a key that includes User Name GC002 and Direction Name GC003. In operation GE005 one or more Light Models CT001 are recovered, from Light Model DB AB003, by including the Light Model RIDs CT008 held by the Direction Set CT006, within Model Directions CT007, in database keys. In operation GE006 the Always Recalculate GC006 flag, in the Animation Request Data GC001, is tested. In Operation GE007 the presence of a Light Animation CT011, in Light Animation DB AB004, is tested using a key that includes User Name GC002 and Direction Name GC003. In operation GE008 a Light Animation CT011 is recovered, from Light Animation DB AB004, using a key that includes User Name GC002 and Direction Name GC003. In operation GE009 a test of whether the Light Animation CT011 record, in Light Animation DB AB004, is newer than the Direction Set CT006 record, in Direction Set DB AB005, and every associated Light Model CT001 record, in Light Model DB AB003, is performed. In operation GE010 an Animation Response AB014 message is created that includes, within an Animation Response Data GC004, the newest Light Animation CT011, for the key that includes User Name GC002 and Direction Name GC003, and then sent to the client. In operation GE012 a new Light Animation CT011 is created, by Light Animation CT011 Generator AB002, from the Direction Set CT006 and its associated Light Models CT001. In operation GE013 the new Light Animation CT011 is saved, in Light Animation DB AB004, to the record with a key that includes User Name GC002 and Direction Name GC003.

Figure 68:
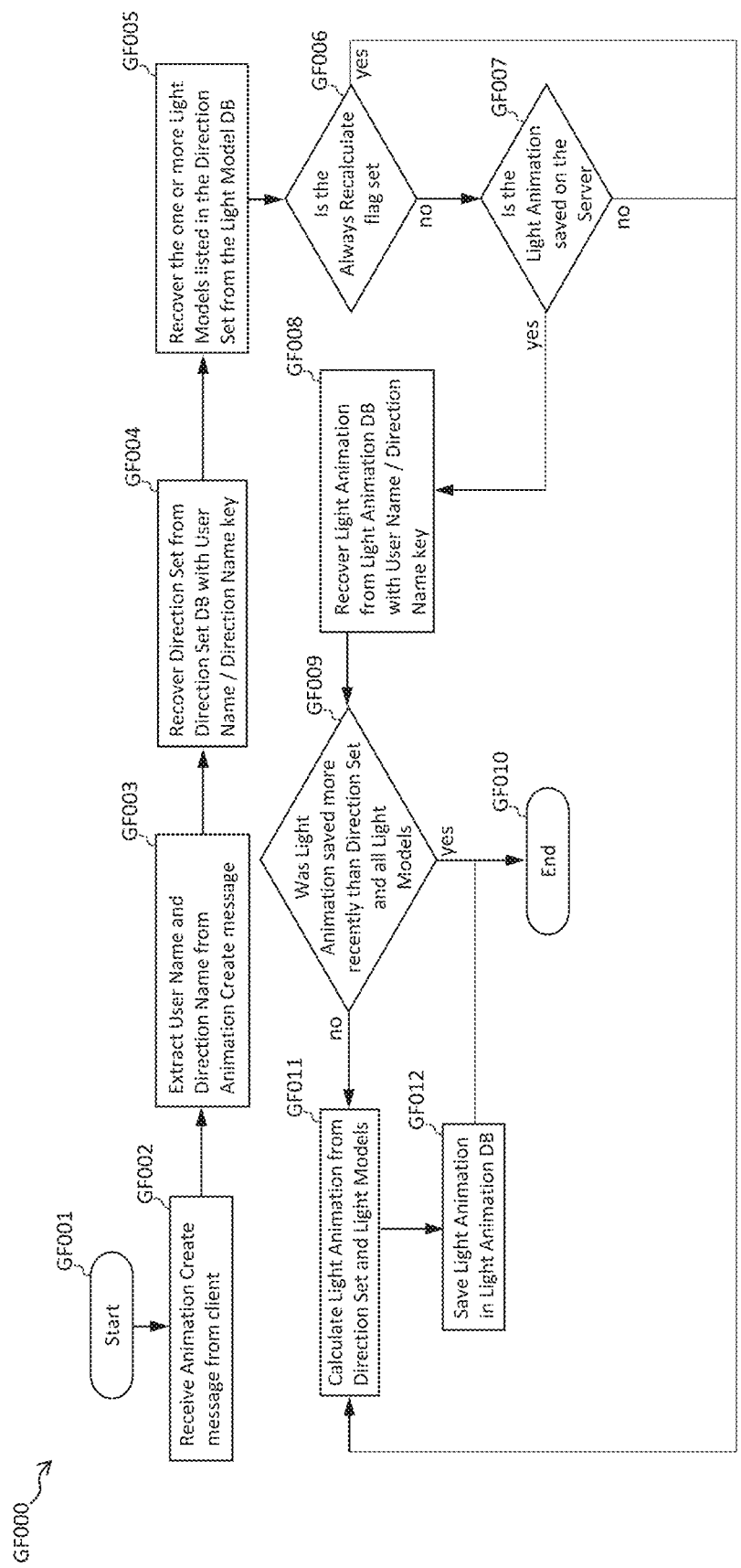
FIG. 68 is a flow chart of a method of Internet Server operation.

FIG. 68 is a flow diagram illustrating a method GF000 that may be used, in one or more embodiments, by Internet Server AA001 to respond to a request to update a Light Animation CT011 from a client, for example Light Show Client AA012, Configuration Client AA011 or Authoring Client AA006. The method GF000 may be performed by Light Animation Service AA002. The method GF000 is similar to method GE000, of FIG. 67, the only difference being the omission of an equivalent of operation GE010, which returns the new, or updated, Light Animation CT011 to the client.

Figure 69:
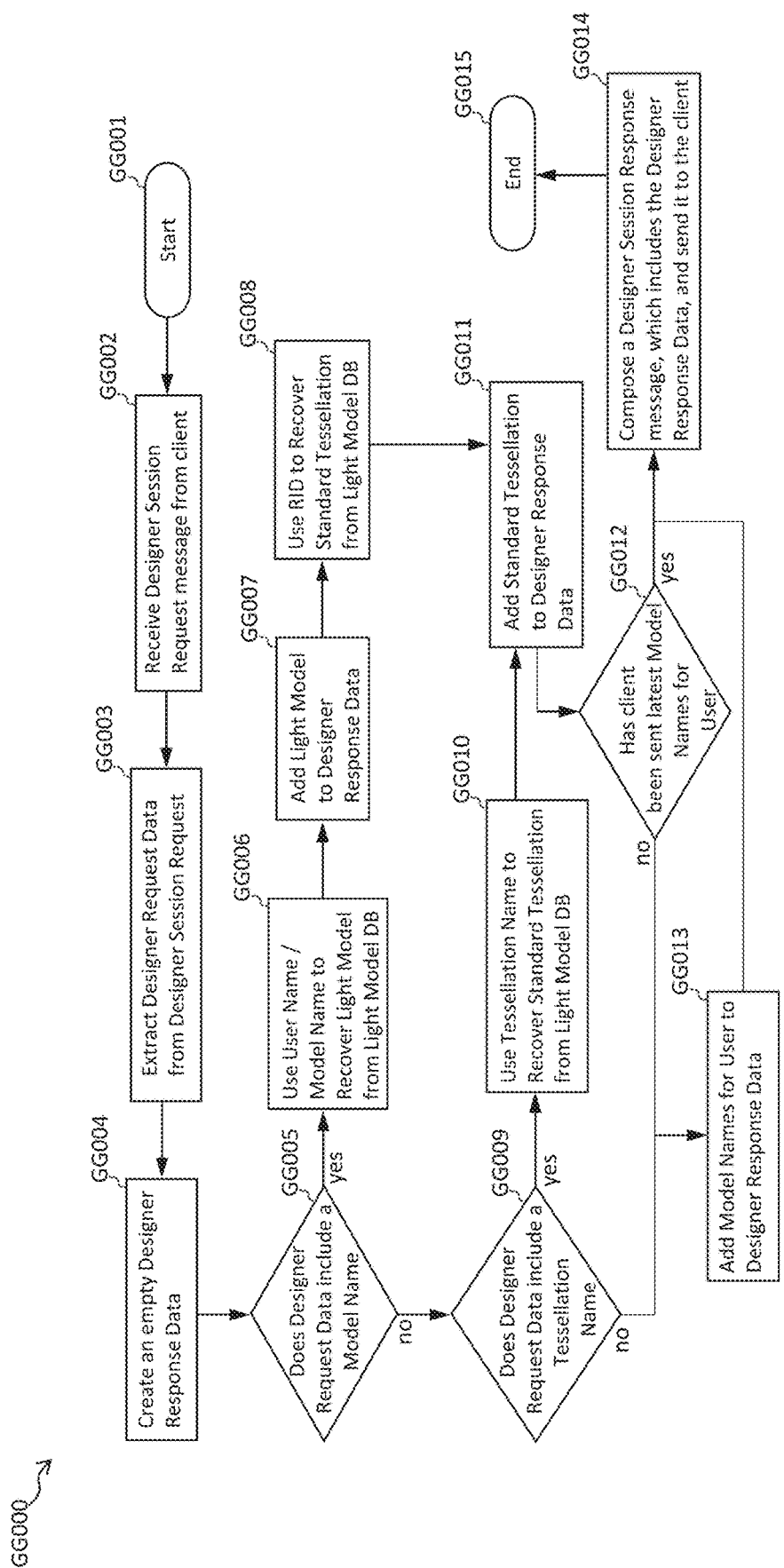
FIG. 69 is a flow chart of a method of Internet Server operation.

FIG. 69 is a flow diagram illustrating a method GG000 that may be used by Internet Server AA001 to provide one or more Model Names GA003, a Light Model CT001 and or a Standard Tessellation BE401 to a client, for example Authoring Client AA006. The method GG000 may be performed by Light Animation Service AA002.

In operation GG002 a Designer Session Request AB006 message is received from the client. In operation GG003 a Designer Request Data GA001 data structure is extracted from the Designer Session Request AB006 message, this provides access to User Name GA002a, optional Model Name GA003a and optional Tessellation Name GA008. In operation GG004 an empty Designer Response Data GA004 data structure is created. In operation GG005 Designer Request Data GA001 is tested for the presence of a Model Name GA003a. In operation GG006 a Light Model CT001 is recovered, from Light Model DB AB003, using a key that includes User Name GA002a and Model Name GA003a. In operation GG007 the Light Model CT001 is added to the Designer Response Data GA004. In operation GG008 a Standard Tessellation is recovered, from Light Model DB AB003, using the Standard Tessellation RID included in the Light Model CT001. In operation GG009 Designer Request Data GA001 is tested for the presence of a Tessellation Name GA008. In operation GG010 a Standard Tessellation is recovered, from Light Model DB AB003, using a key that includes Tessellation Name GA008. In operation GG011 the Standard Tessellation is added to the Designer Response Data GA004. In operation GG012 the Model Names GA003 known to be available to the client, by Light Animation Service AA002, are tested against the Model Names GA003 currently held for it, by Light Animation Service AA002. In operation GG013 the Model Names available in Light Model DB AB003, for the user with User Name GA002a, are added to the Designer Response Data GA004. In operation GG014 a Designer Session Response AB007 is created, that includes the Designer Response Data GA004, and then sent to the client.

Figure 70:
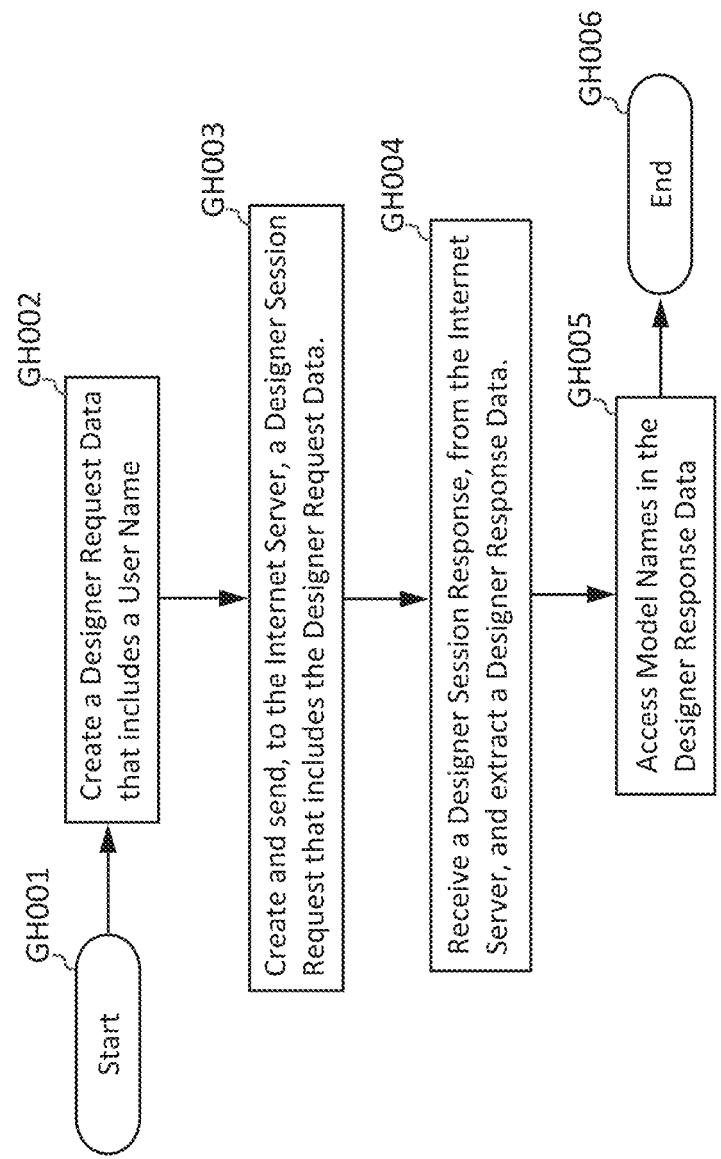
FIG. 70 is a flow chart of a method of Internet Client operation.

FIG. 70 is a flow diagram illustrating a method GH000 that may be used by one or more different client types, for example Authoring Client AA006, to obtain one or more Model Names GA003 from Internet Server AA001.

In operation GH002 a Designer Request Data GA001 is created that includes User Name GA002, but omits Model Name GA003a and Tessellation Name GA008. In operation GH003 a Designer Session Request AB006 message is created, that includes the Designer Request Data GA001, and sent to Internet Server AA001. In operation GH004 a Designer Session Response AB007 message is received, from Internet Server AA001, and a Designer Response Data GA004 is extracted from it. In operation GH005 one or more Model Names GA003 are accessed in the Designer Response Data GA004.

Figure 71:
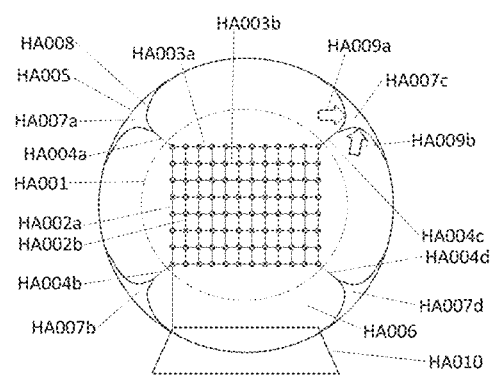
FIG. 71 includes a depiction of an inflatable lawn ornament.

In one or more embodiments, the inflatable lawn ornament of FIG. 71 may be part of the exemplar system. FIG. 71 depicts an inflatable and transparent lawn ornament that includes a plurality of lights arranged such that they provide a Physical Light Set suitable for display of the symbolic Light Animations CT011 previously described. Membranes HA005 and HA008 are shaped and pressurized such that they create an approximately spherical volume containing the Volumes HA006 and HA007a-d when the lawn ornament is inflated. The high pressure within HA006 and low pressure within HA007a-d create a tension in the Flexible Cords HA004a-c. This tension holds the LEDs of Full Light Set HA001 in the correct position via a network of Vertical Cords, for example HA002a-b, and Horizontal Cords, for example HA003a-b. The substantial tension required in HA004a-d in order to hold Full Light Set HA001 in the correct shape is achieved by Pressure Forces, for example HA009a-b, across Membrane HA008. FIG. 71 includes Base HA010, but omits: the tethers and pegs used to hold the lawn ornament in place; the electrical and data connections the lawn ornament may need. These are only illustrated for the other type of lawn ornament design described herein, but apply to both designs.

Figure 72:
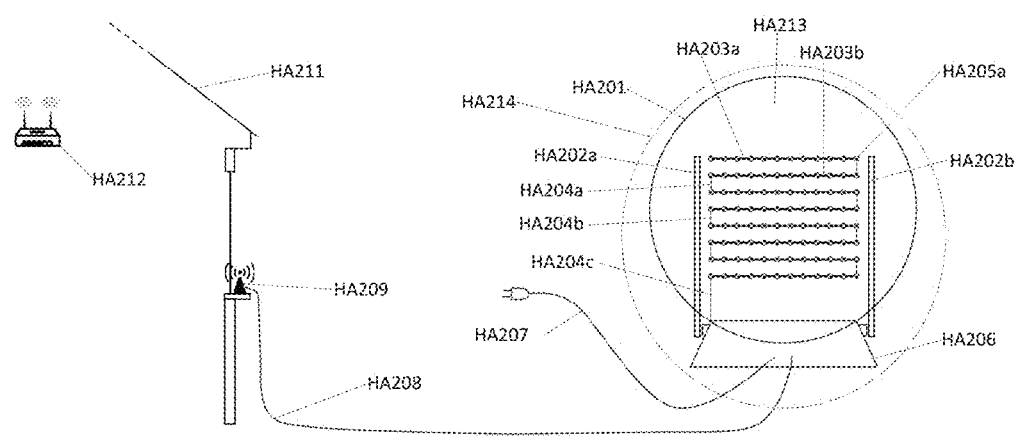
FIG. 72 includes a depiction of an inflatable lawn ornament.

In one or more embodiments, the inflatable lawn ornament of FIG. 72 may be part of the exemplar system. FIG. 72 depicts the inflatable and transparent lawn ornament Snow Globe HA214 that includes a plurality of lights arranged such that they provide a Physical Light Set suitable for display of the symbolic Light Animations CT011 previously described. Spherical Membrane HA201 is shaped and pressurized such that it creates an approximately Spherical Volume HA213 when Snow Globe HA214 is fully inflated. A second transparent Planar Membrane within Spherical Membrane HA201 has embedded within it: vertical Rigid Poles HA202a-b; horizontal Rigid Rods, for example HA203a-b; flexible vertical Communication Wires, for example HA204a-c; Physical Light Set LEDs, or other lights, for example LEDs HA205a. This Planar Membrane may be porous in order to sustain equal, or nearly equal, pressure on its two sides. When Snow Globe HA214 is fully inflated, Rigid Poles HA202a-b and Rigid Rods HA203 hold LEDs HA205 in their correct position. This design leads to a Planar Membrane that may have a low tension when Snow Globe HA214 is fully inflated, hence it may only exert a low force on Membrane HA201. Consequently, a spherical shape for Snow Globe HA214 may be achieved with a low pressure in Spherical Volume HA213 and it may be inflated with the low pressure fans conventionally used by modern lawn ornaments. This allows a design for Snow Globe HA214 that slowly bleeds air through a porous Spherical Membrane HA201 and consequently deflates when the low pressure fan is off. In one or more embodiments, the inflatable law ornament design depicted by Snow Globe HA214 can take forms other than an inflatable transparent snow globe, some of these lawn ornaments may include an inflatable transparent sphere or other shape in their ornamental design.

FIG. 72 also includes depictions of Power Cord HA207, Data/Power Connection HA208, for example Power over Ethernet, House HA211, Wi-Fi Client HA209 and home Wi-Fi Router HA212, which has an Internet connection. In the depiction of FIG. 72: Wi-Fi Client HA209 is positioned on a window sill of House HA211, enabling it to have a good RF connection to Wi-Fi Router HA212; Snow Globe HA214 is positioned some way from House HA211 in order to provide a good Light Show display for House HA211; Data/Power Connection HA208 allows both Wi-Fi Client HA209 and Snow Globe HA214 to be well placed. Please note that Wi-Fi Client HA209 may obtain both power and communication from Data/Power Connection HA208. In one or more embodiments, a Communication Channel between Controller HB005 and Internet Server AA001, or some other Internet Server, provides information that influences when Snow Globe HA214 may inflate, for example:

the times of day inflation should start and end in order for the scheduled Light Shows to be displayed; occasions when inflation may not take place or unusual deflation circumstances, for example when knowledge of the local wind speed on the Server implies Snow Globe HA214 may be unstable. In one or more embodiments, Internet Server AA001, or some other Internet Server, notifies the owner or operator of Snow Globe HA214, for example via email, SMS or cellphone App notification, when maintenance activity is required, for example a weather forecast of high enough local wind speed for Snow Globe HA214 to be brought inside. In one or more embodiments, an alternative RF technology or a wired connection is used for Internet connectivity, for example Bluetooth or Ethernet.

Figure 73:
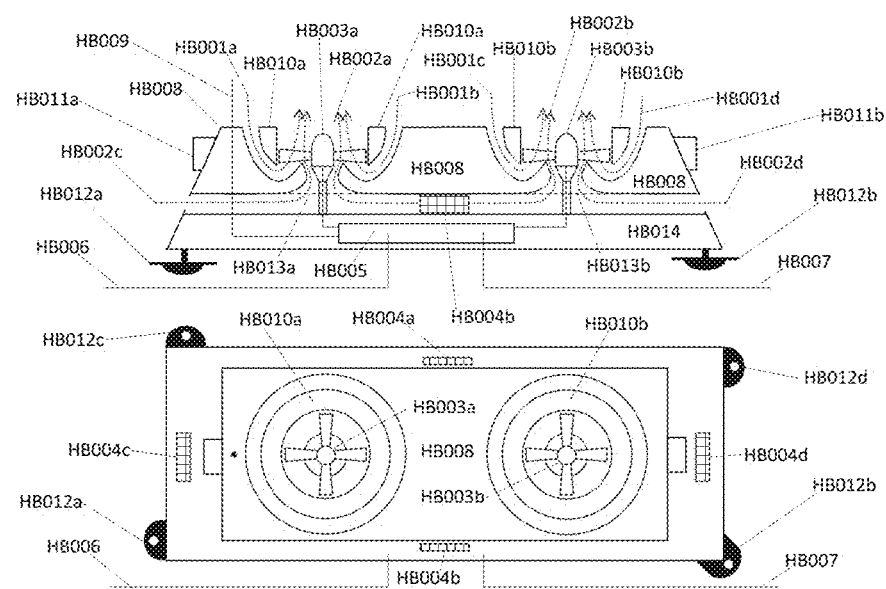
FIG. 73 includes a depiction of the Plinth of an inflatable lawn ornament.

FIG. 73 depicts more detail for Plinth HA206 of Snow Globe HA214. Fans HB003a-b blow air around and into Spherical Volume HA213 of Snow Globe HA214, causing Air Flows HB001a-d and HB002a-d. Vents HB004a-d support Air Flows HB002a-d which expand the low pressure air bubble that is Spherical Volume HA213 to its spherical shape. Air Flows HB001a-d recirculate air within Spherical Volume HA213. The design of Fans HB003a-b, especially their blades, and the Air Ducts created by Plinth Structures HB008, HB014 and HB010a-b support a higher pressure, with lower volume, for Air Flows HB002a-d than for Air Flows HB001a-d. The higher pressure from Air Flows HB002a-d pressurizes the air contained within Spherical Volume HA213 sufficiently to inflate and maintain the spherical shape of Spherical Membrane HA201 in moderately windy conditions. The lower pressure/speed and higher volume of Air Flows HB001a-d maintains a circulation of air within Spherical Volume HA213 that supports the circulation of small fake snow particles, for example light pieces of white paper or plastic, and hence produces a snow blizzard effect within Spherical Volume HA213. Fan Grids HB013a-b prevent the entry of larger objects, which may damage or obstruct the fan, and also greatly reduce, or eliminate, the loss of fake snow particles from Spherical Volume HA213. Controller HB005 is located within Plinth Structure HB014 and has connections that include: Digital Connection HB009 with LEDs HA205; Data/Power Connection HB007 with Wi-Fi Client HA209; a power cord HB006; power connections with Fans HB003a-b. Controller HB005 may include the functionality of Light Show Executor AA014 and hence create a Light Show using LEDs HA205. In one or more embodiments, Controller HB005 may switch on, switch off and vary the speed of Fans HB003a-b. Pole Attachments HB011a-b may grip Rigid Poles HA202a-b and allow them to rotate into or out of the page of FIG. 73. Adjustable Feet HB012a-c have: screw mounts and consequently change height when they are rotated; holes for pegs that may be used to secure Plinth HA206 to the ground. These features may be used to secure Plinth HA206 in a level position on moderately uneven or sloping ground. In one or more embodiments, Snow Globe HA214 includes no fake snow particles, but keeps Air Flows HB002a-d, and maybe Air Flows HB001a-d, for cooling, for example a Snow Globe HA214 for use at Halloween or Christmas.

In one or more embodiments, Snow Globe HA214 includes a mechanism to either remove fake snow particles or avoid their circulation, for example removable grids that may be placed across Air Flows HB001a-d and trap the fake snow particles. A mechanism for preventing the circulation of fake snow particles may be further developed. The Fans HB003a-b may also be further developed.

Figure 74:
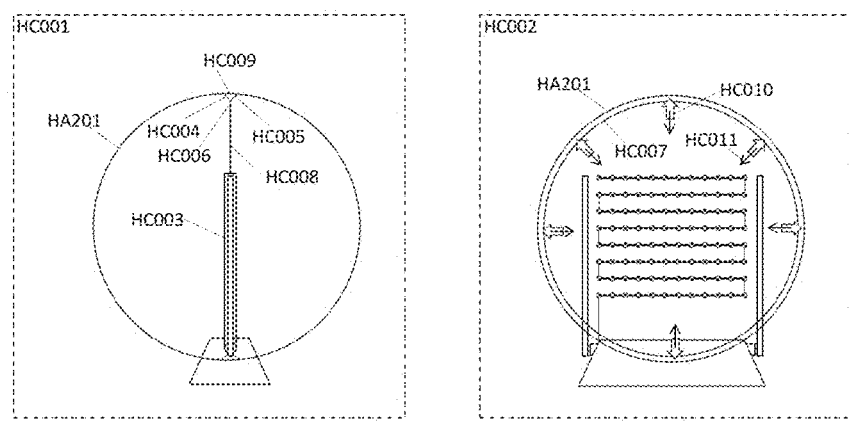
FIG. 74 includes a depiction of an inflatable lawn ornament.

FIG. 74 introduces a side view of Snow Globe HA214 and provides some additional detail for Spherical Membrane HA201. In HC001 a side view of Snow Globe HA214 is shown that includes a Planar Membrane HC008 which has an embedded LED Frame HC003. The LED Frame HC003 is created by embedding a number of components within Planar Membrane HC008, including: Rigid Poles HA202a-b; Rigid Rods, for example HA203a-b; flexible Communication Wires, for example HA204a-c; LEDs or other lights, for example HA205a. HC001 also shows detail for the connection between Planar Membrane HC008 and Spherical Membrane HA201. Small Membrane Connections HC004 and HC005 are used to provide a tension within Planar Membrane HC008. This tension arises because they create a non-spherical surface that internal air pressure should attempt to flatten. The Small Section HC009 of Spherical Membrane HA201 that bridges between Membrane Connections HC004-5 should be sufficiently porous for there to be no significant air pressure across it. Join HC006 is the point where Membrane Connections HC004-5 are connected to Planar Membrane HC008. Please note that, Spherical Membrane HA201 should be sufficiently porous for the airflow through it to remove the heat generated within Spherical Volume HA213, mainly by the lights in LED Frame HC003, at a sufficient rate to avoid overheating.

Diagram HC002, of FIG. 74, shows Snow Globe HA214 from the same perspective as FIG. 72, with Join HC007 showing the circular join between Membrane Connections HC004-5 and Planar Membrane HC008 that is depicted as point Join HC006 in Diagram HC001. The air pressure within Spherical Membrane HA201, for example Air Pressure HC010, acting on Membrane Connections HC004-5 leads to a tension in Planar Membrane HC008, for example Tension HC011, that stretches it like a low tension drum skin.

Figure 75:
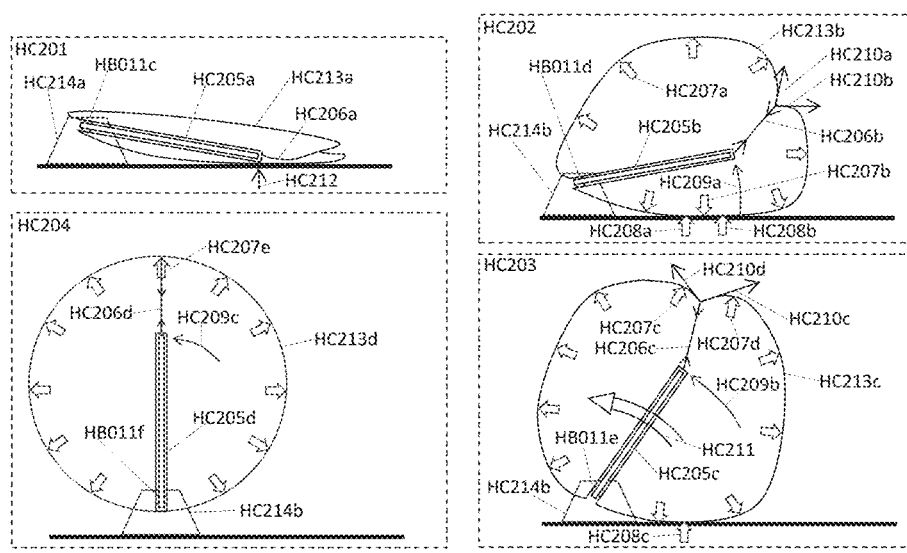
FIG. 75 includes a depiction of the inflation of an inflatable lawn ornament.

FIG. 75 depicts the inflation of Spherical Membrane HA201. In Diagram HC201, Plinth HC214a has not blown air into Spherical Membrane HC213a for some time and consequently: Spherical Membrane HC213a is laying on the ground and has little or no tension within itself; Planar Membrane HC206a is laying almost flat within Spherical Membrane HC213a and has little or no tension within itself; LED Frame HC205a is laying with its free end resting on the ground and has approximately half its weight supported by Pole Attachment HB011c and half by ground Reaction Force HC212 to its free end.

In Diagram HC202, of FIG. 75, Plinth HC214b has been blowing air into Spherical Membrane HC213b for a short time. A simple 2D model can explain the behavior in these circumstances as follows: the free end of LED Frame HC205b has moved through Arc HC209a to an approximately horizontal position; Spherical Membrane HC213b is partially inflated and has some tension within itself; the tension within Spherical Membrane HC213b is applying Forces HC210a-b to one end of Planar Membrane HC206b; the other end of Planar Membrane HC206b transfers Forces HC210a-b to the free end of LED Frame HC205b; the vertical component of the force within Planar Membrane HC206b is slightly greater than half of the weight of LED Frame HC205b and hence it should rotate LED Frame HC205b around Pole Attachment HB011d; Force HC210a, which provides all the vertical component of the force within Planar Membrane HC206b, is created by the force from air pressure on the upper surface of Spherical Membrane HC213b, for example Air Pressure HC207a; some of the force from the air pressure on the lower surface of Spherical Membrane HC213b, for example Air Pressure HC207b, is opposed by the Ground Reaction Force to it, for example HC208a-b, this transfers the weight of the free end of LED Frame HC205b to the ground.

In Diagram HC203, of FIG. 75, Plinth HC214b has been blowing air into Spherical Membrane HC213c for a longer time than air had been blown into Spherical Membrane HC213b. A 3D model is used to explain the behavior in these circumstances as follows: the free end of LED Frame HC205b has moved through Arc HC209b to the elevated angle of LED Frame HC205c; Spherical Membrane HC213c is mostly inflated and has more tension in it than Spherical Membrane HC213b; the tension within Spherical Membrane HC213c applies significant forces, for example Forces HC010c-d, to the outer edge of Planar Membrane HC206c stretching it as described in FIG. 74; the stretched Planar Membrane HC206c holds LED Frame HC205c such that they have approximately planar alignment; the forces on Spherical Membrane HC213c from the air pressure within it, for example HC207c and HC207d, interact with the tension in it to maintain an approximately constant shape, for most of itself and Planar Membrane HC206c, as LED Frame HC205c rotates around Pole Attachment HB011e; a Ground Reaction Force, for example HC208c, counteracts some of the air pressure force from within Spherical Membrane HC213c; small increases of the air pressure within Spherical Membrane HC213c provide enough torque HC211, from increased Ground Reaction Force, to rotate Planar Membrane HC206c, LED Frame HC205c and the center of Spherical Membrane HC213c around Pole Attachment HB011e.

In Diagram HC204, of FIG. 75, Plinth HC214b has been blowing air into Spherical Membrane HC213d for a longer time than air had been blown into Spherical Membrane HC213c and consequently: the air pressure in Spherical Membrane HC213d became sufficient to pull LED Frame HC205c into planar alignment with Planar Membrane HC206d; LED Frame HC205c previously achieved a sufficiently high elevation angle, and hence lower torque to turn, that no ground reaction force may be necessary for it to continue along Arc HC209c to the vertical orientation of LED Frame HC205d; Spherical Membrane HC213d lost contact with the ground and assumed a nearly spherical shape. Once in the vertical position the full weight of LED Frame HC205d is supported by Pole Attachment HB011d, this reduces the force in Planar Membrane HC206d and allows the air pressure in Spherical Membrane HC213d, for example HC207e, to give it a more precise spherical shape.

Figure 76:
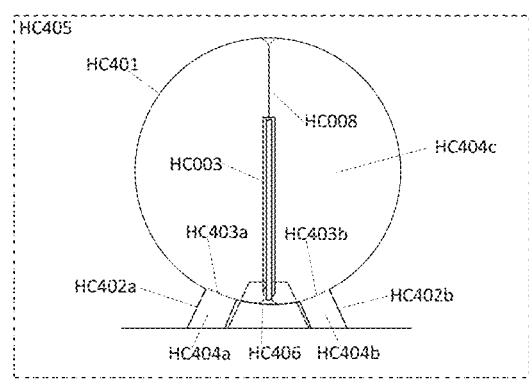
FIG. 76 includes a depiction of an inflatable lawn ornament with skirts.

In one or more embodiments, Spherical Membrane HA201 may be modified as depicted in FIG. 76. Two Semi-spherical Skirts HC402a and HC402b are separated from Spherical Membrane HC401 by Porous Joins HC403a and HC403b. Enclosed Volumes HC404a-c have approximately the same air pressure because Porous Joins HC403a and HC403b allow the free flow of air between them. During inflation of Snow Globe HC405, Semi-spherical Skirts HC402a-b ensure a continuous ground reaction force and hence, for any given air pressure, more torque around Pole Attachment HC406 during the later stages of inflation. The addition of Semi-spherical Skirts HC402a-b may allow the full inflation of Spherical Membrane HC401 with lower maximum air pressure. In one or more embodiments, a Snow Globe HA214 or HC405 may include variable speed Fans HB003a-b and may use a higher fan speed to achieve higher air pressure. This higher air pressure may be used to achieve full initial inflation of Snow Globes HA214 or HC405. In one or more embodiments, careful selection of the materials used in LED Frame HC003 may allow it to be lighter and hence reduce the air pressure required for full initial inflation of Snow Globes HA214 or HC405. The optimal inflated air pressure, air flow for fake snow effects, materials and other aspects of an inflatable Snow Globe design may be further developed. Please note that during inflation the forces due to internal air pressure may be greater than the forces due to the weight of the structure in order for inflation to continue.

Figure 77:
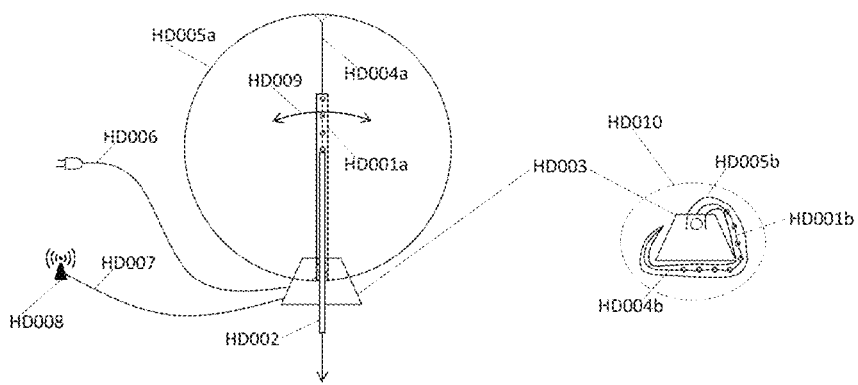
FIG. 77 includes a depiction of the storage of an inflatable lawn ornament.

FIG. 77 depicts how a Snow Globe HA214 may be packed for delivery or storage. The Rigid Poles, for example HD002, are removed from LED Frame HD001a, leaving it flexible enough to be easily bent in direction HD009 and hence easily wrapped around Plinth HD003, as shown by LED Frame HD001b. After the air pressure is released from Spherical Membrane HD005a, the flexibility of it and Planar Membrane HD004a allow them to also be easily wrapped around Plinth HD003, as shown by Spherical Membrane HD005b and Planar Membrane HD004b. The porous nature of Spherical Membrane HD005a and Planar Membrane HD004a support release of their air pressure. Deflated Snow Globe HD010 may be placed in a relatively small container for storage or transport, Power Cord HD006 and Data/Power Connection HD007 being looped and placed in the container along with Wi-Fi Client HD008. In one or more embodiments, Power Cord HD006 and or Data/Power Connection HD007 may be disconnected from Plinth HD003 before transport or storage. In one or more embodiments, Data/Power Connection HD007 may be disconnected from Wi-Fi Client HD008 before transport or storage. In one or more embodiments, an impermeable plastic Spherical Membrane HD005a and or Planar Membrane HD004a may be made porous by the introduction of small holes. In one or more embodiments, the rotation of LED Frame HD001a around Pole Attachments HB011a-b may be damped, by for example viscous rotational damping, in order to reduce the risk of wind damage when Spherical Membrane HD005a is deflated and lying on the ground, for example Spherical Membrane HC213a.

Figure 78:
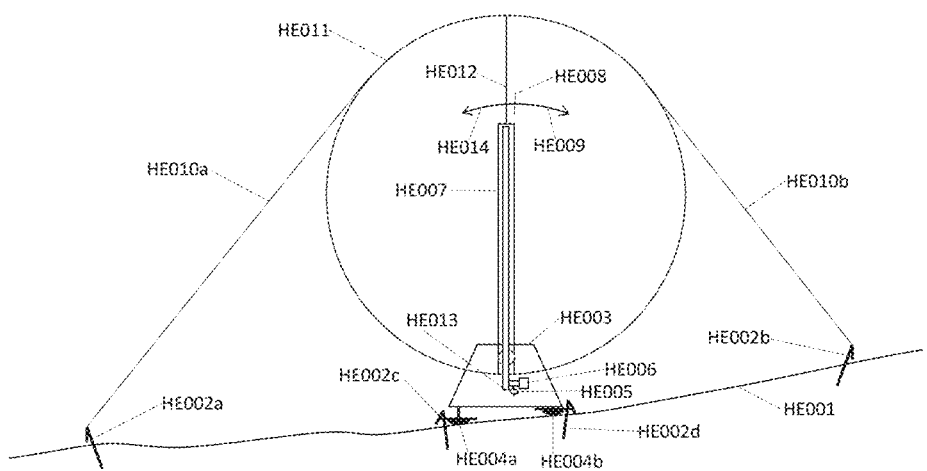
FIG. 78 includes a depiction of an inflatable lawn ornament that is firmly secured to the ground.

FIG. 78 depicts a fully inflated Snow Globe on uneven ground HE001. Adjustable feet HE004a-b have been used to level Plinth HE003, allowing LED Frame HE007 to be vertical, and hence pulling minimally on Planar Membrane HE012, when Spherical Membrane HE011 has its correct fully inflated spherical shape. When Spherical Membrane HE011 is fully inflated Pegs HE002a-b hold the Snow Globe in place using Tethers HE010a-b. When Spherical Membrane HE011 is deflated Tethers HE010a-b may be loose and Pegs HE002c-d hold Plinth HE003 in place against forces that include: wind force on the deflated Spherical Membrane HE011; any forces that arise when Spherical Membrane HE011 is inflated. In one or more embodiments, the Snow Globe includes Spring Loaded Pin HE006, which is positioned such that it is pushing against Rigid Pole HE013 when LED Frame HE007 is more elevated than Angle HE008. Spring Loaded Pin HE006 applies sufficient torque in Direction HE005 that LED Frame HE007 reliably falls in Direction HE009 when Spherical Membrane HE011 loses air pressure. Please note that there are duplicates of Pegs HE002a-d, Tethers HE010a-b, Adjustable Feet HE004a-b, Rigid Pole HE013 and Spring Loaded Pin HE006 on the other side of the Snow Globe. In one or more embodiments, the design of Spring Loaded Pin HE006 should allow Rigid Pole HE013 to pass, if it applies a larger than usual force, and fall in Direction HE014. This should avoid LED Frame HE007 getting stuck in an upright position during high winds, reducing the chance of wind damage.

Figure 79:
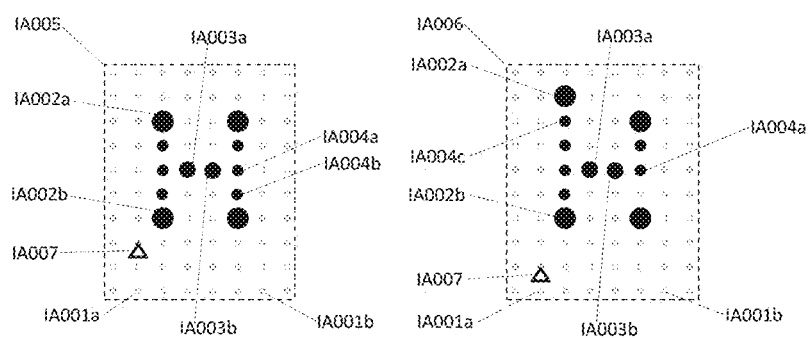
FIG. 79 includes a depiction of a slice from a human computer interface that supports the capture of Light Patterns.

FIG. 79 depicts part of the operation of a human computer interface that may be included in Designer Tool AC001 and used for the entry of one or more Light Models CT001. Interface Slice IA005 depicts an area of a computer display being used for the entry of a Light Pattern, for example Light Pattern CA002, on a square Standard Tessellation BE401. A pattern of empty circles, for example Tessellation Positions IA001a-b, indicate the lights available in the Standard Tessellation. These Standard Tessellation positions may be selected and modified to represent lights that are switched on using the human computer interface. A light that is switched on is depicted with a solid circle, the area of the circle indicating the brightness, and or apparent size, of the light. For ease of illustration, in Interface Slices IA005-6 light circles are drawn solid black on a white background, an HCI may use white or colored solid circles on a black background in order to achieve a more accurate depiction of a nighttime Light Show. In Interface Slice IA005, there are three sizes of solid circle, representing three different levels of light brightness and or apparent size, arranged in the shape of an 'H', for example Dim Lights IA004a-b, On Lights IA003a-b and Bright Lights IA002a-b. Interface Slice IA005 also includes Origin Marker IA007, which is used to define the 2D space of light positions, for example Bright Light IA002b may have position (1, 1) in Interface Slice IA005. In one or more embodiments, the lights of a Standard Tessellation BE401 may display time varying light effects and these may be depicted as changing solid circle sizes and or colors on the human computer interface from which slices are depicted in Interface Slices IA005-6. In one or more embodiments, the display of Light Markers IA001a-b is optional, when these markers are absent the rough position of a light's position may be used to select it. In one or more embodiments, the light circles, Origin Markers and or Tessellation Positions may use a different graphic, for example a grid of crossing lines to represent the Tessellation Positions.

The human computer interface of FIG. 79 may support many different Light Pattern editing operations, for example Add, Copy, Move, Modify Brightness, Delete and Modify Color. Interface Slice IA006 illustrates the same area of the same human computer interface as Interface Slice IA005 after the following four of edit operations: Dim Light IA004b has been switched off; Bright Light IA002a was moved up one light; a new Dim Light IA004c was inserted at the old position of Bright Light IA002a; Origin Marker IA007 was moved down a light. Please note, the movement of Origin Marker IA007 may change the light position of all Light Pattern effects, for example Bright Light IA002b may have position (1, 2) in Interface Slice IA006.

Figure 82:
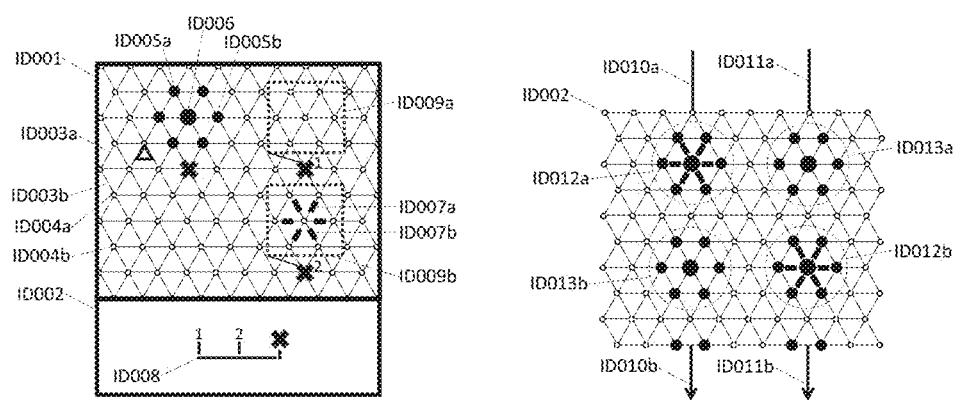
FIG. 82 includes a depiction of windows from a human computer interface that support the capture of a Light Model and Direction Set that have a triangular Standard Tessellation.

The human computer interface of FIG. 79: may also support the addition of Strip Lights and Panel Lights, which is described in more detail by FIG. 82; is editing a Light Pattern for a square Standard Tessellation, not a particular Light Set. Consequently, this human computer interface is part of the exemplar Collaborative Light Show Authoring system that: allows any Light Pattern created to be applied to many different Tessellated Light Sets that use the same Standard Tessellation; creates a symbolic pattern for display on a set of lights with one or more different forms, for example bulb, strip or panel lights; applies to lights which may have significant and clearly visible empty space between them. The human computer interface design that best supports the creation and editing of a Light Pattern may be further developed.

Figure 80:
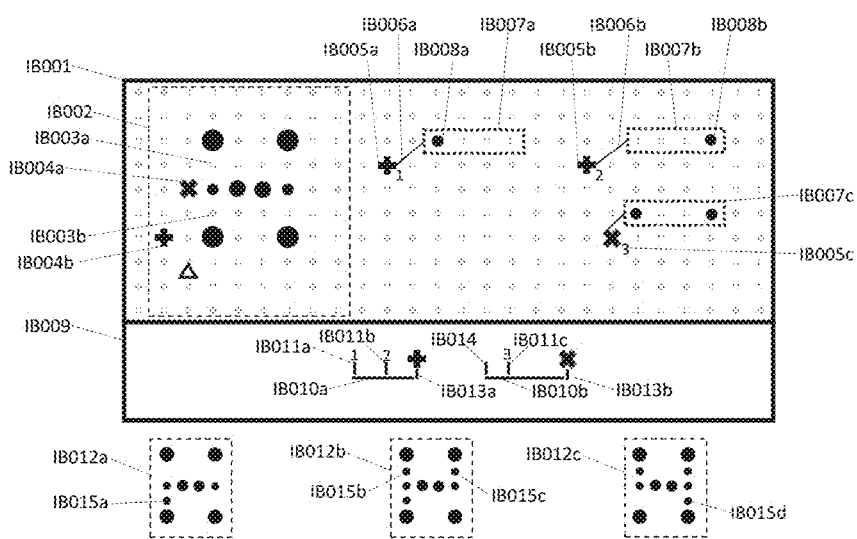
FIG. 80 includes a depiction of windows from a human computer interface that support the capture of a Light Model with a multi-pattern animation.

FIG. 80 extends the Interface Slice depicted in FIG. 79 to include: a Window IB001 that supports the capture of multiple Light Patterns that may be included in a Light Model CT001; a Window IB009 that may be used to capture multi-pattern timelines for an animation of the Light Model CT001 from Window IB001. These simple multi-pattern timelines may be stored in a Direction Set CT006, for the Light Model CT001, and used to create a Light Animation CT011. Window IB001 may be included in the human computer interface of Designer Tool AC001 and Window IB009 may be included in the human computer interface of Director Tool AC002. Window IB001 includes Interface Slice IB002, which is similar to Interface Slice IA005 with the following changes: removal of four of the Dim Lights, for example the Dim Lights that were at IB003a-b, from the 'H'; addition of Dynamic Markers IB004a-b. The Light Model CT001, defined in Window IB001, replaces the removed Dim Lights with: the alternating left/right Dim Lights defined for Dynamic Marker IB004b; a pair of on/off Dim Lights defined for Dynamic Marker IB004a. The alternating left/right Dim Lights associated with Dynamic Marker IB004b are defined by Dynamic Frames IB007a-b. Dynamic Frame IB007a, which has a Dim Light IB008a on the left, is linked to Reference One IB005a by Pattern Link IB006a, and is located by placing Reference One IB005a at Dynamic Marker IB004b. Dynamic Frame IB007b, which has a Dim Light IB008b on the right, is linked to Reference Two IB005b by Pattern Link IB006b, and is located by placing Reference Two IB005b at Dynamic Marker IB004b. Cycling Timeline IB010a defines when Dynamic Frame IB007a or IB007b should be displayed: Pattern Event IB011a is the first Cycling Timeline IB010a event, causing Reference One IB005a to be used, at Dynamic Marker IB004b, to merge the contents of Dynamic Frame IB007a with the 'H' of Interface Slice IB002; Pattern Event IB011b is the second Cycling Timeline IB010a event, causing Reference Two IB005b to be used, at Dynamic Marker IB004b, to merge the contents of Dynamic Frame IB007b with the 'H' of Interface Slice IB002; Loop Event IB013a causes the active time, used on Cycling Timeline IB010a, to loop back to the first pattern event, Pattern Event IB011a. Cycling Timeline IB010b defines when Dynamic Frame IB007c should be displayed: Empty Event IB014 is the first Cycling Timeline IB010b event, causing no Dynamic Frame to be used; Pattern Event IB011c is the second Cycling Timeline IB010b event, causing Reference Three IB005c to be used, at Dynamic Marker IB004a, to merge the contents of Dynamic Frame IB007c with the 'H' of Interface Slice IB002; Loop Event IB013b causes the active time, used on Cycling Timeline IB010b, to loop back to the first pattern event, Empty Event IB014.

Model Lights IB012a-c, of FIG. 80, illustrate a Light Show segment that may be generated using data entered via Windows D3001 and IB009. The light effects from the 'H' of Interface Slice IB002 are active in each of the Model Lights IB012a-c. Initially, this 'H' of light effects is combined with the light effect of Dim Light IB008a, which is associated with Pattern Event IB011a, on Light IB015a to produce the active lights shown in Model Lights IB012a. When Cycling Timeline IB010b transitions from Empty Event IB014 to Pattern Event 113011c, this 'H' of light effects is also combined with the light effects of the Dim Lights, from Dynamic Frame IB007c, on Lights IB015b-c to produce the active lights shown in Model Lights IB012b. When Cycling Timeline IB010a transitions from Pattern Event IB011a to Pattern Event IB011b, this 'H' of light effects is combined with the light effect of Dim Light IB008b on Light IB015d to produce the active lights shown in Model Lights IB012c.

The human computer interface partially depicted in FIG. 80, which includes Windows D3001 and IB009, may supplement the editing procedures described for FIG. 79. The editing procedures added for Window D3001 may include: Add, Copy, Move and Delete for Dynamic Frames, Dynamic Markers and References; Reshape for Dynamic Frames. The editing procedures for Window IB009 may include: Add, Delete, Reorder, Change Dynamic Frame and Change Time for Pattern Events and Empty Events; Change Time for Loop Events. Design optimization of an easy to use human computer interface that includes Windows IB001 and IB009 may be further developed.

Figure 81:
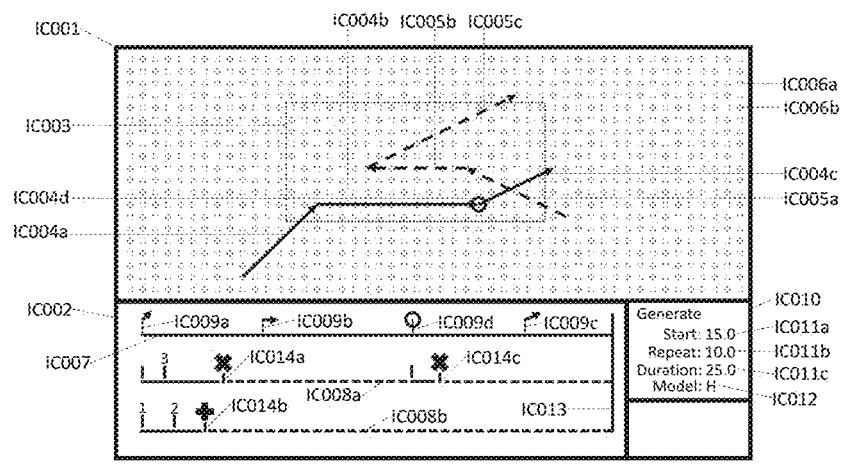
FIG. 81 includes a depiction of windows from a human computer interface that support the capture of a Direction Set with multiple moving Light Models.

FIG. 81 depicts part of the operation of a human computer interface that may be included in Director Tool AC002 and used for the entry of motion and multi-pattern animation timing for one or more Light Models CT001. Window IC001, of this human computer interface, is used to enter and edit the Motion Paths for one or more Light Models CT001. Window IC002 is used to enter and edit Timelines that determine, for the Motion Paths of Window IC001, the timing of multi-pattern animation changes and the relative rate of motion along each Motion Path vector. Window IC010 is used to enter when, and over what time, one or more Light Models CT001 traverse each Motion Path defined in Window IC001. The data entered into Windows IC001, IC002 and IC010 may be included in a Direction Set CT006 that references one or more moving or stationary, and possibly different, Light Models CT001. The depiction of Window IC001 includes: a pattern of empty circles, for example Tessellation Positions IC006a-b, that indicate the lights available in the Standard Tessellation; a Motion Path IC004 that includes Motion Vectors IC004a-c and Pause Point IC004d; a Motion Path IC005 that includes Motion Vectors IC005a-c; a Light Extent IC003 that marks the edge of a Light Set that the Motion Paths entered may work well with. An unselected Motion Path in Window IC001 is drawn as a dashed line, for example IC005, and a selected Motion Path is drawn as a solid line, for example IC004.

When a Motion Path is selected in Window IC001, of FIG. 81, then: Window IC002 shows a number of timelines for it; Window IC010 shows when one or more Light Models CT001 may appear at its start and how long they should spend traversing it. In FIG. 81, Motion Path IC004 is selected and consequently Timelines IC007 and IC008a-b schedule its motion and multi-pattern animation changes. Timeline IC007 may be automatically created in Window IC002 when the Motion Path IC004 is added to Window IC001. This initial Timeline IC007 may use the constant speed model, described in FIG. 34, to determine the fraction of time spent traversing each Motion Vector IC004a-c and assign a short default time, for example 1 second, to the time spent at Pause Point IC004d. In Window IC002, the separation of each Direction Event IC009a-d from the next event, which may be a Direction Event IC009a-d or End Event IC013, may be proportional to a function of the time spent executing the Motion Vector IC004a-c, or Pause Point IC004d, it is associated with. This association is done in time order of Motion Path traversal, for example Direction Event IC009a is for the start of Motion Vector IC004a and End Event IC013 is the time when the light effect activity ends. These associations may be indicated by the direction arrows, or pause circle, in the graphics for one or more of the Direction Events IC009a-d. In one or more embodiments, the separation distances of Events IC009a-e are proportional to the time spent performing each Motion Vector IC004a-c or Pause Point IC004d. In one or more embodiments, the separation distances of Events IC009a-e are proportional to a log, of any base, of the time spent performing each Motion Vector IC004a-c or Pause Point IC004d. Moving Direction Events IC009b-d on Timeline IC007 may alter the speed of travel along Motion Vectors IC004a-c, in one or more embodiments: the speed of travel along each Motion Vector IC005a-c is constant with instantaneous speed changes on transitions; the speed of travel along each Motion Vectors IC005a-c is variable, for example constant acceleration, with the smoothly changing speed behavior persisting across transitions, including transitions to and from Pause Point IC004d.

When a Motion Path is selected in Window IC001, of FIG. 81, then Window IC010 provides a display, for example an HTML form, that may be used to view or change the light effects associated with one or more Light Models that traverse the Motion Path using Label Inputs IC011a-c and IC012. Label Input IC011a holds a Start value of 15 seconds, this should cause the first Light Model CT001, which traverses Motion Path IC004, to become active 15 seconds after the start of the Light Animation CT011. Label Input IC011c holds a Duration value of 25 seconds, this is the time that a Light Model CT001 may be active, and causes the first Light Model CT001 to cease activity, at the end of Motion Vector IC004c, 40 seconds after the start of the Light Animation CT011. Label Input IC011c holds a Repeat value of 10 seconds, this should cause Light Models CT001, which traverse Motion Path IC004, to become active at 10 second intervals after the first, for example the third Light Model CT001 should become active 35 seconds after the start of the Light Animation CT011. Label Input IC012 holds which Light Model CT001 may traverse Motion Path IC004, the 'H' Light Model CT001 from FIG. 80 is specified.

In addition to motion Timeline IC007, Window IC002, of FIG. 81, also depicts animation pattern Timelines IC008a-b, each of which may define how the multi-pattern animations of the selected 'H' Light Model CT001 behave. A similar iconography to FIG. 80 is used, with Timeline IC008b defining the activity of Dynamic Frames IB007a-b relative to Dynamic Marker IB004b and Timeline IC008a defining the activity of Dynamic Frame IB007c relative to Dynamic Marker IB004a. On creation of Motion Path IC004, default Timelines are created for Dynamic Markers IB004a-b from Cycling Timelines IB010a-b: Cycling Timeline IC014a, which is a copy of Cycling Timeline IB010b, is inserted at the start time of Timeline IC008a and schedules the activity of Dynamic Frame IB007c for the duration of Timeline IC008a; Cycling Timeline IC014b, which is a copy of Cycling Timeline IB010a, is placed at the start time of Timeline IC008b and schedules changes between Dynamic Frames IB007a and IB007b for the duration of Timeline IC008b. Subsequent to this initialization, the depiction of Window IC002 is created by the insertion of Cycling Timeline IC014c into Timeline IC008a. This insertion causes inactivity of Dynamic Frame IB007c, for the duration of Timeline IC008a, after its start time is reached.

The human computer interface partially depicted in FIG. 81 enables the creation of Light Animations CT011 with many Motion Paths, and each of these may have traversals, by multiple Light Models, with independent start times. Also, each Light Model traversal may have many light effect updates as a consequence of its Pattern Events, Loop Events and Direction Events. Consequently, it can be seen that a Light Animation CT011 that includes many asynchronous updates may be created.

A Motion Path may be added to Window IC001, of FIG. 81, by selecting start and end Tessellation Positions for each Motion Vector in the Motion Path, for example a double mouse click might be used to select a Tessellation Position for the end of the last Motion Vector, in the Motion Path, after single mouse clicks have been used to select its start and the start and end of all previous Motion Vectors in the Motion Path. When selecting the end point of a Motion Vector the method of data entry from FIG. 36 may be used to limit the selectable Tessellation Positions to those that may be reached via a sequence of Movement Steps. After complete entry of a Motion Path via Window IC001: Window IC002 may show the constant speed initial motion Timeline and default multi-pattern animation Timelines previously described; Window IC010 may show empty Label Inputs. Subsequently, numerical data may be directly entered into Label Inputs IC011a-b and a Model Name may be entered into Label Input IC012. Alternatively, the Model Name for Label Input IC012 may be selected from a list of available Model Names. Also, the initial Timelines in Window IC002 may subsequently be edited: the Timeline position of every Direction Event, except the first one, may be moved in order to change the relative speed along the Motion Vectors of the Motion Path; the Pattern Events and Loops Events of the initial Cycling Timelines may be modified as previously described; Cycling Timelines may be added or deleted and their Pattern Events and Loop Events may be modified as previously described. Window IC001 may be used to add, edit, select or delete Motion Paths and the Motion Vectors or Pause Points in a Motion Path. The human computer interface, partially depicted in FIG. 81, may support the definition of one or more Motion Paths at any time. When a Motion Path is selected, in Window IC001, it may have: one motion Timeline and optionally one or more animation pattern Timelines in Window IC002; the light effects associated with the one or more Light Models that may traverse it in Window IC010. Design optimization of a human computer interface that includes Windows IC001, IC002 and IC010 may be further developed.

Windows ID001 and ID002, of FIG. 82, partially depict the same human computer interface windows as Windows IB001 and IB009, of FIG. 80. However, the empty circles for a square Standard Tessellation layout, available in Window IB001, are replaced, in Window ID001, with a triangular Standard Tessellation layout, similar to Standard Tessellation BC007, which allows entry of both Strip Light and Bulb Light effects. Consequently, Window ID001 includes graphics for the vertices, for example Vertices ID004a-b, and edges, for Example Edges ID003a-b, of the triangular Standard Tessellation. Using methods similar to those described in FIG. 80 light effects for Bulb Lights, for example Dim Lights ID005a-b and On Light ID006, may be created at the vertices of the Standard Tessellation. Similarly, an edge of the Standard Tessellation graphic may be selected and a light effect for the Strip Light specified, these light effects may be represented as rectangular graphics, for example On Strip ID007a-b. Cycling Timeline ID008 interacts with Dynamic Frames ID009a-b using the method that was previously described for the interaction of Cycling Timeline IB010a with Dynamic Frames IB007a-b. A Light Model CT001 with a star shape that includes flashing Strip Lights, for example Star Shapes ID012a-b and ID013a-b, may be created with the human computer interface partially depicted by Windows ID001 and ID002. The human computer interface and method depicted in FIG. 81 may be used, with a Standard Tessellation similar to the triangular Standard Tessellation BC007, to define: vertical Motion Paths ID010a-b and ID011a-b; a series of light effects that traverse these Motion Paths, using Window IC010. The slice of Standard Tessellation ID002 illustrates a visual effect that may subsequently be generated, creating a series of star shapes which alternate between Star Shapes ID012a-b and ID013a-b whilst moving down a Light Set. In one or more embodiments, the human computer interfaces depicted in Windows IB001, ID001 and IC001 may also support the entry and display of light effects for one or more Panel Lights, using selection of the space between the vertices and edges of the Standard Tessellation to configure their brightness and color. This configuration may be represented on the interface's display by a set of pixels, within the vertices and edges that bound the Panel Light, that have a brightness and color representative of that set for the light.

Figure 83:
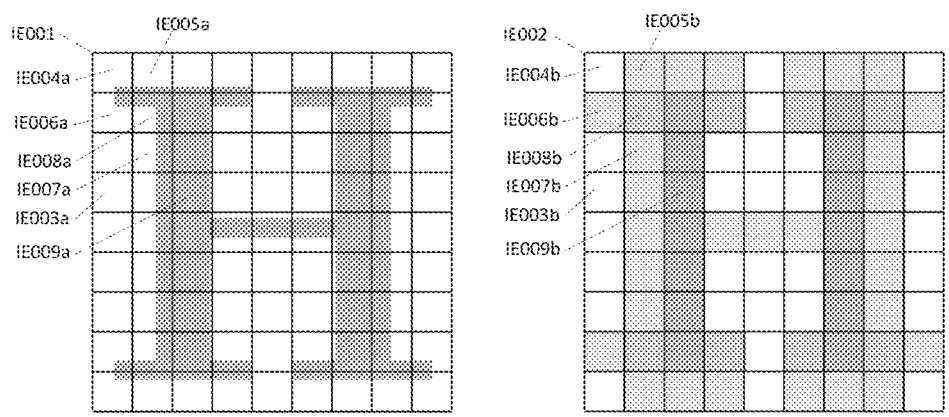
FIG. 83 includes a depiction of the capture of a Digital Picture.

Image Plane IE001, of FIG. 83, depicts the capture of an image by a simple Digital Camera. A printed black 'H' on a planar piece of white paper is observed by a pinhole camera with a parallel Image Plane IE001, creating an image of the 'H' on it. Image Plane IE001 includes a 9×9 Detector array, for example Detectors IE003a-9a, each of which may convert the light it receives into a current which is saved as an electric charge. To capture an image: the electric charge for each Detector is depleted; the shutter of the camera is opened and Image Plane IE001 exposed for a short time; the shutter is closed and the electric charge for each Detector is sampled and converted to a digital signal. This signal includes a number of Pixel values, each of which represents the light intensity level of a Detector as a digital number. Please note, in principal the Image Plane area covered by a Detector may have a number of different shapes, and may not be limited to use, or emulate, a square, or nearly square, shape, as depicted in the exemplary Image Plane IE001.

The picture taken by Image Plane IE001 using the method described above is depicted in Digital Picture IE002, of FIG. 83, which has a 9×9 area of 2 bit, 4 different value, Pixels. In order to generate a high quality picture, each Detector converts light over a substantial fraction of the area of Image Plane IE001 it covers. Consequently, each Detector averages the light intensity over the Image Plane area it covers, for example: the area covered by Detector IE003a has an image of white paper and creates a Pixel Value IE003b of 3; the area covered by Detector IE007a has slightly more white paper than black 'H' and creates a Pixel Value IE007b of 2; the area covered by Detector IE008a has more black 'H' than white paper and creates a Pixel Value IE008b of 1; the area covered by Detector IE009a is all black 'H' and creates a Pixel Value IE009b of 0. It can be seen from FIG. 83 that the capture, storage and display of a Digital Picture normally emulates a standard square detector layout, with a corresponding standard square LED or other light source, to reproduce the Pixel value captured. In order to achieve a high quality image the digital picture method of FIG. 83 normally: has a large number of detectors, for example 1000×1000 or more; has a large number of Pixel bits and values per detector, for example 8 bits or more; has red, green and blue detectors and Pixels. The depiction of FIG. 83 uses much lower resolution in order to illustrate the properties of the method. Please note, the physical implementation of a particular camera or display does not necessarily have a square layout, instead it may emulate one with higher resolution non-square elements and additional processing.

Figure 84:
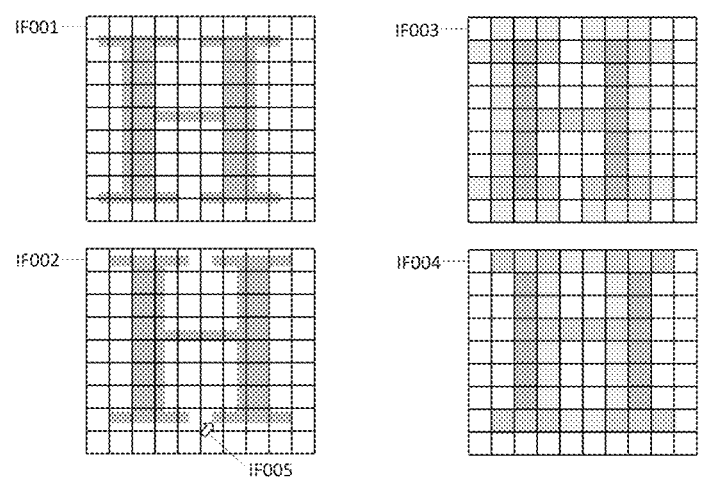
FIG. 84 includes a depiction of the effect of motion on two adjacent Digital Pictures in a Video.

FIG. 84 depicts Image Plane IF001 with the Digital Picture IF003 it generates and Image Plane IF002 with the Digital Picture IF004 it generates. Digital Pictures IF004 is the next frame after Digital Picture IF003, in a Video Sequence, and is taken within a few tens of milliseconds of it. The paper with 'H' written on it was moving relative to the camera at the time Digital Pictures IF003 and IF004 were taken and consequently the 'H' has an Apparent Motion IF005 on the image plane. It can be seen that Apparent Motion IF005 causes the Pixel values between Digital Pictures IF003 and IF004 to vary in a way that cannot be replicated by applying Apparent Motion IF005, with noise changes, to the Pixel values. This happens because the movement is not a whole number of Pixels and consequently the edges of the 'H' have different fractional positions in the Pixels of Digital Pictures IF003 and IF004. This is the fractional picture element effect of FIG. 26, which is a standard part of Digital Videos, but cannot be used in symbolic Light Animations CT011. Consequently, symbolic Light Animations CT011 may have asynchronous updates with fixed movements, not synchronous frame updates with variable movements, see FIGS. 24-28 for more Light Animation CT011 motion details. Some commonly used computer graphics also do not support fractional pixel movement, for example fonts. However, small pixel size, and or blurring during motion, allow such graphics to be moved a whole pixel in either image plane direction, at a rate dithered by the frame rate, without apparent loss of quality. These approaches are also not applicable to symbolic Light Animations CT011 because they require smooth apparent motion, and cannot be blurred, due to the space between lights and insufficient resolution, and have too big a distance associated with each move, due to the large light spacing.

Figure 85:
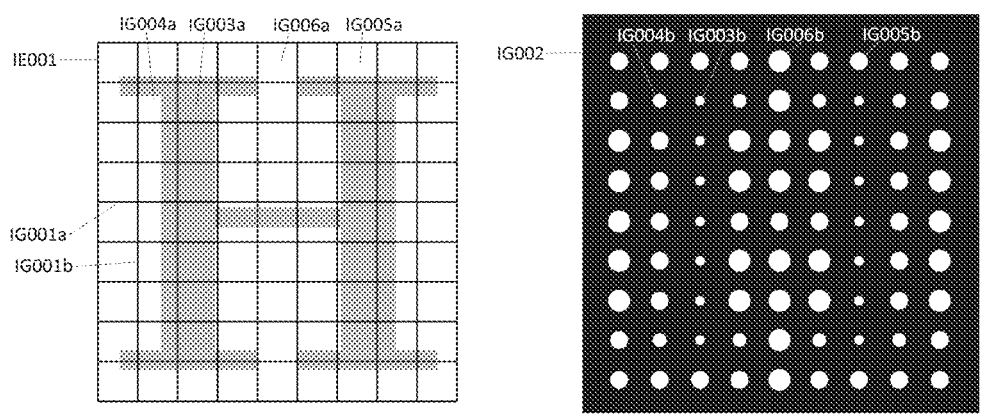
FIG. 85 includes a depiction of the Light Effect produced when a Digital Picture is applied to an array of Bulb Lights.

FIG. 85 demonstrates the poor visual effect that is obtained if a Digital Picture of an 'H' is applied to a 2D array of widely separated Bulb Lights. Image Plane IE001 is provided on the left hand side of the figure for reference. Bulb Effects IG002 shows the application of Digital Picture IE002, which may be generated from Image Plane IE001, to a square array of Bulb Lights with significant distance between the lights. The lights are reproduced as solid white circles, which have an area proportional to their brightness, on a black background, this is the closest paper illustration for low intensity Bulb Lights that are spaced at some distance from each other at night and also corresponds to lights with variable apparent size. It can be seen that the effect produced is nothing like the Light Model CT001 based symbolic 'H' that is depicted in Interface Slice IA004, of FIG. 79. In addition, Digital Picture IE002 may be even less applicable to any Strip Lights aligned with edges of the square Standard Tessellation, for example IG001a-b, as the different light orientations may make the effect even less like the symbolic 'H' desired. Other light configurations, such as a triangular Standard Tessellation, are even less applicable, requiring additional, Tessellated Geometry specific, processing that converts the regular 2D array of Pixel values into a signal for Bulb Lights, Strip Lights and or Panel Lights that are not aligned with it. Only one light configuration can produce a high quality display when directly controlled by a Digital Picture or Video Sequence, the 2D array of square Panel Lights that they are designed to work with. These Panel Lights should also have the properties required for high quality display that are provided in the FIG. 83 description.

The video process described in FIGS. 83-85 applies to both the capture and generation of video imagery. The generation of video based animation, for example animation based on 3D world models or 2D drawing, attempts to emulate the video capture process for large numbers of Pixels. A Light Animation CT011 is a description of a much smaller number of light effect changes that produce a simple symbolic animated effect.

In addition to the spatial description and motion/timing differences between a Video signal and a symbolic Light Animation CT011, the fundamental differences between a video system and the novel exemplar system described herein imply a very different human computer interface for content creation and a different approach for data compression. A human computer interface for entry of symbolic Light Animations CT011 may include an equivalent of the functionality given for the exemplar system in FIGS. 79-82. This functionality is very different to that required of a human computer interface that supports the entry of data that can be used to generate more realistic video imagery or a video based animation. This video creation functionality is typically time consuming and complex to use for even a skilled professional and may include 3D Model editing, perspective projections, natural lighting simulation, the physical properties of objects in a World, transformations in 2D or 3D and many other operations that generate or manipulate large numbers of Pixels. Video compression for non-medical Digital Pictures or Video Sequences, for example JPEG or MPEG, is typically lossy, producing an output with different Pixel values that looks like the intended picture or video sequence. The Light Animations CT011, sent by Internet Server AA001 of the exemplar architecture, are already a compressed version of the Light Controls CW207 sent to Light Interface AE009, in order to display a Light Show, and any additional compression may need to be lossless, for example Lempel-Ziv. Every light in a Physical Light Set should be set to the correct light effect at the correct time for a quality symbolic light animation to be displayed.

The Physical Light Set on which a Light Show, which includes one or more Light Animations CT011, may be displayed is different to that used to display a Video. A Video display is a flat, or smooth, panel with very high Pixel resolution, typically provided by LEDs or a back lit LCD, which provides a high resolution image effect over a contiguous area of its surface. A Physical Light Set used for the display of Light Shows, which include one or more Light Animations CT011, has far fewer Bulb, Strip or Panel lights than the Pixel resolution of a Video display and normally has a mostly see through Planar or 3D form, for example those described by FIGS. 16-21. This Physical Light Set form is: much closer to the light configurations used for other light shows, which also include different types of separated lights arranged in a regular pattern, than a video display; may be used for the display of other light shows; cannot be used for quality reproduction of a video; may be used to display a light show based on the processing of a video, just like other light show systems.

Figure 86:
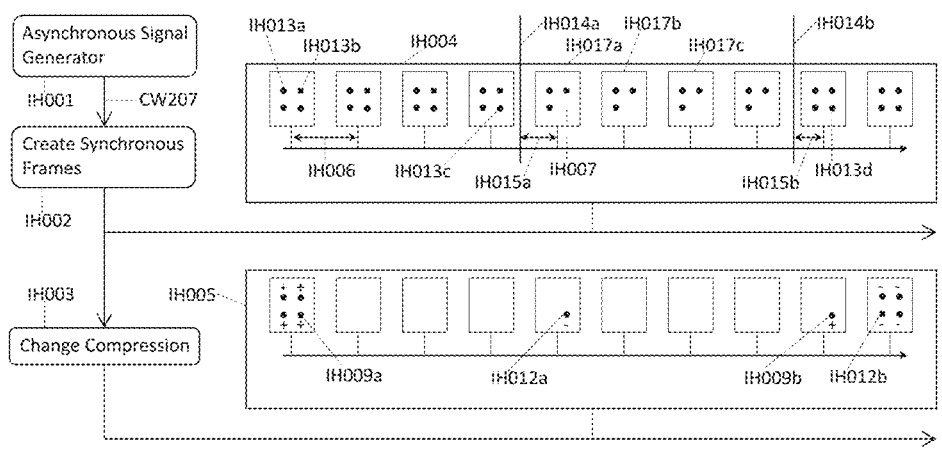
FIG. 86 includes a depiction of a method for converting a Light Control data structure to a synchronous framed representation.

FIG. 86 depicts an example of a method for generating Framed Lights IH004 and Compressed Lights IH005 from a Light Control CW207. Asynchronous Signal Generator IH001 generates one or more Light Control CW207. Create Synchronous Frames IH002 generates a Framed Lights, for example Framed Lights IH004, from each Light Control CW207 provided to it by Asynchronous Signal Generator IH001. Change Compression IH003 generates a Compressed Lights, for example Compressed Lights IH005, from each Framed Light passed to it by Create Synchronous Frames IH002. Example Framed Lights IH004 includes one or more Light Frames, for example Light Frames IH017a-c, which are separated from the next Light Frame by Inter-frame Time IH006. Each Light Frame optionally includes one or more Frame Effects, for example Frame Effects IH013a-d, each of which set the light effects for one Bulb Light, Strip Light or Panel Light for Inter-frame Time IH006. Light Control CW207 includes one or more Control Events CW208, for example Control Events IH014a-b, each of which causes a change to the Frame Effects of the Light Frame sequence, for example: Control Event IH014a causes the removal of Frame Effects IH013c at Position IH007 in subsequent frames; Control Event IH014b causes the placement of Frame Effects IH013d at Position IH007 in subsequent frames. The light effect changes due to Frame Effects occur after the light effect changes that their equivalent Control Event may have produced, for example the removal of Frame Effect IH013c is delayed by Effect Delay IH015a and the addition of Frame Effect IH013d is delayed by Effect Delay IH015b. Consequently, the Light Show produced by a Framed Lights is only equivalent to the Light Control CW207 that produced it if Inter-frame Time IH006 is small enough for all Effect Delays to be below the limit of human perception, for example 20 ms. The values of Inter-frame Time IH006 required for a high fidelity Light Show may lead to many Light Frames including the same light effects, for example Light Frames IH017a-c. This replication may make a Frame Lights data structure large, potentially creating communication bandwidth or cost problems. The, potentially large, size of a Frame Lights data structure may be significantly reduced by converting it to a Compressed Lights data structure, for example Compressed Lights IH005a, that includes Effect Changes, for example Effect Changes IH009a-b and IH012a-b, in place of Frame Effects. There will typically be many fewer Effect Changes than Frame Effects and Effect Changes should only be slightly larger than Frame Effects, allowing the data structure to be a lot smaller, for example the 36 Frame Effects in Framed Lights IH004 become 10 Effect Changes in Compressed Lights IH005. Each Effect Change either: adds a Frame Effect to a Light Frame and subsequent Light Frames until it is removed or replaced, for example Effect Changes IH009a-b; removes a Frame Effect from a Light Frame and subsequent Light Frames, for example Effect Changes IH012a-b. In one or more embodiments, the Compressed Lights or Frame Lights data structures may be further compressed by other compression techniques, for example Lempel-Ziv. In one or more embodiments, Create Synchronous Frames IH002 generates one or more Framed Lights on Internet Server AA001, which sends them to one or more of its clients. In one or more embodiments, Change Compression IH003 generates one or more Compressed Lights on Internet Server AA001, which sends them to one or more of its clients. Please note that a symbolic Light Animation CT011 is fundamentally an asynchronous process that can be converted to a synchronous one that approximates its behavior. Also, please note that Frame Effects are not the simple Pixel values that a video data structure may use, for example they may specify a time changing light effect for a Bulb Light, with the persistent presence of the same Frame Effect in multiple Light Frames, for the same light, producing the time changing effect.

Figure 87:
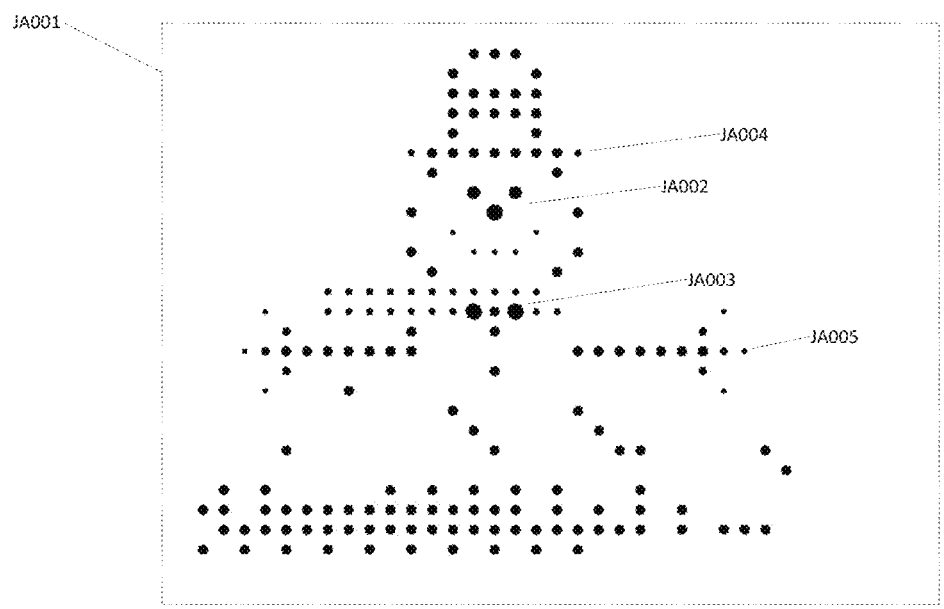
FIG. 87 includes a depiction of a Snow Man Light Effect enhanced by Bulb Lights with varying apparent sizes.

FIG. 87 includes Snowman JA001, which shows light effects for a symbolic snowman Light Model CT001 that may occur, in a Light Animation CT011, soon after Snowman BG005, of FIG. 17. Snowman JA001 includes light effect depictions that use variable size solid circles, whereas Snowman BG005 includes light effect depictions that use fixed size solid circles. The variable sized circles of Snowman JA001 are used for enhancing its appearance, including: enhancing the visual effect of its eyes and nose, at Snowman Position JA002; creating a bowtie effect, at Snowman Position JA003; enhancing the visual effect of its hat by enlarging most of the hat's light effects, for example the smaller hat brim effects at Snowman Position JA004; creating a better finger effect, for example the fingertip effect at Snowman Position JA005. It can be seen that light effects with variable apparent size may make a significant contribution to the aesthetic effect of a Light Show, based on a Light Animation CT011, and that a larger range of apparent size may be used to further enhance a Light Show. These aesthetic improvements are even more apparent when optionally colored lights, of variable apparent size, are used in a dark environment. Please note that: Bulb Lights may have significantly variable apparent size; Strip Lights may have significantly variable apparent width; adjacent Panel Lights may not have a significant apparent size change. The usefulness of apparent size/width changes for Bulb Lights and Strip Lights arises because of the space between them, when they don't have adjacent Panel Lights. Significant apparent size changes may be destructive of the illusion created by a Video display and consequently their creation and use by the novel exemplar system presented is another difference between it and video, or video based animation, systems.

Figure 88:
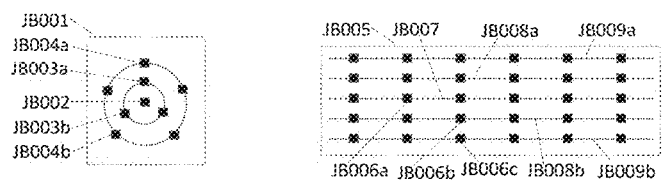
FIG. 88 includes depictions of a Bulb Light/Strip Light with apparent size/width changes increased using multiple component lights.

In one or more embodiments, the multiple light configurations, depicted in FIG. 88, may be used to create a larger apparent size change for the lights in a Physical Light Set. Compound Bulb JB001 has a Central Light JB002 and 2 Light Rings. The inner Light Ring has 2 Lights, for example Lights JB003a-b, and the outer Light Ring has 5 Lights, for example Lights JB004a-b. By brightening the Central Light before Lights on the inner Light Ring and Lights on the inner Light Ring before Lights on the outer Light Ring, Compound Bulb JB001 may look like a Bulb Light with a larger range of apparent sizes than one with a single Bulb Light. A Compound Bulb may have one or more Light Rings. Compound Strip JB005 has a 5 Light Lines JB007, JB008a-b and JB009a-b. Each Light Line in Compound Strip JB005 has 6 Lights, for example Lights JB006a-c, but may have one or more in other Compound Strips. By brightening Light Line JB007 before Light Lines JB008a-b and Light Lines JB008a-b before Light Lines JB009a-b, Compound Strip JB005 may look like a Strip Light with a larger range of apparent widths than one with a single Light Line. A Compound Strip may have one or more Light Lines on either side of its central Light Line.

Figure 89:
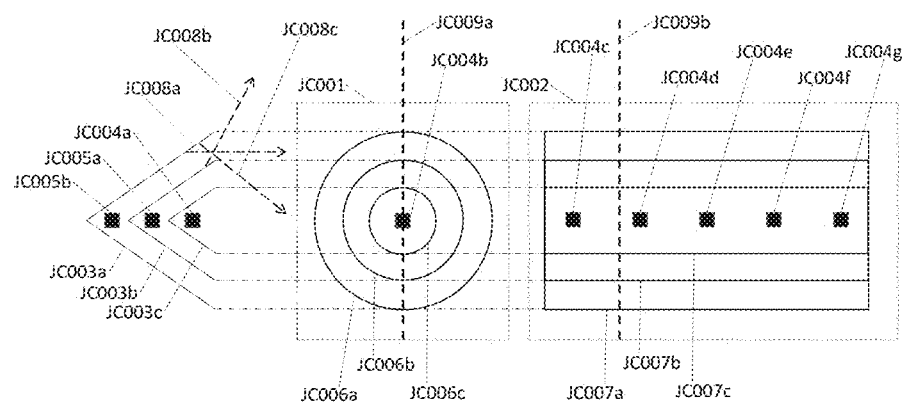
FIG. 89 includes depictions of a Bulb Light/Strip Light with apparent size/width changes increased using multiple component lights.

In one or more embodiments, the multiple light configurations, depicted in FIG. 89, may be used to create a larger apparent size change for the lights in a Physical Light Set. Compound Bulb JC001 and Compound Strip JC002 are both built from a plurality of nested reflectors: Compound Bulb JC001 has three conical Nested Reflectors JC006a-c, which may appear as Nested Reflectors JC003a-c for a cross-section taken along JC009a; Compound Strip JC002 has three Nested Reflectors JC007a-c with V Trough shapes, which may appear as Nested Reflectors JC003a-c for a cross-section taken along JC009b. Lights JC004a-g are within the innermost Nested Reflector and consequently visible from both perspectives. Lights JC005a-b are between Nested Reflectors and consequently are only visible in the cross-section view. The cross section of Compound Strip JC002 uses: Light JC400a to represent the 5 Lights JC004c-g; Lights JC005a-b to each represent 5 Lights within the Nested Reflectors that cannot be seen from the view of Compound Strip JC002. Most of the light emitted by Lights JC005a-b may reflect multiple times off of Nested Reflectors JC003a-c before emerging in many different directions, for example Light Rays JC008a-c. Consequently, any light effects produced by Compound Bulb JC001 and Compound Strip JC002 may be visible from many different directions.

By brightening Light JC004a before Light JC005a and Light JC005a before Light JC005b, Compound Bulb JC001 may look like a Bulb Light with a larger range of apparent sizes than one with the single Bulb Light JC004a. By brightening the Light Line represented by Light JC004a before the Light Line represented by Light JC005a and the Light Line represented by Light JC005a before the Light Line represented by Light JC005b, Compound Strip JC002 may look like a Strip Light with a larger range of apparent widths than one with the single Light Line represented by Light JC004a. A Compound Strip may have one or more Lights between each pair of adjacent nested reflectors.

In one or more embodiments, the multiple lights in Compound Bulbs or Compound Strips, as depicted in FIGS. 88 and 89, may be used for enhanced Light Effects, for example color chasing along a Compound Strip or time varying colors from a Compound Bulb that are simultaneously different at different distances from its center.

Figure 90:
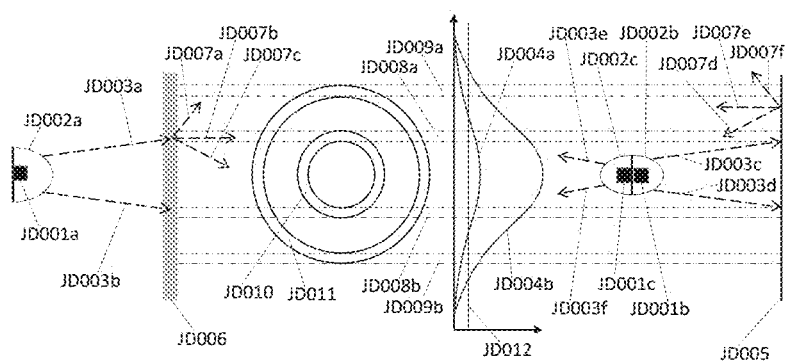
FIG. 90 includes a depiction of a Bulb Light with an enhanced apparent width change.

In one or more embodiments, the apparent size change for an individual light may be enlarged as depicted in FIG. 90. The Light Rays JD003a-d from Lights JD001a-b pass through Lenses JD002a-b, producing directional light beams. A directional light beam has varying brightness with angle, for example a dimmer light may produce Intensity Curve JD004a and a brighter light may produce Intensity Curve JD004b. The Light Beam from Light JD001a shines onto Translucent Diffuser JD006, causing a brightness of its other surface which: emits light over a wide range of viewing angles, for example Light Rays JD007a-c; emits light with varying brightness across the surface, due to the Intensity Curve of the light beam. The Light Beam from Light JD001b shines onto Translucent Reflector JD005, causing a brightness of the same surface which: emits light over a wide range of viewing angles, for example Light Rays JD007d-f; emits light with varying brightness across the surface, due to the Intensity Curve of the light beam. Linear Bands JD008a-b are positioned near to the light beams center and Linear Bands JD009a-b are positioned further from the light beams center. When a dimmer light produces Intensity Curve JD004a, the brightness level within Linear Bands JD008a-b will be above Perceivable Level JD012, the brightness level at which the surface appears lit, and the brightness level within Linear Bands JD009a-b will be below it. When a brighter light produces Intensity Curve JD004b, the brightness level within both Linear Bands JD008a-b and Linear Bands JD009a-b will be above Perceivable Level JD012. Consequently, it can be seen that as the light grows in brightness the surfaces of both Translucent Reflector JD005 and Translucent Diffuser JD006 may appear lit further from the center of the beam. Circular Bands JD010 and JD011 show bands of similar intensity that may be observed on the surface of Translucent Reflector JD005, or Translucent Diffuser JD006, for Linear Bands JD008a-b and JD009a-b if Lenses JD002a-b produced a circular beam, it can be seen that a Bulb Light which includes a Lens that produces a circular beam with a Translucent Diffusor or Reflector may enlarge its apparent size change.

In one or more embodiments, optional Light JD001c and Lens JD002c may be used to produce a light beam facing away from Translucent Reflector JD005, as illustrated by Light Rays JD003e-f. This light beam may be used to enhance the lighting effect from Translucent Reflector JD005, for example when the small apparent light size wanted may be significantly blocked from some angles by Light JD001b. The value of Perceivable Level JD012 that may be used in order to calculate the Bulb Lights apparent size may vary, both with the ambient background light level and due to other lights in the Light Show, in one or more embodiments: the effects of other light from the light show may be calculated and used to adjust Perceivable Level JD012; an Ambient Light Sensor may be used to monitor the ambient light level and hence adjust Perceivable Level JD012.

Figure 91:
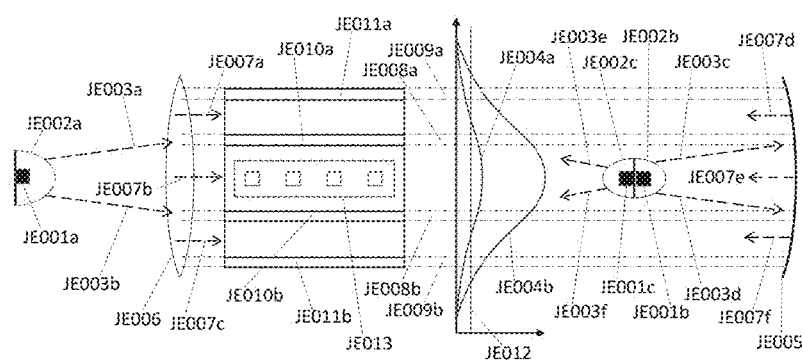
FIG. 91 includes a depiction of a Strip Light with an enhanced apparent width change.

In one or more embodiments, the apparent size change for an individual light may be enlarged as depicted in FIG. 91. The Light Rays JE003a-d from Lights JE001a-b pass through Lenses JE002a-b, producing directional light beams. A directional light beam has varying brightness with angle, for example a dimmer light may produce Intensity Curve JE004a and a brighter light may produce Intensity Curve JE004b. The Light Beam from Light JE001a shines onto Lens JE006, causing: parallel Light Rays JE007a-c to emerge from its other side; light of varying brightness to emerge from its other surface, due to the Intensity Curve of the light beam. The Light Beam from Light JE001b shines onto Specular Reflector JE005, causing: parallel Light Rays JE007d-f to be reflected from its surface; light of varying brightness to be reflected from its surface, due to the Intensity Curve of the incident light beam. Linear Bands JE008a-b are positioned near to the light beams center and Linear Bands JE009a-b are positioned further from the light beams center. When a dimmer light produces Intensity Curve JE004a, the brightness level within Linear Bands JE008a-b will be above Perceivable Level JE012, the brightness level at which the reflected or refracted light rays can be seen, and the brightness level within Linear Bands JE009a-b will be below it. When a brighter light produces Intensity Curve JE004b, the brightness level within both Linear Bands JE008a-b and Linear Bands JE009a-b will be above Perceivable Level JE012. Consequently, it can be seen that as the light grows in brightness Specular Reflector JE005 and Lens JE006 may appear to emit light further from the center of the beam. Linear Bands JE010 and JE011 show bands of similar intensity, corresponding to Linear Bands JE008a-b and Linear Bands JE009a-b, that may be observed to be coming from different points, on the surfaces of Specular Reflector JE005 and Lens JE006, if they and Lenses JE002a-b only varied light intensity in one dimension, for example a trough shape for the surface of Reflector JE005, it can be seen that such an arrangement may enlarge the apparent width change of a Strip Light. Light Bar JE013 illustrates four lights embedded in a Lens that produces variable brightness curves JE004a-b in one dimension, this is an example of the one or more lights that may be included in a Strip Light. A Strip Light created using the method of FIG. 91 may only be visible from an observer position along the path taken by parallel Light Rays JE007a-f.

In one or more embodiments, optional Light JE001c and Lens JE002c may be used to produce a light beam facing away from Specular Reflector JE005, as illustrated by Light Rays JE003e-f. This light beam may be used to enhance the lighting effect from Specular Reflector JE005, for example when the small apparent light size wanted may be significantly blocked by Light JE001b. The value of Perceivable Level JE012 that may be used in order to calculate the Strip Lights apparent width may vary, both with the ambient background light level and due to other lights in the Light Show, in one or more embodiments: the effect of other light from the light show may be calculated and used to adjust Perceivable Level JE012; an Ambient Light Sensor may be used to monitor the ambient light level and hence adjust Perceivable Level JE012.

In one or more embodiments, the apparent width of a Strip Light may be enlarged by replacing Specular Reflector JE005 or Lens JE006, in FIG. 91, with a Translucent Reflector JD005 or Translucent Diffuser JD006, from FIG. 90. The Strip Light produced may emanate light that is visible from a wide range of observer positions. In one or more embodiments, the apparent size of a Bulb Light may be enlarged by replacing Translucent Reflector JD005 or Translucent Diffuser JD006, in FIG. 90, with a Specular Reflector or Lens that may produce parallel light rays from the circular beams generated by Lenses JD002a-b. A Bulb Light created using this method may only be visible from an observer position along the path taken by the parallel light rays produced.

Please note that, the methods illustrated in FIGS. 88-91 are applied in order to achieve larger changes in the apparent size or width of lights when they change brightness. Improving the aesthetic effect of a Light Show by the use of lights with a larger apparent size or width change is another way that the novel exemplar system is different to a video based animation system.

Figure 92:
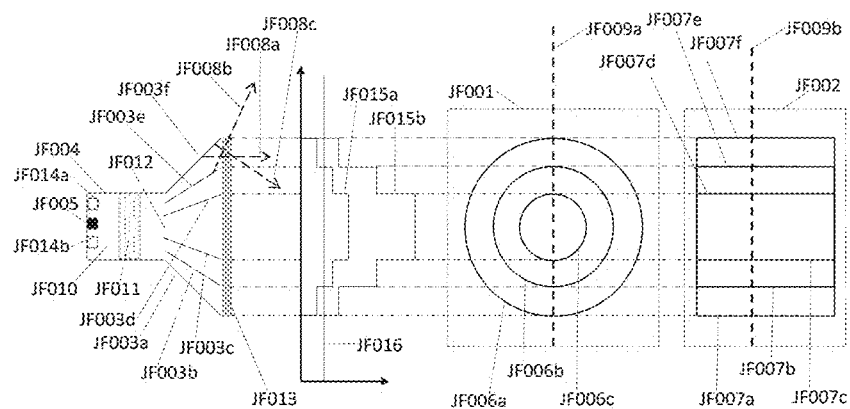
FIG. 92 includes depictions of a Bulb Light and a Strip Light with an enhanced apparent width change.

In one or more embodiments, the apparent size change for an individual light may be enlarged as depicted in FIG. 92. Wider Bulb JF001 and Wider Strip JF002 both include a plurality of nested light baffles: Wider Bulb JF001 has three conical Nested Baffles JF006a-c, which may appear as Nested Baffles JF003a-f for a cross-section taken along JF009a; Wider Strip JF002 has three Nested Baffles JF007a-f with V Trough shapes, which may appear as Nested Baffles JF003a-f for a cross-section taken along JF009b. Light JF005 and Optional Lights JF014a-b produce the light that is seen emerging from Translucent Diffuser JF013. Light Mixer JF011 may include one or more specular reflectors, diffuse reflectors or diffusers in order to spread and mix the light from Light JF005 and Optional Lights JF014a-b. In one or more embodiments, Light JF005 may be a colored LED and Optional Lights JF014a-b may be different color LEDs, for example a red, green and blue set of LEDs. The light entering at Nested Baffles JF003a-f, for example at Entry Position JF012, is of approximately uniform color, in one or more embodiments this light may have uniform brightness, and in other embodiments varying brightness, for different entry positions. The separation of Nested Baffles JF003a-f, and maybe the varying brightness of the entering light, leads to different light intensities arriving at, and leaving from, Translucent Diffuser JF013, as illustrated by Intensity Curves JF015a-b. When a dimmer light produces Intensity Curve JF015a, the light emerging, from the surface of Translucent Diffuser JF013, from between Nested Baffles JF003a-b and Nested Baffles JF003e-f will be below Perceivable Level JF016. When a brighter light produces Intensity Curve JF015b, the light emerging, from the surface of Translucent Diffuser JF013, from between Nested Baffles JF003a-b and Nested Baffles JF003e-f will be above Perceivable Level JF016. Consequently, it can be seen that: as the light emitted by Light JF005 and Optional Lights JF014a-b increases more of the surface of Translucent Diffuser JF013 may appear to be lit; there may be step changes in the size of apparent brightness due to the shape of Intensity Curves JF015. Much of the light emitted by Light JF005 and Optional Lights JF014a-b may reflect multiple times off of Nested Baffles JF003a-f before reaching Translucent Diffuser JF013. Translucent Diffuser JF013 may also disperse light rays in many different directions for each incident direction. Consequently, any light effects produced by Wider Bulb JF001 and Wider Strip JF002 may have many different light ray directions, for example Light Rays JF008a-c, and may be visible from many different directions. In some embodiments, the light mixer may be a light diffuser membrane configured to improve the light uniformity of corresponding display regions on the Translucent Diffuser JF013. In some embodiments, the light diffuser membrane, of Light Mixer JF011, may be disposed in direct contact with the bottom of the nested Baffles JF003a-f to advantageously reduce or eliminate light leakage into different regions separated by the Nested Baffles such that a better animation (of apparent size change) may be obtained.

Figure 93:
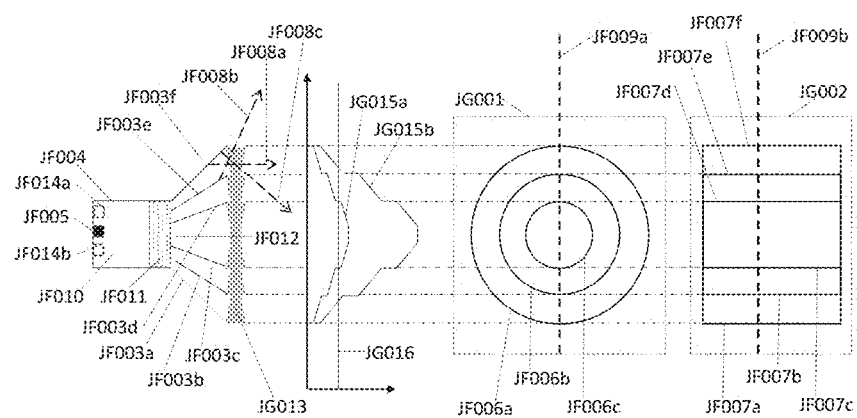
FIG. 93 includes depictions of a Bulb Light and a Strip Light with an enhanced apparent width change.

FIG. 93 depicts a modification of Translucent Diffuser JF013, of FIG. 92, that may be used, in one or more embodiments, to enhance the light effect produced. Translucent Diffuser JG013 allows more light to pass in some places than others. This property is depicted via thickness in FIG. 93, with thicker places passing less light, but may be achieved by one or more other mechanisms, for example a material that is more opaque in some places than others or a material that redirects light as it travels through the material such that more appears in some places than in others. The only differences between Wider Bulb JF001 and Wider Bulb JG001 or Wider Strip JF002 and Wider Strip JG002 are their Translucent Diffuser and the positioning of Light Mixer JF011, their common components being illustrated in FIG. 93 by the use of figure numbers from FIG. 92. The varying light attenuation of Translucent Diffuser JG013 may produce Intensity Curves JG015a, for a low brightness, and JG015b, for a high brightness, of Light JF005 and Optional Lights JF014a-b, it can be seen that: only light that passes between the central Nested Baffles JF003c-d is above Perceivable Level JG016 for Intensity Curve JG015a; light that passes between all the paths created by Nested Baffles JF003a-f is above Perceivable Level JG016 for Intensity Curve JG015b, but only some of the light that passes between Nested Baffles JF003a-b and JF003e-f is above it. It can be seen that, the shape of Intensity Curves JG015 provides a gradual increase, or decrease, in apparent size when the brightness of Light JF005 and Optional Lights JF014a-b varies. The same reasoning used in FIG. 92 to conclude a wide angle of visibility, for the lit surfaces of Wider Bulb JF001 and Wider Strip JF002, may be applied to Wider Bulb JG001 and Wider Strip JG002 of FIG. 93. In one or more embodiments, a diffuser similar to Translucent Diffuser JG013 may be used, in place of Translucent Diffuser JD006 of FIG. 90, to either offset unwanted properties of Lens JD002a or to otherwise enhance the visual effect. In one or more embodiments, the apparent size effects described, in FIG. 93 or FIG. 92, may be applied to shapes other than a Wider Bulb or a Wider Strip, for example a flower shape whose outer petals appear as the light emitted gets brighter relative to the Perceivable Level.

Figure 94:
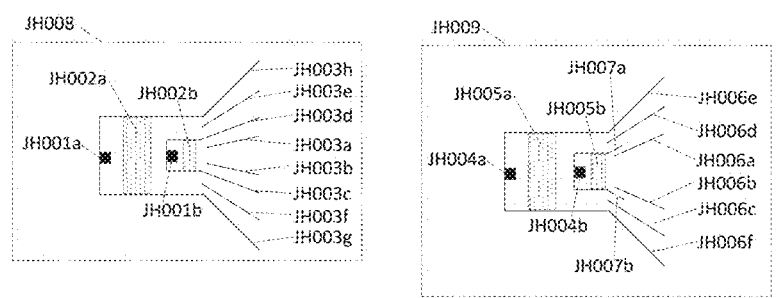
FIG. 94 includes cross sections of light designs, with one or more light sources, which have an increased apparent size or width change.

FIG. 94 depicts two different example configurations which may be used to create, within the Wider Light designs depicted in FIGS. 92 and 93, Wider Lights that support a larger apparent size change in one or more embodiments. Illustration JH008 depicts a configuration with: an inner Wider Light, which may be a Bulb Light or Strip Light, which includes a Light JH001b, Light Mixer JH002b and Nested Baffles JH003a-d; an outer Wider Light, which includes a Light JH001a, Light Mixer JH002a and Nested Baffles JH003c-h. The light pair, of Illustration JHO08, may be used to create a Wider Light whose apparent width ranges from the distance between Nested Baffles JH003a-b up to the distance between Nested Baffles JH003g-h, this light may be used to create effects that cannot be supported by a single light source, for example two different colors within the same Wider Light or a Wider Light that can alternate between being lit in the middle and lit at the edges. In one or more embodiments, Nested Baffles JH003*a-b* and or Nested Baffles JH003*e-f* may not be present. In one or more embodiments, more light may pass between Nested Baffles JH003*a-b* than between Nested Baffles JH003*b-c* or JH003*a* and JH003*d*. In one or more embodiments, more light may pass between Nested Baffles JH003*b-c* or JH003*a* and JH003*d* than between Nested Baffles JH003*a-b*. In one or more embodiments, more light may pass between Nested Baffles JH003*d-e* or Nested Baffles JH003*c* and JH003*f* than between Nested Baffles JH003*f-g* or JH003*e* and JH003*h*. In one or more embodiments, more light may pass between Nested Baffles JH003*f-g* or JH003*e* and JH003*h* than between Nested Baffles JH003*d-e* or Nested Baffles JH003*c* and JH003*f*. Various combinations of these embodiments may support different effects, for example: a single apparent light with higher intensity at its middle and outer edges and a lower intensity zone between them; a single apparent light with higher intensity in the middle and part way between the middle and outer edge; a single apparent light with lower intensity at its middle and outer edges and a higher intensity zone between them.

Illustration JH009, of FIG. 94, depicts a configuration, which may be used in one or more embodiments, that has: an inner Wider Light, which may be a Bulb Light or Strip Light, which includes a Light JH004*b*, Light Mixer JH005*b* and Nested Baffles JH006*a-d*; an outer Wider Light, which includes a Light JH004*a*, Light Mixer JH005*a* and Nested Baffles JH006*a-f*. Partial Baffles JH007*a-b* allow light from Light JH004*a* and Light JH004*b* to mix between Nested Baffles JH006*b-c* and Nested Baffles JH006*a* and JH006*d*. The light pair, of Illustration JH1009, may be used to create a Wider Light whose apparent width ranges from the distance between Nested Baffles JH006*a-b* up to the distance between Nested Baffles JH006*e-f*; this light may be used to create effects that cannot be supported by a single light source, for example three different colors, one of which is the mixed light color, within the same Wider Light or a Wider Light that can alternate between being lit in the middle and lit at the edges. In one or more embodiments, the mixed light may include more light from Light JH004*a* than Light JH004*b*. In one or more embodiments, the mixed light may include less light from Light JH004*a* than Light JH004*b*. In one or more embodiments, the mixed light may include approximately the same light from Light JH004*a* and Light JH004*b*. In one or more embodiments, more light may pass between Nested Baffles JH006*a-b* than between Nested Baffles JH006*b-c* or JH006*a* and JH006*d*. In one or more embodiments, more light may pass between Nested Baffles JH006*b-c* or JH006*a* and JH006*d* than between Nested Baffles JH006*a-b*. In one or more embodiments, more light may pass between Nested Baffles JH006*b-c* or JH006*a* and JH006*d* than between Nested Baffles JH006*d-e* or JH006*c* and JH006*f*. In one or more embodiments, more light may pass between Nested Baffles JH006*d-e* or JH006*c* and JH006*f* than between Nested Baffles JH006*b-c* or JH006*a* and JH006*d*. Various combinations of these embodiments may support different effects, for example: a single apparent light with higher intensity at its middle and outer edges and a lower intensity zone between them; a single apparent light with higher intensity in the middle and part way between the middle and outer edge; a single apparent light with lower intensity at its middle and outer edges and a higher intensity zone between them. The Lights JH001*a-b* and JH004*a-b* may represent multiple light sources, for example LEDs of different colors, and these may be at the different locations illustrated by Optional Lights JF014*a-b* in FIG. 92. Wider Lights that use the multi-light approaches depicted in FIG. 94 may be further developed.

Figure 95:
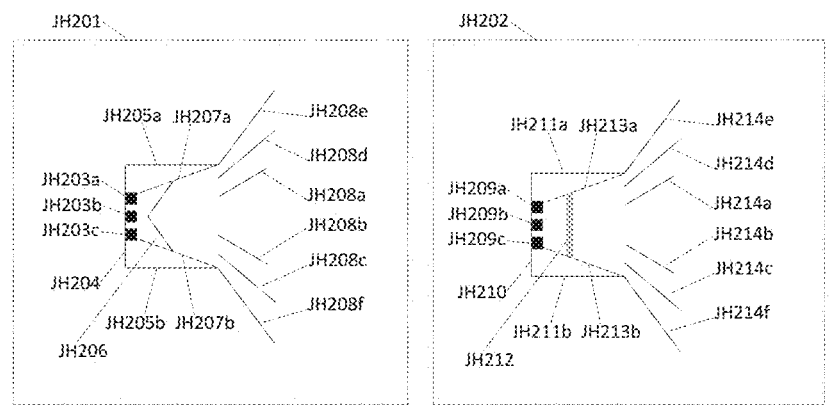
FIG. 95 includes cross sections of light designs, with one or more light sources, which have an increased apparent size or width change.

FIG. 95 depicts two different apparatus that may be used, in one or more embodiments, to provide a Light Mixer JF011. Mixer Apparatus JH201 has the following design: RGB LEDs JH203*a-c* each provide one of red, green or blue light; Specular Surface JH204 and Diffuse Surfaces JH205*a-b* create a Light Box; Specular Surface JH204 provides specular reflection of light rays impinging from within the Light Box; Diffuse Surfaces JH205*a-b* provide diffuse reflection of light rays impinging from within the Light Box; Angled Surface JH206 provides specular reflection of light rays. The geometry of Specular Surface JH204, RGB LEDs JH203*a-c*, Angled Surface JH206 and Diffuse Surfaces JH205*a-b*, ensure there is no direct path from any of RGB LEDs JH203*a-c* to the opening of the Light Box, as depicted by Lines Of Sight JH207*a-b*. Hence, all light rays, from RGB LEDs JH203*a-c*, may reflect off of one of Diffuse Surfaces JH205*a-b* before leaving the Light Box. Consequently, the light leaving, via the opening of the Light Box, may be an approximately uniform mixture of the three colors from RGB LEDs JH203*a-c*. Mixer Apparatus JH202 has the following design: RGB LEDs JH209*a-c* each provide one of red, green or blue light; Specular Surface JH210 and Diffuse Surfaces JH211*a-b* create a Light Box; Specular Surface JH210 provides specular reflection of light rays impinging from within the Light Box; Diffuse Surfaces JH211*a-b* provide diffuse reflection of light rays impinging from within the Light Box; Mixing Block JH212 provides both diffuse reflection and translucent diffusion of light rays. The geometry of Specular Surface JH210, RGB LEDs JH209*a-c*, Mixing Block JH212 and Diffuse Surfaces JH211*a-b*, ensure there is no direct path from any of RGB LEDs JH209*a-c* to the opening of the Light Box, as depicted by Lines Of Sight JH213*a-b*. Hence, all light rays, from RGB LEDs JH209*a-c*, may reflect off of one of Diffuse Surfaces JH211*a-b* or pass through Mixing Block JH212 before leaving the Light Box. Consequently, the light leaving, via the opening of the Light Box, may be an approximately uniform mixture of the three colors from RGB LEDs JH209*a-c*. In one or more embodiments, Specular Surface JH204 or Specular Surface JH210 may be diffuse reflectors. In one or more embodiments, the light sets of FIGS. 90-95 may include red, green, blue and white lights. In one or more embodiments, the Baffles JF003*a-f*, JH003*a-h*, JH006*a-f*, JH208*a-f* and JH214*a-f*, of FIGS. 92-95, may be specular reflectors, diffuse reflectors or light absorbers over part or all of their surfaces. In one or more embodiments, there may be a gap between one or more of Nested Baffles JF003*a-f*, JH003*a-h*, JH006*a-f*, JH208*a-f* or JH214*a-f*, of FIGS. 92-95, and their associated diffusers, for example Translucent Diffuser JF013 or Translucent Diffuser JG013. This gap may allow light from between different baffle pairs to mix and hence change the Intensity Curve produced. In one or more embodiments, there may be a different number of Nested Baffles to the number shown, with Nested Baffles JF003*a-f*, JH003*a-h*, JH006*a-f*, JH208*a-f* and JH214*a-f*, in FIGS. 92-95.

Figure 96:
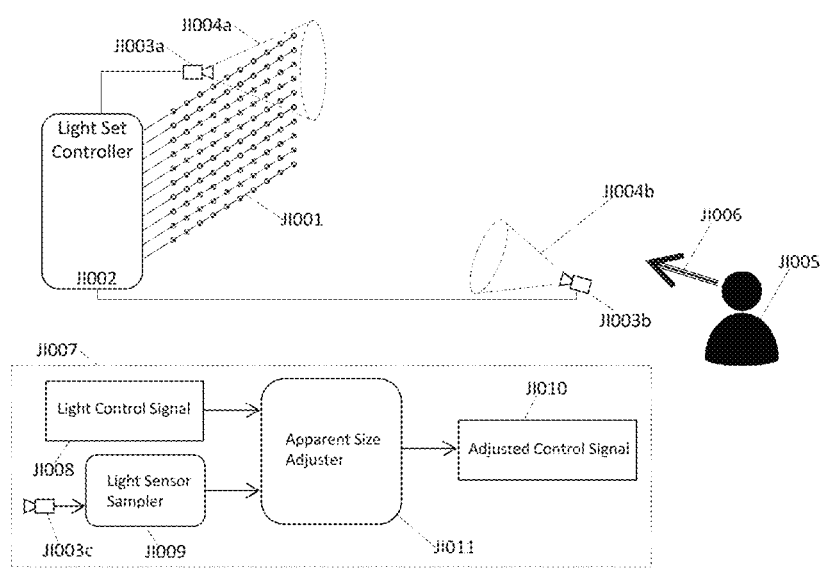
FIG. 96 includes depictions of equipment and a system level block diagram that may be used to adjust light brightness in response to ambient light changes.

The methods for increasing the apparent size variation of one or more lights described in FIGS. 90-95 all rely on the lights brightness relative to the ambient light level. FIG. 96 depicts an exemplar subsystem that may be used, within the exemplar system, to set this relative brightness. Light Set Controller JI002 and Physical Light Set JI001, which may be part of a Light Show Client AA012 in one or more embodiments, are supplemented with one or more of Light Sensors JI003a-b in order to monitor the ambient light level. Light Sensor JI003a is positioned near Physical Light Set 11001, with its Field Of View JI004a looking away from Physical Light Set JI001 towards the expected Viewing Direction JI006 of Observer JI005. Light Sensor JI003b is positioned near the expected position of Observer JI005, with its Field Of View JI004b aligned with the expected Viewing Direction JI006, for Physical Light Set 11001, of Observer JI005. A Light Sensor JI003a or JI003b may include: one or more photodetectors that measure sufficient light frequencies to adequately capture the light level that may be observed by the human eye; optics to capture these light frequencies over an angle that adequately represents the human field of view. The position and orientation of Light Sensor JI003b allows it to capture good information on the background light level, which is the ambient light level plus the background light level change due to the light from Physical Light Set 11001, for Observer JI005. Light Sensor JI003a is positioned such that it can easily be integrated into Physical Light Set 1100, however it makes light level measurements opposing Viewing Direction JI006 and consequently makes less good measurements of the background effect of Physical Light Set JI001 than Light Sensor JI003b. The optimal positioning of a Light Sensor may be further developed. Illustration JI007, of FIG. 96, is a functional diagram for setting light brightness to achieve the desired apparent size of lights. A Light Control Signal JI008, which in one or more embodiments may be a Light Control CW207, is passed to Apparent Size Adjuster JI011 along with one or more background light measurements from Light Sensor Sampler JI009. Apparent Size Adjuster JI011 uses the apparent light sizes requested in Light Control Signal JI008 to set the light brightness of these lights in Adjusted Control Signal 11010. Light Sensor JI003c sends its output signal, which in one or more embodiments may be an analog voltage, to Light Sensor Sampler JI009 which converts it to a series of background light measurements, which in one or more embodiments may be a series of digital samples, which it sends to Apparent Size Adjuster HOW In one or more embodiments, additional lights that are not in Physical Light Set JI001, for example a string of decorative lights, may have their brightness modified by Apparent Size Adjuster HOW One or more of these additional lights may use one or more apparent size increase methods, for example those described in FIGS. 90-95. In one or more embodiments, the enclosure of Light Sensor JI003b may include a light that may be used to increase the background light level near Physical Light Set JI001. The brightness of this light may be adjusted when the ambient light level changes.

Figure 97:
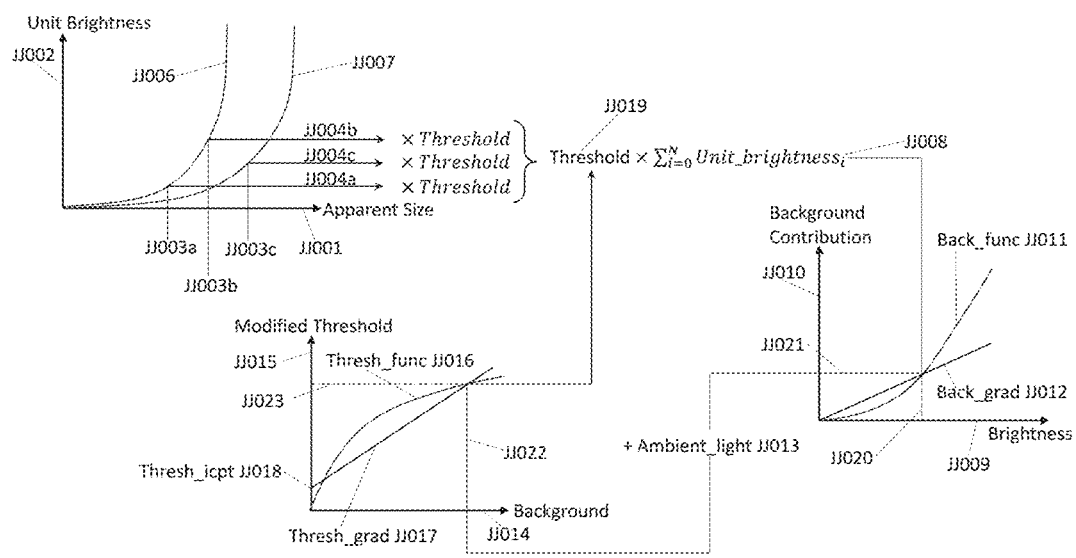
FIG. 97 includes a depiction of a method for adjusting light brightness in response to ambient light changes.

FIG. 97 is a graphical depiction of a method that may be used to set a value for background light Threshold JJ019. Brightness Curves, for example JJ006 and JJ007, provide a function from Apparent Size JJ001 to Unit Brightness JJ002 for one or more different types of lights, for example two types of Wider Light one of which is a Bulb Light and the other a Strip Light. The type of each light in Light Control Signal JI007 is used to obtain its Brightness Curve and this is then used, along with its Apparent Size, to obtain the Unit Brightness JJ002 the light should have, for example Apparent Size JJ003c has Unit Brightness JJ004c and Apparent Sizes JJ003a-b have Unit Brightness JJ004a-b. The Unit Brightness JJ002, for an Apparent Size JJ001, is the brightness that may provide the desired apparent size for a unit Perceivable Level. Threshold JJ019 scales the lights brightness to that which should provide the same Apparent Size JJ001 for the current background light level, as all lights share the same background light level, for any given time, then they may all have the same Threshold JJ019 at this time. The total brightness of Adjusted Control Signal 11010 may be calculated by summing the scaled brightness of all the lights in Physical Light Set 11001 at any time. Moving the scaling Threshold outside of the Unit Brightness summation produces Equation JJ008, which represents, at any given time, the Total Brightness JJ020 of the N lights in Physical Light Set 11001. Total Brightness JJ020, calculated using Equation JJ008, is converted to Light Background JJ021 using a Back_func JJ011 which converts from light Brightness JJ009 to Background Contribution JJ010. In one or more embodiments, Back_func JJ011 may be a linear conversion that passes through the origin and has gradient Back_grad JJ012. Back_grad JJ012, or Back_func JJ011, may vary with both the position and Field Of View JI004 of Light Sensor JI003. Ambient light JJ013 is added to Light Background JJ021 to produce Total Background JJ022. Total Background JJ022 is converted to Threshold JJ023 using a Thresh_func JJ016 which converts from Background JJ014 to Modified Threshold JJ015. In one or more embodiments, Thresh_func JJ016 may be a linear conversion that passes through Thresh_icpt JJ018 and has gradient Thresh_grad JJ017. The Threshold to be used, at any given time and light brightness, can be calculated by solving for a value of Threshold JJ019 that produces a Threshold JJ023 that is the same. A Thresh_func JJ016 may be created using observation of the systems behavior and enhanced via user configuration that modifies the brightness/apparent size of lights, in one or more embodiments a simple "brightness control" may be provided for the user that enables the brightness/apparent size to be tuned to the user's satisfaction via a simple one variable control input. A Back_func JJ011 may be created using observation of the systems behavior and have its parameters set by changes in the background values measured by a Light Sensor J1003. Optimization of the method described by FIG. 97, in the expected conditions of use, may be further developed.

FIG. 98 depicts a number of Equations that may be used by Apparent Size Adjuster JI011, in one or more embodiments, and a Low Pass Filter, or LPF, process that may be used to smooth a signal. These Equations are written for a Light Sensor Sampler J1009 that produces samples at a regular interval, using the subscript T for the sample number, for example Ambient_est$_j$ is the jth estimate for Ambient light JJ013 and Threshold$_j$ is the Threshold JJ019 calculated using the jth sample. Equation JK001 may be obtained from the method of FIG. 97 when a Back_func JJ011 and Thresh_func JJ016 are in use. When Back_func JJ011 and Thresh_func JJ016 are linear then Equation JK002 may be used to describe the method of FIG. 97 in terms which include Back_grad_est$_j$, the Back_grad JJ012 estimate for sample j, Thresh_grad JJ017 and Thresh_icpt JJ018. Equation JK002 may be rearranged as Equation JK003 and used to solve for Threshold from Back_grad_est$_j$, Thresh_grad JJ017, Thresh_icpt JJ018, Ambient_est$_j$ and the sum of the Unit Brightness JJ002, of all lights in Physical Light Set JI001, at sample 'j'. The denominator of Equation JK003 may approach or even become less than zero, in one or more embodiments a positive lower limit may be applied to this denominator in order to avoid generating very large or negative values of Threshold$_j$. The value of Threshold$_j$, calculated by Equation JK003, may also become negative due to errors in the measurement of Ambient_est$_j$, in one or more embodiments a lower limit on Ambient_est$_j$ may prevent it having any, physically meaningless, negative values. Linear Thresh_grad JJ017 and Thresh_icpt JJ018 may be configured from observation and user input in a similar way to Thresh_func JJ016, in one or more embodiments this configuration may include a simple "brightness control". Equation JK004 may be used to calculate Total_brightness$_j$, the brightness of Physical Light Set JI001 for the pattern on display at sample 'j'. Back_grad sample$_j$, which is a sample used to estimate Back_grad JJ012, may be calculated using Equation JK005, which divides the observed change in samples Back_sample$_j$ and Back_sample$_k$, from Light Sensor Sampler JI009, by the calculated change in the light from Physical Light Set 11001 at the time the 'j' and 'k' samples were taken. Sample 'k' is a sample taken before sample T, to reduce changes in the ambient light level, for the sample pair, it will typically be a recent sample and, in one or more embodiments, is the sample immediately before sample 'j'. Equation JK006 may be used to calculate Back contrib$_j$, the Background Contribution JJ010 from Physical Light Set 11001 for the pattern on display at sample 'j'. LPF JK007 may produce smoothed measurements Filtered for a sequence of Sample$_j$. A LPF JK007 may smooth using Equation JK008 with a decay constant Decay$^m$, where 'm' is the number of samples missing between consecutive samples passed to LPF JK007, in order to accommodate missing samples. A LPF JK007 may smooth using Equation JK009 when there are no missing samples or missing samples can be ignored.

Figure 99:
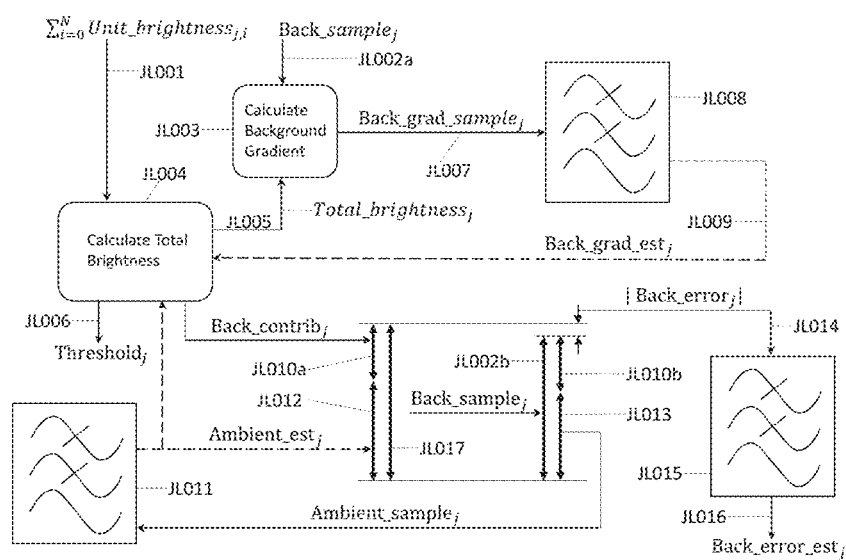
FIG. 99 includes a data processing block diagram that may be used to adjust light brightness in response to ambient light changes.

FIG. 99 depicts a process for adjusting the brightness of lights with enlarged apparent size changes, for example those depicted in FIGS. 90-95, such that they maintain a constant apparent size for varying ambient light levels. The process of FIG. 99 may be used by Apparent Size Adjuster 11011 in one or more embodiments. Calculate Total Brightness JL004 may use Equation JK003 to calculate Threshold JL006 from: Unit Brightness Sum JL001, which is the sum of all Unit Brightness JJ002, from Physical Light Set JJ001, at the time of sample 'j'; Back_grad_est$_j$ JL009, which may be the Filtered$_{j-1}$ value, of Equations JK008 or JK009, from LPF JL008; Ambient_est$_j$ JL012, which may be the Filtered$_{j-1}$ value from LPF JL011. The value of Threshold JL006 may subsequently be used along with Unit Brightness Sum JL001, the sum of all Unit Brightness JJ002 from Physical Light Set JJ001, to calculate, within Calculate Total Brightness JL004, a value for Total_brightness$_j$ JL005 using Equation JK004. The value of Total_brightness$_j$ JL005 may subsequently by used along with Back_grad_est$_j$ JL009 to calculate, within Calculate Total Brightness JL004, a value for Back contrib$_j$ JL010a-b using Equation JK006. Calculate Background Gradient JL003 may use Equation JK005 to calculate Back_grad sample$_j$ JL007, using current and previous values of Back_sample$_j$ JL002a, from Light Sensor Sampler JI009, and Total_brightness$_j$ JL005. In support of this calculation, one or more previous values of Back_sample$_j$ JL002a and Total_brightness$_j$ JL005 may be held by Calculate Background Gradient JL003. To reduce the chances of a change in Ambient light JJ013, these previous values will typically be taken from the very recent past. Calculate Background Gradient JL003 may compare the latest Total_brightness$_j$ JL005 against previous values and use the sample with the largest magnitude of Total_brightness$_j$ JL005 difference for the Back_sample$_k$ and Total_brightness$_k$ of Equation JK005. If no previous sample with a significant Total_brightness$_j$ JL005 difference can be found then no informative Back_grad sample$_j$ JL007 can be calculated for sample 'j'. Consequently, the exemplar system may need to accommodate these missing samples, in one or more embodiments: LPF JL008 may use Equation JK008 to accommodate the missing samples, sending the latest available value of Back_grad_est$_j$ JL009 when no sample is passed to it; Calculate Background Gradient JL003 may send the latest available value of Back_grad sample$_j$ JL007, in place of the missing samples, to an LPF JL008 that uses equation JK009; LPF JL008 may use Equation JK009 and ignore the missing samples, sending the latest available value of Back_grad_est$_j$ JL009 when no sample is passed to it. Ambient_sample$_j$ JL013, which may be sent to LPF JL011, may be calculated by subtracting Back contrib$_j$ JL010b from Back_sample$_j$ JL002b. Back est$_j$ JL017 may be calculated by adding Ambient_est$_j$ JL012 to Back contrib$_j$ JL010a. Back error$_j$ is the difference between Back est$_j$ JL017 and Back_sample$_j$ JL002b. Back error$_j$ Magnitude JL014 may be sent to LPF JL015 and used to produce Back error est$_j$ JL016, which estimates the performance of the process depicted by FIG. 99. In one or more embodiments, Back error$_j$ Magnitude JL014 may be replaced by the square of Back error$_j$. An Ambient_sample$_j$ JL013 is available to LPF JL011 for every sample T, consequently LPF JL011 may use Equation JK009 for its Filtered calculation. A Back error$_j$ Magnitude JL014 is available to LPF JL015 for every sample 'j', consequently LPF JL015 may use Equation JK009 for its Filtered calculation. Threshold JL006 and one or more Brightness Curves, for example JJ006 and JJ007, may be used to calculate the brightness that should be set in Adjusted Control Signal JI010 for every light, in Physical Light Set JI001, that is referenced by Light Control Signal JI008. The optimal setting for the Decay parameter, of Equations JK008 and JK009 when used in LPFs JL008, JL011 and JL015, may be affected by the rate of human visual response, the best value to use may be further developed. In one or more embodiments, Threshold JL006 may have a lower limit that ensures a good dynamic range of light levels are available. In one or more embodiments, Threshold JL006 may have an upper limit that ensures no attempt is made to ask a light for a higher brightness than it can provide. Any light effect change may also change Unit Brightness Sum JL001 and hence lead to a recalculation of Threshold by Calculate Total Brightness JL004. Any new Back_sample$_j$ JL002a-b may lead to an update, by the process depicted in FIG. 99, and a new value for Threshold$_j$, if this value is significantly different from the previous value then the brightness of the light effects displayed, by Physical Light Set 11001, may also change. The calculation of Ambient_sample$_j$ JL013 may produce, physically meaningless, negative values. In one or more embodiments a lower limit may be used to prevent values less than zero.

As both Ambient_est$_j$ JL012 and Back_grad_est$_j$ JL009 are set using Filtered$_{j-1}$ then the process of FIG. 99 should be provided with initial values for them. In one or more embodiments, these initial values may be obtained by: flashing varying numbers of the lights in Physical Light Set 11001 on and off one or more times for randomly selected values of Apparent Size JJ001 and Threshold; making direct measurements of Back_sample$_j$ when the lights are on; making direct measurements of Ambient_sample$_j$ and Back_sample$_j$ when the lights are off; calculating multiple Back_grad sample$_j$ using Equations JK004 and JK005 with the Back_sample$_j$ samples, random Thresholds$_j$ and random Apparent Sizes JJ001; using the last Ambient_sample$_j$ as Ambient_est$_j$ JL012; using an average of Back_grad sample$_j$ as Back_grad_est$_j$ JL009. In one or more embodiments, the initial Back_grad_est$_j$ JL009 may be a fixed value, possibly established in a controlled environment, which can be associated with a typical use of Physical Light Set 11001 and typical placement of Light Sensor JI003.

In one or more embodiments, one or more of LPF JL008 and/or JL011 may be replaced by a more complex predictive filter, for example an alpha-beta filter. In one or more embodiments, short periods when all the lights, in Physical Light Set JI001, are off may be inserted into a light show in order to make improved measurements of the ambient light level. In one or more embodiments, the process of FIG. 99 may be modified to use an equation set based on Back_func JJ011 and or Thresh_func JJ016 in place of the linear equations of FIG. 98, these non-linear equations may be solved using numerical algorithms, for example Newton-Raphson. In one or more embodiments, the equations of FIG. 98 and process of FIG. 99 may operate in a space that is the consequence of non-linear processing of the data samples, for example logarithmic, exponential, square or inverse square functions may be applied to inputs and or outputs. For some Light Sensors JI003 this space change may provide a better fit to the linear, or other, model used and hence better predictions and lower error. In one or more embodiments, if Back error $est_j$ JL016, or Back $error_j$ Magnitude JL014, gets too large then the process of FIG. 99 may reinitialize. In one or more embodiments, if Back error $est_j$ JL016, or Back $error_j$ Magnitude JL014, gets too large then a short period of time may be inserted into the Light Show when all the lights are off, this time period may be used to make a direct measurement of the ambient light level. This measurement may be used to reinitialize LPF JL011 and hence fix any bad value of Ambient_$est_j$ JL012 that may have occurred. In one or more embodiments, one or more of LPF JL008 and or JL011 may be enhanced by the rejection of outliers, samples inconsistent with other recent samples, from their sample data set. In one or more embodiments, outliers may be rejected by keeping a recent history of samples and only using samples that are consistent with the majority of samples in this recent history.

Figure 100:
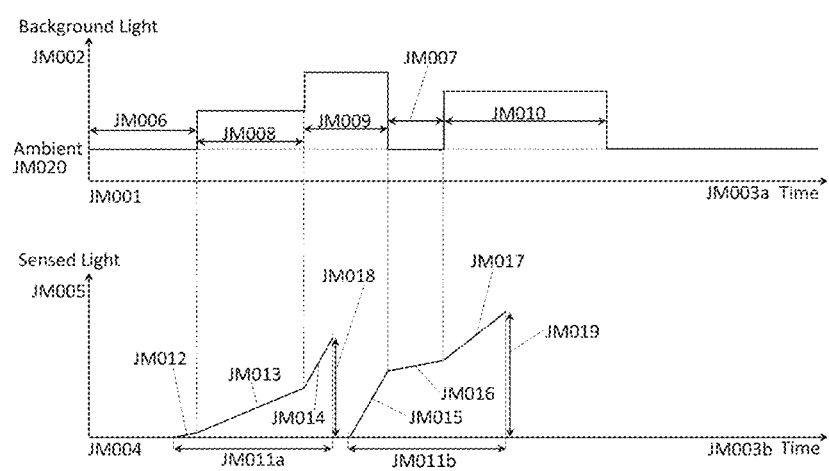
FIG. 100 depicts the behavior of a type of sampling light sensor.

FIG. 100 depicts a type of background light sampling that may be used, in one or more embodiments, by Light Sensor JI003a-c. Graph JM001 depicts the level of Background Light JM002, the ambient light plus the background effect from the lights of Physical Light Set JI001, against Time JM003a. Intervals JM006-7 are for time periods when all the lights, in Physical Light Set JI001, are switched off and hence have the Ambient JM020 light level. Intervals JM008-10 are for time periods when some of the lights, in Physical Light Set 11001, are on. The lights on in Intervals JM008-10 produce a different amount of light in each Interval and consequently the different Background Light JM002 values depicted in Graph JM001. Graph JM004 illustrates the behavior of an exemplar Light Sensor JI003 using a depiction of the Sensed Light JM005, captured by two consecutive samples, for the same Time JM003b as Graph JM001. Sample Intervals JM011a-b are shown for the consecutive light samples along with Background Measurements JM018-19, which are the total Sensed Light JM005 for each sample. It can be seen that Background Measurements JM018-19 are the sum of the light received during their Sample Intervals, with: Background Measurement JM018 measuring light from Intervals JM006, JM008 and JM009; Background Measurement JM019 measuring light from Intervals JM007, JM009 and JM010. The gradual increase of the light received during Sample Intervals JM011a-b is shown in Graph JM004, with: Light Slopes JM012-14 depicting the rise in measured light for Sample Interval JM011a; Light Slopes JM015-17 depicting the rise in measured light for Sample Interval JM011b. The measurements of Background Light with multiple brightness levels, depicted in FIG. 100, may imply, in one or more embodiments, modifications to the process of FIG. 99 in order to accommodate the multiple Unit Brightness Sums and Thresholds per sample. These changes may include: an extended Equation JK004 that uses an active time weighted sum of the multiple Unit Brightness Sum and Threshold pairs that contributed to the sample measured: a modified Calculate Total Brightness JL004 that can assign the correct fraction of each Unit Brightness Sum and Threshold pair to every Back_$sample_j$ JL002a. In one or more embodiments, the timing of sample collection and Sample Interval may be adjusted such that there is constant illumination from the Physical Light Set during each Sample Interval.

An Extended Direction Set, referred to by the text below, is a Direction Set CT006 with additional elements for the new features introduced below, for example Sync Links and Model Offsets. The figures included by this document are intended to illustrate the methods used, they may not be dimensionally accurate or dimensionally consistent across, or even within, different components either between figures or within a figure.

Figure 101:
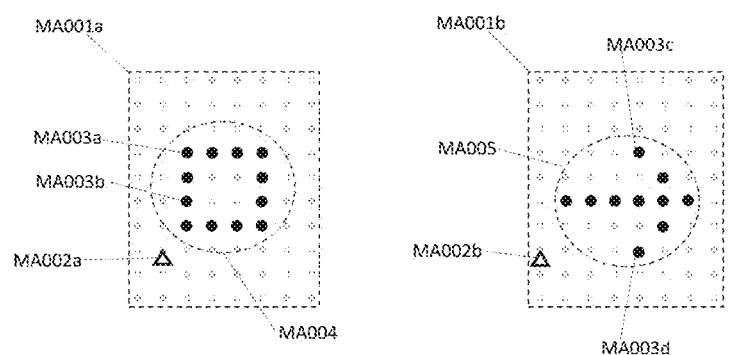
FIG. 101 includes a depiction of two slices from a human computer interface which supports the capture of Light Models.

FIG. 101 depicts the same the same part of the operation of a human computer interface as is depicted in FIG. 79. In place of the 'H' shape modified in FIG. 79 a Square Shape MA004 is depicted in Interface Slice MA001a and an Arrow Shape MA005 is depicted in Interface Slice MA001b. Square Shape MA004 includes Dim Lights MA003a-b and Origin Marker MA002a. Arrow Shape MA005 includes Dim Lights MA003c-d and Origin Marker MA002b. For ease of illustration neither Square Shape MA004 or Arrow Shape MA005 are depicted with Dynamic Frames, however they represent Light Models CT001 which may have Dynamic Frames and their associated Timelines.

Figure 102:
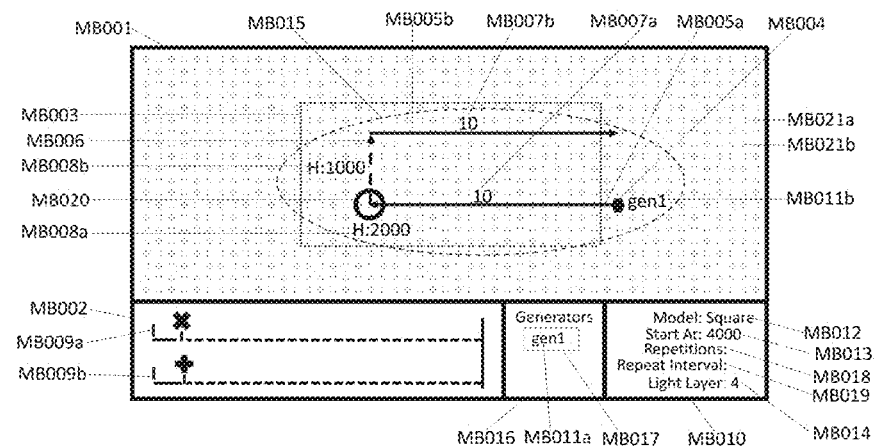
FIG. 102 includes a depiction of windows from a human computer interface which support the capture of an Extended Direction Set that includes a Model Path for a Light Model.

FIG. 102 depicts part of the operation of a human computer interface which, in one or more embodiments, may be included in Director Tool AC002 of the exemplar architecture and be used for the entry of motion and/or multi-pattern animation timing for one or more Light Models CT001. This human computer interface is used by many of the FIGS. 102-120 to illustrate extensions of the human computer interface depicted in FIG. 81. Window MB001 may be used to enter and edit the Model Paths for one or more Light Models CT001. Window MB002 may be used to enter and edit one or more Timelines that may determine the timing of multi-pattern animations included in one or more Light Models CT001. FIG. 102 uses a Square Shape MA004 for the Light Model CT001 of the example data depicted, consequently there are no Dynamic Frames available and Timelines MB009a-b are empty. However, Timelines MB009a-b may provide similar functionality to Timelines IC008a-b, of FIG. 81, when Dynamic Frames are available. In one or more embodiments, a Timeline may not be drawn when it does not have any have Dynamic Frames, this behavior may lead to an empty Window MB002 for the example data of FIG. 102. The human computer interface, depicted in FIG. 102, does not have an equivalent of Timeline IC007, instead it defines the speed of movement, and time spent stationary, of one or more Light Models CT001 using one or more Model Paths, for example Model Path MB015. The role and display of Model Paths in FIG. 102 is significantly different from the role and display of Motion Paths in FIG. 81, hence the new name. The data entered into Windows MB001, MB002, MB010 and MB016 may be included in an Extended Direction Set that references one or more moving or stationary Light Models CT001. Black graphics may be used for any selected Model Path and grey graphics for all other Model Paths, in Window MB001.

Window MB001, of FIG. 102, may be used to create, edit or remove one or more Model Paths and each of these can include one or more Light Models CT001 in an Animation CT011. The depiction of Window MB001, in FIG. 102, includes: a pattern of empty circles, for example Tessellation Positions MB021a-b, that indicate the lights available in the Standard Tessellation; a Model Path MB015 that includes Start Point MB004, Move Segments MB005a-b, Pause Point MB020 and Hold Segment MB006; a Light Extent MB003 that marks the edge of a Light Set that any Model Paths entered may work well with. Move Segments, Pause Points and Hold Segments are, along with other things introduced later in this document, all types of Path Segment. When a Model Path has no Path Segments it may be set to zero time duration and hence any Light Model CT001 associated with it should not be seen in any Animation CT011 created. The Path Segments of any other Model Path may include any combination of Path Segment types and if these segments have durations greater than 0 they may cause any Light Model CT001 associated with the Model Path to be seen in any Animation CT011 created.

When a Model Path is selected in Window MB001, of FIG. 102, then: the color of the graphics for any Start Point or Path Segments in the Model Path may be changed from grey to black; Window MB016 may show any Generators available for the Model Path. When a Generator is selected in Window MB016 then: Selection Box MB017 is drawn around the displayed name of the Generator; any available Move Speeds or Hold Times for the selected Model Path may be shown in Window MB001; Window MB002 may show Timelines for the Dynamic Markers included in the Light Model for the Generator; Window MB010 may show the Model Name, Start At time, Light Layer and, if they are available, the number of Repetitions and their associated Repeat Interval. In FIG. 102, Model Path MB015 and Generator MB011a, with name "gen1", are selected, consequently: Move Speeds MB007a-b and Hold Times MB008a-b, for Model Path MB015, are included in the display of Window MB001; empty Timelines MB009a-b for Square Shape MA004 are included in the display of Window MB002; Window MB010 includes a display of "Square" for Model Name MB012, a display of "4000" for Start At MB013 and a display of "4" for Light Layer MB014. Generator MB011a has no repetitions associated with it, hence Repetitions MB018 and Repeat Interval MB019 are empty. Move Speed MB007a is for Move Segment MB005a. Hold Time MB008a is for Pause Point MB020. Hold Time MB008b is for Hold segment MB006. Move Speed MB007b is for Move Segment MB005b. In one or more embodiments, if a Model Path has only a single Generator associated with it then that Generator may be auto-selected when the Model Path is selected.

When a Model Path is selected in Window MB001 and a Generator in Window MB016, of FIG. 102, then Window MB010 may be used to view or enter various parameters associated with traversal of the Model Path by a Light Model CT001. For a given selected Model Path and Generator these parameters may include: Model Name MB012 which may be used to view or change the Light Model CT001 that should traverse the Model Path; Start At MB013 which may be used to view or change the time that Light Model CT001 should start traversing the selected Model Path, this time may be expressed in milliseconds since the start of the animation; Light Layer MB014 which may be used to view or change the Light Layer, of FIG. 45, that may be used for display of Light Model CT001; Repetitions MB018 which may be used to view or set the number of times a Light Model CT001 should traverse a Model Path due to its use by the selected Generator; Repeat Interval MB019 which may be used to view or set the time between successive repetitions due to Repetitions MB018, this time interval may be expressed in milliseconds.

The description provided for animation pattern Timelines IC008a-b, of FIG. 81, may be applicable to Timelines included in Window MB002.

The human computer interface partially depicted in FIG. 102 enables the creation of Light Animations CT011 with many Model Paths, and each of these may have traversals, by one or more Light Models CT001, with independent start times. Also, each Light Model traversal may have many light effect updates as a consequence of its Pattern Events and Loop Events. Consequently, it can be seen that a Light Animation CT011 that includes many asynchronous updates may be created.

A Model Path may be added to Window MB001, of FIG. 102, by selecting start and end Tessellation Positions for each Path Segment in the Model Path, for example a double mouse click might be used to select a Tessellation Position for the end of the last Path Segment, in the Model Path, after single mouse clicks have been used to select its start and the start and end of all previous Path Segments in the Model Path. When selecting the end point of a Path Segment the method of data entry from FIG. 36 may be used to limit the selectable Tessellation Positions to those that may be reached via a sequence of Movement Steps. On creation, Path Segments may default to Move Segments or Hold Segments and may subsequently be converted between types using mouse clicks in one or more segment converting mouse modes. One or more Pause Points may be added to a Model Path using a pause point creating mouse mode. After initial entry and selection of a Model Path via Window MB001: the display Window MB002 may include the default multi-pattern animation Timelines or, in one or more embodiments, be empty; Window MB010 may show empty values for Label Inputs MB012-14 and MB018-19; the display of Window MB016 may include an empty list of Generators. Subsequently, a Generator may be added and its name displayed in Window MB016 and then: numerical data may be directly entered into Label Inputs MB013-14 and MB018-19; a name may be entered into Model Name MB012. In one or more embodiments, the name for Model Name MB012 may be selected from a list of available Model Names. Also, the initial Timelines in Window MB002 may subsequently be edited: the Pattern Events and Loops Events of the initial Cycling Timelines may be modified as previously described using FIGS. 80-81; Cycling Timelines may be added or deleted and their Pattern Events and Loop Events may be modified as previously described using FIGS. 80-81. Window MB001 may be used to add, edit, select or delete Model Paths or their Path Segments. The human computer interface, partially depicted in FIG. 102, may support the definition of one or more Model Paths at any time. When a Model Path is selected, in Window MB001, it may have: optionally one or more animation pattern Timelines displayed in Window MB002; one or more Generators displayed in Window MB016; parameters for the light effects associated with the one or more Light Models that may traverse it displayed in Window MB010, one Light Model's parameter set at a time. Design optimization of a human computer interface that includes Windows MB001, MB002, MB010 and MB016 may be further developed.

In one or more embodiments, Move Speeds and Hold Times may be per Generator, with their displayed value changing as different Generators are selected. In one or more embodiments, Move Speeds and Hold Times may be per Path Segment, with their value being displayed on Model Path selection and remaining constant across Generator selection. In one or more embodiments, Move Speeds and Hold Times may have defaults per Path Segment that can be customized on a per Generator basis. In one or more embodiments, one or more of Label Inputs MB012-14 and/or MB018-19 may be per Generator, with their displayed value changing as different Generators are selected. In one or more embodiments, one or more of Label Inputs MB012-14 and/or MB018-19 may be per Model Path, with their value being displayed on Model Path selection and remaining constant across Generator selection.

Figure 103:
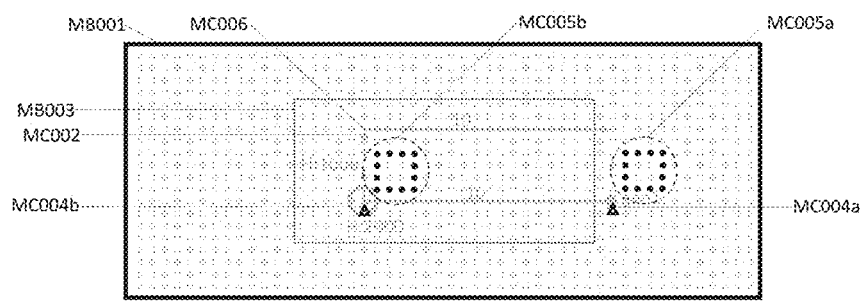
FIG. 103 includes a depiction of the Light Model motion created by an Extended Direction Set.

FIG. 103 depicts the display of an animation that may be created by the example data used in the user interface depiction of FIG. 102. The origin of Square Shape MA001a starts at Origin Position MC004a, moves to Origin Position MC004b, pauses at this position for a while and then moves back to Origin Position MC004a, causing the light effects of Square Shape MA001a to move from Effect Positions MC005a to Effect Positions MC005b and back. If used with a Physical Light Set with Light Extent MB003 then these light effects may appear to enter from the right hand side of the Physical Light Set, cross the display to Effect Positions MC005b, pause there for a time and then move back across the Physical Light Set and exit its right hand side.

Move Segment MB005a has a Move Speed MB007a of 10 lights per second, consequently each step between adjacent lights should take 100 ms and the time taken to move the 20 steps from Origin Position MC004a to Origin Position MC004b, using Move Segment MB005a and Move Speed MB007a, is 2000 ms. Similarly, it should take 2000 ms to move the 20 steps in Move Segment MB005b at the 10 lights per second of Move Speed MB007b. Model Path MB015 has a Start At MB013 of 4000 ms, hence Square Shape MA001a should arrive at Origin Position MC004b 6000 ms after the start of the Animation CT011. Immediately after this move Pause Point MB020 and Hold Segment MB006 should cause Square Shape MA001a to stay at Origin Position MC004b for Hold Times MB008a-b, or 3000 ms. Subsequently, Move Segment MB005b may start moving Square Shape MA001a from Origin Position MC004b 9000 ms after the start of the Animation CT011, causing it to arrive back at Origin Position MC004a 11000 ms after the start of the Animation CT011. Please note Move Segments define a move vector for the Light Model CT001 they move, not an absolute move position, consequently the move due to Move Segment MB005b starts at Origin Position MC004b, not Position MC006. The Hold Time of Hold Segments is not affected by their magnitude or direction. The Hold Time of Hold Segments will normally be restricted to values greater than or equal to 0, but this may not be the case in one or more embodiments. In one or more embodiments, the Hold Time of Hold Segments may be restricted to integer values. The step time of Move Segments will normally be restricted to values greater than or equal to 0 with a value of 0 representing a Leap, but this may not be the case in one or more embodiments. In one or more embodiments, the step time of Move Segments may be restricted to integer values. A Leap is a single step move which has the magnitude and direction of its Move Segment and uses 0 time to transition the move vector represented by its Move Segment. As Hold Segments do not represent movement then they are not necessarily bound by the start/end relative position limiting method of data entry from FIG. 36. In one or more embodiments, the method of data entry from FIG. 36 may be applied to Hold Segments. Applying this limitation may make some user interface operations in Window MB001 easier, for example converting a Hold Segment to a Move Segment. A Move Segment with a time interval of 0 may Leap and hence have only one move step which can be of arbitrary magnitude and direction. In one or more embodiments, a Move Segment which Leaps may not be bound by the start/end relative position limiting method of data entry from FIG. 36.

Figure 104:
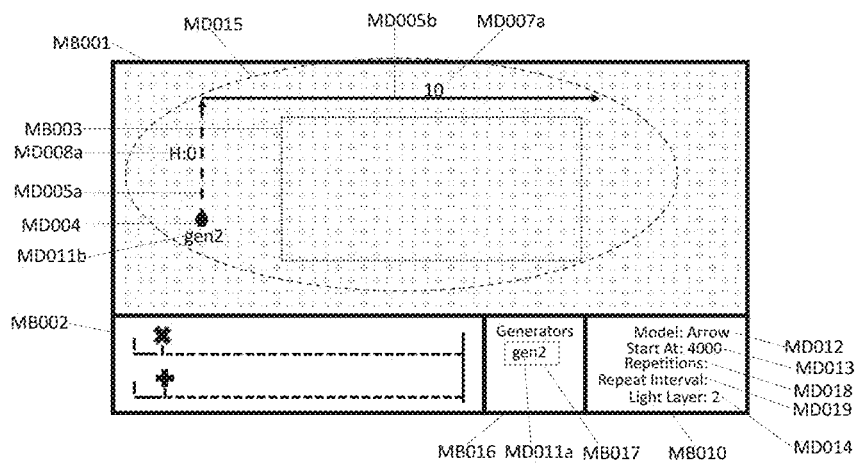
FIG. 104 includes a depiction of windows from a human computer interface which support the capture of an Extended Direction Set that includes a Model Path for a Light Model.

FIG. 104 depicts the human computer interface of FIG. 102 with different example data. Selected Model Path MD015 includes: Start Point MD004; Hold Segment MD005a which has Hold Time MD008a; Move Segment MD005b which has Move Speed MD007a. The Generator MD011a, with name 'gen2', for the selected Model Path has been selected using Selection Box MB017, consequently Window MB010 is displaying the following parameters for Generator MD011a: Model Name MD012 which is set to reference Arrow Shape MA001b by the text 'Arrow'; Start At MD013 which is set to 4000 ms; Light Layer MD014 which is set to 2.

Figure 105:
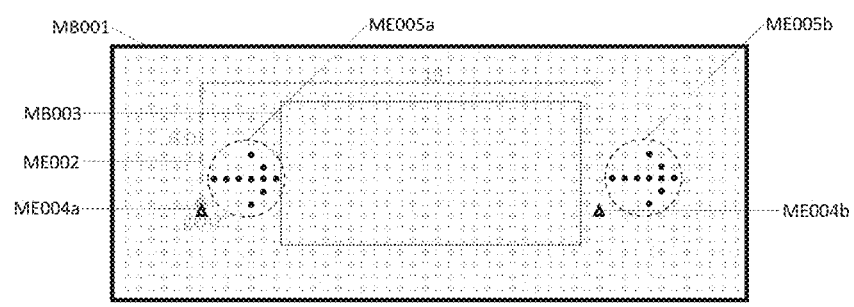
FIG. 105 includes a depiction of the Light Model motion created by an Extended Direction Set.

FIG. 105 depicts the display of an animation that may be created by the example data used in the user interface depiction of FIG. 104. Origin MA002b of Arrow Shape MA001b starts at Origin Position ME004a and moves to Origin Position ME004b, causing the light effects of Arrow Shape MA001b to move from Effect Positions ME005a to Effect Positions ME005b. If used with a Physical Light Set with Light Extent MB003 then these light effects may appear to enter from the left hand side of the Physical Light Set, cross it and exit through its right hand side. Move Segment MD005b has a Move Speed MD007a of 10 lights per second, consequently each step between adjacent lights should take 100 ms and the time taken to move the 32 steps from Origin Position ME004a to Origin Position ME004b, using Move Segment MD005b and Move Speed MD007a, is 3200 ms. Model Path MD015 has a Start At MD013 of 4000 ms and Hold Segment MD005a has a Hold Time MD008a of 0ms, hence Arrow Shape MA001b may leave Origin Position ME004a 4000 ms after the start of the Animation CT011 and arrive at Origin Position ME004b 7200 ms after it.

Figure 106:
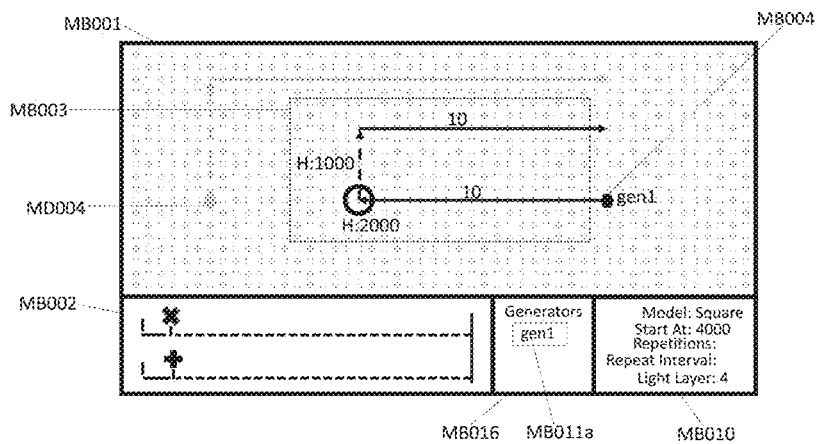
FIG. 106 includes a depiction of windows from a human computer interface which support the capture of an Extended Direction Set that includes multiple Model Paths.

FIG. 106 depicts the human computer interface of FIG. 102 displaying example data that includes both Model Path MB015, with Start Point MB004, and Model Path MD015, with Start Point MD004. The depiction is for a time when Model Path MB015 and Generator MB011a are selected. An Animation CT011 created for Light Extent MB003 from the example data of FIG. 106 should have: Arrow Shape MA001b entering from the left and Square Shape MA001a entering from the right; the shapes crossing each other near the middle of Light Extent MB003, with Light Effects from Arrow Shape MA001b, which has a Light Layer of 2, overtop those of Square Shape MA001a, which has a Light Layer of 4; Arrow Shape MA001b exiting on the right shortly after the effects from Square Shape MA001 pause on the left; Square Shape MA001a pausing for a while on the left and then moving to the right, exiting on the right around 11000 ms after the start of the Animation CT011.

Figure 107:
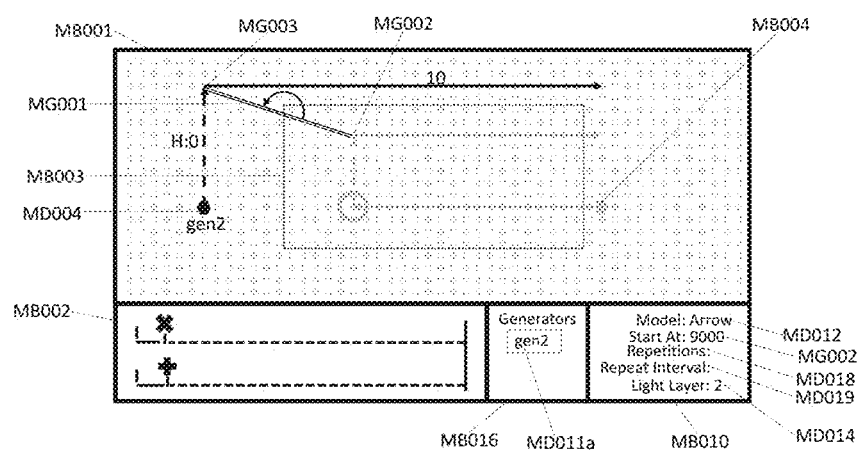
FIG. 107 includes a depiction of windows from a human computer interface which support the capture of an Extended Direction Set that includes multiple Model Paths which are connected using Sync Links.

FIG. 107 depicts the human computer interface of FIG. 102 displaying example data that includes: Model Path MB015, with Start Point MB004; Model Path MD015, with Start Point MD004; Sync Link MG001, which connects Model Path MB015 to Model Path MD015. The depiction is for a time when Model Path MD015 and Generator MD011a are selected. The example data of FIG. 107 is similar to that provided in FIG. 106 with the addition of Sync Link MG001. The effect of a Sync Link is to change the per Generator Start At times of the Model Path which includes its Sync To End such that every Light Model CT001 which traverses this Model Path, and is not produced by a Repetition, arrives at the Sync To End at the same time as the last Light Model CT001, for all Generators which use the other Model Path, arrives at the Sync From End included by the other Model Path. For FIG. 107, Sync Link MG001 may change the Start At time of Model Path MD015, for Generator MD011a, such that the traversal of Model Path MB015, for Generator MB011a by Square Shape MA001a, arrives at Sync From End MG002 at the same time as the traversal of Model Path MD015, for Generator MD011a by Arrow Shape MA001b, arrives at Sync To End MG003. As the traversal of Model Path MB015, for Generator MB011a by Square Shape MA001a, arrives at Sync From End MG002 9000 ms after the start of the Animation CT011 and the only Path Segment between Sync To End MG003 and the start of Model Path MD015 is Hold Segment MD005a with Hold Time MD008a, which is Oms, then the Start At of Model Path MD015 for Generator MD011a should be set to 9000 ms after the start of the Animation CT011 by Sync Link MG001. In one or more embodiments, the Start At label input for the Model Paths at both ends of the link may remain editable, the changing of either Start At affecting the other. In one or more embodiments, the Start At of the Model Path connected to the Sync To End becomes read only, changing as the Start for the Model Path connected to the Sync From End is changed. In the example of FIG. 107, Start At MD012, which is for Model Path MD015 connected to Sync To End MG003, becomes read only, changing on events which include changes to the Start At of Model Path MB015 or the Sync Link MG001 connecting Model Paths MB015 and MD015. In one or more embodiments, the synchronizing event for the Sync From End of a Sync Link may be something other than the arrival time of the last traversing Light Model CT001, for example it may be the leave time of the first traversing Light Model CT001 or the average arrival time of all the traversing Light Models CT001. Please note, phrases like "Light Model CT001 arrives at Sync From End" do not imply that Light Model CT001 is at the displayed position of the Sync Link's end instead they refer to the logical arrival at a Sync Link end, the difference between these interpretations arises for reasons which include the displayed position offsets created by Hold Segments.

Figure 108:
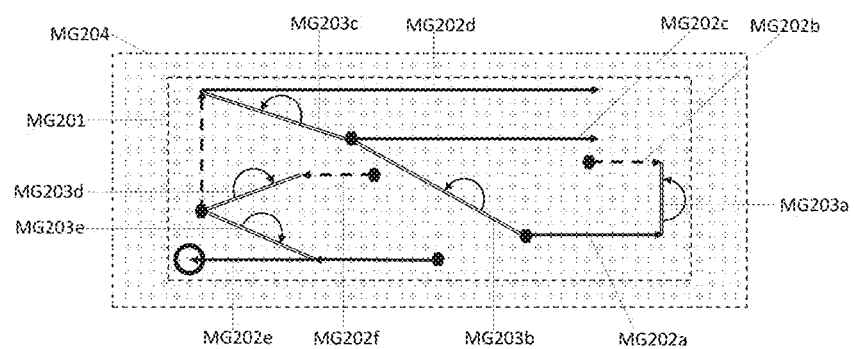
FIG. 108 includes a depiction of a Path Tree.

FIG. 108 depicts a Path Tree MG201 overlaid on a Tessellation Positions MG204 of possible light positions that may be used by an Animation CT011 created from it. Model Path MG202a has the Start At times for its Generators entered using a Label Input, for example Start At MB012, and is connected to the Sync From End of Sync Links MG203a-b. Model Path MG202b calculates the Start At times for its Generators from its connection to the Sync To End of Sync Link MG203a. Model Path MG202c calculates the Start At times for its Generators from its connection to the Sync To End of Sync Link MG203b, it is also connected to the Sync From End of Sync Link MG203c. Model Path MG202d calculates the Start At times for its Generators from its connection to the Sync To End of Sync Link MG203c, it is also connected to the Sync From End of Sync Links MG203d-e. Model Path MG202e calculates the Start At times for its Generators from its connection to the Sync To End of Sync Link MG203e. Model Path MG202f calculates the Start At times for its Generators from its connection to the Sync To End of Sync Link MG203d. Path Tree MG201 includes the Model Paths MG203a-f and the Sync Links MG202a-e, it has: a single root Model Path MG202a whose Start At times are not calculated from a Sync Link; a single Sync To End, of a Sync Link, for all other Model Paths, which controls their Start At time; one or more Sync From Ends, of Sync Links, for the one or more Model Paths it includes. These connections create a data structure tree which may be used to calculate the Start At time of all other Model Paths in a Path Tree from the Start At time of the root Model Path, consequently Sync Links may be used to automatically preserve the relative timing of Model Path traversal, across Start At time changes, by a plurality of Light Models CT001 for a plurality of Model Paths.

FIG. 109 depicts JavaScript Software that may be used, in one or more embodiments, to provide a Recursive Process that propagates changes to the Start At times of a root Model Path to the other Model Paths in a Path Tree. Function MH003a, propagateStartAt, is called with a reference to the root Model Path of the Path Tree. Function MH003a calls Function MH003b, propagateFromStartAt, at Function Call MH004a, passing parameters that include the root Model Path. Function MH003b calls Function MH003c, propagateToStartAt, for all Sync Links with Sync To Ends in the Model Path it was passed, passing parameters that include the Model Path at the Sync From End of the Sync Link to Function Call MH004b. Function MH003c calls Function MH003b, propagateFromStartAt, at Function Call MH004c. The call of Function MH003c by Function MH003b and Function MH003b by Function MH003c may lead to one or more nested calls of either Function MH003b or Function MH003c, creating a Recursive Process that walks the Model Paths in a Path Tree. In one or more embodiments, the Start At times of any Model Path may be set via text entry, this may be supported, for a Path Tree with correctly set Start At times, by adding the change in the modified Start At time to the Start At time of the root Model Path and then propagating this change to all the other Model Paths.

The JavaScript Software, of FIG. 109, uses the largest time interval from the Start At, of a Model Path, to the Sync To End of the Sync Link, for any Generator in the Model Path, at Line MH002a and the latest Start At time, for any Generator in the Model Path, at Line MH002b when calculating the time from the start, of any Animation CT011 which may be created, to the time of a Sync Link. In one or more embodiments, this time interval and Start At time may be calculated differently, for example the smallest time interval and earliest Start At time for all Generators or the only time interval and only Start At time when Hold Times and Move Speeds are per Model Path in the Path Tree.

Figure 110:
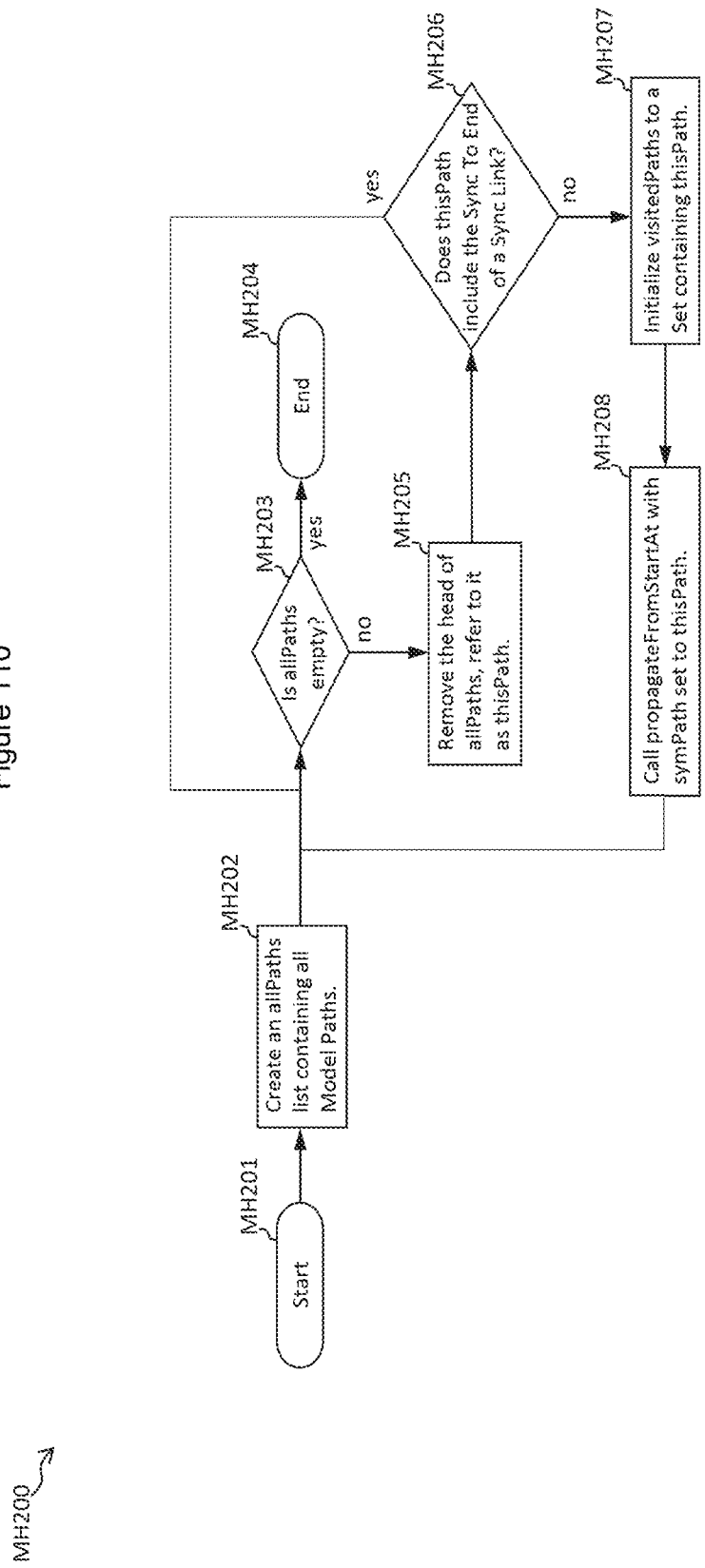
FIG. 110 is a flow chart of a method of Internet Client operation.

FIG. 110 is a flow diagram illustrating a method MH200 that may be used by Authoring Client AA006 as part of a Process to create an Extended Direction Set. The method MH200 may be performed by Director Tool AC002. The method MH200 is equivalent to calling Function MH003a, propagateStartAt, for every root Model Path, of a Path Tree, in an Extended Direction Set.

In operation MH202 a list of all the Model Paths in an Extended Direction Set is created. In operation MH203 a test of whether the list of all Model Paths contains any Model Paths is done. In operation MH205 a Model Path is removed from the head of the list of all Model Paths. In operation MH206 the Model Path is tested to see if it contains the Sync To End of a Sync Link, this test is equivalent to checking whether the Model Path is not the root Model Path of a Path Tree. In operation MH207 a list of visited Model Paths is created and initialized to contain the root Model Path. In operation MH208 the Recursive Process depicted in FIG. 109 is used to call propagateFromStartAt, the method MH400, of FIG. 111, may be used to provide propagateFromStartAt.

Figure 111:
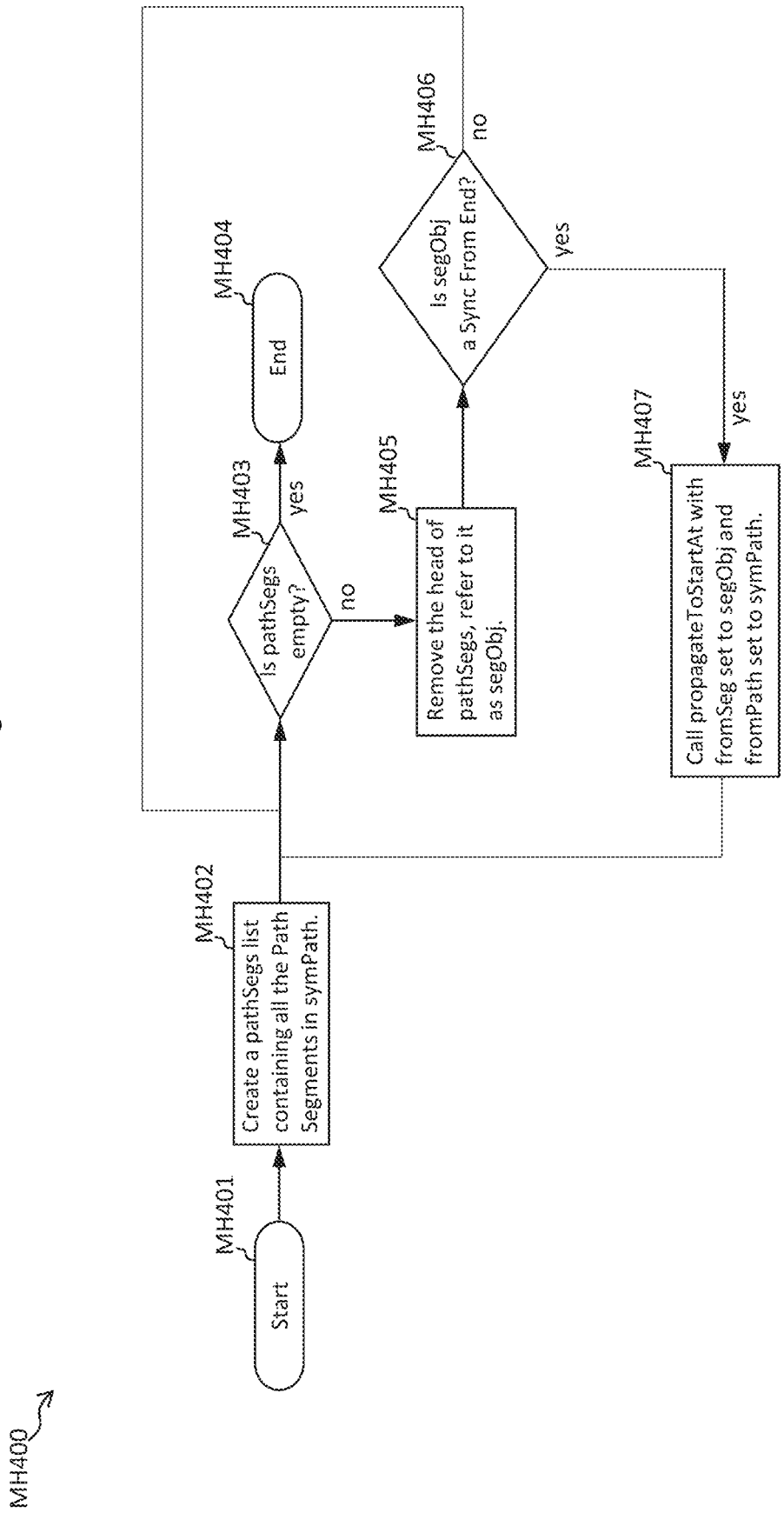
FIG. 111 is a flow chart of a method of Internet Client operation.

FIG. 111 is a flow diagram illustrating a method MH400 that may be used by Authoring Client AA006 as part of a Process to create an Extended Direction Set. The method MH400 may be performed by Director Tool AC002. The method MH400 is equivalent to one call of the Function MH003b, propagateFromStartAt.

In operation MH402 a list containing all the Path Segments in the Model Path passed to propagateFromStartAt is created. In operation MH403 a test of whether the list of all Path Segments contains any Path Segments is done. In MH405 a Path Segment is removed from the head of the list of All Path Segments. In operation MH406 the Path Segment is tested to see if it is a Sync From End. In operation MH407 the Recursive Process depicted in FIG. 109 is used to call propagateToStartAt, the method MH600, of FIG. 112, may be used to provide propagateToStartAt.

Figure 112:
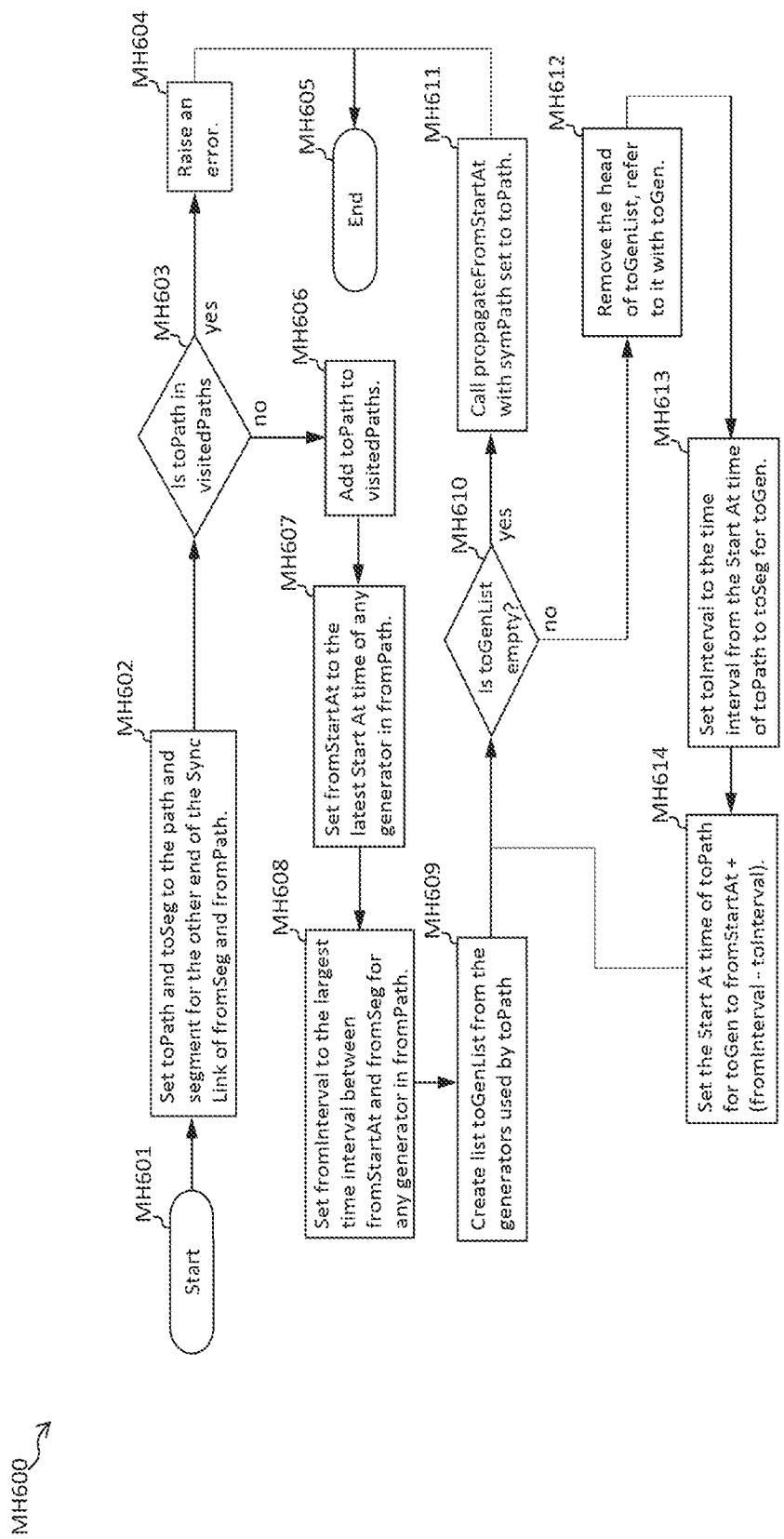
FIG. 112 is a flow chart of a method of Internet Client operation.

FIG. 112 is a flow diagram illustrating a method MH600 that may be used by Authoring Client AA006 as part of a Process to create an Extended Direction Set. The method MH600 may be performed by Director Tool AC002. The method 1\4I-1600 is similar to one call of the Function MH003c, propagateToStartAt.

In operation MH602 the Sync To End of the Sync Link passed, along with the Model Path that includes it as a Path Segment, are found. In operation MH603 visited Model Paths is tested to see if it includes the Model Path found in operation MH602. In operation MH604 an error reports that the Path Tree includes a loop. In operation MH606 the Model Path found in operation MH602 is added to the visited Model Paths. In operation MH607 the Start At time to be used for the Model Path passed is calculated. In operation MH608 the time interval between the Start At time calculated in MH607 and the Sync Link passed is calculated. In operation MH609 a list of Generators is created from the Generators used by the Model Path found in operation MH602. In operation MH610 a test of whether the list of Generators contains any Generators is done. In operation MH611 the Recursive Process depicted in FIG. 109 is used to call propagateFromStartAt, the method MH400 may be used to provide propagateFromStartAt. In operation MH612 a Generator is removed from the head of the list of Generators. In operation MH613 the time interval between the Start At time of the Model Path found in operation MH602 and the Sync Link passed is calculated. In operation MH614 a new per Generator Start At time for the Model Path found in operation MH602 and the Generator from operation MH612 is calculated as follows: create a Start At offset by subtracting the time interval calculated in MH613 from the time interval calculated in operation MH602; add the Start At offset to the Start At of the Model Path/Generator.

Figure 113:
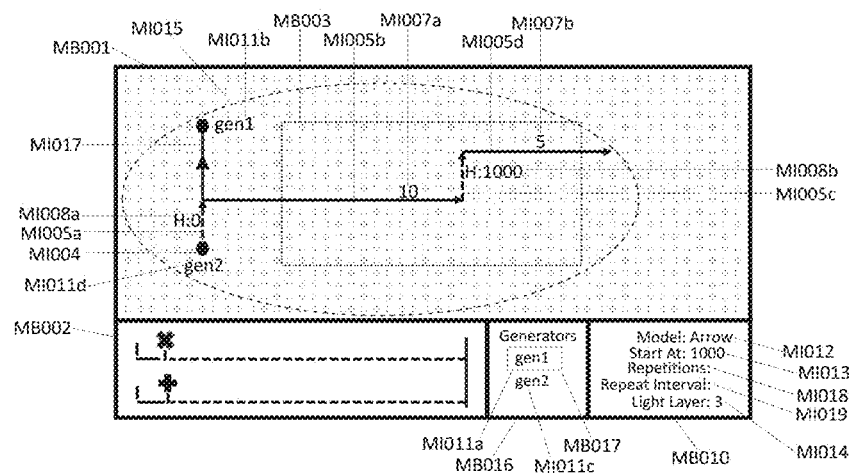
FIG. 113 includes a depiction of windows from a human computer interface which support the capture of an Extended Direction Set that includes a Model Offset.

FIG. 113 depicts the human computer interface of FIG. 102 with different example data. Selected Model Path MI015, in Window MB001, includes: Start Point MI004 which references Generator MI011d, the same generator, with name "gen2", as Generator MI0011c, this Generator references Square Shape MA001a; Hold Segment MI005a which has a Hold Time MI008a of 0ms; Offset Segment MI017 which references Generator MI011b the same generator, with name 'gen 1', as Generator MI011a; Move Segment MI005b which has a Move Speed MI007a of 10 lights per second; Hold Segment MI005c which has a Hold Time MI008b of 1000 ms; Move Segment MI005d which has a Move Speed MI007b of 5 lights per second. Generator MI011a has been selected using Selection Box MB017, consequently Window MB010 is displaying the following parameters for Generator MI011a-b: Model Name MI012 which is set to reference Arrow Shape MA001b by the text 'Arrow'; Start At MI013 which is set to 1000 ms; Light Layer MI014 which is set to 3.

Figure 114:
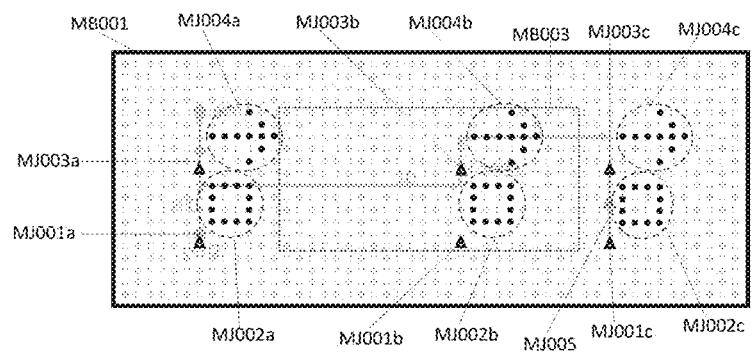
FIG. 114 includes a depiction of the Light Model motion created by an Extended Direction Set that includes a Model Offset.

FIG. 114 depicts the display of an animation that may be created by the example data used in the user interface depiction of FIG. 113. Origin MA002a of Square Shape MA001a: starts at Origin Position MJ001a and moves to Origin Position MJ001b at a speed of 10 light per second, causing the light effects of Square Shape MA001a to move from Effect Positions MJ002a to Effect Positions MJ002b; stays at Origin Position MJ001b for 1000 ms, causing the light effects of Square Shape MA001a to stay at Effect Positions MJ002b; moves to Origin Position MJ001c at a speed of 5 lights per second, causing the light effects of Square Shape MA001a to move to Effect Positions MJ002c. For the complete set of Square Shape MA001a positions created, due to Generator MI011d, by Model Path MI015, a synchronized set of Arrow Shape MA001b positions is created, due to Generator MI011b, at the fixed offset defined by Offset Segment MI017. This fixed offset behavior is illustrated in FIG. 114 by: Offset Vector MJ005, which is the same vector as Offset Segment MI017, being the difference between Origin Position MJ001c and Origin Position MJ003c, which are simultaneous positions for Square Shape MA001a and Arrow Shape MA001b; the movement shown for Arrow Shape MA001b. Origin MA002b of Arrow Shape MA001a: starts at Origin Position MJ003a and moves to Origin Position MJ003b at the same time and speed as Square Shape MA001a moves between Origin Position MJ001a and Origin Position MJ001b, causing the light effects of Arrow Shape MA001a to move from Effect Positions MJ004a to Effect Positions MJ004b; stays at Origin Position MJ003b for the same time as Square Shape MA001a stays at Origin Position MJ001b, causing the light effects of Arrow Shape MA001b to stay at Effect Position MJ004b for 1000 ms; moves to Origin Position MJ003c at the same time and speed as Square Shape MA001a moves to Origin Position MJ001c, causing the light effects of Arrow Shape MA001b to move to Effect Position MJ004c. If used on a Physical Light Set with Light Extent MB003, both light effects should have synchronized motion that appears to enter from the its left hand side, move to its right hand side, pause for 1000 ms, resume moving and exit through its right hand side.

In one or more embodiments, the display of the Light Model CT001 associated with an Offset Segment, via a Generator, may stop at the time defined by the position where the Offset Segment attaches to the Model Path. If such an embodiment had been used for FIG. 114 and Offset Segment MI017 had been attached at the end of Hold Segment MI005c, then Arrow Shape MA001b would not have been displayed after the 1000 ms pause in movement, due to Hold Time MI008b, that may be part of an animation created by Model Path MI015.

In one or more embodiments, the display of the Light Model CT001 associated with an Offset Segment, via a Generator, may start at the time defined by the position where the Offset Segment attaches to the Model Path. If such an embodiment had been used for FIG. 114 and Offset Segment MI017 had been attached at the start of Hold Segment MI005c, then Arrow Shape MA001b would not have been displayed before the 1000 ms pause in movement, due to Hold Time MI008b, that may be part of an animation created by Model Path MI015.

Figure 115:
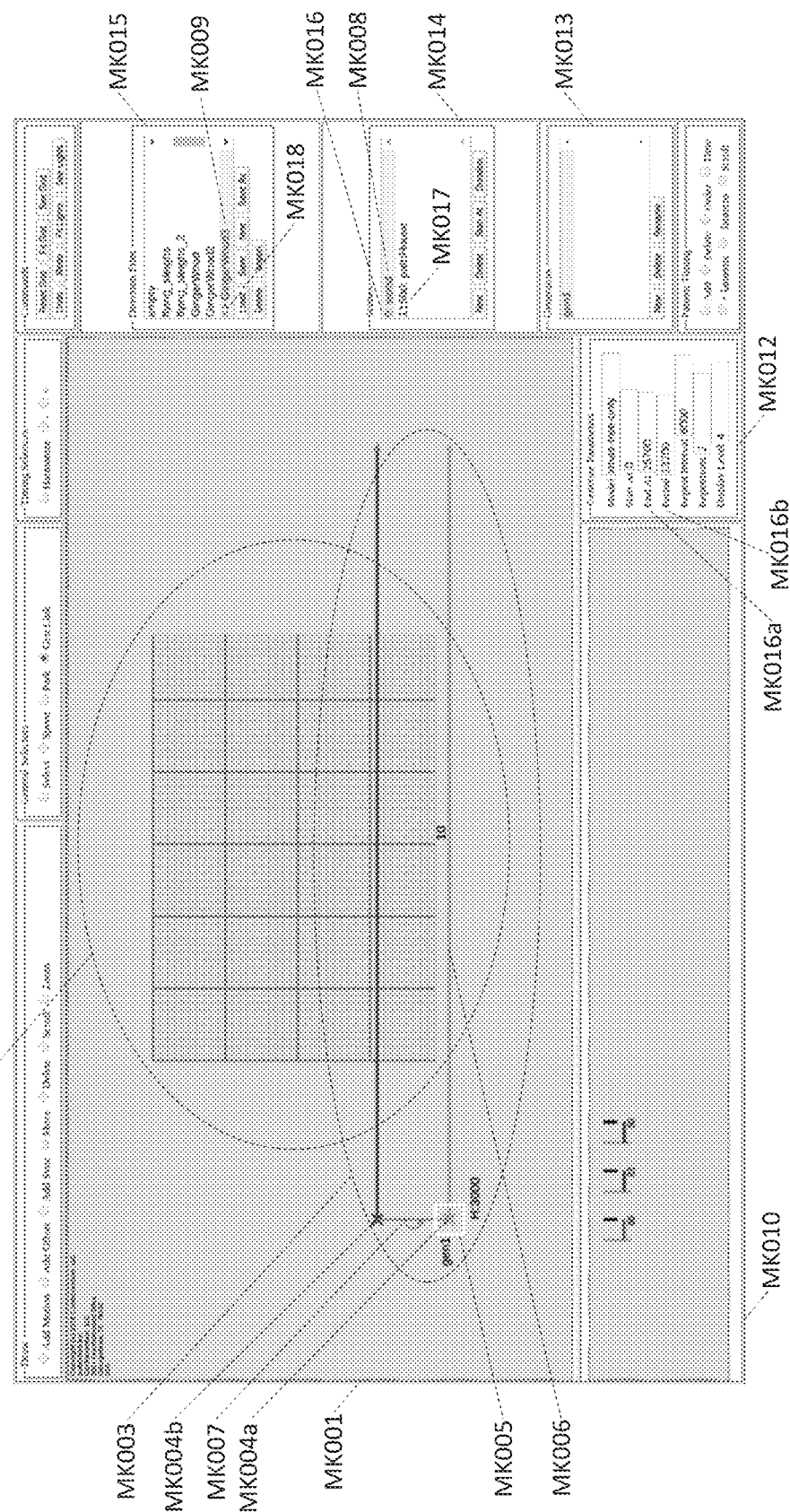
FIG. 115 includes a depiction of windows from a human computer interface which includes multiple Direction Scenes.
Figure 116:
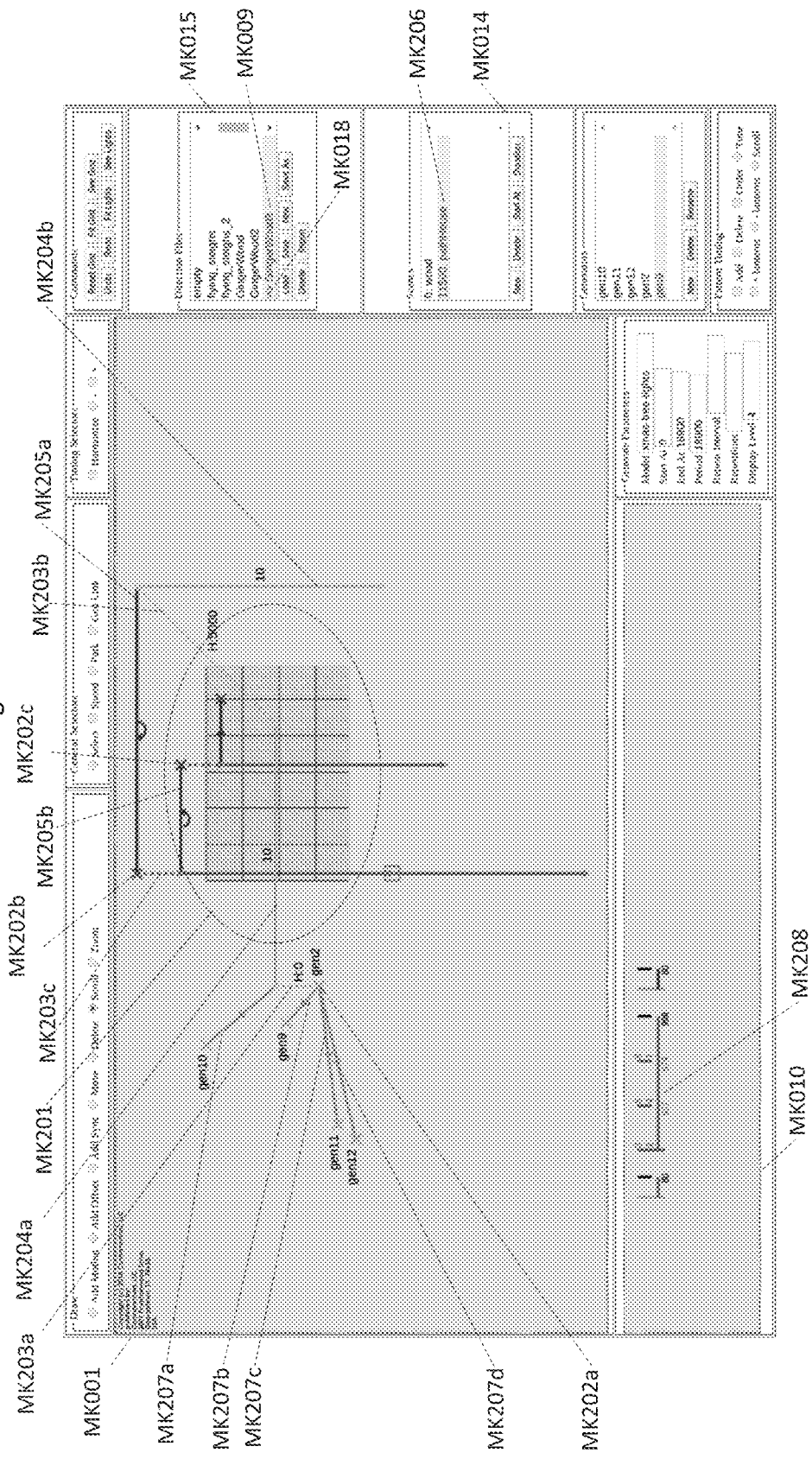
FIG. 116 includes a depiction of windows from a human computer interface which is being used to capture a more complex Direction Scene.

FIG. 115 depicts a human computer interface which may, in one or more embodiments, be included in Director Tool AC002 or Authoring Client AA006. This interface may include part, or all, of the functionality of the human computer interface introduced in FIG. 102. The human computer interface of FIGS. 115-116 is a snapshot of an interface which uses a different graphical design to that used elsewhere in this document. The Window layout of the interfaces depicted in FIGS. 102 and 115 is similar: Window MK001 has a similar role to Window MB001; Window MK010 has a similar role to Window MB002; Window MK013 has a similar role to Window MB016 and Window MK012 has a similar role to Window MB010. Please note that, in one or more embodiments, other graphical representations may be used by the human computer interface functionality of the exemplar design.

The graphical differences between the human computer interfaces of FIGS. 102 and 115 include: replacing circles that indicate possible Tessellation Positions for lights, for example Tessellation Positions MB021a-b, with a grid of lines, for example Line Grid MK002; using colors, or shades of grey, to indicate the selected Model Path, for example Model Path MK003; using a square instead of a circle to represent a Pause Point, for example Pause Points MK005 and MB020; using a cross instead of a hexagon to represent a Start Point, for example Start Points MK004b and MB004; using colors, or shades of grey, and number pairs instead of symbols and numbers for Timelines, for example Timelines IC008b and MK208; the layout of Timelines in Windows MK010 and MB002; the additional read only Label Inputs MK016a and MK016b, these are used for values that may be calculated from data already available to the interface. The intersection of lines within a Line Grid indicates the available Tessellation Positions, for example Line Grid MK002 is 60 lights wide and 40 lights high.

Window MK015 includes a scrolling window that, in one or more embodiments, may include one or more of the Direction Names, for Extended Direction Sets, that may be available to a User of the human computer interface of FIG. 115. The Direction Name MK009, with name "GingerWood3", is the one that is currently loaded into the human computer interface of FIG. 115, this loaded status is indicated on the display by the Loaded Symbol MK018, the characters '=>', to the left of "GingerWood3". The Window MK014 includes a scrolling window that, in one or more embodiments, may include Scene Start Time/Scene Name pairs for one or more Direction Scenes, for example Scene Start Time MK016 and Scene Name MK008. A Direction Scene may include: a Scene Start Time that may be used to define the time offset of the Direction Scene relative to an Animation CT011 that may be partially created from it, for example the Scene Start Time MK016 with value 0; a Scene Name which may be used to select the Direction Scene currently displayed, for example the Scene Name MK008 with value "wood"; the one or more Model Paths that are displayed in Window MK001 whilst the Scene Name, of the Direction Scene, is selected in Window MK014; the data displayed in other Windows for a selected Model Path, for example Windows MK010 and MK012. The Start At times of Model Paths, and other timers, included in a Direction Scene may use its Start Time to define their time 0, for example the Start At time of a Model Path in the Direction Scene with Scene Start Time MK017 may be converted to a time in an Animation CT011 by adding 11500 ms.

In FIG. 116, a Direction Scene which includes Model Paths MK202a-c and Sync Links MK205a-b is depicted in Window MK001. The Model Path with Start Point MK202a includes Model Offsets MK207a-d, Move Segments MK204a-b and Hold Segments MK203a-b. The Model Path with Start Point MK202b includes two Move Segments and a Pause Point. Sync Link MK205a sets the Start At time of the Model Path with Start Point MK202b to the end time of Hold Segment MK203b. The Model Path with Start Point MK202c includes a Hold Segment, a Move Segment and an Offset Segment. Sync Link MK205b sets the Start At time of the Model Path with Start Point MK202c to the time of the end of Hold Segment MK203c. The Direction Scene depicted in FIG. 116 illustrates the creation of a motion description, for a larger set of Light Models CT001, which is significantly more complex than motion descriptions previously depicted in this document. This more complex motion description includes a set of Model Paths and Sync Link connections, with a regular geometry, that may be created using the human computer interface of FIGS. 102 through 120. The Loaded Symbol MK018 to the left of Direction Name MK009, in Window MK015 of FIG. 116, indicates that the same Extended Direction Set is loaded by FIGS. 115 and 116. In FIG. 116 the Direction Scene with Scene Name MK206, of value "pathHouse", has been selected and hence displayed in Window MK001. An Extended Direction Set may use one or more Direction Scenes to organize its motion description, with each Direction Scene having sufficiently low complexity that its content, including Model Paths and Sync Links, may be clearly seen on a single graphical display within Window MK001.

Figure 117:
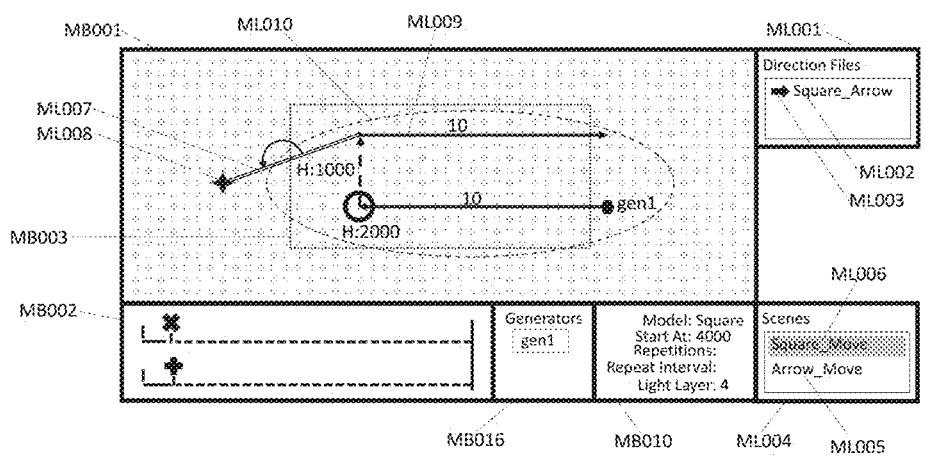
FIG. 117 includes a depiction of windows from a human computer interface which is capturing a Direction Scene that includes a From Scene Link.
Figure 118:
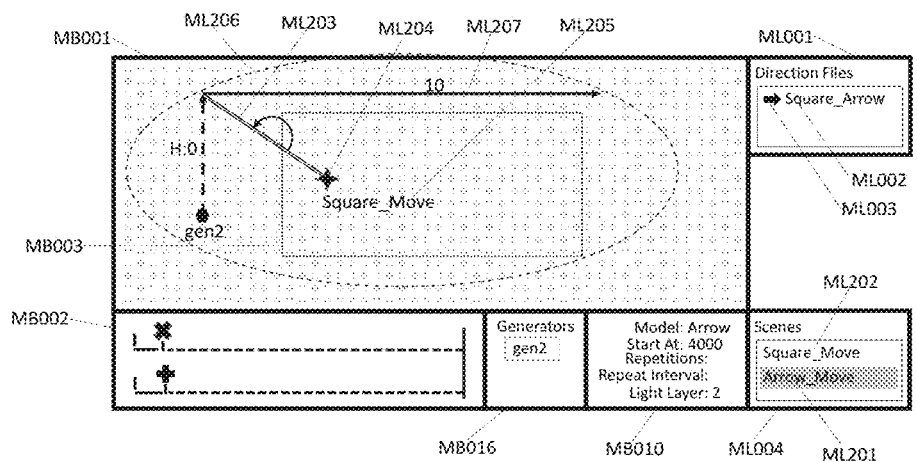
FIG. 118 includes a depiction of windows from a human computer interface which is capturing a Direction Scene that includes a To Scene Link.

FIGS. 117-118 depict Model Path synchronization across a plurality of Direction Scenes. The placement of Loaded Symbol ML003, in Window ML001, next to Direction Name ML002, or "Square_Arrow", indicates that both FIG. 117 and ML2 have the same Direction Set loaded into the human computer interface, for example in Windows MB001 and ML004.

Window ML004, of FIG. 117, indicates that the Direction Scene with Scene Name ML006, or "Square_Move", is displayed, and available for edit, in Windows MB001, MB002, MB016 and MB010. From Scene Link ML007 connects the start of Move Segment ML009, from Model Path ML010, to Time Symbol ML008. A Direction Scene may only include one From Scene Link, consequently any From Scene Link may be found using the Scene Name of its Direction Scene.

Window ML004, of FIG. 118, indicates that the Direction Scene with Scene Name ML201, or "Arrow Move", is displayed, and available for edit, in Windows MB001, MB002, MB016 and MB010. To Scene Link ML203 connects Time Symbol ML204 to the start of Move Segment ML207, from Model Path ML206. Time Symbol ML204 has Scene Name ML205, or "Square_Move" associated with it. A Direction Scene may optionally include one or more To Scene Links and one or more of these may share one or more Scene Names, either by sharing a Time Symbol or by using different Time Symbols with the same Scene Name. Each To Scene Link can have one associated From Scene Link that may be found using the Scene Name of its Time Symbol. A From Scene Link may optionally have one or more To Scene Links associated with it. A From Scene Link may include a Sync From End and a To Scene Link may include a Sync To End, consequently a To Scene Link may be used as an alternative to a Sync Link when propagating Start At times using the method of FIGS. 109-112. In one or more embodiments, Direction Scenes may have Scene Start Times associated with them, for example the embodiment of FIGS. 115-116, for these embodiments: the different time frames of the Direction Scenes may be converted to a shared time frame before the method of FIGS. 109 through 112 is applied; after Start At times have been adjusted in the shared time frame they may be converted back to the time frames of the Direction Scenes.

Figure 119:
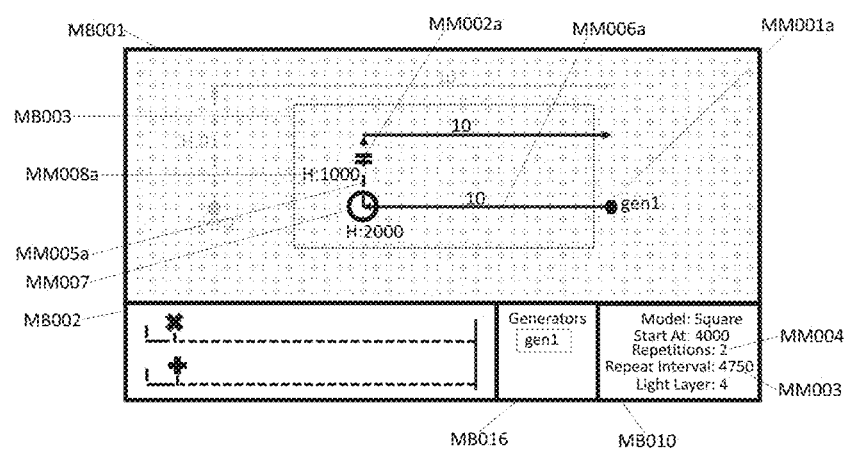
FIG. 119 includes a depiction of windows from a human computer interface which is capturing Model Paths that include a Repeat Marker.

FIG. 119 depicts a graphical way to edit and display the Repeat Interval, of a Model Path, that may be available in one or more embodiments. When the Repeat Interval is less than the time taken to traverse the Model Path, then the position of a Repeat Marker, on the Model Path, may be used to set and display the Repeat Interval. Repeat Marker MM002a, of FIG. 119, is for the selected Model Path with Start Point MM001a, it is positioned ¾ of the way along Hold Segment MM005a. This position is 4750 ms after the Start At time of the Model Path with Start Point MM001a: 2000 ms from traversing Move Segment MM006a; 2000 ms due to Pause Point MM007 and ¾ of the Hold Time MM008a, or 750 ms, for Hold Segment MM005a. In one or more embodiments, there may a Repeat Interval per Generator associated with a Model Path, with the Repeat Interval for the selected Model Path/Generator pair controlling the Model Path position of the Repeat Marker. In one or more embodiments, there may be a Repeat Marker per Model Path, with only one Repeat Marker position for a Model Path at any given time. In one or more embodiments Repeat Interval MM003 may become read only when a Repeat Marker is associated with its Model Path/Generator. In one or more embodiments, Repeat Interval MM003 may remain read/write when a Repeat Marker is displayed for its Model Path/Generator, the position of the Repeat Marker changing to reflect any time entered into Repeat Interval MM003. A Repeat Interval from a Repeat Marker may be used with textually entered Repetitions to control the repeat behavior for a Generator or Model Path, for example Repetitions MM004, with value 2, and Repeat Interval MM003, set by Repeat Marker MM002a to 4750 ms, may cause traversals of the Model Path with Start Point MM001a, by Light Model CT001 with Model Name "Square", which begin 4000 ms, 8750 ms and 13500 ms after the start of an Animation CT011. In one or more embodiments, Repeat Markers may only be placed at the start or end of Path Segments, changes to the Repeat Interval being made by adjusting the Path Segments.

FIG. 120 depicts a Harmonize feature that may be available in one or more embodiments, this supports: associating a Time Interval with one or more Sync Links, or To Scene Links; limiting the time difference from the Start At time of a Sync To End to the Start At time of one or more Path Segments, which are included in the Model Path that also includes the Sync To End, to a multiple of the Time Interval associated with the Sync Link, or To Scene Link, which includes the Sync To End; limiting the move step time, of one or more Move Segments, to a multiple of the Time Interval associated with the Sync Link, or To Scene Link, which includes the same Sync To End as the Model Path which includes the Move Segments. The Model Paths of FIG. 120, that include Start Points MN001b and MN001c, have the allowed values of one or more of their Path Segments Start At and step times affected by the Harmonize feature.

Hold Segment MN006a, of FIG. 120, has the allowed values of its Hold Time MN007a limited by the Harmonize Feature. Sync Link MN002a has a Time Interval MN003a, of 50 ms, associated with it and shares a Sync To End with the Model Path that includes Start Point MN001b. Hold Segment MN004a, with a Hold Time MN005a, of 883 ms, is not in Harmonize Mode and consequently may have any Hold Time greater than or equal to zero. Hold Segment MN006a, with a Hold Time MN007a of 117 ms, is in Harmonize Mode, which is indicated by a graphic that includes close parallel lines, and is included in the Model Path with Start Point MN001b, consequently it may only allow its Hold Time to be set to a value which causes the Time Interval from the Sync To End, of Sync Link MN002a, to the Start At time, of Move Segment MN008a, to be a multiple of 50 ms. For the Extended Direction Set of FIG. 120, this Time Interval is 883+117=1000 ms, a multiple of 50 ms. Move Segment MN008a, of FIG. 120, has the allowed values of its move step time limited by the Harmonize Feature. Move Segment MN008a, with a Move Speed MN009a of 20 lights per second, is in Harmonize Mode, which is indicated by a graphic that includes close parallel lines, and is included in the Model Path with Start Point MN001b, consequently it may only allow its Move Speed MN009a to be set to a value that leads to a step time which is a multiple or simple fraction of Time Interval MN003a, for example 25 ms, 50 ms, 100 ms, 150 ms or 200 ms. For the Extended Direction Set of FIG. 120, the 20 lights per second of Move Speed MN009a is equivalent to 50 ms per move step.

Hold Segment MN006b, of FIG. 120, has the allowed values of its Hold Time MN007b limited by the Harmonize Feature. Sync Link MN002b has a Time Interval MN003b, of 50 ms, associated with it and shares a Sync To End with the Model Path that includes Start Point MN001c. Hold Segment MN004b, with a Hold Time MN005b, of 62 ms, is not in Harmonize Mode and consequently may have any Hold Time greater than or equal to zero. Hold Segment MN006b, with a Hold Time MN007b of 38 ms, is in Harmonize Mode, which is indicated by a graphic that includes close parallel lines, and is included in the Model Path with Start Point MN001c, consequently it may only allow its Hold Time to be set to a value which causes the Time Interval from the Sync To End, of Sync Link MN002b, to the Start At time, of Hold Segment MN006b, to be a multiple of 50 ms. For the Extended Direction Set of FIG. 120, this Time Interval is 62+38=100 ms, a multiple of 50 ms. Move Segment MN008b, of FIG. 120, has the allowed values of its move step time limited by the Harmonize Feature. Move Segment MN008b, with a Move Speed MN009b of 20 lights per second, is in Harmonize Mode, which is indicated by a graphic that includes close parallel lines, and is included in the Model Path with Start Point MN001c, consequently it may only allow its Move Speed MN009b to be set to a value that leads to a step time which is a multiple or simple fraction of Time Interval MN003b, for example 50 ms or 150 ms. For the Extended Direction Set of FIG. 120, the 20 lights per second of Move Speed MN009b is equivalent to 50 ms per move step.

The behavior of Hold Times MN007a-b, of FIG. 120, illustrates how the position, in a Model Path, of the Sync To End of a Sync Link, or To Scene Link, affects the allowed values of Hold Times, the affected time interval running from the Sync To End to the far end of the Hold Segment. The allowed Hold Times are set from the time of the Sync Link. In FIG. 120 the Model Path with Start Point MN001a illustrates this Sync Link time dependency using Hold Time MN004c: Move Segment MN008a has the allowed values of its Start At time set by Sync Link MN002a; Move Segment MN008b has the allowed values of its Start At time set by Sync Link MN002b; Sync Links MN002a-b have a time offset of 1025 ms, due to Hold Time MN004c. Consequently, the movement steps of Move Segments MN008a-b, which both have a 50 ms step time, should be offset by 25 ms, or half their step time. In one or more embodiments, the allowed Hold Times and Move Speeds of Path Segments may be limited to particular values, for example an integer number of milliseconds, with any Sync Link Time Intervals providing additional limitations. In one or more embodiments, the conversion of Path Segments to and from Harmonize Mode may be performed with a mouse mode.

FIG. 121 depicts an extension to the human computer interface, for an Extended Direction Set, previously depicted in FIGS. 101-120 that may be used in one or more embodiments. This extension provides a timeline format visualization of the Model Paths which may have previously been entered and viewed via Window MB001. The extended human computer interface may include: Window MP001 as an alternative to Window MB001; one or more mechanisms for changing the display of Window MB001 to and from the display of Window MP001, for example a button that when pressed converts between them; a timeline format display of one or more Model Paths from the Extended Direction set loaded, for example the Timeline Model Paths depicted in Window MP001 of FIG. 121 are a timeline display of the Model Paths depicted in Window MB001 of FIG. 120; in one or more embodiments, editing, and optional saving, of the timeline data displayed via methods that may include one or mouse modes. The timeline representation provides a User with a different perspective that may enable a quicker, and or easier, development of one or more Animations CT011.

The Timeline Model Path, in FIG. 121, with Start Point MP010b and a Start At time of 0ms is a timeline depiction of the Model Path with Start Point MN001b, from FIG. 120, it includes: Hold Segment MP004a that starts at an Animation Time MP009a of 0ms; Timeline Hold Segment MP006a, in Harmonize Mode, that starts at an Animation Time MP009b of 883 ms, which is offset from Animation Time MP009a by Hold Time MN005a; Timeline Move Segment MP008a, in Harmonize Mode, that starts at an Animation Time MP009c of 1000 ms, which is offset from Animation Time MP009b by Hold Time MN007a. The Timeline Model Path with Start Point MP010b ends at an Animation Time MP009d of 2550 ms, which is offset from Animation Time MP009c by the 31 steps of 50 ms each, or 1550 ms, duration of Timeline Move Segment MP008a.

The Timeline Model Path, in FIG. 121, with Start Point MP010a and a Start At time of 0ms is a timeline depiction of the Model Path with Start Point MN001a, from FIG. 120, it includes Hold Segment MP004c which starts at an Animation Time MP009a of 0ms. The Timeline Model Path with Start Point MP010a ends at an Animation Time MP009e of 1025 m, which is offset from Animation Time MP009a by Hold Time MN005c.

The Timeline Model Path, in FIG. 121, with Start Point MP010c and a Start At time of −375 ms is a timeline depiction of the Model Path with Start Point MN001c, from FIG. 120, it includes: Hold Segment MP004d that starts at an Animation Time MP009i of −375 ms; Timeline Move Segment MP008b, in Harmonize Mode, that starts at an Animation Time MP009h of −375 ms, which is offset from Animation Time MP009i by Hold Time MN005d; Timeline Hold Segment MP006b, in Harmonize Mode, that starts at an Animation Time MP009g of 925 ms, which is offset from Animation Time MP009h by the 26 steps of 50 ms each, or 1300 ms, duration of Timeline Move Segment MP008b; Timeline Hold Segment MP004b that starts at an Animation Time MP009f of 963 ms, which is offset from Animation Time MP009g by Hold Time MN007b. The Timeline Model Path with Start Point MP010c ends at an Animation Time MP009e of 1025 m, which is offset from Animation Time MP009f by Hold Time MN005b.

Timeline Sync Links depict Sync Links in a timeline format visualization, for example: Timeline Sync Link MP003a is a representation, in FIG. 121, of Sync Link MN002a, in FIG. 120; Timeline Sync Link MP003b is a representation, in FIG. 121, of Sync Link MN002b, in FIG. 120. As Timeline Sync Links represent a moment in time, they are drawn as vertical connections between the horizontal depictions of, the time consuming, Timeline Model Paths. In one or more embodiments, Timeline Hold Segments with a 0 Hold Time may also be drawn as vertical lines on a timeline representation where the horizontal axis represents elapsed time. It can be seen that the timeline depiction of FIG. 121 may, in some circumstances, provide a User with an easier to understand time representation, for example: the synchronization, by Sync Link MN002a, of the start of the Model Path with Start Point MN001b may be more clearly seen; the synchronization, by Sync Link MN002b, of the end of the Model Path with Start Point MN001c may be more clearly seen. The timeline depiction of FIG. 121 uses the Generator Names MP002a "gen2", MP002b "gen1" and MP002c "gen3" to label Model Paths, in one or more embodiments additional information, for example a Model Name, may also be displayed in Window MP001. The horizontal time axis of Window MP001 uses a monotonically increasing, but non-linear, timescale, in one or more embodiments Window MP001 may support one or more other timescales, for example a linear timescale.

FIG. 122 depicts an extension to the human computer interface, for an Extended Direction Set, previously depicted in FIGS. 101-121 that may be used in one or more embodiments. This extension provides an animation of the motion that might be produced, in an Animation CT011, from the loaded Extended Direction Set. The extended human computer interface may include one or more Movement Markers, for example Movement Markers MQ002a-c, that may be overlaid on one or more Model Paths to animate the motion of Origin Positions for one or more Light Models CT001, for example a Direction Animation for the Model Paths with Start Points MN001a-c, of FIG. 122, may include: the Movement Marker MQ001a at a First Time; the Movement Marker MQ001b at a Second Time; the Movement Markers MQ002a-c at a Third Time; the Movement Marker MQ003 at a Fourth Time. Movement Markers may traverse Hold Segments smoothly, having positions on and between the Tessellation Positions of possible lights. Movement Markers may traverse Move Segments discretely, only having positions on the Tessellation Positions of possible lights and consequently providing a better depiction of the movement that should be seen in any Animation CT011 that may be produced, for example Movement Marker MQ001a may be displayed for 50 ms and then be followed immediately by Movement Marker MQ001b. At the First Time of Movement Marker MQ001a, the Second Time of Movement Marker MQ001b and the Fourth Time of Movement Marker MQ003 no other Model Path is active, hence no other Movement Markers are displayed. At the Third Time of Movement Markers MQ002a-c all three Model Paths, of FIG. 122, are active and consequently one Movement Marker per Model Path is displayed. The Movement Markers of a Direction Animation provide an enhanced representation that may be especially useful for an inexperienced User. Such a User may have limited understanding of the meaning of the graphical components, for example Path Segments and Sync Links, of the human computer interface. In one or more embodiments, the Movement Markers may be more complex than a simpler graphic, for example they may depict the lights to be switched on, by the traversing Light Model CT001, at one or more levels of detail.

In one or more embodiments, the human computer interface depicted in FIGS. 101-122 may support converting Hold Segments to Move Segments and or Move Segments to Hold Segments. In one or more embodiments, when converting a Move Segment to or from a Hold Segment the total time duration of the original Path Segment may be given to the new Path Segment, this may lead to Move Segment step sizes that require sub-millisecond update times. In one or more embodiments, when converting a Hold Segment to a Move Segment the calculated step time may be rounded to the nearest millisecond, this may produce a different total time for the Move Segment. In one or more embodiments, the minimum resolution may be something other than milliseconds, for example one hundredth of a second.

In one or more embodiments, the human computer interface depicted in FIGS. 101-122 may also support an Invisible Mode. Path Segments in Invisible mode may have the same time and movement properties as other Path Segments, for example a Hold Segment may cause a time delay but no motion and a Move Segment may cause motion and time delay. Path Segments in Invisible Mode may not produce light effects, in any Animation CT001 they may be used to create, for the one more Light Models CT001 that may be associated with their Model Path.

FIG. 123 is a graphical depiction of a method that may, in one or more embodiments, be used by Apparent Size Adjuster JI011 as part of the process that creates an Adjusted Control Signal 11010 from inputs that include a Light Control Signal JI008 and one or more samples of the background light level Background_sample$_j$, from a Light Sensor JI003c. In one or more embodiments, the simplified process of FIG. 123 may be used in place of the process of FIGS. 97-99. Circumstances where this simplified process maybe used may include: when Light Sensor JI003 is not sensitive to the light emitted by Physical Light Set 11001, for example a light sensor which measures the background light level using photodetectors which are not sensitive to the light frequencies emitted by the LEDs in Physical Light Set JI001; a position, of Light Sensor JI003, from which the light of Physical Light Set JI001 makes a negligible contribution to the background light level measured; a system whose expected performance allows it to tolerate the uncorrected contribution of Physical Light Set JI001 to the background light level measured by Light Sensor JI003.

The graphical depiction, of FIG. 123, may use LPF NA010, with equation JK009, to create one or more Background estimate$_j$ NA011 samples from a plurality of Background_sample$_j$ NA009 measurements. Background estimate$_j$ NA011 may subsequently be used, as Total Background NA022, in order to calculate Threshold NA023. Threshold NA023 may be used to convert Apparent Sizes NA003, for example NA003a-c, in a Light Control Signal JI008 to the light brightness setting that should provide this apparent size, in Adjusted Control Signal JI010. Brightness Curves, for example NA006 and NA007, provide a function from Apparent Size NA001 to Unit Brightness NA002 for one or more different types of lights, for example two types of Wider Light one of which is a Bulb Light and the other a Strip Light. The type of each light in Light Control Signal JI008 is used to obtain its Brightness Curve and this is then used, along with its Apparent Size, to obtain the Unit Brightness NA002 the light should have, for example Apparent Size NA003c has Unit Brightness NA004c and Apparent Sizes NA003a-b have Unit Brightness NA004a-b. The Unit Brightness NA002, for an Apparent Size NA001, is the brightness that may provide the desired apparent size for a unit Perceivable Level, see FIG. 92 for a Perceivable Level example. Threshold$_j$ NA023 scales the lights brightness to that which should provide the same Apparent Size NA001 for the current background light level, as all lights share the same background light level, for any given time, then they may all be set to the same Threshold NA023 at this time. Total Background NA022 is converted to Threshold NA023 using a Thresh_func NA016 which converts from Background NA014 to Threshold NA015. In one or more embodiments, Thresh_func NA016 may be a linear conversion that passes through Thresh_icpt NA018 and has gradient Thresh_grad NA017. A Thresh_func NA016 may be created using observation of the systems behavior and enhanced via user configuration that modifies the brightness/apparent size of lights, in one or more embodiments a simple "brightness control" may be provided for the user that enables the brightness/apparent size to be tuned to the user's satisfaction via a simple one variable control input. Optimization of the method described by FIG. 123, in the expected conditions of use, may be further developed. In one or more embodiments, LPF NA010 may be omitted and Background_sample$_j$ NA009 may be used in place of Background estimate$_j$ NA011 for Total Background NA022.

In one or more embodiments, the apparent size change for an individual light may be enlarged by the method depicted in FIG. 124. The Wider Light, of FIG. 124, includes LED NB001, Light Baffles NB008a-d, Attenuating Diffusers NB002a-b, Attenuating Diffusers NB003a-b and Lit Surface NB010. Light Rays, for example Light Rays NB009d-f, pass through the space between Attenuating Diffusers NB003a-b, brightly lighting Section NB004 of Lit Surface NB010. Lit Surface NB010 is a translucent diffuser and consequently impinging Light Rays, for example Light rays NB009d-f which radiate from LED NB001 or Light Ray NB009a, emerge from its external surface radiating in all directions, for example Light Ray NB009c may be produced as a consequence of impinging Light Ray NB009f. Section NB004, of Lit Surface NB010, is brightly lit by LED NB001, consequently it may appear to be brightly lit over nearly all angles from which it can be seen. Attenuating Diffusers NB003a-b are translucent diffusers which attenuate impinging light, they span the distance from reflective Light Baffles NB008b-c to the edge of the hole through which Light Rays NB009d-f pass. Light Baffles NB008b-c constrain the light emitted by Attenuating Diffusers NB003a-b such that it mainly impinges on Sections NB004 and NB005a-b of Lit Surface NB010, for example Light Ray NB009a is reflected off Light Baffle NB008c at Position NB007b keeping it within Light Baffles NB008b-c. Attenuating Diffusers NB003a-b contribute nearly all of the light that emerges from Sections NB005a-b, for example Light Ray NB009a impinges on Lit Surface NB010 leading to the emergence of light rays that may include Light Ray NB009h. As the direct lighting of Section NB004, by LED NB001, is much brighter than the light it receives from Attenuating Diffusers NB003a-b, they only contribute a small fraction of the total light that emerges from it. Attenuating Diffusers NB002a-b are translucent diffusers which attenuate impinging light more than Attenuating Diffusers NB003a-b, they span the distance from reflective Light Baffles NB008a and NB008d to reflective Light Baffles NB008b-c. Light Baffles NB008a-b constrain the light emitted by Attenuating Diffuser NB002a such that it mainly impinges on Section NB006a of Lit Surface NB010, for example Light Ray NB009b is reflected off Light Baffle NB008b at Position NB007a keeping it within Light Baffles NB008a-b. Light Baffles NB008c-d constrain the light emitted by Attenuating Diffuser NB002b such that it mainly impinges on Section NB006b of Lit Surface NB010. Attenuating Diffusers NB002a-b contribute nearly all of the light that emerges from Sections NB006a-b, for example Light Ray NB009i impinges on Lit Surface NB010 leading to the emergence of light rays that may include Light Ray NB009g. The method of FIG. 124 may create a Lit Surface NB010 which appears lit over a wide range of viewing angles and has: a brightly lit central area; medium brightness areas around the central area; low brightness areas on the outside. These variable brightness zones allow the creation of a light with an apparent size that changes dependent on the brightness of the light and the ambient light level at the light's location, as depicted in FIGS. 92-93 and FIG. 130.

FIG. 125 depicts a Light Design NC019 that may be used, in one or more embodiments, to realize a light with enlarged apparent size via the method of FIG. 124. Light Design NC019 may be constructed using a Material extrusion 3D printer, for example the Prusa i3 MK2, from four or more components that include LED NC015, Bulb Base NC014, Bulb Cone NC006 and Diffuser Can NC011. LED NC015 may be a digitally controlled LED, or other light source, that may be capable of producing multiple colors, for example a Worldsemi WS2812B. Bulb Cone NC006 may be printed with Transparent Layer NC001 on the Heated Bed of a 3D Printer. Diffuser Can NC011 may be printed with Transparent Layers NC007a-b on the Heated Bed of a 3D Printer. Bulb Base NC014 may be printed with its Bottom Face NCO21 on the Heated Bed of a 3D Printer. A Light Design NC019 may be assembled by: inserting a Diffuser Can NC011, with Transparent Layers NC007a-b facing up, into a Bulb Base NC014, see Diffuser Can NC012; placing a Bulb Cone NC006, with its Transparent Layer NC001 facing up, over the Diffuser Can NC012, see Bulb Cone NC013. The assembled Light Design NC019 does not show any of the fasteners which may be included in one or more embodiments that use it. Please note that some parts of FIG. 125 are dimensionally exaggerated in order to show details of both the Lit Surface of Bulb Cone NC006 and the Attenuating Diffuser of Diffuser Can NC011.

The Lit Surface of Bulb Cone NC006, of FIG. 125, includes 3 layers: a Transparent Layer NC001 which may be constructed by 3D printing of two 0.2 mm layers of transparent filament, for example 3D Solutech Natural Clear PLA, onto the Heated Bed of a 3D Printer, this is used to provide mechanical strength for the Lit Surface and also to provide a bed for Diffuse Layer NC002; a Diffuse Layer NC002 which may be constructed by 3D printing of one 0.1 mm layer of white filament, for example HATCHBOX True White PLA, onto Transparent Layer NC001; a Diffuse Layer NC003a-b which may be constructed by 3D printing of two 0.1 mm layers of white filament, for example HATCHBOX True White PLA, onto Diffuse Layer NC002. Having only Diffuse Layer NC002 for the brightest part of the Lit Surface increases its brightness. Having both Diffuse Layer NC002 and Diffuse Layer NC003a-b over most of the Lit Surface both reduces its brightness, compared to the brightest area, and greatly reduces the variation in surface brightness that may arise from the internal structure of Light Design NC019. In one or more embodiments, Diffuse Layer NC002 may be created from two 0.05 mm layers of white filament. Bulb Cone NC006 also includes: Light Baffles NC004a-b which may be constructed by 3D printing of many layers of a, possibly shiny, reflected color neutral plastic, for example HATCHBOX True White PLA or 3D Solutech Silver Metal PLA, in a way that provides a solid outer casing for Light Design NC019 that is also thick enough to not let significant light escape; Light Baffles NCO20a-b which may be constructed by 3D printing of many layers of a, possibly shiny, reflected color neutral plastic, for example HATCHBOX True White PLA or 3D Solutech Silver Metal PLA, in a way that provides a reflective, or absorbent, light barrier; Mounting Can NC005a-b which may be constructed by 3D printing many layers of a, possibly shiny, reflected color neutral plastic, for example HATCHBOX True White PLA or 3D Solutech Silver Metal PLA, in a way that provides a solid outer casing for Light Design NC019 that is also thick enough to not let significant light escape. The relative brightness of different areas of the Lit Surface, of Light Design NC019, may be changed by altering Distance NCO23 and Distances NCO22a-b.

The Attenuating Diffuser of Diffuser Can NC011, of FIG. 125, includes three layers: a Transparent Layer NC007a-b which may be constructed by 3D printing of two 0.2 mm layers of transparent filament, for example 3D Solutech Natural Clear PLA, onto the Heated Bed of a 3D Printer, this is used to provide mechanical strength for the Attenuating Diffuser and also to provide a bed for Diffuse Layer NC008a-b; a Diffuse Layer NC008a-b which may be constructed by 3D printing of one 0.1 mm layer of white filament, for example HATCHBOX True White PLA, onto Transparent Layer NC007a-b; an Attenuating Layer NC009a-b which may be constructed by 3D printing of four 0.1 mm layers of black filament, for example 3D Solutech Real Black PLA, on a fraction of Diffuse Layer NC008a-b. Diffuser Can NC011 also includes Light Baffles NC010a-b, these both keep the light, from LED NC015, within Light Design NC019 and position the Attenuating Diffuser, they may be constructed by 3D printing of many layers of a, possibly shiny, reflected color neutral plastic, for example HATCHBOX True White PLA or 3D Solutech Silver Metal PLA, in a way that provides a reflective, or absorbent, light barrier. The geometry of an assembled Light Design NC019 may have: Light Baffles NC004a-b and NCO20a-b either parallel with, or close to parallel with, light rays from LED NC015; the central hole in Attenuating Diffuser, of Diffuser Can NC011, sized and positioned such that direct lighting by LED NC015 just covers the area of the Lit Surface which does not have Diffuser Layer NC003a-b, see Light Rays NC018a-b. In one or more embodiments, the thickness of plastic layers in a Lit Surface or Attenuating Diffuser may be different, for example three 0.1 mm or five 0.05 mm layers of black filament may be used for an Attenuating Layer NC009a-b.

FIG. 126 includes a more detailed representation of the Attenuating Diffuser of a Diffuser Can NC011. This Attenuating Diffuser is shown in an assembled Light Design NC019, along with: Light Baffles ND005a-b of a Diffuser Can NC011; Base Sides ND004a-b of a Bulb Base NC014; Light Baffles ND001a-b, Light Baffles ND002a-b and Mounting Can ND003a-b of a Bulb Cone NC006. Transparent Layer ND006a-b and Diffuse Layer ND007a-b are shown to a similar level of detail as provided in FIG. 125. Small Absorbent Blocks ND008a-f and Large Absorbent Blocks ND009a-f, both of which prevent nearly all visible light passing through them, provide a more detailed depiction of an Attenuating Layer NC009a-b. Small Absorbent Blocks ND008a-f allow more light to pass into the space between Light Baffles ND002a-b than Large Absorbent Blocks ND009a-f allow to pass into the spaces between Light Baffles ND001a-b and ND002a-b, for example: the space between Light Baffles ND002a-b includes Light Ray ND011a which arises as a consequence of Light Ray ND010b passing between Small Absorbent Blocks ND008c-d and interacting with Diffuse Layer ND007b; the space between Light Baffles ND002a-b includes Light Ray NDO 1 lb which arises as a consequence of Light Ray ND010a passing between Small Absorbent Blocks ND008e-f and interacting with Diffuse Layer ND007b; the space between Light Baffles ND001b and ND002b includes Light Ray NDO11d which arises as a consequence of Light Ray ND010d passing between Large Absorbent Blocks ND009e-f and interacting with Diffuse Layer ND007b; the space between Light Baffles ND001b and ND002b includes Light Ray ND012 which arises as a consequence of Light Ray ND010c passing between Large Absorbent Blocks ND009d-e, interacting with Diffuse Layer ND007b and bouncing off of Light Baffle ND002b. The smaller size, and possibly larger spacing, of Small Absorbent Blocks ND008a-f allows more light to pass than the larger size, and possibly smaller spacing, of Large Absorbent Blocks ND009a-f. Consequently, the Sections NB006a-b, of Lit Surface NB010 for the design of FIGS. 125-126, should have a much lower brightness than Sections NB005a-b for the same brightness of LED NB001. The size and separation of both Small Absorbent Blocks ND008a-f and Large Absorbent Blocks ND009a-f are such that the brightness within Sections NB004, NB005a-b and NB006a-b, for a Light Design NC019, may be approximately uniform. In one or more embodiments, a circular Light Design NC019 may have ring shaped Absorbent Blocks, for example ND009c and ND009d may be opposite sides of a ring that runs into and out of the plane of the page of FIG. 126. In one or more embodiments, a rectangular Light Design NC019 may have bar shaped Absorbent Blocks, for example ND009c and ND009d may be slices through a pair of bars that run into and out of the plane of the page of FIG. 126. In one or more embodiments, nested Absorbent Blocks may provide lights with enlarged apparent size change whose lit surfaces have a wide variety of shapes, for example a rectangular block with circular ends, an octagon, a triangle or a flower shape.

Combining the various methods for attenuating and redirecting light depicted in FIGS. 125-126 may provide the brightness levels necessary for the method of FIG. 124 to enlarge the apparent size change of an individual light.

In one or more embodiments, the apparent size change for an individual light may be enlarged by the method depicted in FIG. 127. The Wider Light, of FIG. 127, includes LED NE001, Light Baffles NE008a-b, Attenuating Diffusers NE002a-b, Attenuating Refractors NE003a-b and Lit Surface NE010. Light Rays, for example Light Rays NE009d-f, pass through the space between Attenuating Refractors NE003a-b, brightly lighting Section NE004 of Lit Surface NE010. Lit Surface NE010 is a translucent diffuser and consequently impinging Light Rays, for example Light rays NE009d-f which radiate from LED NE001 or Light Ray NE009b, emerge from its external surface radiating in all directions, for example Light Ray NE009h may be produced as a consequence of impinging Light Ray NE009f. Section NE004, of Lit Surface NE010, is brightly lit by LED NE001, consequently it may appear to be brightly lit over nearly all angles from which it can be seen. Attenuating Refractors NE003a-b are translucent refractors which attenuate impinging light, they span the distance from the inner edge of Attenuating Diffusers NE002a-b to the edge of the hole through which Light Rays NE009d-f pass. Attenuating Refractors NE003a-b bend the impinging Light Rays by, at most, a small amount, for example impinging Light Ray NE009j may lead to Light Rays NE009c or NE009k at the limit of the possible direction changes. Consequently, most of the Light Rays from LED NE001 which pass through Attenuating Refractors NE003a-b cause light rays that impinge on Lit Surface NE010 within Sections NE005a-b, mostly affecting their brightness. As in Section NE004, the approximately aligned Light Rays which impinge on Sections NE005a-b, of Lit Surface NE010, may emerge from its external surface radiating in all directions, for example Light Ray NE009i may be produced as a consequence of impinging Light Ray NE009c. Attenuating Refractors NE003a-b contribute most of the light that emerges from Sections NE005a-b. Attenuating Diffusers NE002a-b are translucent diffusers which attenuate impinging light more than Attenuating Refractors NE003a-b, they span the distance from reflective Light Baffles NE008a-b to the outer edge of Attenuating Refractors NE003a-b. Light Rays, from LED NE001, that impinge on Attenuating Diffusers NE002a-b may emerge from its other surface radiating in all directions, for example Light Ray NE009m impinges on Attenuating Diffuser NE002b leading to the emergence of light rays that may include Light Ray NE009b. Light Baffles NE008a-b allow nearly all the light emitted by Attenuating Diffusers NE002a-b to impinge on Section NE006, or any part, of Lit Surface NE010, for example Light Ray NE009a is reflected off Light Baffle NE008a at Position NE007a keeping it within Light Baffles NE008a-b. As the direct lighting of Section NE004, by LED NE001, is much brighter than the light it receives from Attenuating Diffusers NE002a-b, they only contribute a small fraction of the total light that emerges from it. As the lighting of Sections NE005a-b by Attenuating Refractors NE003a-b is much brighter than the light they receive from Attenuating Diffusers NE002a-b, they only contribute a small fraction of the total light that emerges from Sections NE005a-b. Attenuating Diffusers NE002a-b contribute nearly all of the light that emerges from Sections NE011a-b, for example Light Ray NE009b impinges on Lit Surface NE010 leading to the emergence of light rays that may include Light Ray NE009g. The method of FIG. 127 may create a Lit Surface NE010 which appears lit over a wide range of viewing angles and has: a brightly lit central area; medium brightness areas around the central area; low brightness areas on the outside. These variable brightness zones allow the creation of a light with an apparent size that changes dependent on the brightness of the light and the ambient light level at the light's location, as depicted in FIGS. 92-93 and FIG. 130.

FIG. 128 depicts a Light Design NF019 that may be used, in one or more embodiments, to realize a light with enlarged apparent size via the method of FIG. 127. Light Design NF019 may be constructed using a Material extrusion 3D printer, for example the Prusa i3 MK2, from four or more components that include LED NF015, Bulb Base NF014, Bulb Cone NF006 and Diffuser Can NF011. LED NF015 may be a digitally controlled LED, or other light source, that may be capable of producing multiple colors, for example a Worldsemi WS2812B. Bulb Cone NF006 may be printed with Transparent Layer NF001 on the Heated Bed of a 3D Printer. Diffuser Can NF011 may be printed with Transparent Layers NF007a-b on the Heated Bed of a 3D Printer. Bulb Base NF014 may be printed with its Bottom Face NF021 on the Heated Bed of a 3D Printer. A Light Design NF019 may be assembled by: inserting a Diffuser Can NF011, with Transparent Layers NF007a-b facing up, into a Bulb Base NF014, see Diffuser Can NF012; placing a Bulb Cone NF006, with its Transparent Layer NF001 facing up, over the Diffuser Can NF012, see Bulb Cone NF013. The assembled Light Design NF019 does not show any of the fasteners which may be included in one or more embodiments that use it. Please note that some parts of FIG. 128 are dimensionally exaggerated in order to show details of both the Lit Surface of Bulb Cone NF006 and the Attenuating Diffuser of Diffuser Can NF011.

The Lit Surface of Bulb Cone NF006, of FIG. 128, includes 3 layers: a Transparent Layer NF001 which may be constructed by 3D printing of two 0.2 mm layers of transparent filament, for example 3D Solutech Natural Clear PLA, onto the Heated Bed of a 3D Printer, this is used to provide mechanical strength for the Lit Surface and also to provide a bed for Diffuse Layer NF002; a Diffuse Layer NF002 which may be constructed by 3D printing of one 0.1 mm layer of white filament, for example HATCHBOX True White PLA, onto Transparent Layer NF001; a Diffuse Layer NF003a-b which may be constructed by 3D printing of two 0.1 mm layers of white filament, for example HATCHBOX True White PLA, onto Diffuse Layer NF002. Having only Diffuse Layer NF002 for the brightest part of the Lit Surface increases its brightness. Having both Diffuse Layer NF002 and Diffuse Layer NF003a-b over most of the Lit Surface both reduces its brightness, compared to the brightest area, and greatly reduces the variation in surface brightness that may arise from the internal structure of Light Design NF019. In one or more embodiments, Diffuse Layer NF002 may be created from two 0.05 mm layers of white filament. Bulb Cone NF006 also includes: Light Baffles NF004a-b which may be constructed by 3D printing of many layers of a, possibly shiny, reflected color neutral plastic, for example HATCHBOX True White PLA or 3D Solutech Silver Metal PLA, in a way that provides a solid outer casing for Light Design NF019 that is also thick enough to not let significant light escape; Mounting Can NF005a-b which may be constructed by 3D printing many layers of a, possibly shiny, reflected color neutral plastic, for example HATCHBOX True White PLA or 3D Solutech Silver Metal PLA, in a way that provides a solid outer casing for Light Design NF019 that is also thick enough to not let significant light escape.

The Refracting Diffuser of Diffuser Can NF011, of FIG. 128, includes three layers: a Transparent Layer NF007a-b which may be constructed by 3D printing of two 0.2 mm layers of transparent filament, for example 3D Solutech Natural Clear PLA, onto the Heated Bed of a 3D Printer, this is used to provide mechanical strength for the Refracting Diffuser, a bed for Diffuse Layer NF008a-b and also for its ability to slightly bend light; a Diffuse Layer NF008a-b which may be constructed by 3D printing of one 0.1 mm layer of white filament, for example HATCHBOX True White PLA, onto a fraction of Transparent Layer NF007a-b; an Attenuating Layer NF009a-b which may be constructed by 3D printing of four 0.1 mm layers of black filament, for example 3D Solutech Real Black PLA, onto a fraction of Diffuse Layer NF008a-b. Diffuser Can NF011 also includes Light Baffles NF010a-b, these both keep the light, from LED NF015, within Light Design NF019 and position the Refracting Diffuser, they may be constructed by 3D printing of many layers of a, possibly shiny, reflected color neutral plastic, for example HATCHBOX True White PLA or 3D Solutech Silver Metal PLA, in a way that provides a reflective, or absorbent, light barrier. The geometry of an assembled Light Design NF019 may have: Light Baffles NF004a-b either parallel with, or close to parallel with, light rays from LED NF015; the central hole in the Refracting Diffuser, of Diffuser Can NF011, sized and positioned such that direct lighting by LED NF015 just covers the area of the Lit Surface which does not have Diffuser Layer NF003a-b, see Light Rays NF018a-b. In one or more embodiments, the thickness of plastic layers in a Lit Surface or Refracting Diffuser may be different, for example three 0.1 mm or five 0.05 mm layers of black filament may be used for an Attenuating Layer NF009a-b.

FIG. 129 includes a more detailed representation of the Refracting Diffuser of a Diffuser Can NF011. The Refracting Diffuser is shown in an assembled Light Design NF019, which also includes: Light Baffles NG005a-b of a Diffuser Can NF011; Base Sides NG004a-b of a Bulb Base NF014; Light Baffles NG001a-b and Mounting Can NG003a-b of a Bulb Cone NF006. Transparent Layer NG006a-b is shown to a similar level of detail as provided in FIG. 128. Large Diffusing Blocks NG007a-b and Small Mounting Blocks NG014a-f provide a more detailed depiction of a Diffuse Layer NF008a-b. Small Absorbent Blocks NG008a-f and Large Absorbent Blocks NG009a-f, both of which prevent nearly all visible light passing through them, provide a more detailed depiction of an Attenuating Layer NF009a-b.

Light Rays from an LED NF015 that pass between Large Absorbent Blocks NG009a-f may impinge on Diffuse Layer NG007a-b and emerge from the surface of the Refracting Diffuser radiating in all directions, for example Light Ray NG010c impinges on Diffuse Layer NG007b leading to the emergence of light rays, from Translucent Layer NG006b, that may include Light Ray NG011a. Light Baffles NG001a-b should mostly keep these light rays within the Bulb Cone NF006, for example Light Ray NG011b is reflected off of Light Baffle NG001b at Position NG012 keeping it within Light Baffles NG001a-b. Light Rays from an LED NF015 that pass between Small Absorbent Blocks NG008a-f may also pass between Small Mounting Blocks NG014a-f and impinge on Transparent Layer NG006a-b, these light rays may emerge from the surface of Translucent Layer NG006a-b with a slightly different direction than the impinging Light Ray, for example: when Light Ray NG010b impinges on Transparent Layer NG006b the Light Rays that emerge may include Light Ray NG013c or NG013d; when Light Ray NG010a impinges on Transparent Layer NG006b the Light Rays that emerge may include Light Ray NG013a or NG013b. A small, and variable, change in direction has been observed for light rays crossing a thin 3D printed Translucent Layer NG006a-b with an angle of incidence which is less than 30 degrees, it is believed to arise from the small scale structure created by 3D printing. Small Mounting Blocks NG014a-f may be made from the same material as Diffuse Layer NG007a-b, allowing a Light Design NF019 to be printed with a material extrusion 3D Printer, and toolset, that support material layering. In one or more embodiments, Small Mounting Blocks NG014a-f may not be included in a Light Design NF019. The smaller size, and possibly larger spacing, of Small Absorbent Blocks NG008a-f allows more light to pass than the larger size, and possibly smaller spacing, of Large Absorbent Blocks NG009a-f. In addition, Diffuse Layer NG007a-b should attenuate light rays passing between Large Absorbent Blocks NG009a-f and their light may be spread over the entire Lit Surface. Consequently, the Sections NE011a-b, of Lit Surface NE010 for the design of FIGS. 128 and 129, should have a much lower brightness than Sections NE005a-b for the same brightness of LED NE001. The size and separation of both Small Absorbent Blocks NG008a-f and Large Absorbent Blocks NG009a-f are such that the brightness within Sections NE004, NE005a-b and NE011a-b, for a Light Design NF019, may be approximately uniform.

In one or more embodiments, a circular Light Design NF019 may have ring shaped Absorbent Blocks, for example NG009c and NG009d may be opposite sides of a ring that runs into and out of the plane of the page of FIG.

129. In one or more embodiments, a rectangular Light Design NF019 may have bar shaped Absorbent Blocks, for example NG009c and NG009d may be slices through a pair of bars that run into and out of the plane of the page of FIG. 129. In one or more embodiments, nested Absorbent Blocks may provide lights with enlarged apparent size change whose lit surfaces have a wide variety of shapes, for example a rectangular block with circular ends, an octagon, a triangle or a flower shape.

Combining the various methods for attenuating and redirecting light depicted in FIGS. 128 and 129 may provide the brightness levels necessary for the method of FIG. 127 to enlarge the apparent size change of an individual light.

FIG. 130 depicts a light with enhanced apparent size change for lights created using the methods of FIGS. 124 through 129. In one or more embodiments, Light Design NH003 may be a Light Design NC019, as depicted in FIG. 130, or a Light Design NF019. The brightness of light emerging from Lit Surface NH013 may be split into Sections NH010, NH011a-b and NH012a-b, producing the light Intensity Curves NH015a-b that may be seen by an observer. Bulb Light NH001 has a circular Lit Surface with: a lit circle for Section NH010 of Lit Surface NH013 which is bounded by Ring Boundary NH006c; a lit ring for Sections NH011a-b of Lit Surface NH013 which is bounded by Ring Boundaries NH006b-c; a lit ring for Sections NH012a-b of Lit Surface NH013 which is bounded by Ring Boundaries NH006a-b. Light Design NH003 may be a representation of Bulb Light NH001 along Section View NH009a. Strip Light NH002 has a rectangular Lit Surface with: a lit central bar for Section NH010 of Lit Surface NH013 which is bounded by Line Boundaries NH007c-d; a pair of lit bars for Sections NH011a-b of Lit Surface NH013 which are bounded by Line Boundaries NH007b-c and NH007d-e; a pair of lit bars for Sections NH012a-b of Lit Surface NH013 which are bounded by Line Boundaries NH007a-b and NH007e-f. Light Design NH003 may be a representation of Strip Light NH002 along Section View NH009b. When a dimmer LED NH005, which may be an LED NC015 or NF015, produces Intensity Curve NH015a, the light emerging from Sections NH012a-b, of Lit Surface NH013, is below Perceivable Level NH016. When a brighter LED NH005 produces Intensity Curve NH015b, the light emerging, from Sections NH012a-b, of Lit Surface NH013, is above Perceivable Level NH016. Hence, as the light emitted by LED NH005 increases more of Lit Surface NH013 may appear to be lit. There may be step changes in the apparent size of Lit Surface NH013 due to the shape of Intensity Curves NH015a-b. The Translucent Diffusers in Lit Surface NH013 may produce light rays that radiate in all directions from all points on its surface. Consequently, it can be seen that: the size of the visibly lit part of Lit Surface NH013, of a Bulb Light NH001, may be a circle of variable size; the size of the visibly lit part of Lit Surface NH013, of a Strip Light NH002, may be a rectangle of variable width. In one or more embodiments, the variable attenuation effect depicted in FIG. 93 may be used to smooth out the step changes in size depicted in FIG. 130.

In one or more embodiments, one or more of LEDs NB001, NC015, NE001 and or NF015 may be: one or more LEDs that may produce one or more different light colors, for example a red, green and blue set of LEDs; one or more Light Sources, with one or more different colors, that are not LEDs. The one or more light sources that may act as an LED NB001, NC015, NE001 or NF015 in one or more embodiments, should be positioned such that they are effectively a point, or line, source of light when illuminating the center Section of a Lit Surface, for example Section NB004, and the Attenuating Refractors NE003a-b.

FIG. 131 depicts the exemplary generation and display of a light show, which may include one or more light animations, by a system that has the exemplary architecture of FIG. 1. This authoring system may be used to author light shows for display on one or more physical lights sets that include one or more subsets of lights with perspective projections that present tessellated light geometries.

The authoring system 100 includes an internet server 105. In some embodiments, the internet server 105 may be a large computer system. In this depicted example, the internet server 105 includes a light model database 110. The light model database 110 may be accessed by different authoring tools. In this depicted example, the light model database 110 is accessed by a first authoring tool 115 and a second authoring tool 120. The first authoring tool 115 may be used by a first pattern author to create a first pattern for a light model. The second authoring tool 120 may be used by a second pattern author to create a second pattern for the light model. The first pattern and the second pattern may be merged together to form a complete light model, for example in the internet server 105, the first authoring tool 115, the device 135, the light show controller 140 or the second authoring tool 120. In this depicted example, the first pattern author and the second pattern author work collaboratively to create the complete light model. The light model database 110 is also accessible by other authoring tools, e.g., a laptop 125. One or more motion authors may create motions for one or more light models. In this depicted example, a motion author uses a third authoring tool 125 to create a motion for the one or more light models from first authoring tool 115 and second authoring tool 120. In some embodiments, these may then be used by the internet server 105, the first authoring tool 115, the device 135, the light show controller 140 or the second authoring tool 120 to create a light animation.

In some embodiments, a light show user may search and preview light animations stored in the light animation database 130. The light show user downloads a selected light animation to a light show controller 140 to control his light set 145. In some embodiments, the light show controller 140 may be configured to access the internet server 105 directly. In some embodiments, the light show user may select and download a light animation to control the light set 145 through a user interface of the light show controller 140. In this depicted example, the light show controller is configured by a device 135. The device 135 may be used to preview and select one or more light animations from the light animation database 130 or one or more light shows. A control signal for a physical light set may include a signal that causes the physical light set to present one or more animations. This signal component may be generated for the one or more animations using the process described in FIGS. 45-50. In some embodiments, one or more of the authoring tools (e.g., the authoring tools 115, 120, and 125), the light controller (e.g., the light controller 140), and the device (e.g., the device 135) may be a cell phone or a laptop. In some embodiments, the internet server 105 may also include a light show database. A light show designer may access the light animation database and select a series of light animations to be performed during a light show. The light show designer may design a timeline and sequence to play the series of light animations. The designed light show may be stored in the light show database to be downloaded by the light show user. In some embodiments, the internet server may also include a light mapping database. The light show user may upload his light mapping structure to the light mapping database. The pattern authors, motion authors, and light show designers may take the light mapping structure into consideration when creating their work.

In some embodiments, the internet server 105 may provide a light animation service, a search service, and a light show service. The light animation service may communicate with authoring tools via messages over a communication channel. In some embodiments, there may be many communication channels connecting the light animation service to multiple different authoring clients. The light animation service may communicate with configuration tools via messages over multiple communication channels. In some embodiments, there may be multiple communication channels connecting the light animation service to the configuration clients. In some embodiments, there may be multiple communication channels connecting the light animation service to light show clients. In some embodiments, the authoring client, the searching client and/or the configuration client may be a cell phone or a laptop. In some embodiments, the light show client may be an electronic device with an interface that can control a physical light set.

FIG. 132 depicts an exemplary light show implemented with lights having variable apparent sizes. As shown in FIG. 132, a light show includes a number of lights that are controlled to present a Christmas tree, candy canes and a path. In this depicted example, as shown in FIG. 132, the lights used to form the path can provide variable apparent sizes. For example, light 150 is controlled to have a larger apparent size than light 155. By dynamically changing the apparent size of one or more lights, the animation and visual effects of a light show may be advantageously improved. The lights used in the light show may include an optical display device to provide variable apparent sizes of a light. The exemplary architectures for the optical display device have been discussed in detail with reference to FIGS. 89-95 and FIGS. 124-130. Control signals may be used to control the light intensity emitted by, for example, LEDs arranged within the optical display structure to obtain the variable apparent sizes. An exemplary system used to update the control signals (such that the intended apparent size is achieved) has been discussed in detail with reference to FIGS. 96-100 and 123. Various devices (e.g., the first authoring tool 115, the device 135, the light show controller 140 or the second authoring tool) may also be used to generate the control signals for a light show.

The optical display structures disclosed with reference to FIGS. 89-95 and FIGS. 124-130 may be applied to the light set 145 as shown in FIG. 131. One or more human computer interfaces (HCIs) may be used to generate control signals for light sources in the light set 145 for the generation of a light show enhanced by a plurality of lights with variable apparent size. The HCIs may include one or more per-light graphics for lights of variable apparent size, each of which represents the variable apparent size of one light with a varying number of pixels. A control signal for a light show which includes lights of variable apparent size may be created from data which includes the data on lights with variable apparent size entered into the HCI. The control signal may be then sent to a light set (e.g., the light set 145) which includes a plurality of lights with the optical display structures to generate variable apparent size and these lights may be used to display the light show.

In some embodiments, the per-light graphic for a bulb light of variable apparent size may be a circle (e.g., as shown in FIG. 92) with a radius that represents the apparent size of the light. In some embodiments, the per-light graphic for a strip light of variable apparent size may be a line with a width that represents the apparent width of the light (e.g., as shown in FIG. 92). In some embodiments, some of the lights, including lights with variable apparent size, may have a 3D geometry that presents one or more perspective projections suitable for displaying animations. In some embodiments, animations that may be viewed from one or more of the perspective projections may be embedded in the generated control signal. In some embodiments, artwork and motion may be captured separately.

Although various embodiments have been described with reference to the Figures, other embodiments are possible. Some aspects of embodiments may be implemented as a computer system. In one exemplary aspect, an optical display apparatus includes (a) a first baffle (e.g., JF003*d*), having a first wall extending between a first proximal end and a first distal end to define a first chamber, arranged to guide a first beam of light (e.g., the light entering at Entry Position JF012) being distributed over a first angle with respect to an optical axis that originates at a light source, (b) a second baffle (e.g., JF003*e* or JF003*f*), having a second wall extending between a second proximal end and a second distal end to define a second chamber, arranged to guide a second beam of light (e.g., light enters the region between the first baffle and second baffle) being distributed over a second angle with respect to a surface defined by the first angle that originates at the light source, and, (c) a translucent diffusion medium (e.g., JF013), arranged on the second baffle, defines at least a first display region and a second display region, the first display region lies within the second display region such that the second display region extends outside of the first display region, the first beam of light arrives at the first display region of the translucent diffusion medium, and the second beam of light arrives at the second display region of the translucent diffusion medium, wherein, the first baffle is nested in the second baffle such that a first intensity of the first beam of light is stronger than a second intensity of the second beam of light.

In some embodiments, the optical display apparatus may also include a third baffle, the second baffle may be nested in the third baffle. In some embodiments, the light source may also include one or more LEDs. In some embodiments, the one or more LEDs are configured to emit light with different colors. In some embodiments, the optical display apparatus may also include (d) a light diffuser layer, arranged to cover the one or more LEDs, configured to diffuse lights from the one or more LEDs, the light diffuser layer may be in directly contact with the first proximal end of the first baffle.

In another exemplary aspect, an optical display includes (a) a first diffusion medium (Attenuating Diffusers NB002*a-b*, NB003*a-b*) having a first proximal surface and a first distal surface and arranged to receive, on the first proximal surface, light output by a light source, the received light being distributed over a first angle with respect to an optical axis (e.g., a vertical axis) that originates at the light source, and the first diffusion medium defines at least a first intermediate region (light between the NB009*e* and NB009*d*) and a second intermediate region (light in any other regions), wherein the first intermediate region lies within the second intermediate region such that the second intermediate region extends outside of the first intermediate region. The optical display also includes (b) a second diffusion medium (NB010) having a second proximal surface and a second distal surface and wherein the second diffusion medium defines at least a first display region (NB004) and a second display region (NB005*a*, NB005*b*, NB006*a*, NB006*b*), the first display region (NB004) lies within the second display region (NB005a, NB005b, NB006a, NB006b) such that the second display region extends outside of the first display region. A first beam of light incident on the first proximal surface within the first intermediate region arrives at the first display region of the second diffusion medium, and a second beam of light incident on the first proximal surface within the second intermediate region arrives at the second display region of the second diffusion medium, and a first diffusion coefficient of the first intermediate region (air or other gases) is less than a second diffusion coefficient of the second intermediate region (Attenuating Diffusers NB002a-b, NB003a-b) such that a first intensity of the first beam of light is stronger than a second intensity of the second beam of light.

In some embodiments, the first diffusion medium may be formed with an annular shape having an aperture (the opening), and a region defined by the aperture may be the first intermediate region, the aperture may be oriented orthogonally to the optical axis. In some embodiments, the first diffusion medium may also include comprises a translucent refractor configured to attenuate impinging light. In some embodiments, the second diffusion medium may also include a translucent refractor. In some embodiments, the optical display apparatus may also include a first reflective wall (e.g., nested baffles NB008a, NB008c) extending between the first diffusion medium and the second diffusion medium and arranged to substantially guide light from the second intermediate region to the second display region. In some embodiments, the first diffusion medium may also defines third intermediate region (NE002a), the second intermediate region (NE003a) may lie within the third intermediate region such that the third intermediate region extends outside of the second intermediate region, the third intermediate region may be configured to have a diffusion coefficient greater than the second diffusion coefficient.

In some embodiments, the second diffusion medium further defines a third display region (NE011a), the second display region (NE005a) lies within the third display region such that the third display region extends outside of the first display region, wherein a third beam of light (e.g., NE009a) incident on the first proximal surface within the third intermediate region arrives at the third display region of the second diffusion medium. In some embodiments, the optical display apparatus may also include a first plurality of absorption blocks (e.g., ND008c) arranged on the first proximal surface of the second intermediate region and a second plurality of absorption blocks (e.g., ND009b) arranged on the first proximal surface of the third intermediate region, wherein each absorption block of the first plurality of absorption blocks has a smaller size than each absorption block of the second plurality of absorption blocks. In some embodiments, the optical display apparatus may also include (c) a first baffle (e.g., ND002a), having a first wall extending between a first proximal end and a first distal end to define a first chamber, arranged between the first diffusion medium and the second diffusion medium to guide a first beam of light being distributed over a first angle with respect to an optical axis that originates at a light source; and, (d) a second baffle (e.g., ND001a), having a second wall extending between a second proximal end and a second distal end to define a second chamber, arranged between the first diffusion medium and second diffusion medium to guide a second beam of light being distributed over a second angle with respect to a surface defined by the first angle that originates at the light source. In some embodiments, the first baffle and the second baffle may be formed by additive manufacture.

In another exemplary aspect, a method to implement an optical display apparatus includes (a) providing a first diffusion medium having a first proximal surface and a first distal surface, the first diffusion medium defines at least a first intermediate region and a second intermediate region, (b) arranging the first diffusion medium to receive, on the first proximal surface, light output by a light source, the received light being distributed over a first angle with respect to an optical axis that originates at the light source, wherein the first intermediate region lies within the second intermediate region such that the second intermediate region extends outside of the first intermediate region, and, (b) providing a second diffusion medium having a second proximal surface and a second distal surface, the second diffusion medium defines at least a first display region and a second display region, wherein the first display region lies within the second display region such that the second display region extends outside of the first display region. A first beam of light incident on the first proximal surface within the first intermediate region arrives at the first display region of the second diffusion medium, and a second beam of light incident on the first proximal surface within the second intermediate region arrives at the second display region of the second diffusion medium, a first diffusion coefficient of the first intermediate region is less than a second diffusion coefficient of the second intermediate region such that a first intensity of the first beam of light is stronger than a second intensity of the second beam of light.

In some embodiments, the first diffusion medium may be formed with an annular shape that having an aperture, the aperture may be oriented orthogonally to the optical axis. In some embodiments, the first diffusion medium may include a translucent refractor configured to attenuate impinging light. In some embodiments, the method may also include (c) providing a first baffle having a first wall extending between a first proximal end and a first distal end to define a first chamber, arranging the first baffle between the first diffusion medium and the second diffusion medium to guide a first beam of light being distributed over a first angle with respect to an optical axis that originates at a light source; and, (d) providing a second baffle having a second wall extending between a second proximal end and a second distal end to define a second chamber, and arranging the second baffle between the first diffusion medium and second diffusion medium to guide a second beam of light being distributed over a second angle with respect to a surface defined by the first angle that originates at the light source. In some embodiments, the first baffle and the second baffle may be formed by additive manufacture.

Some embodiments may be related to authoring light shows that include complex and visually pleasing animations, it is applicable when the light set used for the show includes a plurality of lights with positions that, for one or more observer positions, create perspective projections with tessellated light geometries. In one or more embodiments, the creation of Light Show content is simplified so significantly that new forms of Light Show become practical. In one or more embodiments, collaborative authoring of Light Show content may be achieved.

In one or more embodiments, the system architecture may include an Internet Server, one or more Authoring Clients that may be used to create Light Show content, one or more Configuration Clients that may be used to create Light Shows and one or more Light Show Clients, each of which may be used to display one or more Light Shows on a Physical Light Set. Each Physical Light Set is a plurality of precision controlled lights, with either all or some of the light plurality arranged such that one or more perspective projections present tessellated geometries.

In one or more embodiments, the system may control scheduling of Light Effect changes via one or more Light Animations. Each Light Animation being applicable to one tessellated geometry. One or more Light Animations, with one or more tessellated geometries, may be used to generate, on one Light Show Client, one or more Light Shows with complex and visually pleasing Light Animations. These Light Animations may be visible from observer positions from which subsets of the lights used for the Light Show have perspective projections that present tessellated geometries.

In one or more embodiments, a Light Animation is authored on one or more Authoring Clients using the Authoring Tools, comprising Designer Tool and Director Tool. The Designer Tool is used to create one or more Light Patterns and, in one or more embodiments, other Light Effects of interest. The Director Tool is used to create the sequence of changes in a Light Animation, for example a position or Light Pattern change, that when applied to the Light Patterns, and or Light Effects, from the Designer Tool create one or more complex and visually pleasing Light Animations. The Authoring Tools may be configured to support one or more tessellated light geometries.

In one or more embodiments, the Authoring Tools are run on Authoring Clients and save the Light Pattern and Light Change data they generate to the Internet Server. The Internet Server can use the data saved by one Director Tool Session and one or more Designer Tool Sessions to create one Light Animation, over time generating a plurality of Light Animations from the plurality of Director Tool Sessions saved. These Light Animations may then be either downloaded or, in one or more embodiments, streamed to one or more Light Show Clients. The one or more Light Show Clients combine the one or more Light Animations, downloaded or streamed, in different ways and present them on their Physical Light Sets to generate one or more Light Shows that are enhanced with more visually complex and pleasing displays, from observer positions with perspective projections that present tessellated light geometries.

One or more Light Animations, for one tessellated geometry, can be presented on a plurality of different light configurations with perspective projections that present the tessellated geometry from one or more perspectives. The Designer and Director Tools support designing for tessellated geometries of unlimited extent. Consequently, a Light Animation may be used to provide an enhanced Light Show on a plurality of different light configurations, if those configurations present its tessellated geometry from one or more perspectives.

Various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors and may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices. IoT devices may also support display of data, for example a light show.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. An optical display apparatus comprising:
   a control engine configured to receive a control signal to display a first light show; and,
   an optical display structure comprising a plurality of light sets configured to display the first light show, wherein the first light show defines a first set of apparent light size of the plurality of light sets, and wherein each light set further comprising:
   (a) a light source configured to emit a light in response to a signal from the control engine;
   (b) a first opaque baffle having a first wall extending between a first proximal end and a first distal end to define a first chamber, and being arranged to guide a first beam of light being distributed over a first angle with respect to an optical axis that originates at the light source;
   (c) a second opaque baffle having a second wall extending between a second proximal end and a second distal end to define a second chamber, and being arranged to guide a second beam of light being distributed over a second angle with respect to a surface defined by the first angle that originates at the light source; and,
   (d) a translucent diffusion medium arranged at a distal end of the second opaque baffle, the translucent diffusion medium comprising a first display region and a second display region, wherein the first display region lies within the second display region, wherein the first opaque baffle is nested in the second opaque baffle such that a first intensity of the first beam of light is stronger than a second intensity of the second beam of light, and,
   wherein, in response to receiving an updated control signal to display a second light show, the second light show corresponding to a second set of apparent light size of the plurality of light sets, such that the light source, the first opaque baffle, the second opaque baffle, and the translucent diffusion medium cause the first light show to transition to a second light show displayed,
   wherein, the second light show is generated by transformation operations comprising at least one of adjusting an orientation, a relative position, and a display size of the first light show.

2. The optical display apparatus of claim 1, wherein the first beam of light arrives at the first display region of the translucent diffusion medium, and the second beam of light arrives at the second display region of the translucent diffusion medium.

3. The optical display apparatus of claim 1, wherein the light source comprises one or more LEDs.

4. The optical display apparatus of claim 3, wherein the one or more LEDs are configured to emit light with different colors.

5. The optical display apparatus of claim 1, further comprising:
   (e) a light diffuser layer arranged to cover the light source and to diffuse the received light therefrom, wherein the light diffuser layer is in direct contact with the first proximal end of the first opaque baffle.

6. An optical display apparatus comprising:
   a control engine configured to receive a control signal to display a first light show; and,
   an optical display structure comprising a plurality of light sets configured to display the first light show, wherein the first light show defines a first set of apparent light size of the plurality of light sets, and wherein each light set further comprising:
   (a) a light source configured to emit a light in response to a signal from the control engine;
   (b) a first diffusion medium having a first proximal surface and a first distal surface and arranged to receive, on the first proximal surface, the light output by the light source, the received light being distributed over a first angle with respect to an optical axis that originates at the light source and is substantially orthogonal to the first proximal surface, and the first diffusion medium comprises at least a first intermediate region and a second intermediate region; and, (c) a second diffusion medium comprises a first display region and a second display region, wherein a first diffusion coefficient of the first intermediate region is less than a second diffusion coefficient of the second intermediate region such that a first intensity of the first beam of light is stronger than a second intensity of the second beam of light; and, wherein, in response to receiving an updated control signal to display a second light show, the second light show corresponding to a second set of apparent light size of the plurality of light sets, such that the light source, the first diffusion medium, and the second confusion medium cause the first light show to transition to a second light show displayed, wherein, the second light show is generated by transformation operations comprising at least one of adjusting an orientation, a relative position, and a display size of the first light show.

7. The optical display apparatus of claim 6, wherein the first intermediate region lies within the second intermediate region such that the second intermediate region extends outside of the first intermediate region.

8. The optical display apparatus of claim 6, wherein the second diffusion medium further comprises:
a second proximal surface and a second distal surface, and,
wherein the first display region lies within the second display region such that the second display region extends outside of the first display region, wherein a first beam of light incident on the first proximal surface within the first intermediate region arrives at the first display region of the second diffusion medium, and a second beam of light incident on the first proximal surface within the second intermediate region arrives at the second display region of the second diffusion medium.

9. The optical display apparatus of claim 6, wherein:
the first intermediate region comprises an annular shape circumscribing an aperture, wherein the aperture is oriented orthogonally to the optical axis.

10. The optical display apparatus of claim 6, wherein the first diffusion medium comprises a translucent refractor configured to attenuate impinging light.

11. The optical display apparatus of claim 6, wherein the second diffusion medium comprises a translucent refractor.

12. The optical display apparatus of claim 6, further comprising:
at least one first absorption block arranged on the first proximal surface within the first intermediate region and at least one second absorption block arranged on the second proximal surface within the second intermediate region.

13. The optical display apparatus of claim 6, further comprising:
(d) a first baffle, having a first wall extending between a first proximal end and a first distal end to define a first chamber, arranged between the first diffusion medium and the second diffusion medium to guide a first beam of light being distributed over a first angle with respect to an optical axis that originates at a light source; and,
(e) a second baffle, having a second wall extending between a second proximal end and a second distal end to define a second chamber, arranged between the first diffusion medium and second diffusion medium to guide a second beam of light being distributed over a second angle with respect to a surface defined by the first angle that originates at the light source.

14. A method to implement an optical display apparatus, the method comprising:

(a) providing a control engine configured to receive a control signal to display a first light show;

(b) providing a light source configured to emit a light in response to a signal from the control engine; wherein the signal represents a first set of apparent light size of the light source;

(c) providing a first diffusion medium having a first proximal surface and a first distal surface, the first diffusion medium comprises a first intermediate region and a second intermediate region;

(d) arranging the first diffusion medium to receive, on the first proximal surface, light output by the light source, the received light being distributed over a first angle with respect to an optical axis that originates at the light source and is substantially orthogonal to the first proximal surface; and, (e) providing a second diffusion medium having a second proximal surface and a second distal surface, the second diffusion medium comprises at least a first display region and a second display region, wherein the first display region lies within the second display region such that the second display region extends outside of the first display region, wherein a first diffusion coefficient of the first intermediate region is less than a second diffusion coefficient of the second intermediate region such that a first intensity of the first beam of light is stronger than a second intensity of the second beam of light, and, in response to receiving an updated control signal to display a second light show, the second light show corresponding to a second set of apparent light size, such that the light source, the first diffusion medium, and the second confusion medium cause the first light show to transition to a second light show displayed, wherein, the second light show is generated by transformation operations comprising at least one of adjusting an orientation, a relative position, and a display size of the first light show.

15. The apparatus of claim 14, wherein the first intermediate region lies within the second intermediate region such that the second intermediate region extends outside of the first intermediate region.

16. The apparatus of claim 14, wherein a first beam of light incident on the first proximal surface within the first intermediate region arrives at the first display region of the second diffusion medium, and a second beam of light incident on the first proximal surface within the second intermediate region arrives at the second display region of the second diffusion medium.

17. The method of claim 14, wherein the first diffusion medium comprises an annular shape circumscribing an aperture, wherein the aperture is oriented orthogonally to the optical axis.

18. The method of claim 14, wherein the first diffusion medium comprises a translucent refractor configured to attenuate impinging light.

19. The method of claim 14, further comprising:
(f) providing a first baffle having a first wall extending between a first proximal end and a first distal end to define a first chamber, arranging the first baffle between the first diffusion medium and the second diffusion medium to guide a first beam of light being distributed over a first angle with respect to an optical axis that originates at a light source; and, (e) providing a second baffle having a second wall extending between a second proximal end and a second distal end to define a second chamber, and arranging the second baffle between the first diffusion medium and second diffusion medium to guide a second beam of light being distributed over a second angle with respect to a surface defined by the first angle that originates at the light source.

20. The optical display apparatus of claim 19, wherein the first baffle and the second baffle are formed by additive manufacture.

* * * * *

UNITED STATES PATENT AND TRADEMARK OFFICE
CERTIFICATE OF CORRECTION

PATENT NO. : 11,600,045 B2  
APPLICATION NO. : 17/650150  
DATED : March 7, 2023  
INVENTOR(S) : Arthur Stephens Page 1 of 1

It is certified that error appears in the above-identified patent and that said Letters Patent is hereby corrected as shown below:

On the Title Page

Related U.S. Application Data, item (63):
After "now Pat. No. 11,282,276" and before the ".", add: "which claims benefit of application No. 63/004,330, filed on April 2, 2020, claims benefit of application No. 63/040,574, filed on June 18, 2020, and is a Continuation in part of application No. PCT/US19/61402, filed on November 14, 2019, which claims benefit of application No. 62/768,460, filed on November 16, 2018, claims benefit of application No. 62/769,103, filed on November 19, 2018, and claims benefit of application No. 62/875,805, filed on July 18, 2019."

Signed and Sealed this  
Twenty-fifth Day of February, 2025

Coke Morgan Stewart  
*Acting Director of the United States Patent and Trademark Office*